(12) United States Patent
Gotoh et al.

(10) Patent No.: US 10,253,259 B2
(45) Date of Patent: *Apr. 9, 2019

(54) POLYMERIZABLE COMPOUND HAVING CONJUGATED BONDS, LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yasuyuki Gotoh, Tokyo (JP); Kazuo Okumura, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 42 days.

This patent is subject to a terminal disclaimer.

(21) Appl. No.: 14/249,045

(22) Filed: Apr. 9, 2014

(65) Prior Publication Data

US 2014/0312274 A1    Oct. 23, 2014

(30) Foreign Application Priority Data

Apr. 17, 2013   (JP) ................................. 2013-086756

(51) Int. Cl.
| | |
|---|---|
| C07C 67/02 | (2006.01) |
| C07C 69/96 | (2006.01) |
| C09K 19/18 | (2006.01) |
| C09K 19/16 | (2006.01) |
| C09K 19/32 | (2006.01) |
| C09K 19/04 | (2006.01) |
| C09K 19/30 | (2006.01) |

(52) U.S. Cl.
CPC .............. *C09K 19/18* (2013.01); *C09K 19/16* (2013.01); *C09K 19/32* (2013.01); *C09K 2019/0448* (2013.01); *C09K 2019/0466* (2013.01); *C09K 2019/168* (2013.01); *C09K 2019/188* (2013.01); *C09K 2019/3027* (2013.01)

(58) Field of Classification Search
CPC ........ C09K 19/18; C09K 19/16; C09K 19/32; C09K 2019/0448; C09K 2019/0466; C09K 2019/468; C09K 2019/188; C09K 2019/3027
USPC .............. 252/299.01, 299.6–299.63, 299.66; 558/260, 265, 266, 267; 560/1, 129, 231, 560/254, 255; 428/1.1
See application file for complete search history.

(56) References Cited

U.S. PATENT DOCUMENTS

| | | | |
|---|---|---|---|
| 2003/0143343 A1 | 7/2003 | Kawabata et al. | |
| 2004/0011996 A1 | 1/2004 | Klasen-Memmer et al. | |
| 2010/0309423 A1 | 12/2010 | Bernatz et al. | |
| 2011/0101269 A1 | 5/2011 | Bernatz et al. | |
| 2013/0277609 A1* | 10/2013 | Goto et al. | 252/299.61 |

FOREIGN PATENT DOCUMENTS

| | | |
|---|---|---|
| CN | 1413969 A | 4/2003 |
| CN | 1707330 A | 12/2005 |
| JP | 2004131704 A | 4/2004 |
| JP | 2010536894 A | 12/2010 |
| JP | 2010537256 A | 12/2010 |

OTHER PUBLICATIONS

Y. Yao, et al., "Synthesis of UV-Curable Liquid Crystalline Diacrylates for the Application of Polarized Electroluminescence," Liquid Crystals, vol. 33, No. 1, Jan. 2006, pp. 33-39.

* cited by examiner

*Primary Examiner* — Geraldina Visconti
(74) *Attorney, Agent, or Firm* — Hogan Lovells US LLP

(57) ABSTRACT

Subject
It is to provide a polymerizable compound having a high polymerization reactivity, a high conversion yield and a high solubility in a liquid crystal composition, a polymerizable composition including this compound, a liquid crystal composite prepared from this polymerizable composition and a liquid crystal display device containing this composite.
Means for solving the Subject
A compound represented by formula (1), the liquid crystal composition and the liquid crystal display device.

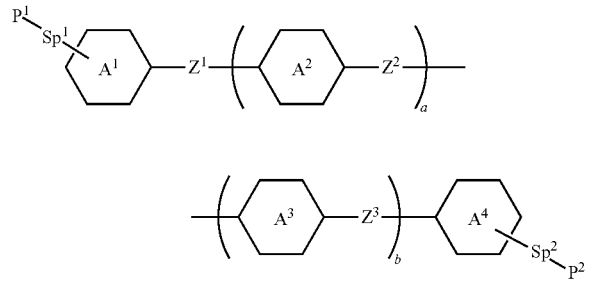

(1)

In the formula, for example, ring $A^1$, ring $A^2$ and ring $A^4$ are phenylene or cyclohexylene; $Sp^1$ and $Sp^2$ are a single bond or alkylene having 1 to 6 carbons; $Z^1$ and $Z^2$ are —CH=CH— or —C≡C—; a is 1, b is 0; and $P^1$ and $P^2$ are a polymerizable group.

16 Claims, No Drawings

US 10,253,259 B2

POLYMERIZABLE COMPOUND HAVING CONJUGATED BONDS, LIQUID CRYSTAL COMPOSITION AND LIQUID CRYSTAL DISPLAY DEVICE

TECHNICAL FIELD

The invention relates to a polymerizable compound, a polymerizable composition including this polymerizable compound and a liquid crystal composition, a liquid crystal composite prepared from this polymerizable composition and a liquid crystal display device.

TECHNICAL BACKGROUND

A liquid crystal display device utilizes optical anisotropy, dielectric anisotropy and so forth possessed by liquid crystal molecules in a liquid crystal composition. A classification based on an operating mode for the liquid crystal molecules includes a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a fringe field switching (FFS) mode and a vertical alignment (VA) mode.

A liquid crystal display device having a mode where a polymer and a liquid crystal composition are united are known. This is, for example, a polymer sustained alignment (PSA) mode or a polymer stabilized (PS) mode. In a liquid crystal display device having this mode, a liquid crystal composition to which a polymerizable compound is added is injected into a display device. A polymer is formed in the liquid crystal composition by the irradiation with ultraviolet light and by the polymerization of the polymerizable compound, while a voltage is applied between electrodes. According to this method, a liquid crystal display device is obtained in which the response time is decreased and the image burn-in is improved.

This method can be applied to a variety of operating modes of a liquid crystal display device, and modes such as PS-TN, PS-IPS, PS-FFS, PSA-VA and PSA-OCB are known. A polymerizable compound used for these kinds of modes seems to have a high ability to orient liquid crystal molecules. It is not said, however, that its solubility in a liquid crystal composition is high. An improvement of the solubility in a liquid crystal composition has been tried until now, and there is a tendency that as the solubility increases, the polymerization reactivity is decreased. Thus, the development of a polymerizable compound having a suitable balance between the solubility and the polymerization reactivity has been expected.

PRIOR ART

Patent Document

Patent document No. 1: CN 1707330 A.
Patent document No. 2: CN 1413969 A.
Patent document No. 3: US 2003-0143343 A.
Patent document No. 4: JP 2004-131704 A.
Patent document No. 5: JP 2010-536894 A.
Patent document No. 6: JP 2010-537256 A.

Non-Patent Document

Non-patent document No. 1: Liquid Crystals, 2006, 33, 33.

OUTLINE OF THE INVENTION

Subject to be Solved by the Invention

The first subject of the invention is to provide a polymerizable compound having a high polymerization reactivity, a high conversion yield and a high solubility in a liquid crystal composition. The second subject is to provide a liquid crystal composite that satisfies at least one of physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The subject is to provide a liquid crystal composite having a suitable balance between at least two of the physical properties. The third subject is to provide a liquid crystal display device having a wide temperature range in which the device can be used, a short response time, a large voltage holding ratio, a low threshold voltage, a large contrast ratio and a long service life.

Means for Solving the Subject

The invention concerns a polymerizable compound having a conjugated double bond or a conjugated triple bond, a polymerizable composition including this compound and a liquid crystal composition, a liquid crystal composite prepared from this polymerizable composition and a liquid crystal display device containing this liquid crystal composite. This polymerizable composition includes at least one compound represented by formula (1) and at least one compound selected from the group of compounds represented by formulas (2) to (15). These compounds will be shown in the items described below.

Effect of the Invention

The first advantage of the invention is that the polymerizable compound has a high polymerization reactivity, a high conversion yield and a high solubility in a liquid crystal composition. The second advantage is that the liquid crystal composite satisfies at least one of physical properties such as a high maximum temperature of a nematic phase, a low minimum temperature of a nematic phase, a small viscosity, a suitable optical anisotropy, a large dielectric anisotropy, a suitable elastic constant, a large specific resistance and a suitable pretilt. The advantage is that the liquid crystal composite has a suitable balance between at least two of the physical properties. The third advantage is that the liquid crystal display device has a wide temperature range in which the device can be used, a short response time, a large voltage holding ratio, a low threshold voltage, a large contrast ratio and a long service life.

Embodiment to Carry Out the Invention

Usage of the terms in this specification is as follows. A liquid crystal compound is a generic term for a non-polymerizable compound that has a liquid crystal phase such as a nematic phase or a smectic phase, and also for a non-polymerizable compound that has no liquid crystal phases, but is mixed for the purpose of adjusting the physical properties of a liquid crystal composition, such as the maximum temperature, the minimum temperature, the viscosity and the dielectric anisotropy. This compound has, for example, a six-membered ring such as 1,4-cyclohexylene and 1,4-phenylene, and the molecular structure is rod-like. A liquid crystal composition is a mixture of liquid crystal compounds. A polymerizable compound is a compound that is added to a composition for the purpose of forming a polymer. A polymerizable composition is a mixture of a polymerizable compound, a liquid crystal composition, an additive and so forth. A liquid crystal composite is a composite formed by the polymerization of this polymerizable composition. A liquid crystal display device is a generic term for a liquid crystal display panel and a liquid crystal display module. The maximum temperature of a nematic phase is the transition temperature between a nematic phase and an isotropic phase in a liquid crystal composition, a polymerizable composition or a liquid crystal composite, and may be abbreviated to the maximum temperature. The minimum temperature of a nematic phase may be abbreviated to the minimum temperature. Polymerization reactivity refers to the rate at which a reactant tends to undergo polymerization. A conversion yield is the ratio by weight of a reactant consumed by a chemical reaction to the reactant.

A liquid crystal composition is prepared by mixing liquid crystal compounds. The ratio (the content) of the liquid crystal compound is expressed as a percentage by weight (% by weight) based on the weight of this liquid crystal composition. An additive such as an optically active compound, an antioxidant, an ultraviolet light absorber, a light stabilizer, a thermal stabilizer, a defoaming agent, a polymerization initiator and a polymerization inhibitor is added to this composition as required. The ratio (the added amount) of the additive is expressed as a percentage by weight (% by weight) based on the weight of the liquid crystal composition in the same manner as the ratio of the liquid crystal compound. Weight parts per million (ppm) is sometimes used. The ratio of a polymerization initiator or a polymerization inhibitor is expressed exceptionally on the basis of the weight the polymerizable compound.

A compound represented by formula (1) may be abbreviated to compound (1). This abbreviation applies to a compound represented by formula (2) or the like. Compound (1) means one compound or at least two compounds represented by formula (1). In ring $A^1$ (or ring $A^4$) of compound (1), an oblique line crossing a hexagonal shape means that the bonding position of a $P^1$-$Sp^1$ group (or a $P^2$-$Sp^2$ group) on a six-membered ring (including a condensed ring) can be arbitrarily selected. In formulas (1) to (15), the symbol $A^1$, $B^1$, $C^1$ or the like surrounded by a hexagonal shape corresponds to ring $A^1$, ring $B^1$, ring $C^1$ or the like, respectively. The symbol $R^{11}$ is used for a plurality of formulas such as formula (2) and formula (3). In these compounds, two terminal groups represented by arbitrary two $R^{11}$ may be the same or different. Two $D^1$ are present in one formula when j is 2 in formula (8). In this compound, two rings represented by two $D^1$ may be the same or different. The same rule applies to $D^1$ where i is greater than 2. The same rule applies to other symbols.

The expression "at least one 'A' may be replaced by 'B'" means that the position of one 'A' is arbitrary when the number of 'A' is one, and that the positions of 'A' can also be selected without restriction when the number of 'A' is two or more. The expression "at least one A may be replaced by B, C or D" includes cases where at least one A has been replaced by B, and at least one A has been replaced by C, and at least one A has been replaced by D, and also cases where a plurality of A have been replaced by at least two of B, C and D. For example, "alkyl in which at least one —$CH_2$— (or —$CH_2CH_2$—) may be replaced by —O— (or —CH=CH—)" includes alkyl, alkenyl, alkoxy, alkoxyalkyl, alkoxyalkenyl and alkenyloxyalkyl. Incidentally, it is undesirable that two successive —$CH_2$— should be replaced by —O— to give —O—O—. It is also undesirable that —$CH_2$— of a methyl moiety (—$CH_2$—H) in alkyl and so forth should be replaced by —O— to give —O—H.

2-Fluoro-1,4-phenylene means the following two divalent groups. Fluorine may be facing left (L) or facing right (R) in a chemical formula. The same rule applies to a divalent group derived from an asymmetric ring, such as tetrahydropyran-2,5-diyl.

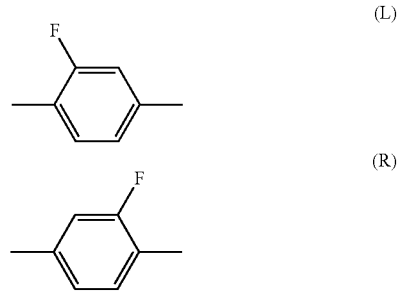

The invention includes the following items.

Item 1. A polymerizable composition including at least one compound selected from the group of compounds represented by formula (1) and at least one compound selected from the group of compounds represented by formula (2) to formula (4):

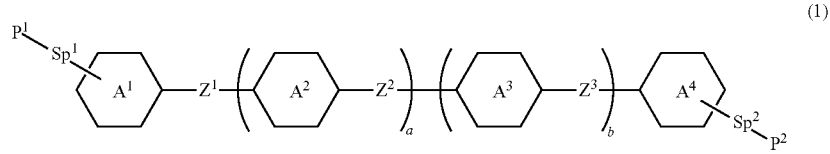

in formula (1), $P^1$ and $P^2$ are independently a polymerizable group;

$Sp^1$ and $Sp^2$ are independently a single bond or alkylene having 1 to 6 carbons, and in this alkylene at least one —$CH_2$— may be replaced by —O—, —COO— or —OCO—, and at least one —$CH_2CH_2$— may be replaced by —CH=CH— or —C≡C—, and in these groups at least one hydrogen may be replaced by fluorine;

ring $A^1$, ring $A^2$, ring $A^3$ and ring $A^4$ are independently a divalent group derived from benzene, naphthalene, anthracene, pyrimidine or pyridine, and in this divalent group at least one hydrogen may be replaced by halogen, alkyl having 1 to 12 carbons, alkyl having 1 to 12 carbons in which at least one hydrogen has been replaced by halogen or -Sp³-P³, where the definition of P³ is the same as that of P¹ and P² and the definition of Sp³ is the same as that of Sp¹ and Sp², and ring A² and ring A³ may be independently a divalent group derived from cyclohexane, cyclohexene, tetrahydropyran or dioxane;

$Z^1$, $Z^2$ and $Z^3$ are independently —CH=CH— or —C≡C—; and a and b are independently 0 or 1, and the sum of a and b is 1 or 2; and then

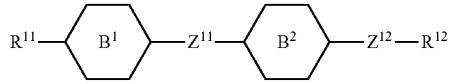

(2)

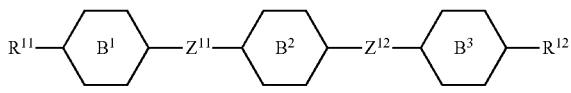

(3)

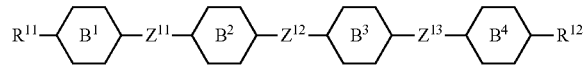

(4)

in formula (2) to formula (4), $R^{11}$ and $R^{12}$ are independently alkyl having 1 to 10 carbons or alkenyl having 2 to 10 carbons, and in the alkyl and alkenyl at least one —CH₂— may be replaced by —O—, and at least one hydrogen may be replaced by fluorine;

ring $B^1$, ring $B^2$, ring $B^3$ and ring $B^4$ are independently 1,4-cyclohexylene, 1,4-phenylene, 2-fluoro-1,4-phenylene, 2,5-difluoro-1,4-phenylene or pyrimidine-2,5-diyl; and $Z^{11}$, $Z^{12}$ and $Z^{13}$ are independently a single bond, —CH₂CH₂—, —CH=CH—, —C≡C— or —COO—.

Item 2. The polymerizable composition according to item 1, further including at least one compound selected from the group of compounds represented by formula (5) to formula (7):

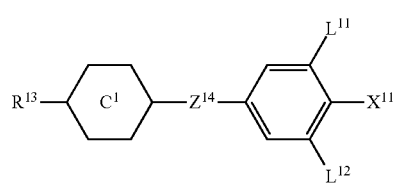

(5)

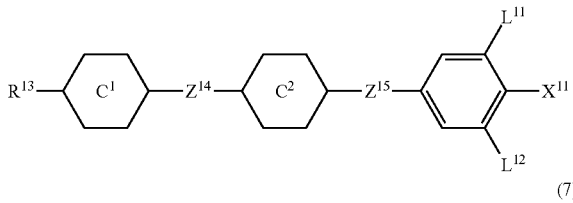

(6)

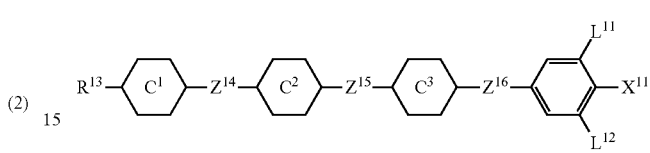

(7)

in formula (5) to formula (7), $R^{13}$ is alkyl having 1 to 10 carbons or alkenyl having 2 to 10 carbons, and in the alkyl and alkenyl at least one —CH₂— may be replaced by —O—, and at least one hydrogen may be replaced by fluorine;

$X^{11}$ is fluorine, chlorine, —OCF₃, —OCHF₂, —CF₃, —CHF₂, —CH₂F, —OCF₂CHF₂ or —OCF₂CHFCF₃;

ring $C^1$, ring $C^2$ and ring $C^3$ are independently 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{14}$, $Z^{15}$ and $Z^{16}$ are independently a single bond, —CH₂CH₂—, —CH=CH—, —C≡C—, —COO—, —CF₂O—, —OCF₂—, —CH₂O— or —(CH₂)₄—; and $L^{11}$ and $L^{12}$ are independently hydrogen or fluorine.

Item 3. The polymerizable composition according to item 1 or 2, further including at least one compound selected from the group of compounds represented by formula (8):

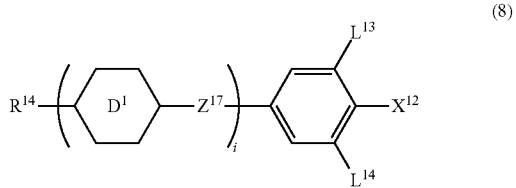

(8)

in formula (8), $R^{14}$ is alkyl having 1 to 10 carbons or alkenyl having 2 to 10 carbons, and in the alkyl and alkenyl at least one —CH₂— may be replaced by —O—, and at least one hydrogen may be replaced by fluorine;

$X^{12}$ is —C≡N or —C≡C—C≡N;

ring $D^1$ is 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;

$Z^{17}$ is a single bond, —CH₂CH₂—, —C≡C—, —COO—, —CF₂O—, —OCF₂— or —CH₂O—;

$L^{13}$ and $L^{14}$ are independently hydrogen or fluorine; and i is 1, 2, 3 or 4.

Item 4. The polymerizable composition according to item 1, further including at least one compound selected from the group of compounds represented by formula (9) to formula (15):

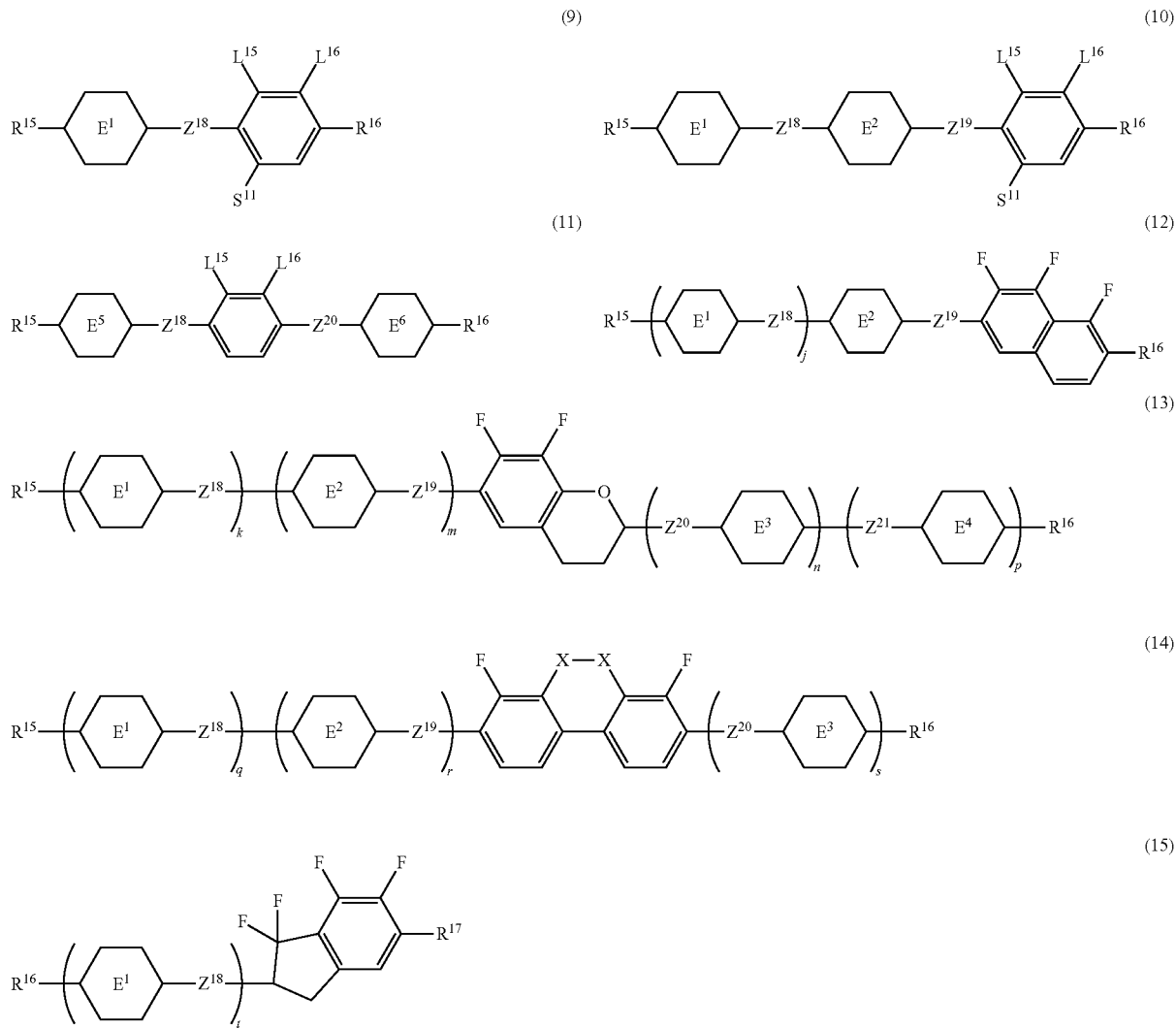

in formula (9) to formula (15), $R^{15}$ and $R^{16}$ are independently alkyl having 1 to 10 carbons or alkenyl having 2 to 10 carbons, and in the alkyl and alkenyl at least one —$CH_2$— may be replaced by —O—, and at least one hydrogen may be replaced by fluorine;

$R^{17}$ is hydrogen, fluorine, alkyl having 1 to 10 carbons or alkenyl having 2 to 10 carbons, and in the alkyl and alkenyl at least one —$CH_2$— may be replaced by —O—, and at least one hydrogen may be replaced by fluorine;

ring $E^1$, ring $E^2$, ring $E^3$ and ring $E^4$ are independently 1,4-cyclohexylene, 1,4-cyclohexenylene, 1,4-phenylene in which at least one hydrogen may be replaced by fluorine, tetrahydropyran-2,5-diyl or decahydronaphthalene-2,6-diyl;

ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;

$Z^{18}$, $Z^{19}$, $Z^{20}$ and $Z^{21}$ are independently a single bond, —$CH_2CH_2$—, —COO—, —$CH_2O$—, —$OCF_2$— or —$OCF_2CH_2CH_2$—;

$L^{15}$ and $L^{16}$ are independently fluorine or chlorine;

$S^{11}$ is hydrogen or methyl;

X is —CHF— or —$CF_2$—; and j, k, m, n, p, q, r and s are independently 0 or 1, the sum of k, m, n and p is 1 or 2, the sum of q, r and s is 0, 1, 2 or 3, and t is 1, 2 or 3.

Item 5. A liquid crystal composite formed by the polymerization of the polymerizable composition according to any one of items 1 to 4.

Item 6. A liquid crystal display device containing the polymerizable composition according to any one of items 1 to 4 or the liquid crystal composite according to item 5.

Item 7. A compound represented by any one of formula (1-1) to formula (1-6):

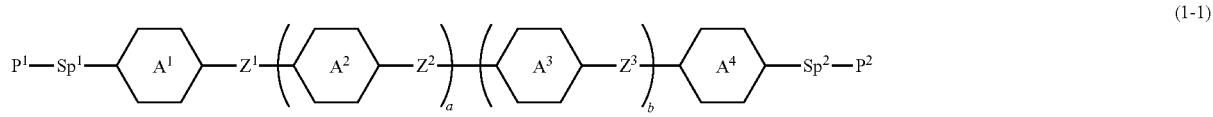

(1-1)

-continued

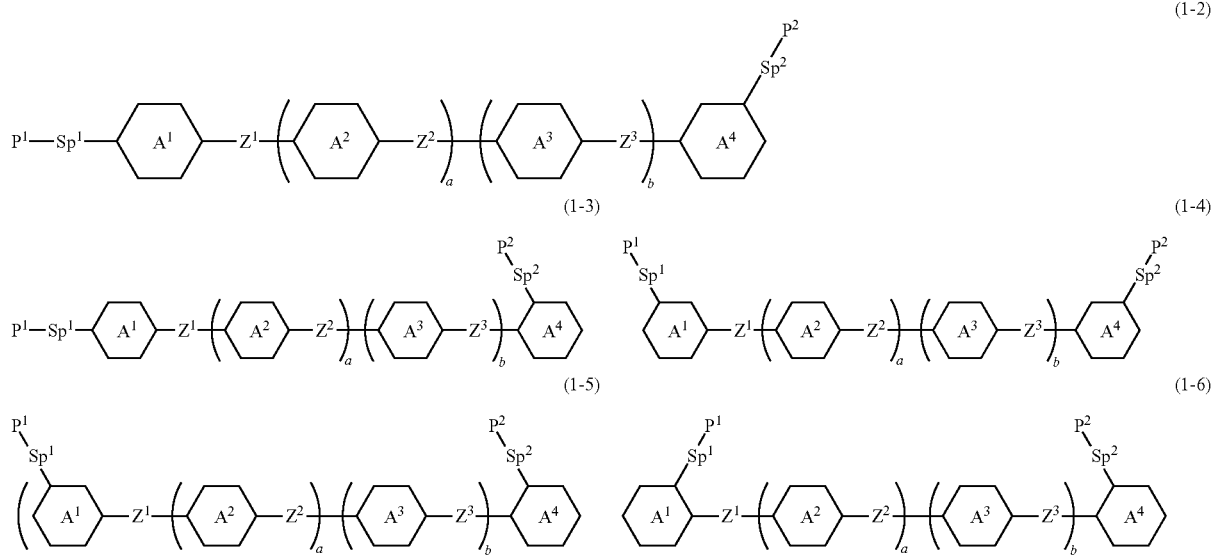

in formula (1-1) to formula (1-6), $P^1$ and $P^2$ are independently a polymerizable group;

$Sp^1$ and $Sp^2$ are independently a single bond, $-CH_2O-$, $-OCH_2-$, $-COO-$, $-OCO-$, $-CH=CH-$, $-C\equiv C-$, $-CH_2CH_2O-$, $-OCH_2CH_2-$, $-CH=CHO-$ or $-OCH=CH-$;

ring $A^1$ and ring $A^4$ are independently a divalent group derived from benzene, pyrimidine or pyridine; ring $A^2$ and ring $A^3$ are independently a divalent group derived from benzene, pyrimidine, pyridine, cyclohexane, cyclohexene, tetrahydropyran or dioxane; and in the divalent groups derived from benzene, pyrimidine or pyridine at least one hydrogen may be replaced by halogen, alkyl having 1 to 12 carbons, alkyl having 1 to 12 carbons in which at least one hydrogen has been replaced by halogen or $-Sp^3-P^3$, where the definition of $P^3$ is the same as that of $P^1$ and $P^2$ and the definition of $Sp^3$ is the same as that of $Sp^1$ and $Sp^2$;

$Z^1$, $Z^2$ and $Z^3$ are independently $-CH=CH-$ or $-C\equiv C-$; and a and b are independently 0 or 1, and the sum of a and b is 1 or 2.

Item 8. The compound according to item 7, wherein in formula (1-1) to formula (1-6), $P^1$ is $-OCO-(M^1)C=CH(M^2)$, vinyloxy or oxiranyl, and $P^2$ is $-OCO-(M^3)C=CH(M^4)$, vinyloxy or oxiranyl, where $M^1$, $M^2$, $M^3$ and $M^4$ are independently hydrogen, fluorine, methyl or trifluoromethyl; $Sp^1$ and $Sp^2$ are independently a single bond, $-CH_2O-$, $-OCH_2-$, $-COO-$, $-OCO-$, $-CH=CH-$, $-C\equiv C-$, $-CH_2CH_2O-$, $-OCH_2CH_2-$, $-CH=CHO-$ or $-OCH=CH-$; ring $A^1$ and ring $A^4$ are independently a divalent group derived from benzene; ring $A^2$ and ring $A^3$ are independently a divalent group derived from benzene, pyrimidine, pyridine, cyclohexane, tetrahydropyran or dioxane; and in the divalent group derived from benzene at least one hydrogen may be replaced by fluorine, chlorine, alkyl having 1 to 3 carbons or alkyl having 1 to 3 carbons in which at least one hydrogen has been replaced by fluorine; $Z^1$, $Z^2$ and $Z^3$ are independently $-CH=CH-$ or $-C\equiv C-$; and a and b are independently 0 or 1, and the sum of a and b is 1 or 2.

Item 9. The compound according to item 7, wherein in formula (1-1) to formula (1-6), $P^1$ is $-OCO-(M^1)C=CH(M^2)$, and $P^2$ is $-OCO-(M^3)C=CH(M^4)$, where $M^1$ and $M^3$ are independently hydrogen or methyl, $M^2$ and $M^4$ are hydrogen; $Sp^1$ and $Sp^2$ are independently a single bond; ring $A^1$, ring $A^2$, ring $A^3$ and ring $A^4$ are independently a divalent group derived from benzene, and in this divalent group one or two hydrogens may be replaced by fluorine, chlorine, methyl, difluoromethyl or trifluoromethyl; $Z^1$, $Z^2$ and $Z^3$ are independently $-CH=CH-$ or $-C\equiv C-$; and a and b are independently 0 or 1, and the sum of a and b is 1 or 2.

Item 10. The compound according to item 7, wherein the compound is represented by formula (1-11) or formula (1-12):

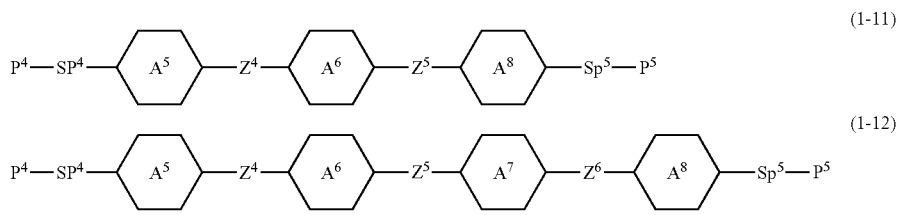

in formula (1-11) or formula (1-12), $P^4$ is $-OCO-(M^5)C=CH_2$ and $P^5$ is $-OCO-(M^6)C=CH_2$, where $M^5$ and $M^6$ are independently hydrogen, fluorine, methyl or trifluoromethyl;

$Sp^4$ and $Sp^5$ are independently a single bond, $-CH_2O-$, $-OCH_2-$, $-COO-$, $-OCO-$, $-CH=CH-$, —C≡C—, —CH$_2$CH$_2$O—, —OCH$_2$CH$_2$—, —CH=CHO— or —OCH=CH—;

ring A$^5$, ring A$^6$, ring A$^7$ and ring A$^8$ are independently 1,4-phenylene, pyrimidine-2,5-diyl or pyridine-2,5-diyl, and in this divalent group at least one hydrogen may be replaced by fluorine, methyl, difluoromethyl or trifluoromethyl; ring A$^6$ and ring A$^7$ may be independently 1,4-cyclohexylene, 1,4-cyclohexenylene, tetrahydropyran-2,5-diyl or 1,3-dioxane-2,5-diyl; and Z$^4$, Z$^5$ and Z$^6$ are independently —CH=CH— or —C≡C—.

Item 11. The compound according to item 10, wherein in formula (1-11) or formula (1-12), P$^1$ is —OCO-(M$^5$)C=CH$_2$ and P$^2$ is —OCO-(M$^6$)C=CH$_2$, where M$^5$ and M$^6$ are independently hydrogen or methyl; Sp$^4$ and Sp$^5$ are independently a single bond, —CH$_2$O—, —OCH$_2$—, —CH$_2$CH$_2$O—, —OCH$_2$CH$_2$—, —CH=CHO— or —OCH=CH—; ring A$^5$, ring A$^6$, ring A$^7$ and ring A$^8$ are independently 1,4-phenylene, 2-fluoro-1,4-phenylene, 2,3-difluoro-1,4-phenylene, 2,5-difluoro-1,4-phenylene, 2-difluoromethyl-1,4-phenylene or 2-trifluoromethyl-1,4-phenylene; and Z$^4$, Z$^5$ and Z$^6$ are independently —CH=CH— or —C≡C—.

Item 12. The compound according to item 7, wherein the compound is represented by formula (1-111) or formula (1-112):

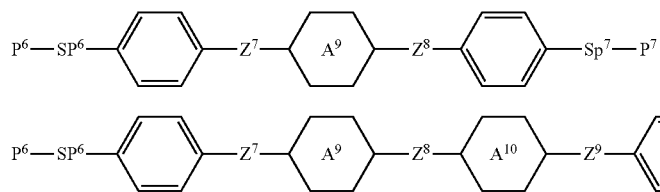

in formula (1-111) or formula (1-112), P$^6$ and P$^7$ are independently —OCO—HC=CH$_2$ or —OCO—(CH$_3$)C=CH$_2$; Sp$^6$ and Sp$^7$ are independently a single bond, —CH$_2$O—, —OCH$_2$—, —CH=CHO— or —OCH=CH—; ring A$^9$ and ring A$^{10}$ are independently 1,4-phenylene, 2-fluoro-1,4-phenylene, 2,3-difluoro-1,4-phenylene or 2,5-difluoro-1,4-phenylene; and Z$^7$, Z$^8$ and Z$^9$ are independently —CH=CH— or —C≡C—.

Item 13. The compound according to item 12, wherein in formula (1-111) or formula (1-112), Sp$^1$ and Sp$^2$ are a single bond.

Item 14. The compound according to item 7, wherein the compound is represented by any one of formula (1-1111) to formula (1-1113):

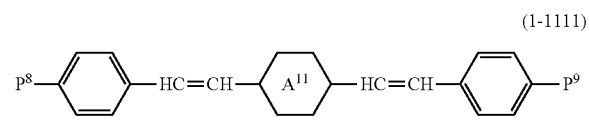

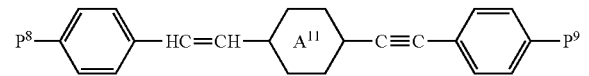

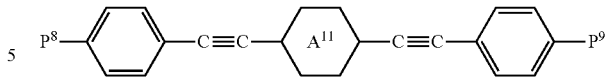

in formula (1-1111) to formula (1-1113), P$^8$ and P$^9$ are independently —OCO—HC=CH$_2$ or —OCO—(CH$_3$)C=CH$_2$, and ring A$^{11}$ is 2-fluoro-1,4-phenylene.

Item 15. A polymerizable composition including at least one compound according to any one of items 7 to 14.

Item 16. An optically anisotropic material formed by polymerization of the polymerizable composition according to item 15.

The invention also includes the following items. (a) The polymerizable composition described above, further including at least one of additives such as an optically active compound, an antioxidant, an ultraviolet light absorber, a light stabilizer, a thermal stabilizer, a defoaming agent, a polymerization initiator and a polymerization inhibitor. (b) The polymerizable composition described above, further including a polymerizable compound that is different from compound (1). (c) An AM device containing a liquid crystal composite prepared from the polymerizable composition described above. (d) A device containing a liquid crystal composite prepared from the polymerizable composition described above and having a mode of PS-TN, PS-IPS, PS-FFS, PSA-VA or PSA-OCB. (e) A transmission type device containing the polymerizable composition described above. (f) Use of the polymerizable composition described above as a composition having a nematic phase. (g) Use as an optically active composition prepared by the addition of an optically active compound to the composition described above.

The invention also includes the following items. (h) Use of a polymerizable composition including at least one compound selected from the group of compounds represented by at least one compound selected from the group of compounds represented by formula (1), at least one compound selected from the group of compounds represented by formulas (2) to (4), and at least one compound selected from the group of compounds represented by formulas (5) to (7) in a liquid crystal display device having a PSA mode. (i) Use of a polymerizable composition including at least one compound selected from the group of compounds represented by formula (1), at least one compound selected from the group of compounds represented by formulas (2) to (4), and at least one compound selected from the group of compounds represented by formula (8) in a liquid crystal display device having a PSA mode. (j) Use of a polymerizable composition including at least one compound selected from the group of compounds represented by formula (1), at least one compound selected from the group of compounds represented by formulas (2) to (4), and at least one compound selected from the group of compounds represented by formulas (9) to (15) in a liquid crystal display device having a PSA mode.

Compound (1) will be explained first, then the synthetic method, the polymerizable composition, the liquid crystal composite and the liquid crystal display device will be explained in that order.

1. Compound (1)

The polymerizable compound of the invention has a conjugated system. That is to say, compound (1) has a plurality of polymerizable groups and two conjugated multiple bonds. It is characterized that compound (1) has a high polymerizability. This is in good agreement with the facts that the UV absorption spectrum of compound (1) shifts to longer wavelengths.

Desirable examples of compound (1) will be explained. Desirable examples of the polymerizable group P, the linking group Sp, the ring A and the bonding group Z in compound (1) apply to sub-formulas of compound (1). In compound (1), the physical properties can arbitrarily be adjusted by a suitable combination of the kinds of these groups. Compound (1) may contain isotopes such as $^2$H (deuterium) and $^{13}$C in a larger amount than the amount of the natural abundance, since there are no major differences in the physical properties of the compound.

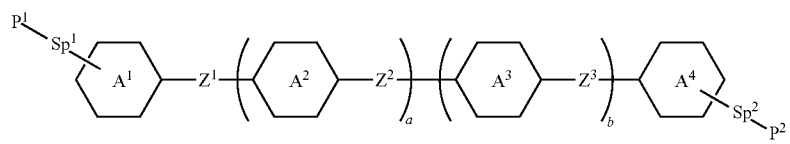

(1)

In formula (1), $P^1$ and $P^2$ are independently a polymerizable group. Examples of the polymerizable group are acryloyloxy, methacryloyloxy, acrylamido, methacrylamido, vinyloxy, vinylcarbonyl, oxiranyl, oxetanyl, 3,4-epoxycyclohexyl and maleimido. In these groups, at least one hydrogen may be replaced by fluorine, methyl or trifluoromethyl. Desirable examples of the polymerizable group are the acryloyloxy (P-1), the vinyloxy (P-2) and the oxiranyl (P-3), where $M^1$ and $M^2$ are independently hydrogen, fluorine, methyl or trifluoromethyl. More desirable examples of the polymerizable group are the acryloyloxy (P-1), where $M^1$ is hydrogen or methyl, and $M^2$ is hydrogen.

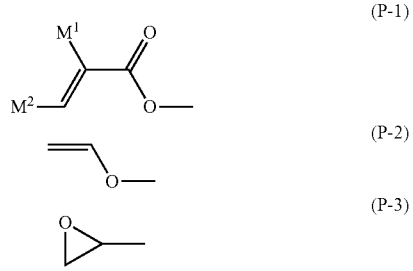

In formula (1), $Sp^1$ and $Sp^2$ are independently a single bond or alkylene having 1 to 6 carbons, and in this alkylene at least one —CH$_2$— may be replaced by —O—, —COO— or —OCO—, at least one —CH$_2$CH$_2$— may be replaced by —CH=CH— or —C≡C—, and in these groups at least one hydrogen may be replaced by fluorine.

Desirable examples of $Sp^1$ or $Sp^2$ are a single bond, —CH$_2$—, —CH$_2$O—, —OCH$_2$—, —COO—, —OCO—, —CH$_2$CH$_2$—, —CH=CH—, —C≡C—, —(CH$_2$)$_3$—, —CH$_2$CH$_2$O—, —OCH$_2$CH$_2$—, —CH=CH—O—, —O—CH=CH—, —C≡C—O—, —O—C≡C—, —(CH$_2$)$_4$—, —(CH$_2$)$_3$—O—, —O—(CH$_2$)$_3$—, —(CH$_2$)$_4$—, —(CH$_2$)$_4$O— or —O(CH$_2$)$_4$—. More desirable examples are a single bond, —CH$_2$—, —CH$_2$O—, —OCH$_2$—, —COO—, —OCO—, —CH=CH—, —C≡C—, —CH$_2$CH$_2$O—, —OCH$_2$CH$_2$—, —CH=CH—O— and —O—CH=CH—. Especially desirable examples are a single bond, —CH$_2$—, —CH=CH—, —CH=CH—O—, —O—CH=CH—, —CH$_2$CH$_2$O— or —OCH$_2$CH$_2$—. The most desirable example is a single bond. The configuration of —CH=CH— may be a cis form or a trans form. The trans form is preferable to the cis form.

In formula (1), ring $A^1$, ring $A^2$, ring $A^3$ and ring $A^4$ are independently a divalent group derived from benzene, naphthalene, anthracene, pyrimidine or pyridine, and in this divalent group at least one hydrogen may be replaced by halogen, alkyl having 1 to 12 carbons, alkyl having 1 to 12 carbons in which at least one hydrogen has been replaced by halogen or -Sp$^3$-P$^3$, where the definition of $P^3$ is the same as that of $P^1$ and $P^2$ and the definition of $Sp^3$ is the same as that of $Sp^1$ and $Sp^2$, and ring $A^2$ and ring $A^3$ may be independently a divalent group derived from cyclohexane, cyclohexene, tetrahydropyran or dioxane.

The halogen means fluorine, chlorine, bromine and iodine. Desirable halogen is fluorine and chlorine. More desirable halogen is fluorine. Alkyl in which at least one hydrogen has been replaced by halogen means alkyl in which at least one hydrogen has been replaced by fluorine, chlorine, bromine and/or iodine. A desirable example of alkyl in which at least one hydrogen has been replaced by halogen is alkyl in which at least one hydrogen has been replaced by fluorine. More desirable examples are —CH$_2$F, —CHF$_2$, —CF$_3$, —CHClF and —CH$_2$CF$_3$. These examples also include perfluoroalkyl and perchloroalkyl.

Desirable ring $A^1$, ring $A^2$, ring $A^3$ or ring $A^4$ is a divalent group derived from benzene, naphthalene, anthracene, pyrimidine or pyridine, and in this divalent group at least one hydrogen may be replaced by fluorine, chlorine, alkyl having 1 to 6 carbons or alkyl having 1 to 6 carbons in which at least one hydrogen has been replaced by halogen, and ring $A^2$ and ring $A^3$ may be independently a divalent group derived from cyclohexane, cyclohexene, tetrahydropyran or dioxane.

More desirable ring $A^1$ to ring $A^4$ are 1,4-phenylene, 1,3-phenylene, 1,2-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, anthracene-1,4-diyl, anthracene-1,6-diyl, anthracene-2,7-diyl, pyrimidine-2,5-diyl or pyridine-2,5-diyl, and in this divalent group at least one hydrogen may be replaced by fluorine, methyl, difluoromethyl or trifluoromethyl, and ring $A^2$ or ring $A^3$ may be 1,4-cyclohexylene, 1,4-cyclohexenylene, tetrahydropyran-2,5-diyl or 1,3-dioxane-2,5-diyl.

Especially desirable ring $A^1$ to ring $A^4$ are 1,4-phenylene, 2-fluoro-1,4-phenylene, 2,3-difluoro-1,4-phenylene, 2-chloro-3-fluoro-1,4-phenylene, 2,5-difluoro-1,4-phenylene, 2-difluoromethyl-1,4-phenylene, 2-trifluoromethyl-1,4-phenylene, naphthalene-1,5-diyl or naphthalene-2,6-diyl. The most desirable ring $A^1$ to ring $A^4$ are 1,4-phenylene. The most desirable ring $A^1$ to ring $A^4$ are also 2-fluoro-1,4-phenylene.

In formula (1), $Z^1$, $Z^2$ and $Z^3$ are independently —CH=CH— or —C≡C—. A desirable example of $Z^1$, $Z^2$ and $Z^3$ is —CH=CH—.

In formula (1), a and b are independently 0 or 1, and the sum of a and b is 1 or 2. A desirable sum of a and b is 1.

A polymerizable compound having objective physical properties can be obtained by suitably selecting a combination of the polymerizable group P, the linking group Sp, the ring A and the bonding group Z by reference to the desirable examples described above. Examples of compound (1) are compound (1-1) to compound (1-6). More desirable examples are compound (1-11) and compound (1-12). Especially desirable examples are compound (1-111) and compound (1-112). The most desirable examples are compound (1-1111) to compound (1-1113). Such a polymerizable compound is useful as a component of a liquid crystal composition for use in a liquid crystal display device having a mode such as PS-TN, PS-IPS, PS-FFS, PSA-VA or PSA-OCB.

2. Synthetic Methods

The method for synthesizing compound (1) will be explained. Compound (1) can be prepared by a suitable combination of methods in synthetic organic chemistry. The method of introducing objective polymerizable groups, linking groups, rings and bonding groups into starting materials are described in books such as Houben-Wyle, Methoden der Organische Chemie (Georg-Thieme Verlag, Stuttgart), Organic Syntheses (John Wily & Sons, Inc.), Organic Reactions (John Wily & Sons Inc.), Comprehensive Organic Synthesis (Pergamon Press) and Shin Jikken Kagaku Kouza (New Experimental Chemistry Course, in English; Maruzen Co., Ltd., Japan).

2-1. Formation of the Bonding Group Z

Examples of the method for forming the bonding groups $Z^1$, $Z^2$ and $Z^3$ in compound (1) are shown in the following schemes. In these schemes, $MSG^1$ (or $MSG^2$) is a monovalent organic group having at least one ring. Monovalent organic groups represented by a plurality of $MSG^1$ (or $MSG^2$) may be the same or different. Compound (1A) and compound (1B) correspond to compound (1).

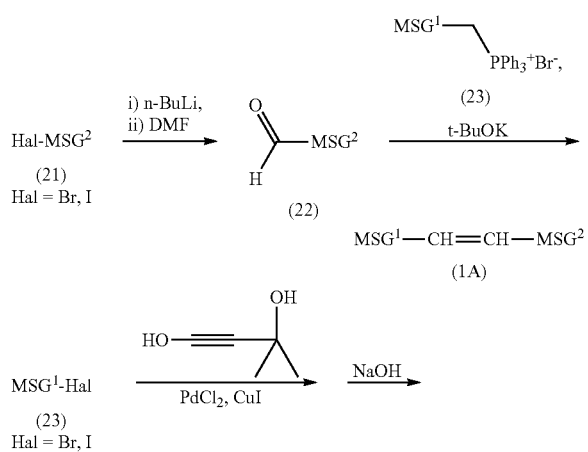

(1) Formation of —CH=CH—

Compound (21) is treated with n-butyllithium, and then reacted with a formamide such as N,N-dimethylformamide (DMF) to give the aldehyde (22). The phosphonium salt (23) prepared by known methods is treated with a base such as potassium tert-butoxide, and the resulting phosphorus ylide is allowed to react with the aldehyde (22) to give compound (1A). Since the cis-isomer is formed depending on the reaction conditions, the cis-isomer is isomerized to the trans-isomer by known methods as requested.

(2) Formation of —C≡C—

Compound (23) is reacted with 2-methyl-3-butyn-2-ol in the presence of a catalyst of dichloropalladium and a copper halide, and the product is deprotected under basic conditions to give compound (24). Compound (24) is reacted with compound (21) in the presence of a catalyst of dichloropalladium and a copper halide to give compound (1B).

2-2. Formation of the Linking Group Sp $P^1$ or $P^2$ is a polymerizable group. Desirable examples of the polymerizable group are the acryloyloxy (P-1), the vinyloxy (P-2) and the oxiranyl (P-3), where $M^1$ and $M^2$ are independently hydrogen, fluorine, methyl or trifluoromethyl.

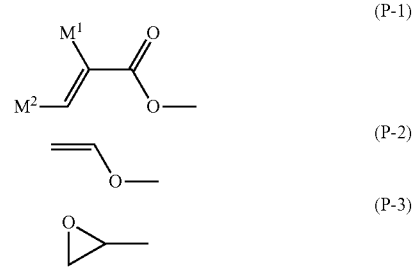

Examples of the method synthesizing a compound in which the polymerizable group is bonded to the ring through the linking group Sp are as follows. First, an example is shown in which the linking group Sp is a single bond.

(1) Formation of a Single Bond

Methods for forming a single bond are shown in the following schemes. In these schemes, $MSG^1$ is a monovalent organic group having at least one ring. Compounds (1S) to (1X) correspond to compound (1).

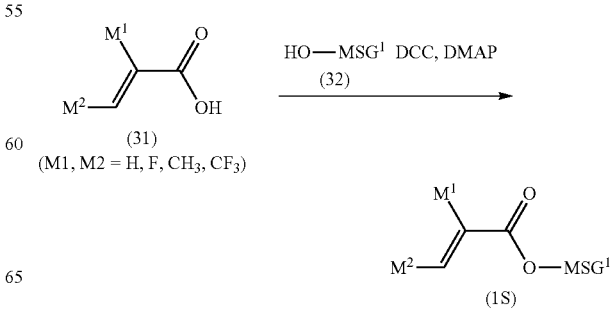

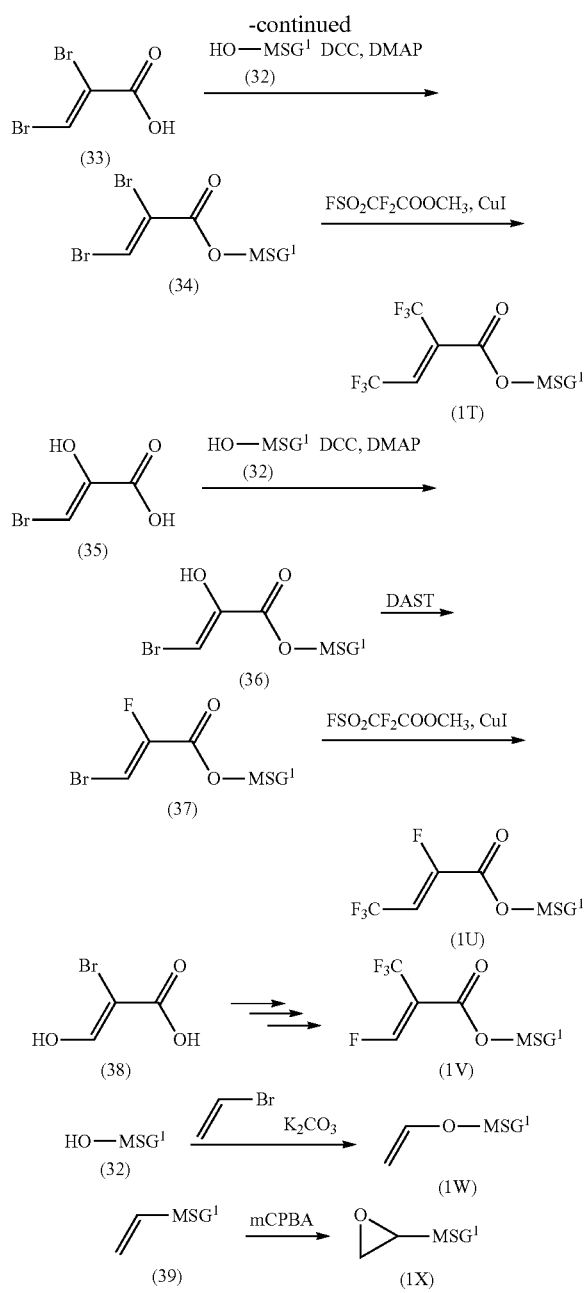

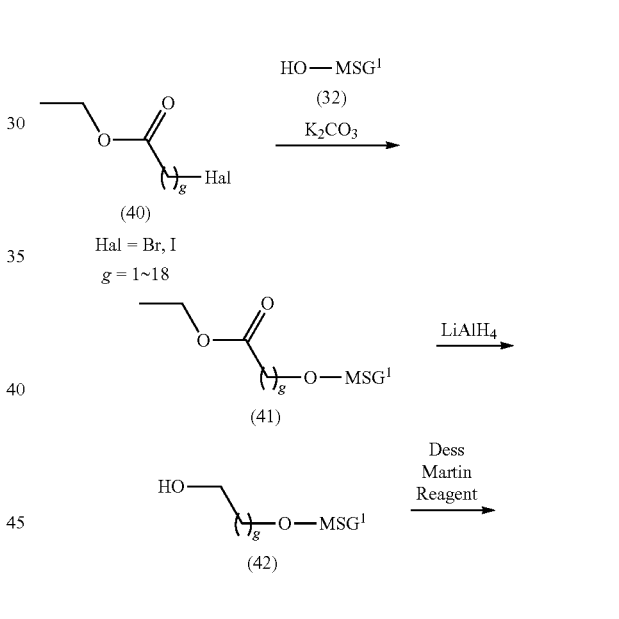

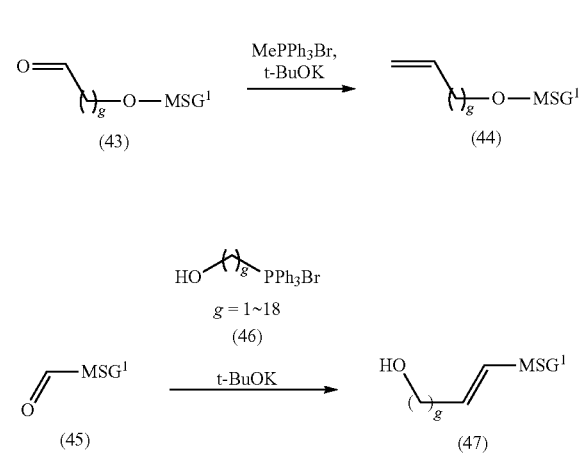

presence of DCC and DMAP. Compound (36) is fluorinated with a fluorinating agent such as DAST to give compound (37). Compound (1U) is prepared by the reaction of compound (37) with methyl 2,2-difluoro-2-(fluorosulfonyl)acetate in the presence of a catalytic amount of copper iodide.

In the case where $M^1$ is —$CF_3$ and $M^2$ is fluorine, compound (1V) is prepared using the carboxylic acid (38) as a starting material according to the method described above.

(1b) In Group (P-2)

Compound (1W) is prepared by the reaction of compound (32) with vinyl bromide in the presence of potassium carbonate or the like.

(1c) In Group (P-3)

Compound (1X) is prepared by the oxidation of the vinyl compound (39) prepared by the known method with meta-chloroperbenzoic acid (mCPBA) or the like.

The synthetic method of the compound where the linking group Sp was a single bond was described just above. Next, the synthetic method of another linking group is shown in the following schemes. In these schemes, $MSG^1$ is a monovalent organic group having at least one ring. Compound (1Y) corresponds to compound (1).

(1a) In Group (P-1)

The carboxylic acid (31) shown in the above scheme, where both $M^1$ and $M^2$ are not —$CF_3$, where $M^1$ is fluorine and $M^2$ is not —$CF_3$, or where $M^1$ is —$CF_3$ and $M^2$ is not fluorine, is commercially available. The dehydration condensation of this carboxylic acid (31) and compound (32) in the presence of DCC and DMAP gives compound (1S).

In the case where both $M^1$ and $M^2$ are —$CF_3$, compound (34) is prepared by the dehydration condensation of the carboxylic acid (33) and compound (32) in the presence of DCC and DMAP. Compound (34) is allowed to react with methyl 2,2-difluoro-2-(fluorosulfonyl)acetate in the presence of a catalytic amount of copper iodide to give compound (1T).

In the case where $M^1$ is fluorine and $M^2$ is —$CF_3$, compound (36) is prepared by the dehydration condensation of the carboxylic acid (35) and compound (32) in the

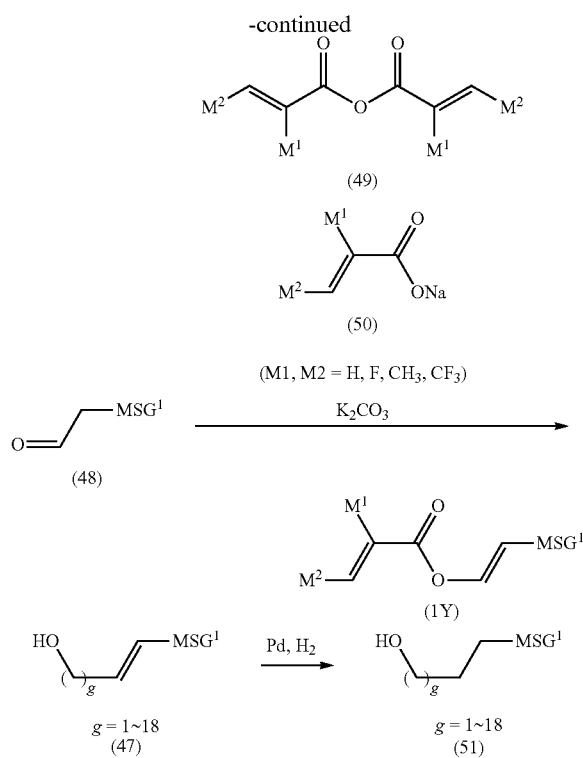

(2) Formation of —(CH$_2$)$_g$—O—

The reaction of compound (40) prepared by known methods with compound (32) in the presence of potassium carbonate or the like gives compound (41). Compound (41) is reduced with a reducing agent such as lithium aluminum hydride to give compound (42). Compound (42) is oxidized with an oxidizing agent such as Dess-Martin reagent to give the aldehyde (43). A phosphorus ylide generated by the treatment of methyltriphenylphosphonium bromide with a base such as potassium tert-butoxide is allowed to react with the aldehyde (43) to give compound (44).

The dehydration condensation of compound (42) and compound (31) is carried out according to the method described above for the introduction of group (P-1) to compound (42). The reaction of compound (42) with vinyl bromide is carried out according to the method described above for the introduction of group (P-2) to compound (42). The epoxidation of compound (44) is carried out according to the method described above for the introduction of group (P-3) to compound (44).

(3) Formation of —(CH$_2$)$_g$—CH=CH—

A phosphorus ylide generated by the treatment of the phosphonium salt (46) prepared by known methods with a base such as potassium tert-butoxide is allowed to react with the aldehyde (45) to give compound (47). The dehydration condensation of compound (42) and compound (32) is carried out according to the method described above for the introduction of group (P-1) to compound (47). The reaction of compound (47) with vinyl bromide is carried out according to the method described above for the introduction of group (P-2) to compound (47). The epoxidation is carried out for the introduction of group (P-3) to compound (47) after —CH$_2$OH has been converted to —CH=CH$_2$ according to the method described above.

(4) Formation of —CH=CH—

The reaction of the aldehyde (48) prepared by known method with the acid anhydride (49) and the sodium carboxylate (50) in the presence of potassium carbonate or the like gives compound (1Y).

(5) Formation of —(CH$_2$)g-

The alcohol (51) is prepared by the hydrogenation of compound (47) in the presence of a catalyst such as palladium-carbon. The method for the introduction of M$^2$CH=CM$^1$-COO—, a vinyloxy group or an epoxy group to this alcohol is described above.

Compound (1) has a high polymerization reactivity, a high conversion yield and a high solubility in a liquid crystal composition in comparison with a similar compound. Compound (1) has a suitable balance between at least two physical properties. Compound (1) can be added to a liquid crystal composition for use in a PSA mode, accordingly.

3. Polymerizable Compositions

The polymerizable composition includes at least one of compound (1) as the first component. The component of the composition may be the first component alone. The composition may include the other components such as the second component and the third component. The kind of second component and so forth depends on the use of a desired polymer. This polymerizable composition may further include other polymerizable compounds that are different from compound (1), as the second component. Desirable examples of other polymerizable compounds are acrylates, methacrylates, vinyl compounds, vinyloxy compounds, propenyl ethers, epoxy compounds (oxiranes, oxetanes) and vinyl ketones. More desirable examples are a compound having at least one acryloyloxy and a compound having at least one methacryloyloxy. More desirable examples also include a compound having acryloyloxy and methacryloyloxy.

Specific examples of other polymerizable compounds are compounds (M-1) to (M-12). In compounds (M-1) to (M-12), $R^{25}$, $R^{26}$ and $R^{27}$ are independently hydrogen or methyl; u, x and y are independently 0 or 1; v and w are independently an integer from 1 to 10; and $L^{21}$, $L^{22}$, $L^{23}$, $L^{24}$, $L^{25}$ and $L^{26}$ are independently hydrogen or fluorine.

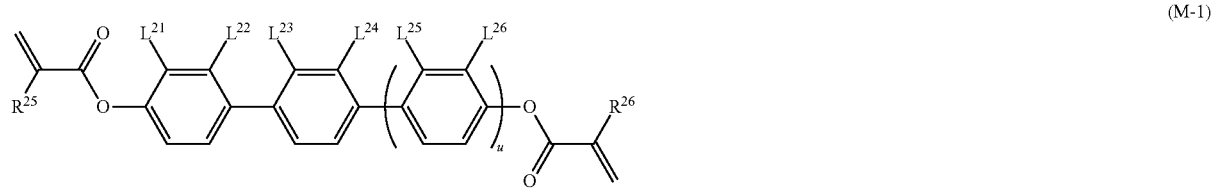

(M-1)

-continued
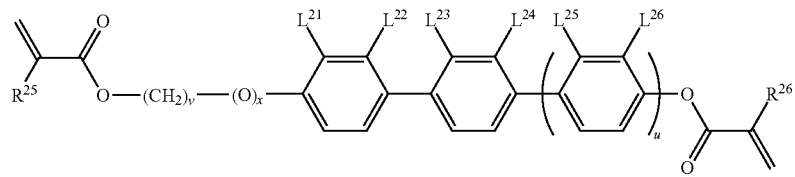
(M-2)
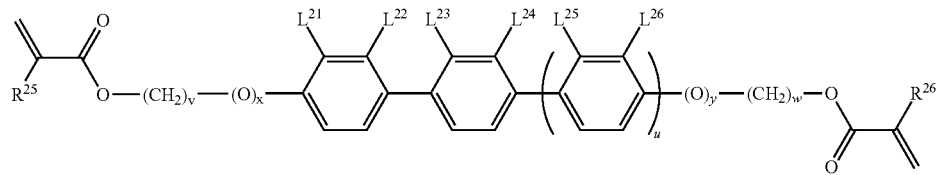
(M-3)
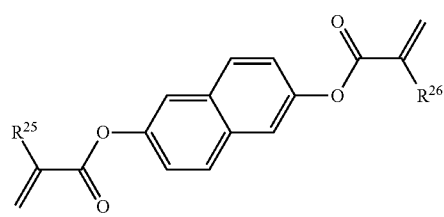
(M-4)
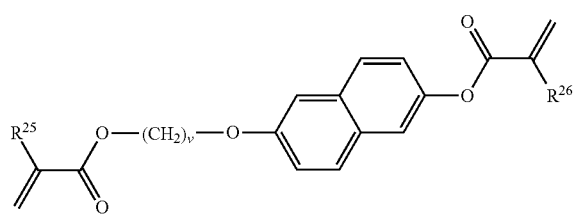
(M-5)
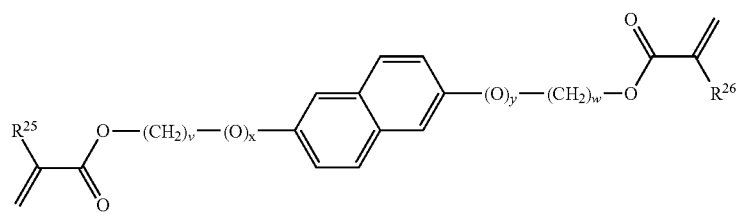
(M-6)
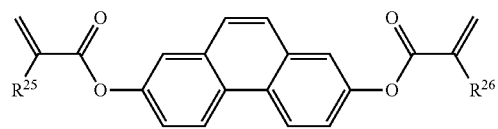
(M-7)
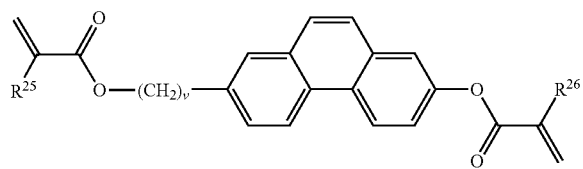
(M-8)
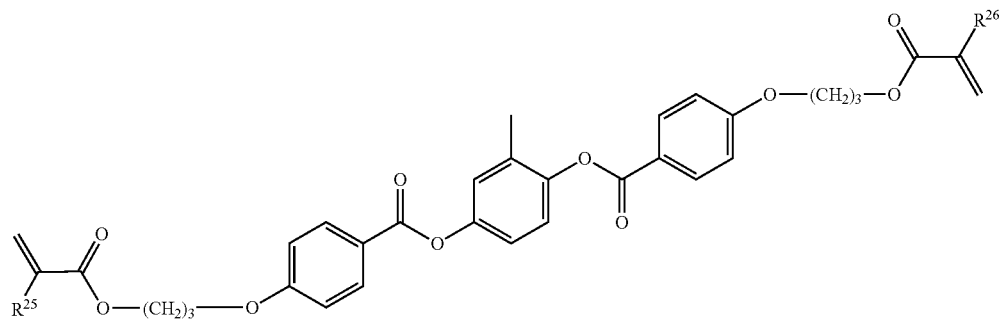
(M-9)

(M-10)

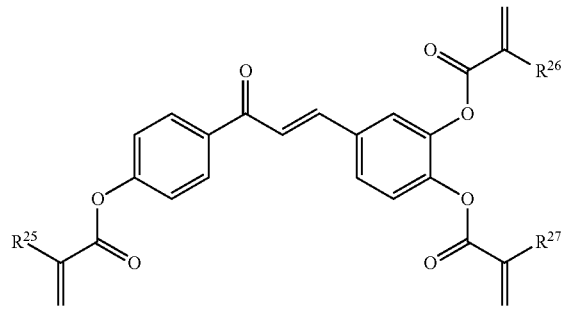

(M-11)

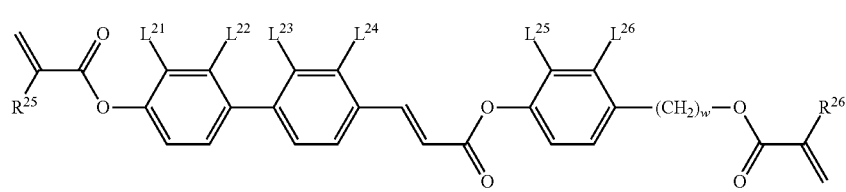

(M-12)

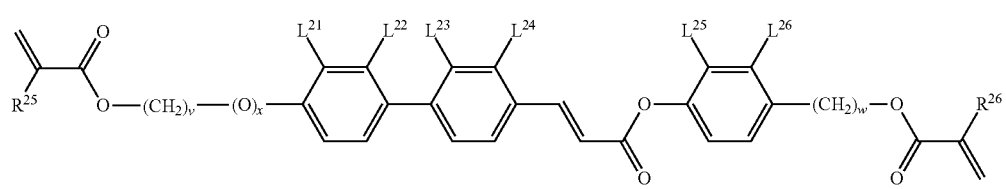

When the second component of the polymerizable composition is a polymerizable compound having a liquid crystal phase, the polymerization in which the orientation of liquid crystal molecules is regulated gives an optically anisotropic material. This optically anisotropic material can be used for an optical retardation film, a polarizer, a circularly polarized light element, an elliptically polarized light element, an antireflection film, a selective reflection film, a color compensation film, a viewing angle-compensation film and so forth. An additive such as a polymerization initiator may be added to the polymerizable composition for the purpose of adjusting the characteristics of the optically anisotropic material.

The polymerizable composition may include a liquid crystal composition as the second component. When a liquid crystal display device for use in a mode such as PS-TN, PS-IPS, PS-FFS, PSA-VA or PSA-OCB is desired, it is desirable that the polymerizable composition should include compound (1) as component A, and should further include a compound selected from components B, C, D and E shown below. Component B is compounds (2) to (4). Component C is compounds (5) to (7). Component D is compound (8). Component E is compounds (9) to (15). It is desirable that components B, C, D and E should be selected in consideration of positive or negative dielectric anisotropy, the magnitude of dielectric anisotropy and so forth when this kind of polymerizable composition is prepared. The polymerizable composition in which the component is suitably selected has a high maximum temperature, a low minimum temperature, a small viscosity, a suitable optical anisotropy (that is to say, a large optical anisotropy or a small optical anisotropy), a large positive or large negative dielectric anisotropy and a suitable elastic constant (that is to say, a large elastic constant or a small elastic constant).

The polymerizable composition is prepared by the addition of compound (1) to a liquid crystal composition. An additive may be added to this composition as required. In such a composition, the added amount of compound (1), that is to say component A, is in the range of 0.05% by weight to 20% by weight based on the weight of liquid crystal composition. A more desirable added amount is in the range of 0.1% by weight to 10% by weight. The most desirable added amount is in the range of 0.2% by weight to 1% by weight. At least one of other polymerizable compounds that are different from compound (1) may further be added. In this case, it is desirable that the total added amount of compound (1) and other polymerizable compounds should be in the range described above. The physical properties of the resulting polymer can be adjusted by a suitable selection of other polymerizable compounds. Examples of other polymerizable compounds are acrylates, methacrylates and so forth, those of which have been explained previously. These examples also include compounds (M-1) to (M-12).

Component B is a compound where the two terminal groups are alkyl or the like. Desirable examples of component B include compounds (2-1) to (2-11), compounds (3-1) to (3-19) and compounds (4-1) to (4-7). In the compounds of component B, the definition of $R^{11}$ and $R^{12}$ is the same as that of formulas (2) to (4) described in item 1.

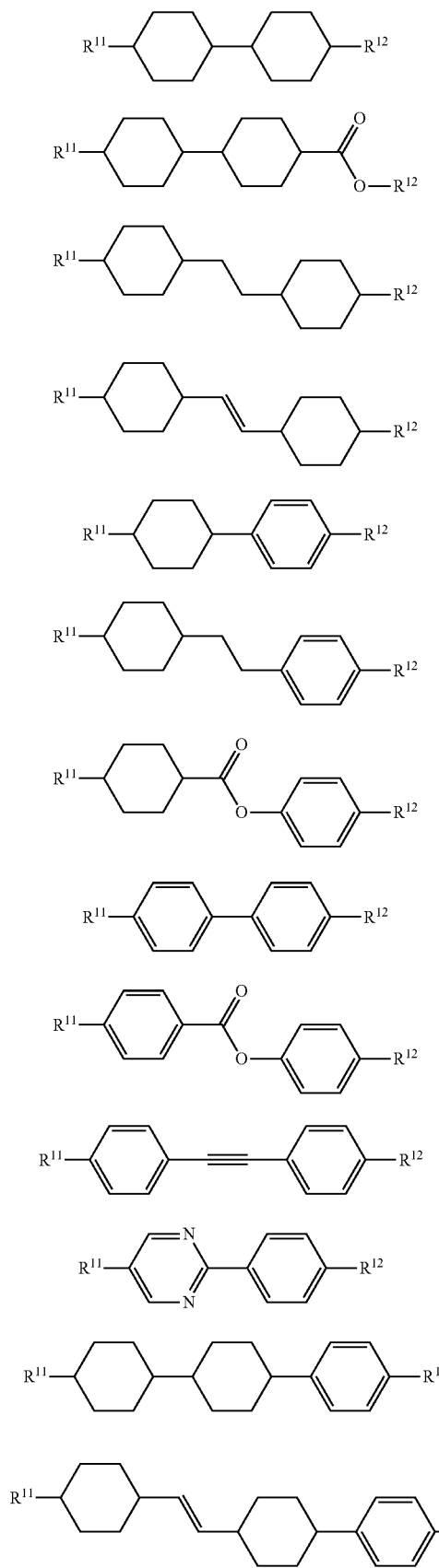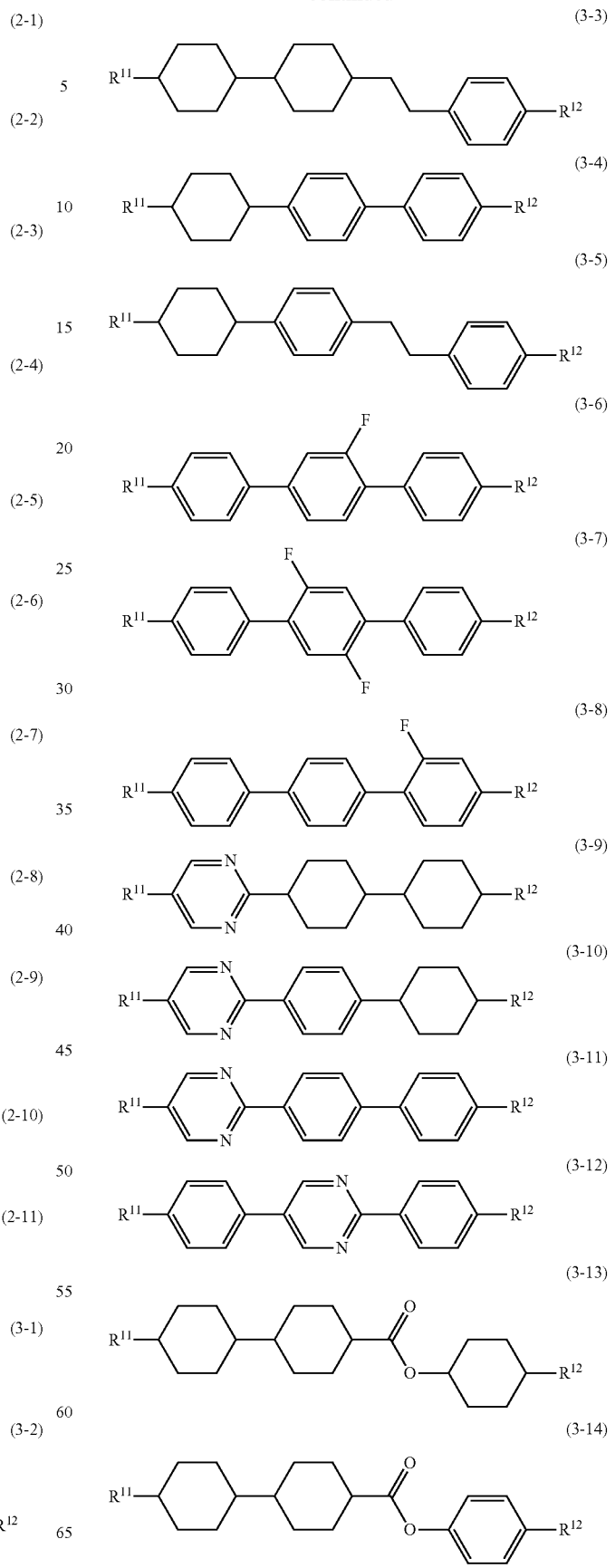

(3-15)
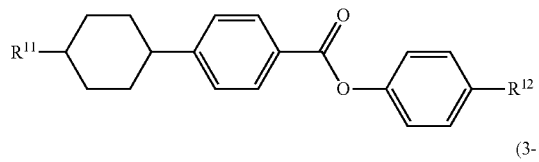

(3-16)
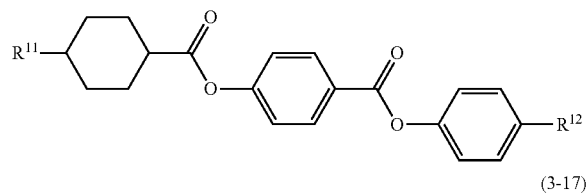

(3-17)
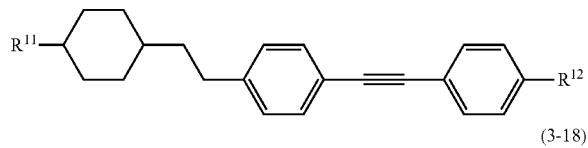

(3-18)
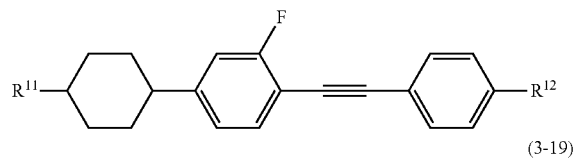

(3-19)
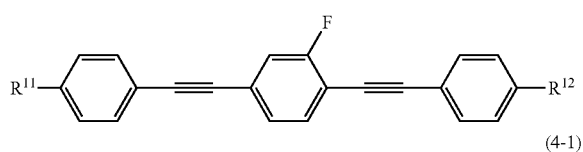

(4-1)
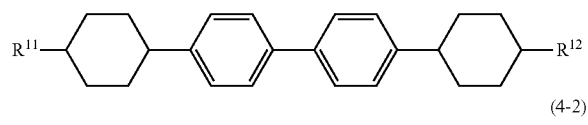

(4-2)
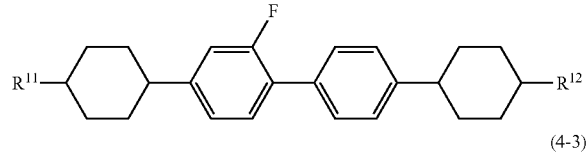

(4-3)
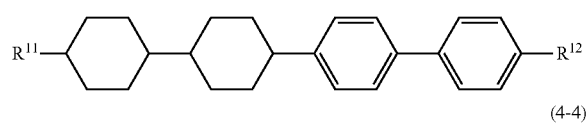

(4-4)
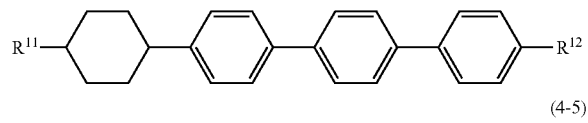

(4-5)
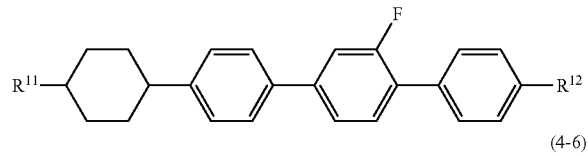

(4-6)
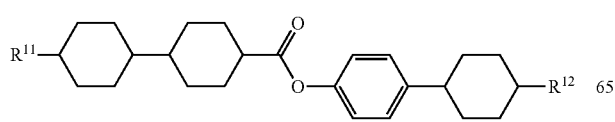

(4-7)
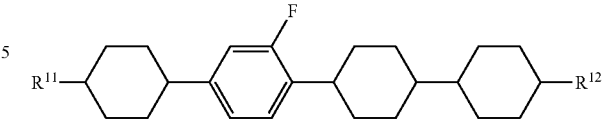

Component B is close to neutral, since the absolute value of the dielectric anisotropy is small. Compound (2) is mainly effective in adjusting the viscosity or adjusting the optical anisotropy. Compounds (3) and (4) are effective in increasing the temperature range of a nematic phase that is caused by an increase in the maximum temperature, or adjusting the optical anisotropy.

As the content of component B is increased, the viscosity of the composition decreases. However, the dielectric anisotropy decreases. Thus, it is desirable that the content should increase as long as the required value of the threshold voltage of the device is satisfied. Accordingly, the content of component B is preferably 30% by weight or more, and more preferably 40% by weight or more based on the weight of the liquid crystal composition, in the preparation of a composition for use in modes of PS-IPS, PSA-VA and so forth.

Component C is a compound having halogen or a fluorine-containing group in the right terminal. Desirable examples of component C include compounds (5-1) to (5-16), compounds (6-1) to (6-113) and compounds (7-1) to (7-57). In the compounds of component C, the definition of $R^{13}$ and $X^{11}$ is the same as that of formulas (5) to (7) described in item 2.

(5-1)
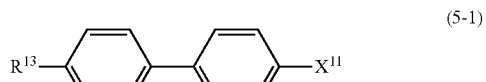

(5-2)
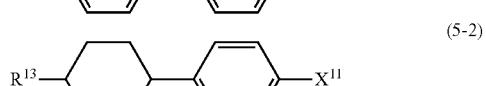

(5-3)
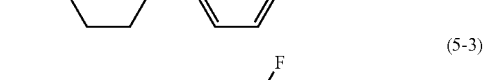

(5-4)
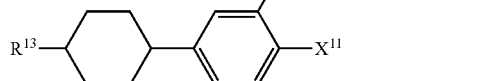

(5-5)
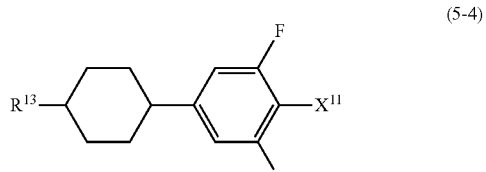

(5-6)
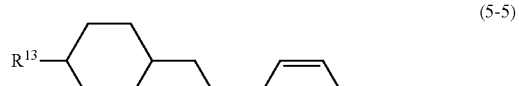

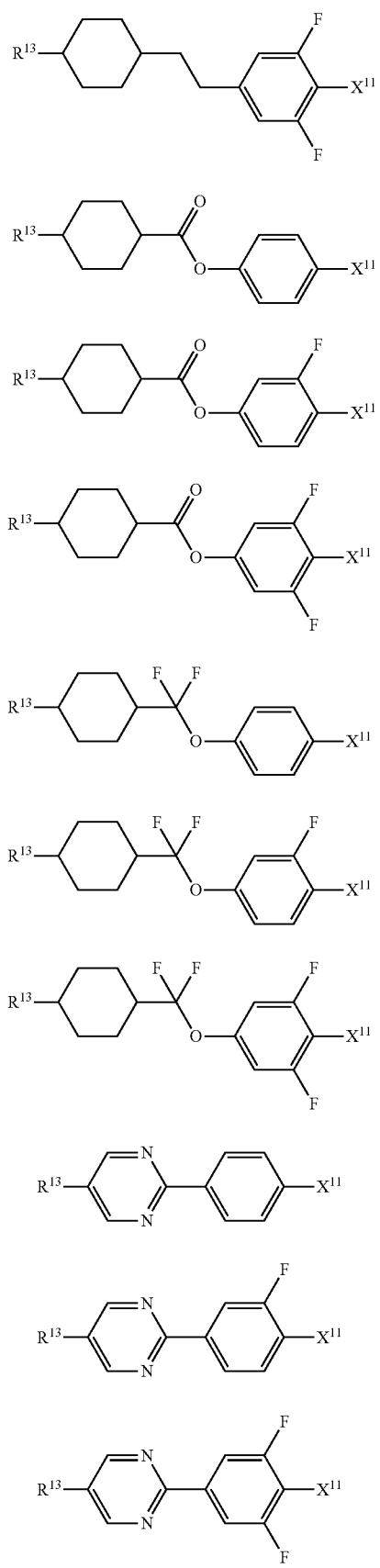
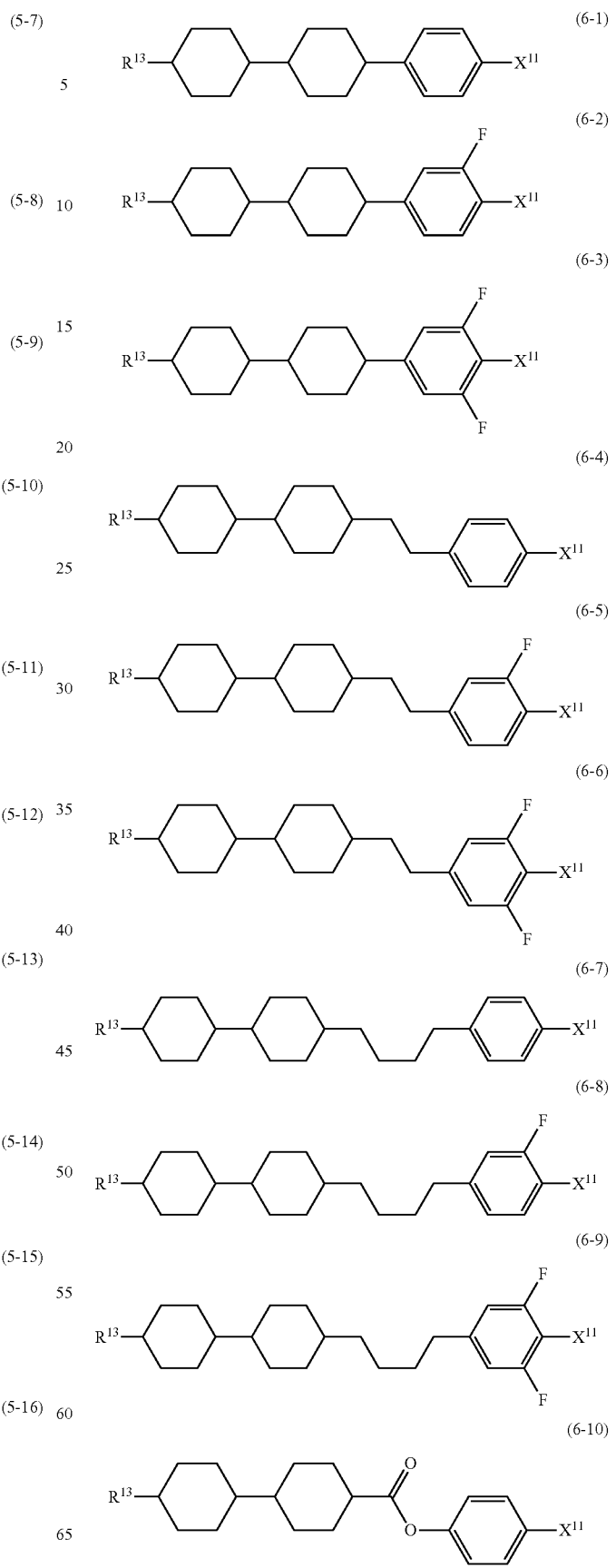

(6-11) 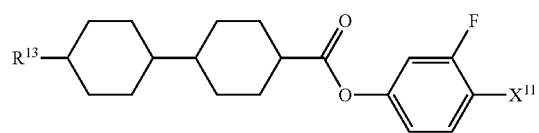
(6-12) 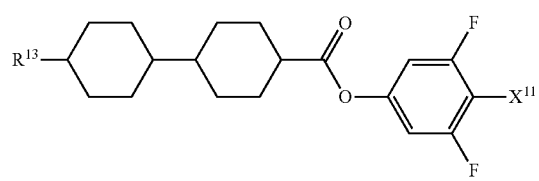
(6-13) 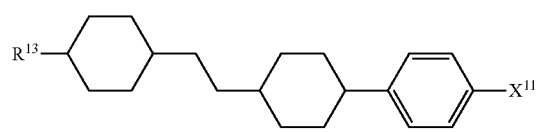
(6-14) 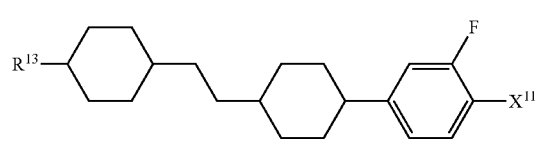
(6-15) 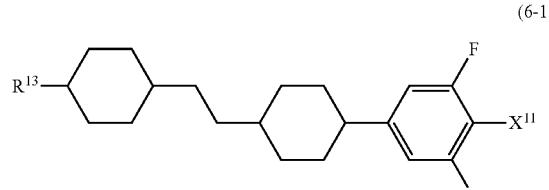
(6-16) 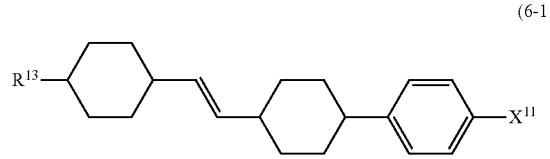
(6-17) 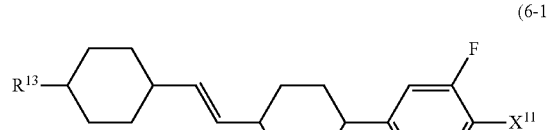
(6-18) 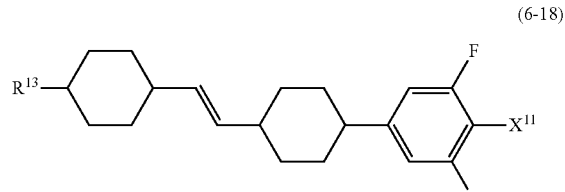
(6-19) 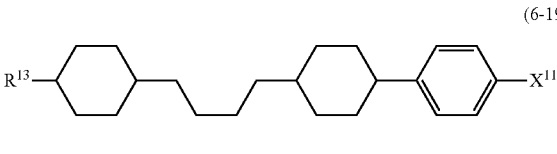
(6-20) 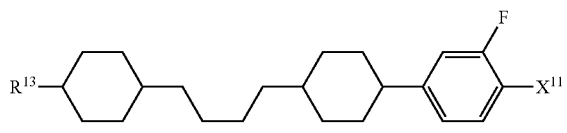
(6-21) 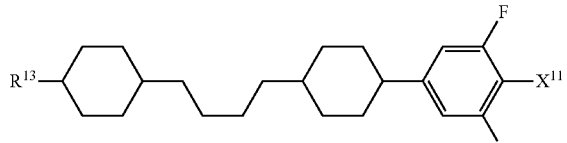
(6-22) 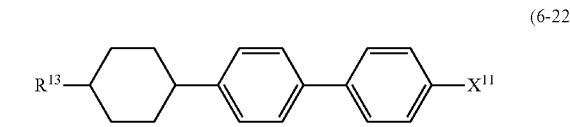
(6-23) 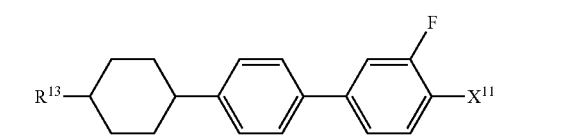
(6-24) 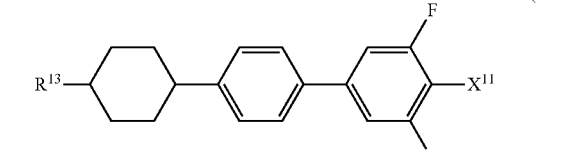
(6-25) 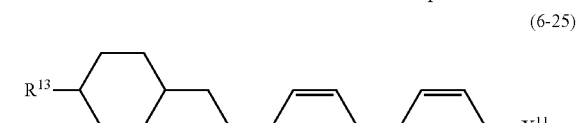
(6-26) 
(6-27) 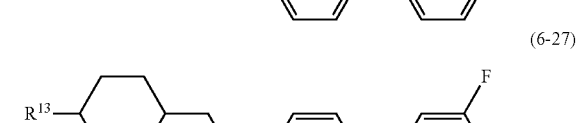
(6-28) 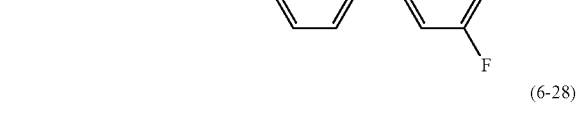
(6-29) 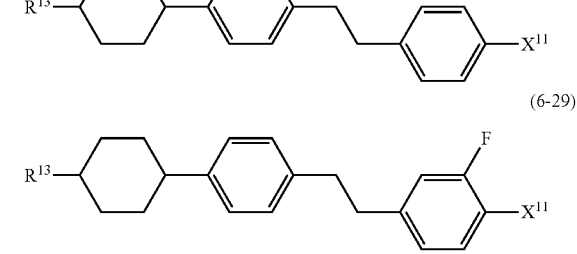

(6-30)
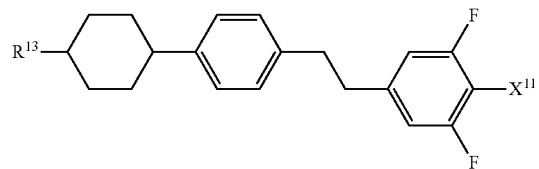
(6-31)
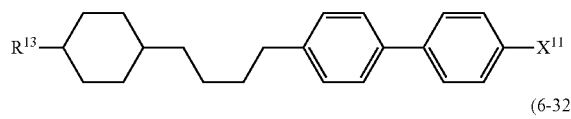
(6-32)
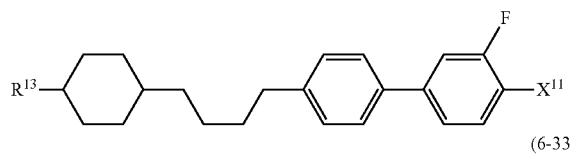
(6-33)
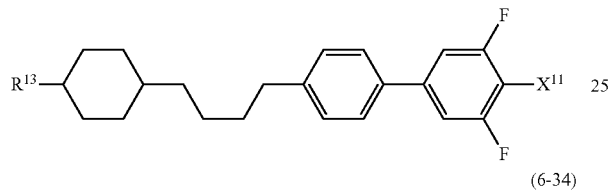
(6-34)
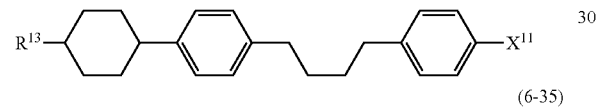
(6-35)
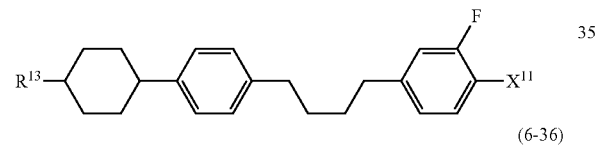
(6-36)
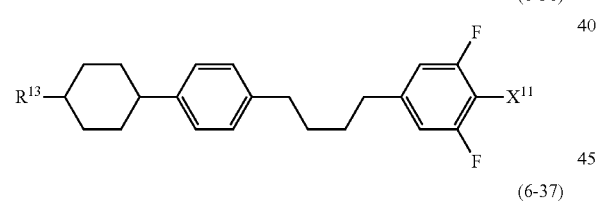
(6-37)
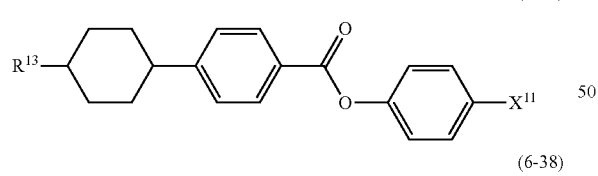
(6-38)
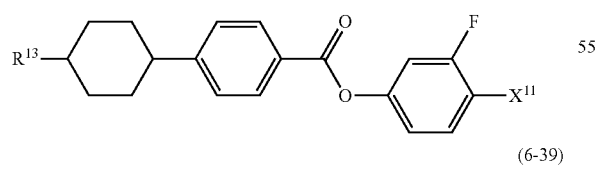
(6-39)
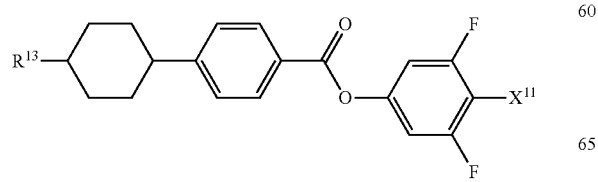
(6-40)
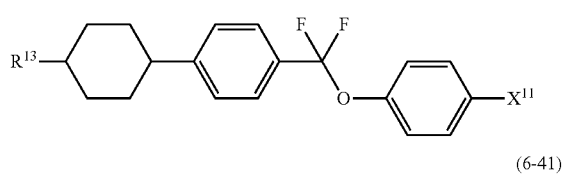
(6-41)
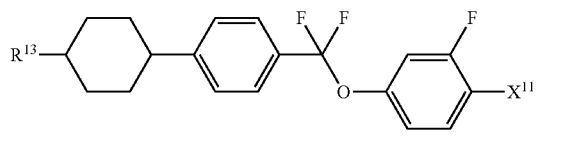
(6-42)
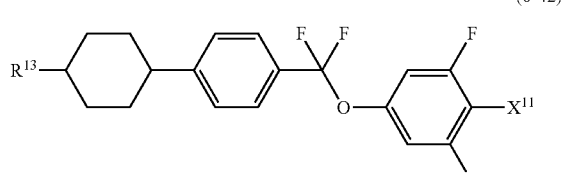
(6-43)
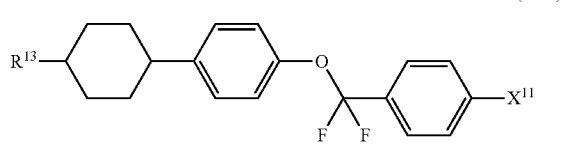
(6-44)
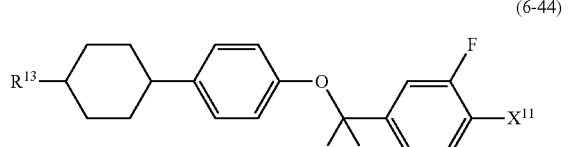
(6-45)
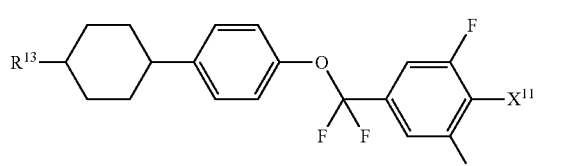
(6-46)
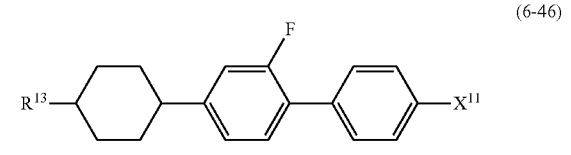
(6-47)
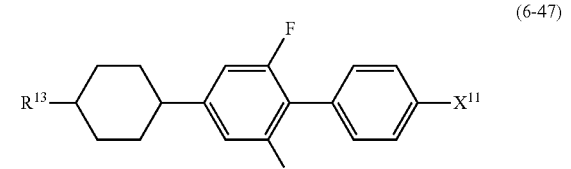
(6-48)

(6-49)
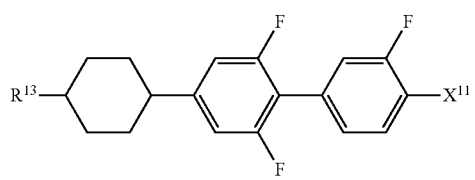
(6-50)
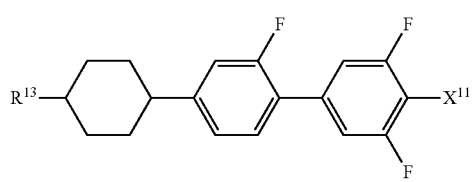
(6-51)
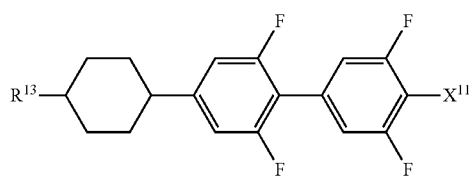
(6-52)
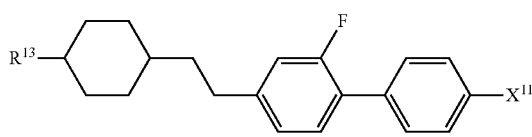
(6-53)
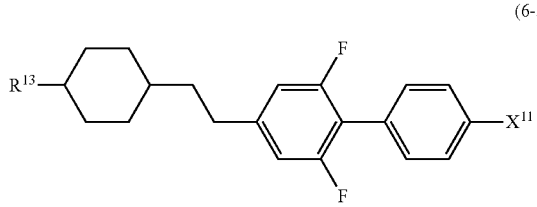
(6-54)
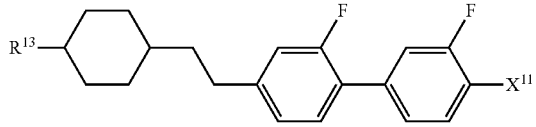
(6-55)
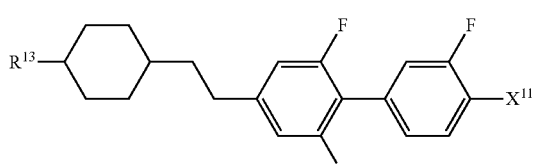
(6-56)
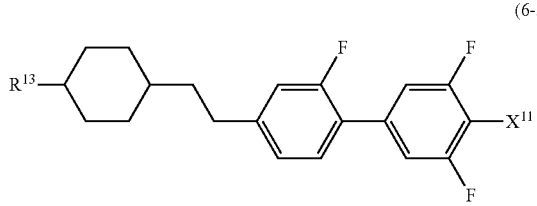
(6-57)
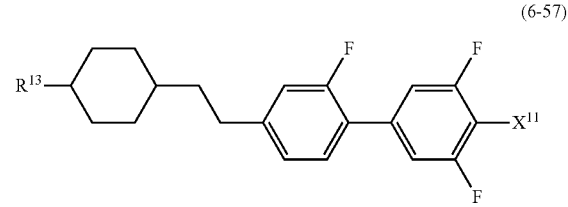
(6-58)
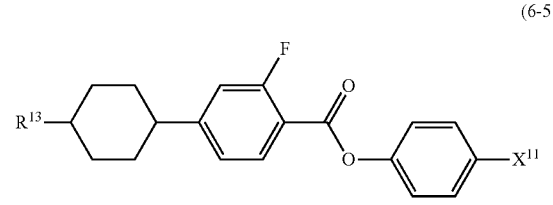
(6-59)
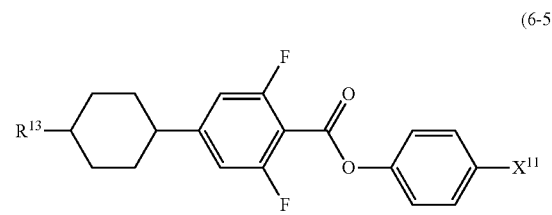
(6-60)
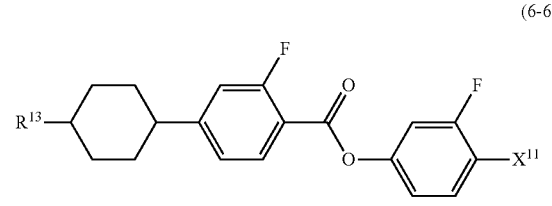
(6-61)
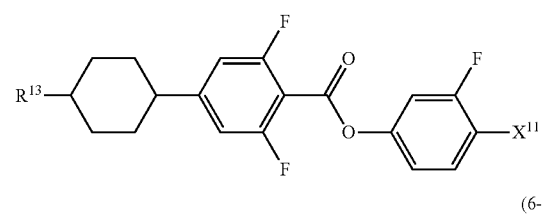
(6-62)
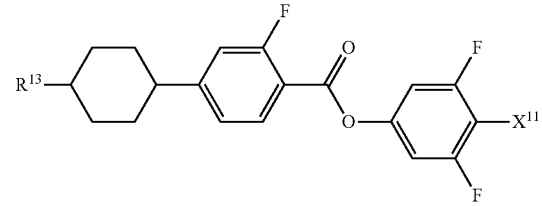
(6-63)
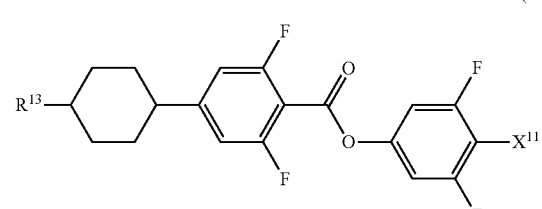
(6-64)
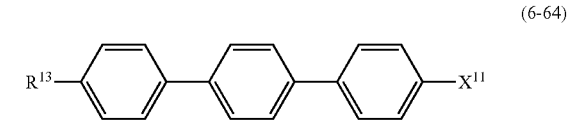

(6-65) 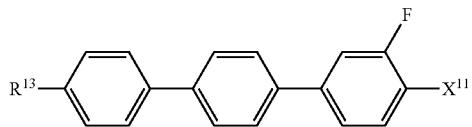
(6-66) 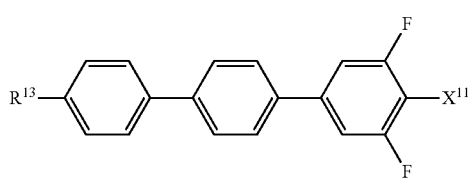
(6-67) 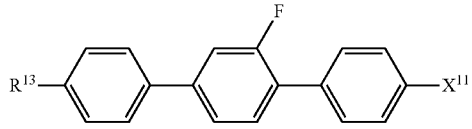
(6-68) 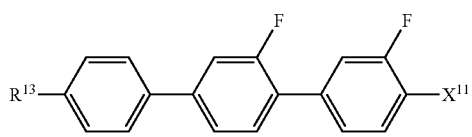
(6-69) 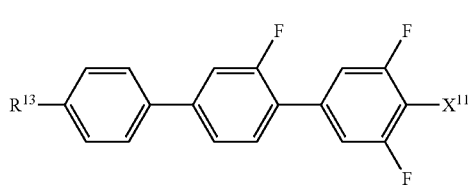
(6-70) 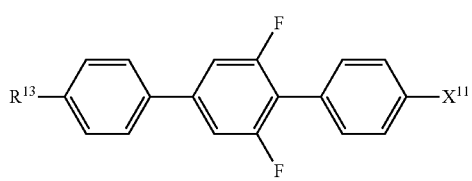
(6-71) 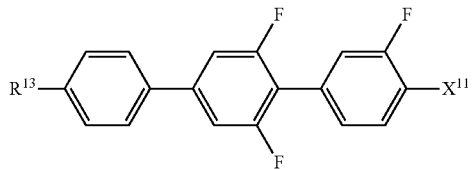
(6-72) 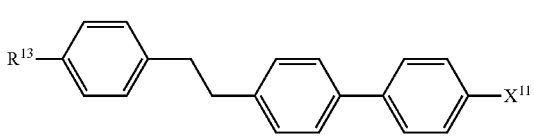
(6-73) 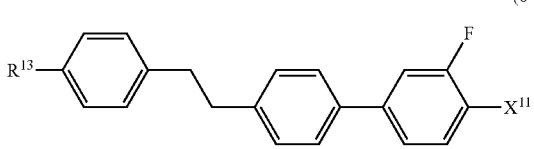
(6-74) 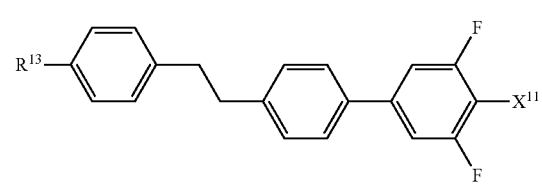
(6-75) 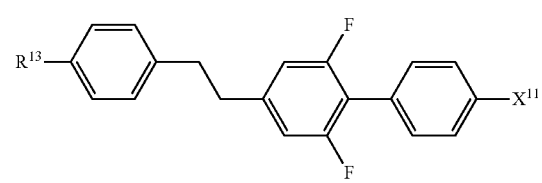
(6-76) 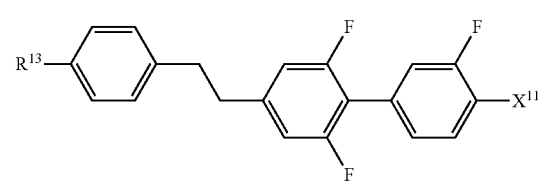
(6-77) 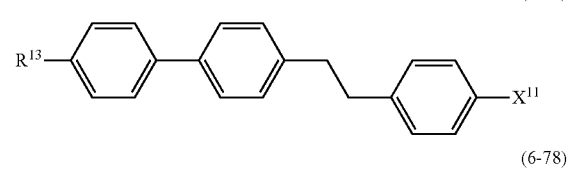
(6-78) 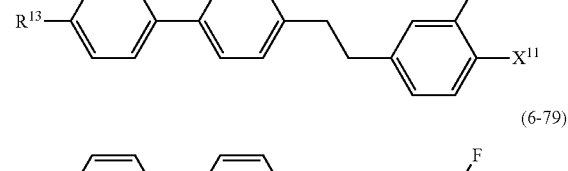
(6-79) 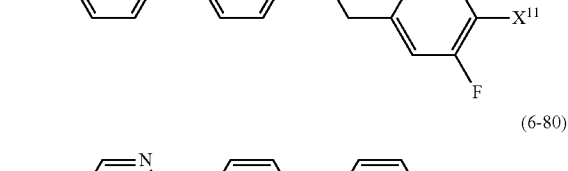
(6-80) 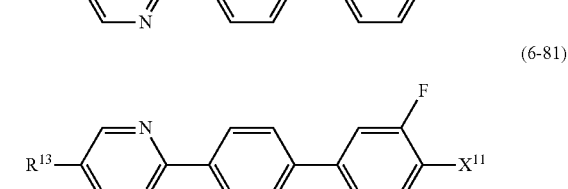
(6-81) 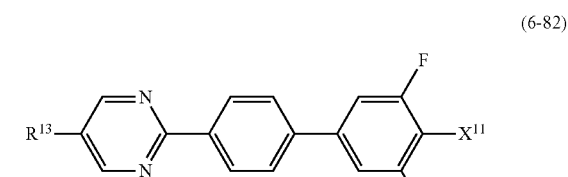
(6-82)

(6-83)
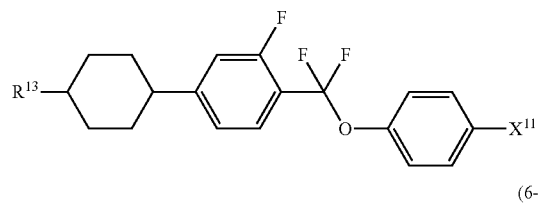
(6-84)
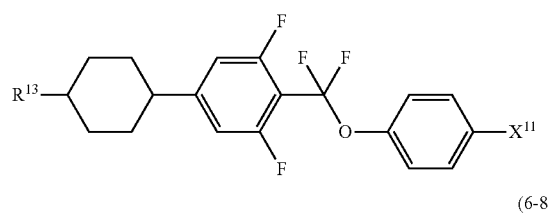
(6-85)
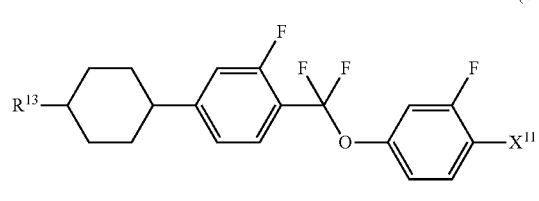
(6-86)
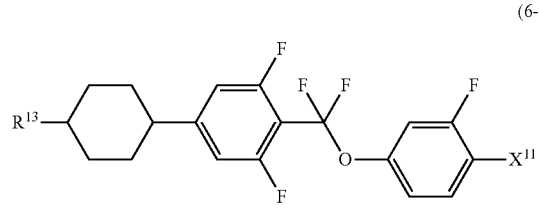
(6-87)
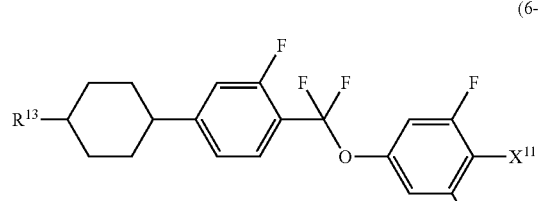
(6-88)
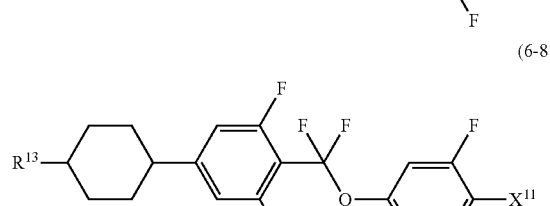
(6-89)
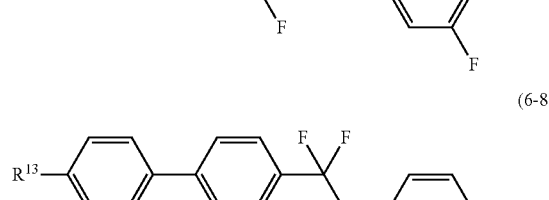
(6-90)
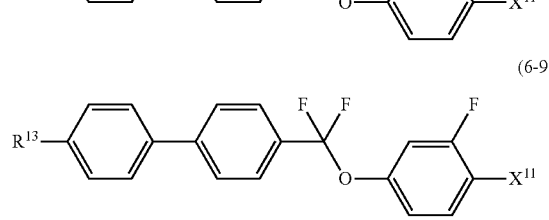
(6-91)
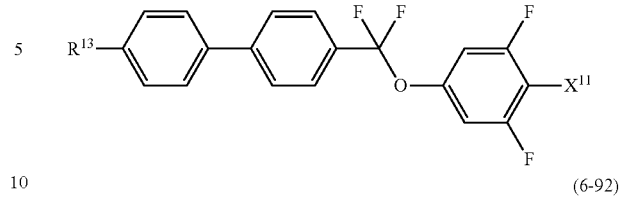
(6-92)
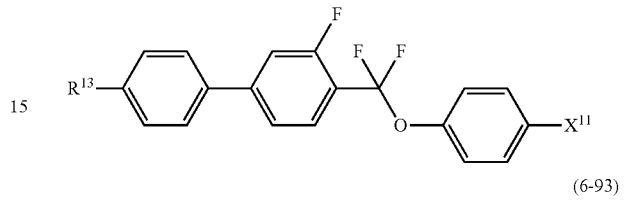
(6-93)
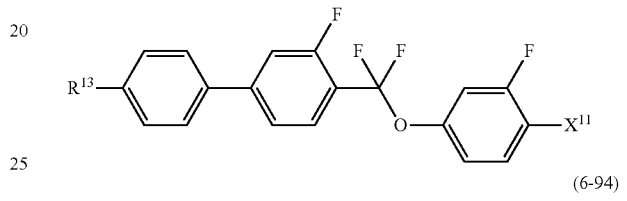
(6-94)
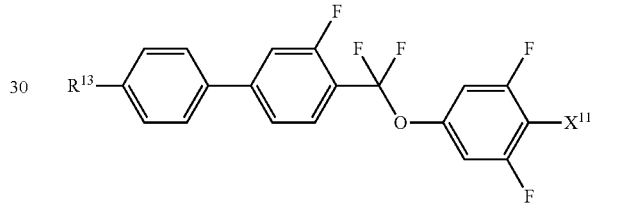
(6-95)
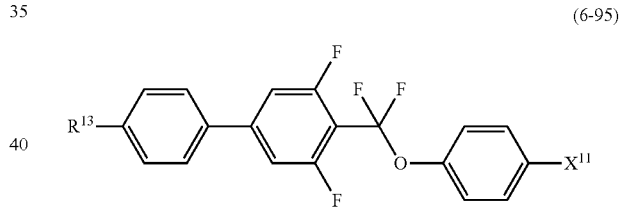
(6-96)
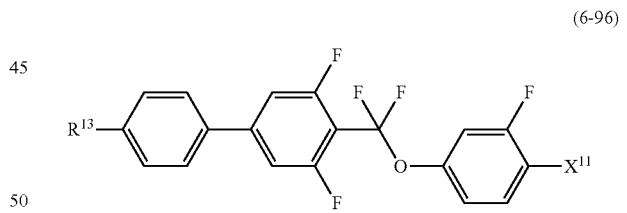
(6-97)
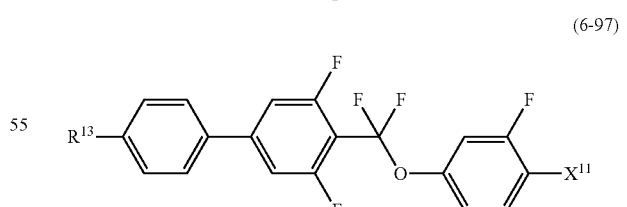
(6-98)
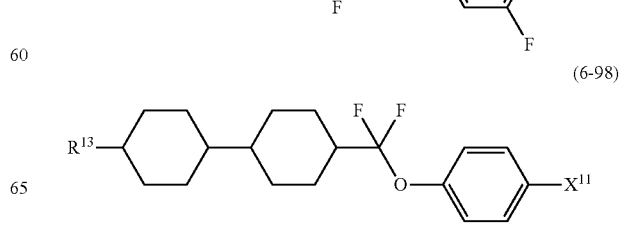

(6-99) 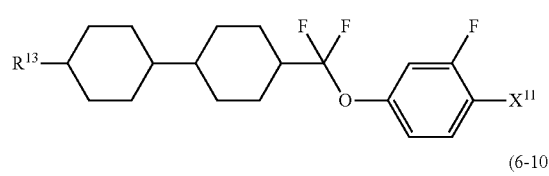
(6-100) 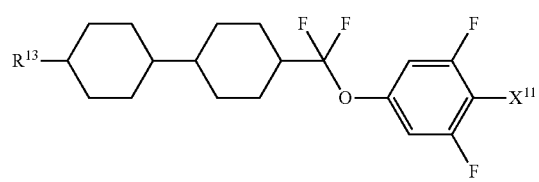
(6-101) 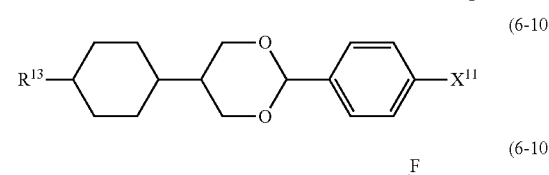
(6-102) 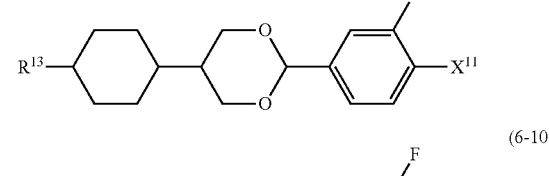
(6-103) 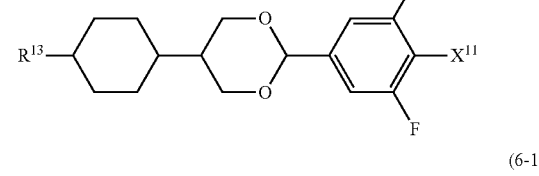
(6-104) 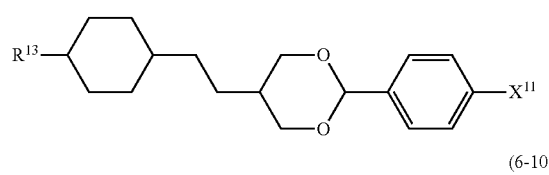
(6-105) 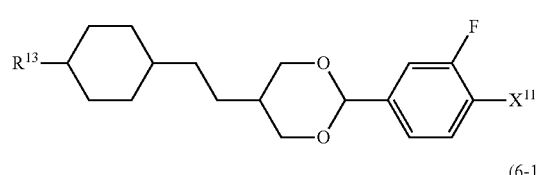
(6-106) 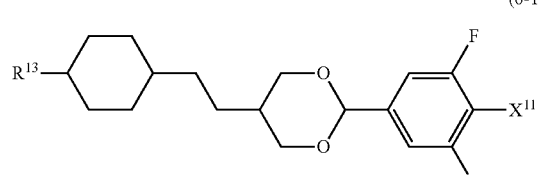
(6-107) 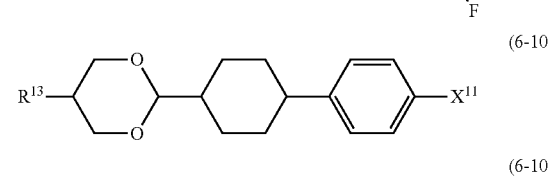
(6-108) 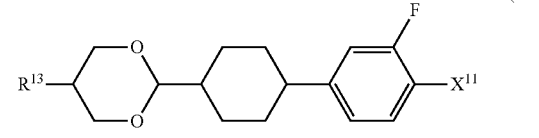
(6-109) 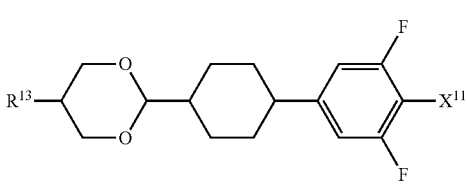
(6-110) 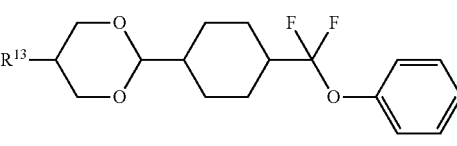
(6-111) 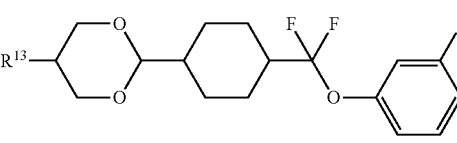
(6-112) 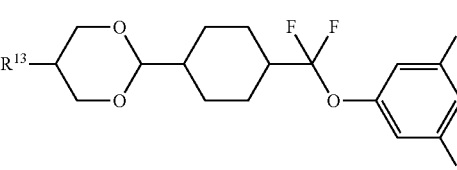
(6-113) 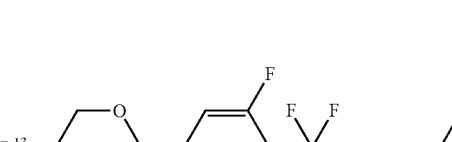
(7-1) 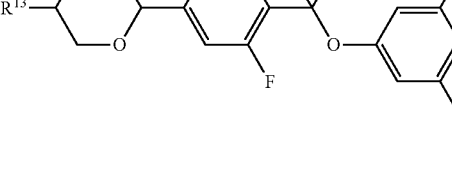
(7-2) 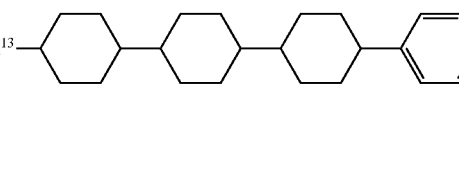
(7-3) 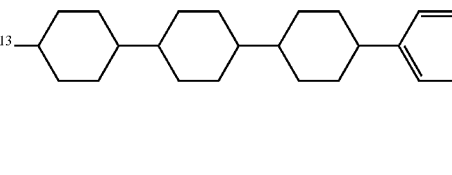
(7-4) 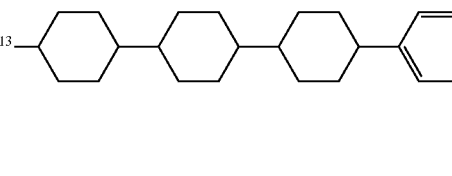

(7-5) 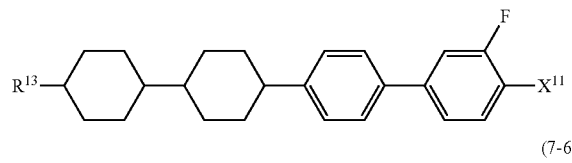
(7-6) 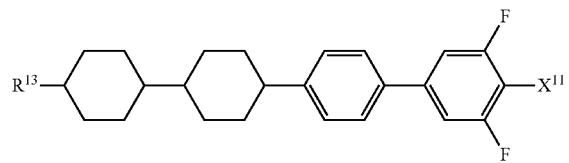
(7-7) 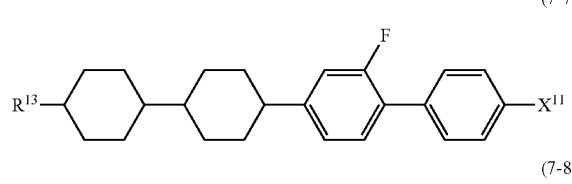
(7-8) 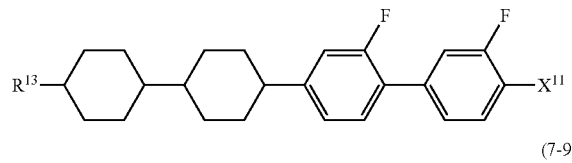
(7-9) 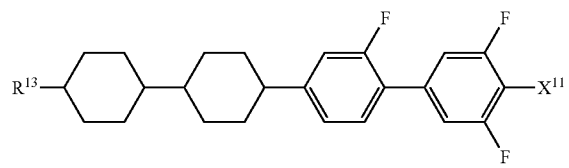
(7-10) 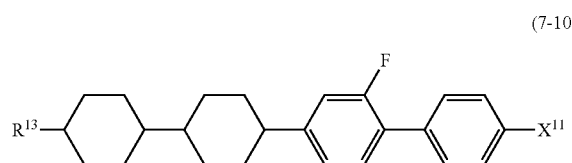
(7-11) 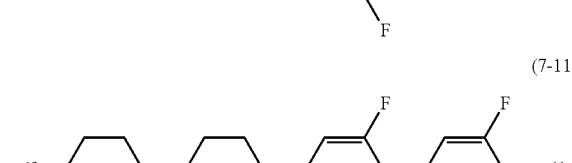
(7-12) 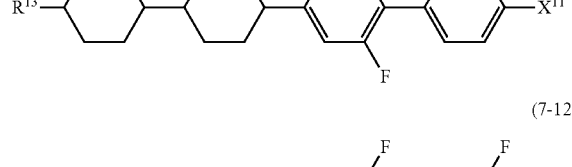
(7-13) 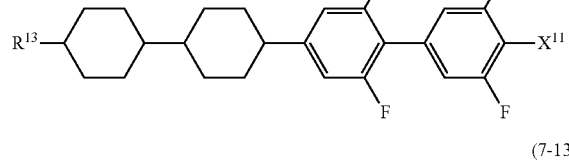
(7-14) 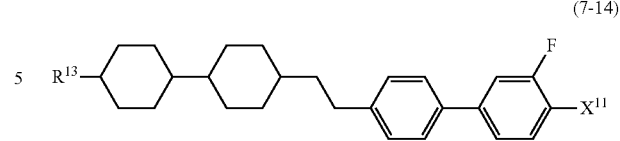
(7-15) 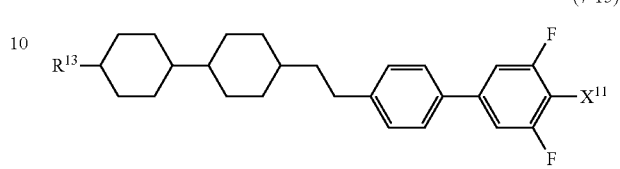
(7-16) 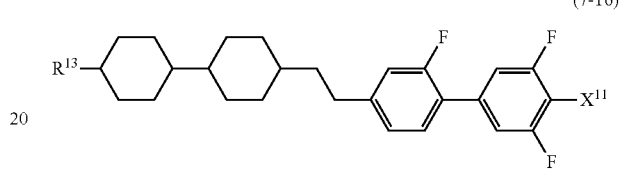
(7-17) 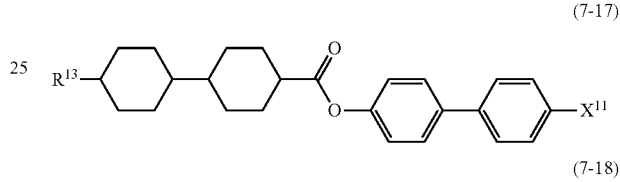
(7-18) 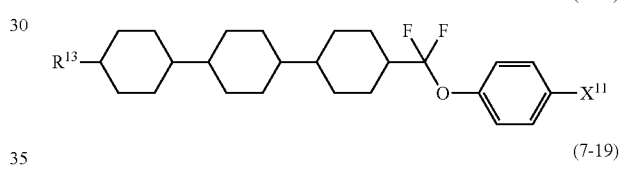
(7-19) 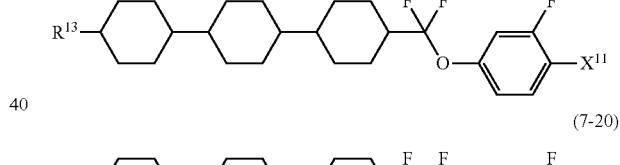
(7-20) 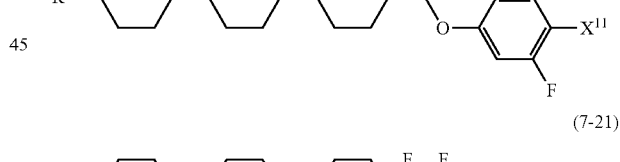
(7-21) 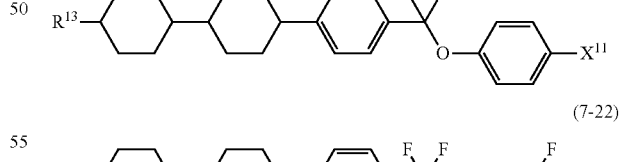
(7-22) 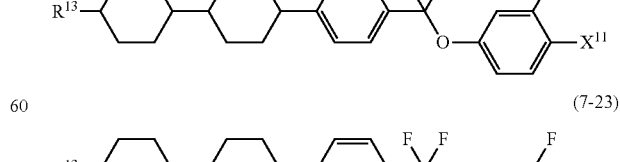
(7-23) 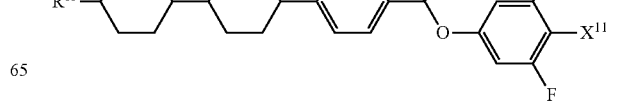

(7-24) 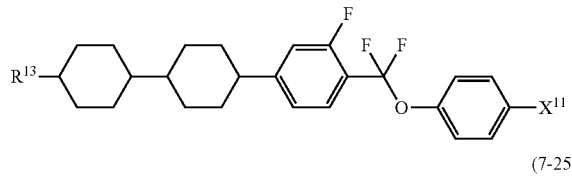
(7-25) 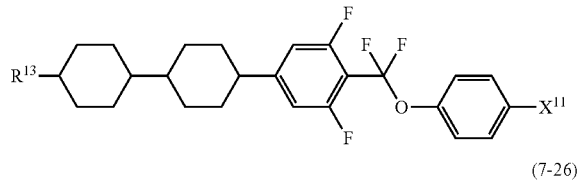
(7-26) 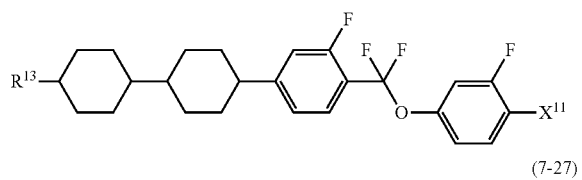
(7-27) 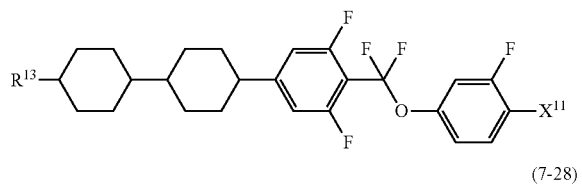
(7-28) 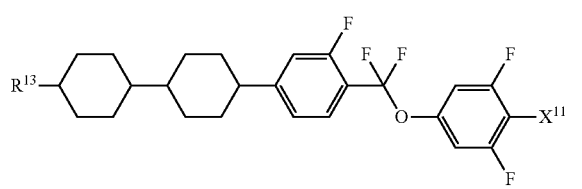
(7-29) 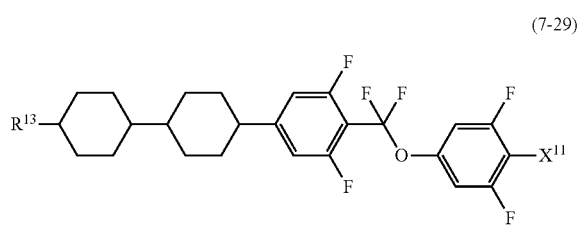
(7-30) 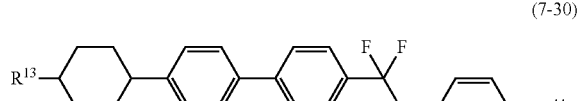
(7-31) 
(7-32) 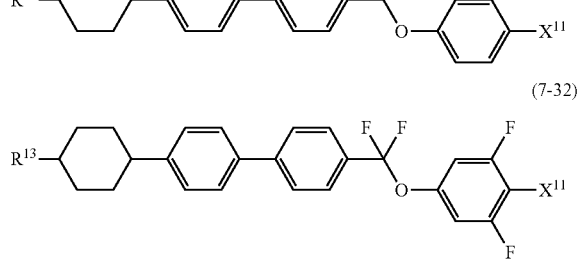
(7-33) 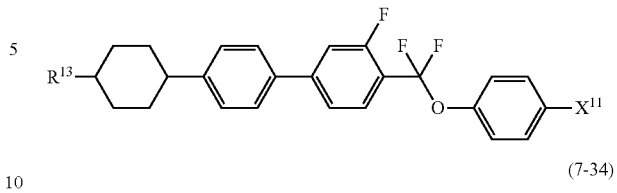
(7-34) 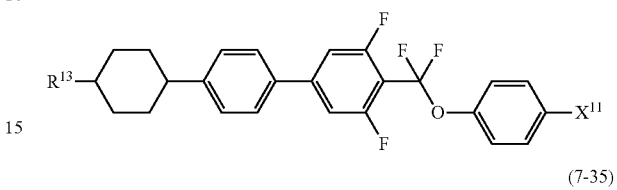
(7-35) 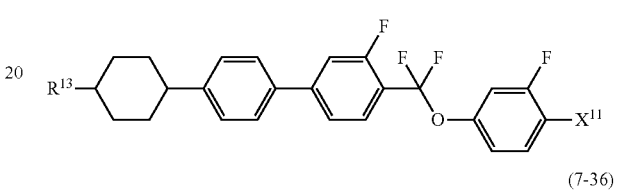
(7-36) 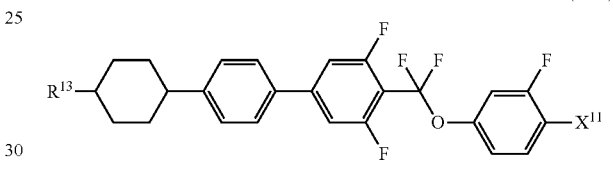
(7-37) 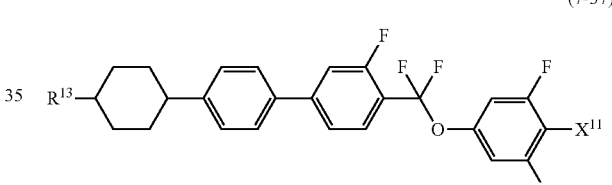
(7-38) 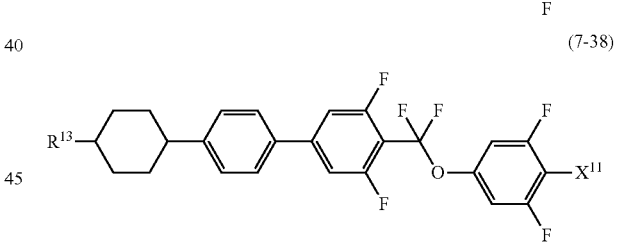
(7-39) 
(7-40) 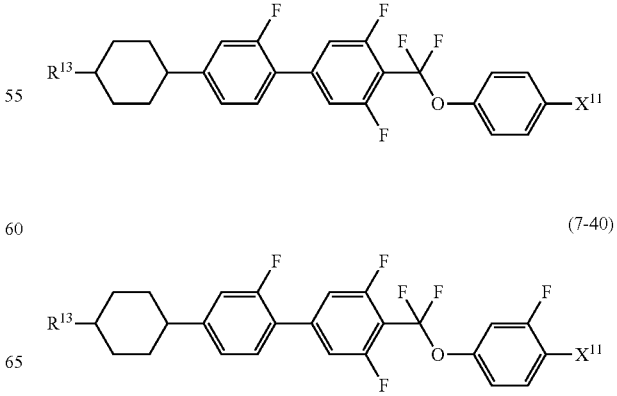

(7-41) 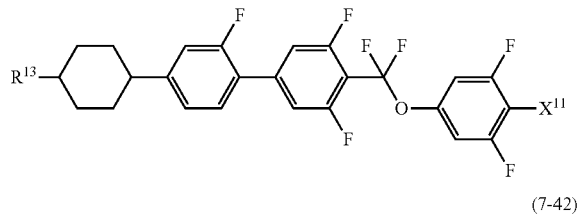
(7-42) 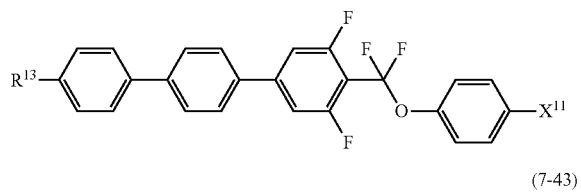
(7-43) 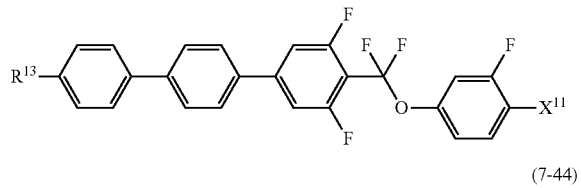
(7-44) 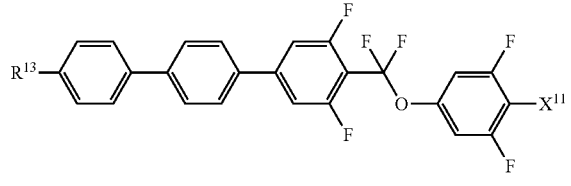
(7-45) 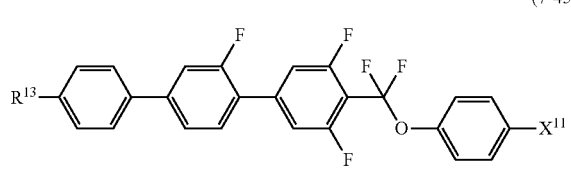
(7-46) 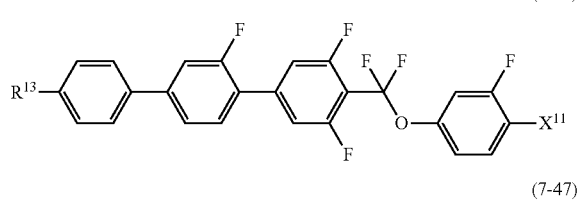
(7-47) 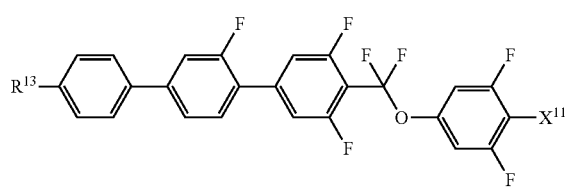
(7-48) 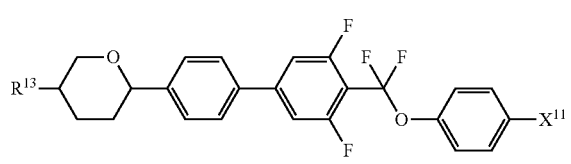
(7-49) 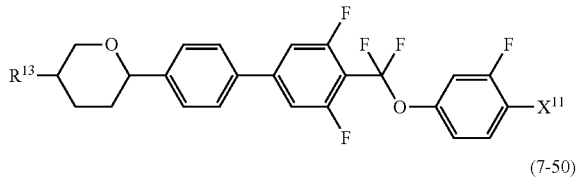
(7-50) 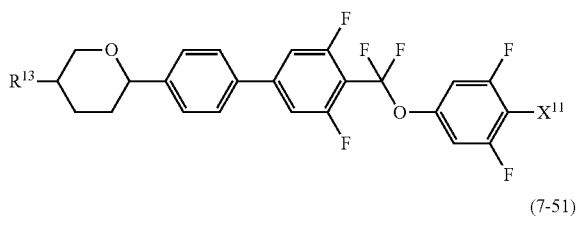
(7-51) 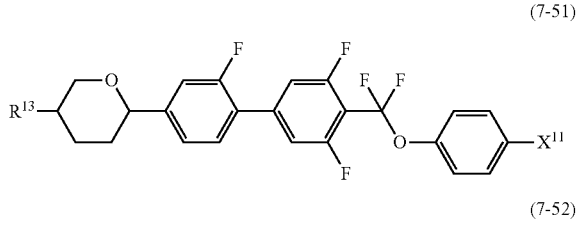
(7-52) 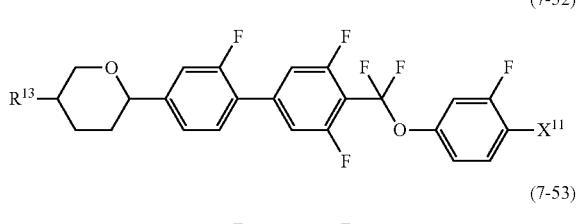
(7-53) 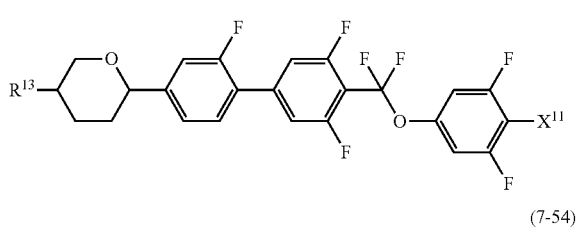
(7-54) 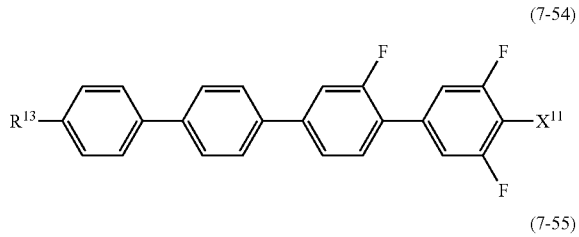
(7-55) 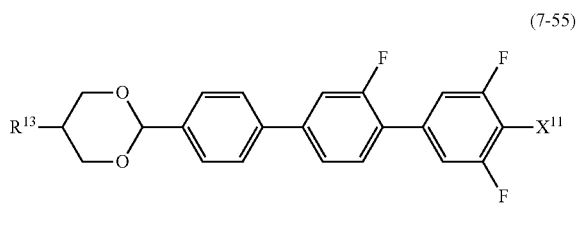
(7-56) 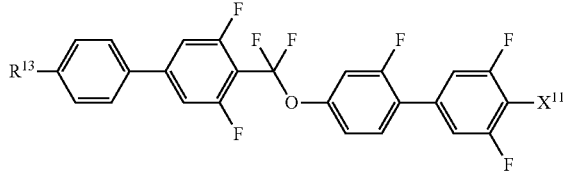

(7-57)
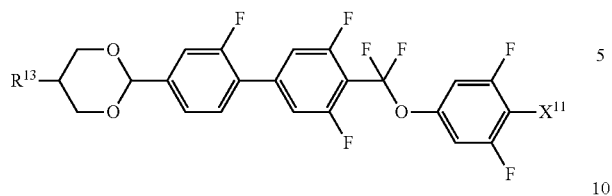

Component C is used for the preparation of a composition for use in modes of PS-IPS, PS-FFS, PSA-OCB and so forth, since the dielectric anisotropy is positive and the stability to heat, light or the like is quite excellent. The content of component C is suitably in the range of 1% by weight to 99% by weight, preferably in the range of 10% by weight to 97% by weight, more preferably in the range of 40% by weight to 95% by weight, based on the weight of the liquid crystal composition. It is desirable that the content of component C should be 30% by weight or less based on the weight of the liquid crystal composition when component C is added to a composition having negative dielectric anisotropy. The elastic constant of the composition can be adjusted and the voltage-transmission curve of the device can be adjusted by the addition of component C.

Component D is compound (8) where the right-terminal group is —C≡N or —C≡C—C≡N. Desirable examples of component D include compounds (8-1) to (8-64). In the compounds of component D, the definition of $R^{12}$ and $X^{12}$ is the same as that of formula (8) described in item 3.

(8-1)
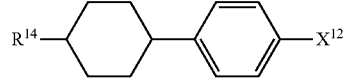

(8-2)

(8-3)

(8-4)

(8-5)

(8-6)

(8-7)
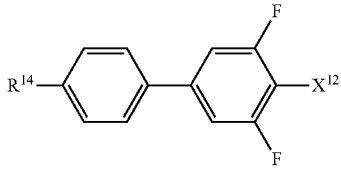

(8-8)
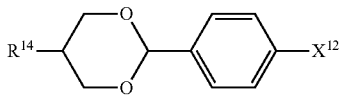

(8-9)
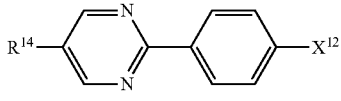

(8-10)
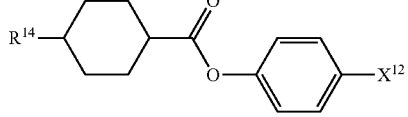

(8-11)
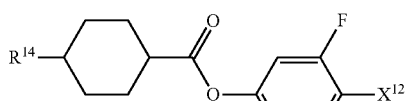

(8-12)
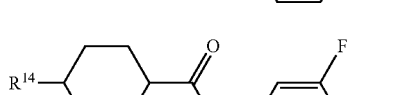

(8-13)

(8-14)
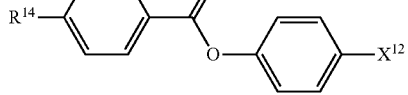

(8-15)
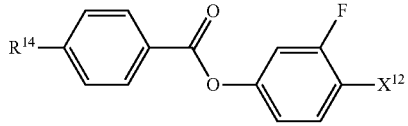

(8-16)
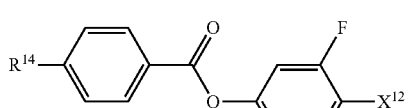

(8-17)

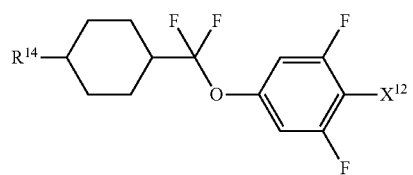 (8-18)
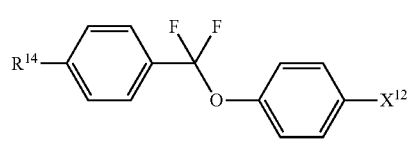 (8-19)
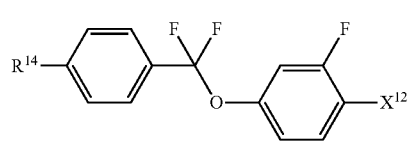 (8-20)
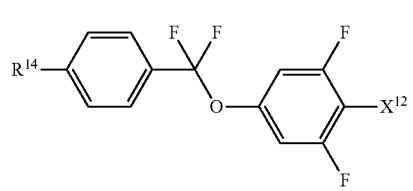 (8-21)
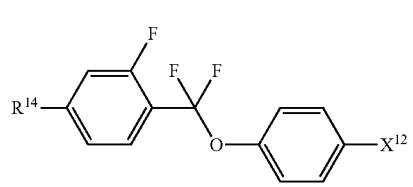 (8-22)
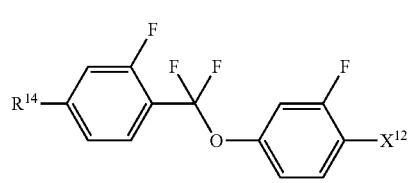 (8-23)
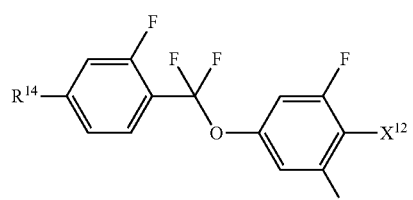 (8-24)
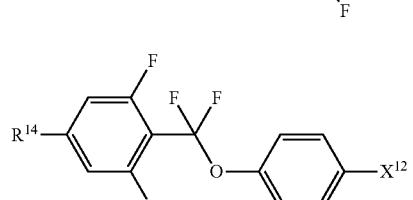 (8-25)
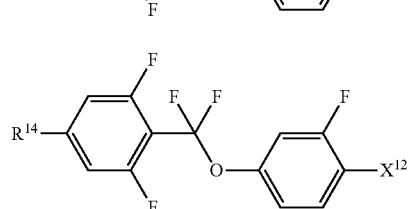 (8-26)
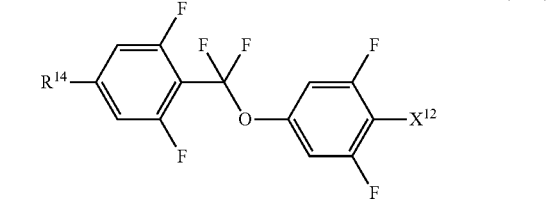 (8-27)
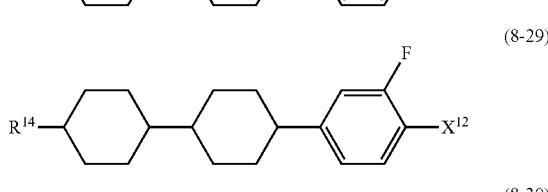 (8-28)
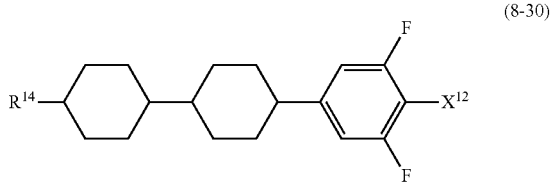 (8-29)
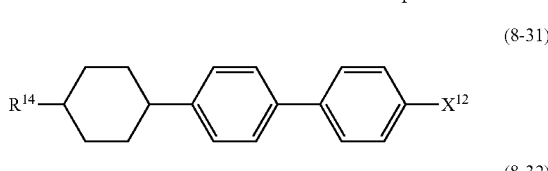 (8-30)
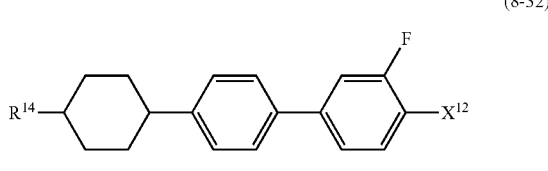 (8-31)
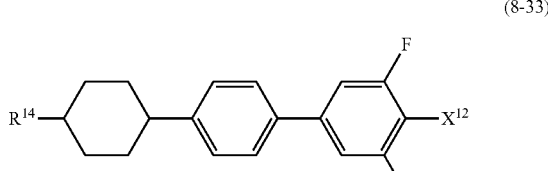 (8-32)
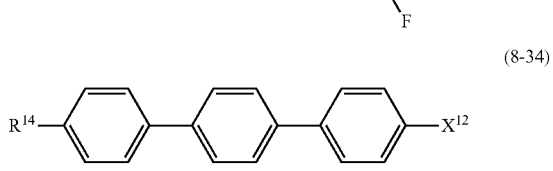 (8-33)
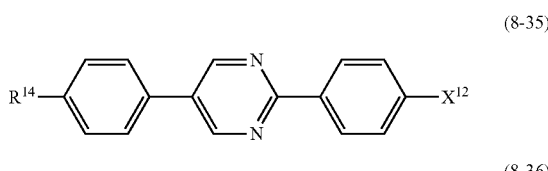 (8-34)
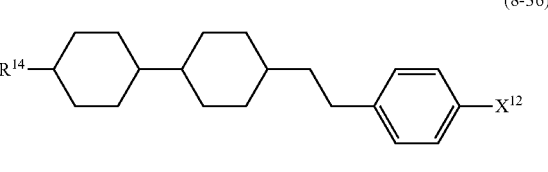 (8-35)
(8-36)

(8-37) 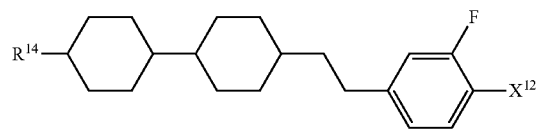
(8-38) 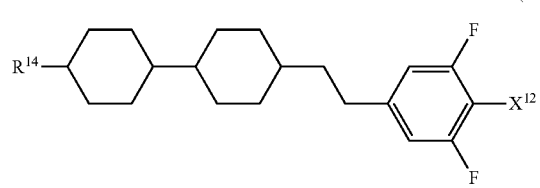
(8-39) 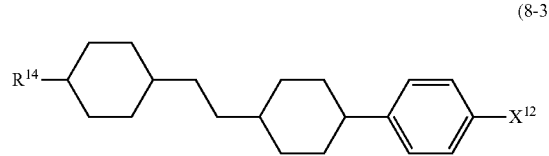
(8-40) 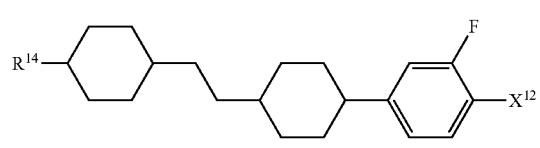
(8-41) 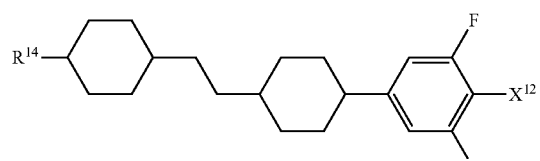
(8-42) 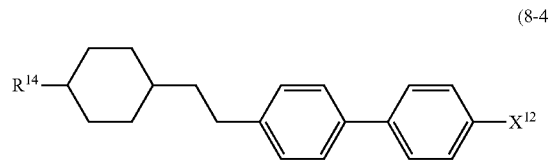
(8-43) 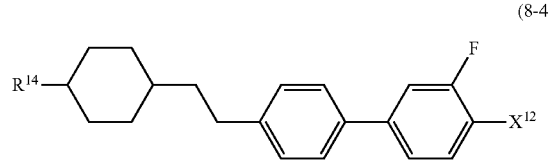
(8-44) 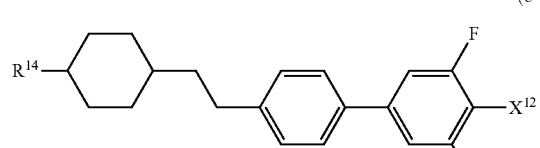
(8-45) 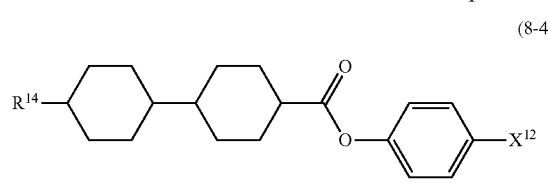
(8-46) 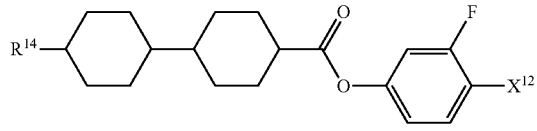
(8-47) 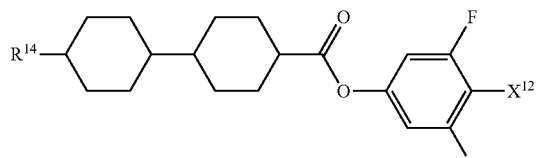
(8-48) 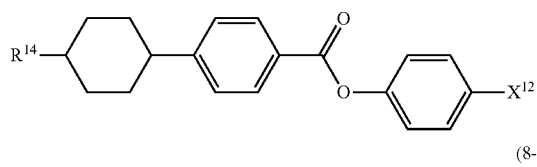
(8-49) 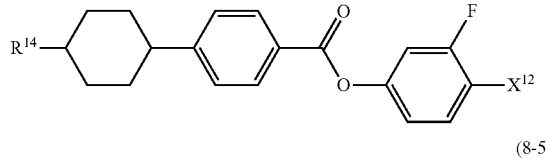
(8-50) 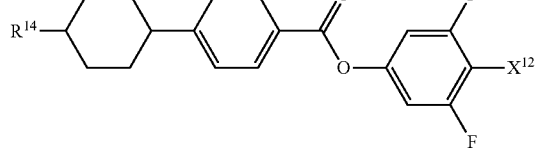
(8-51) 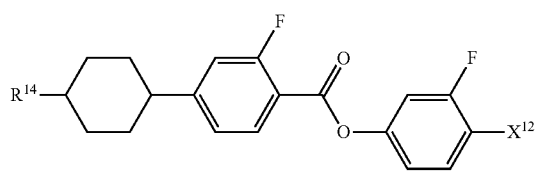
(8-52) 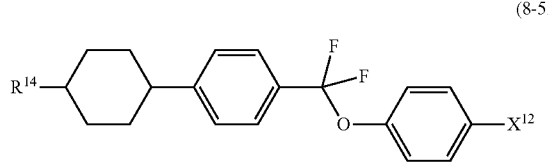
(8-53) 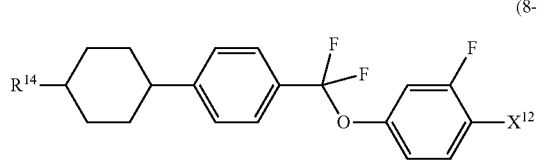
(8-54) 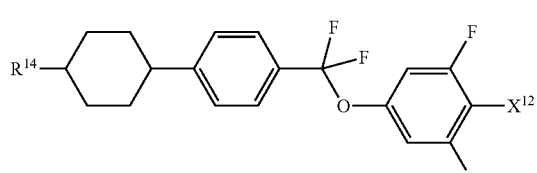

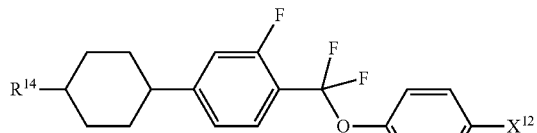
(8-55)

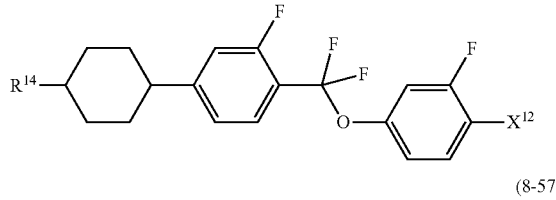
(8-56)

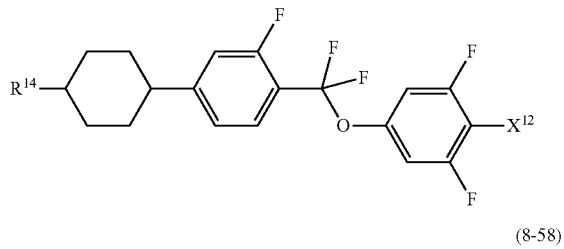
(8-57)

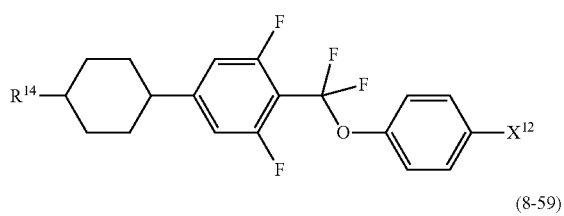
(8-58)

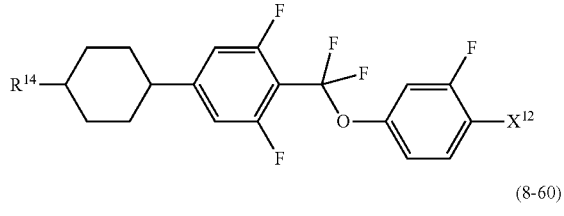
(8-59)

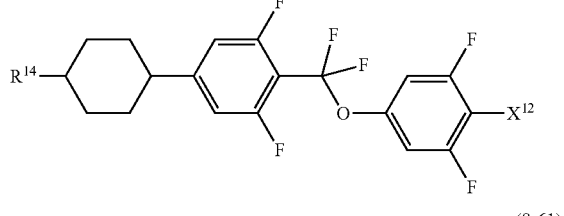
(8-60)

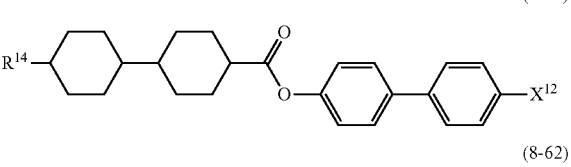
(8-61)

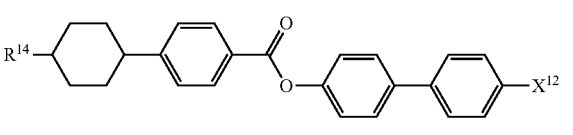
(8-62)

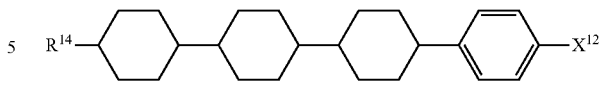
(8-63)

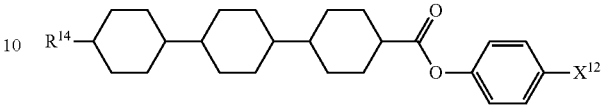
(8-64)

Component D is mainly used for the preparation of a composition for use in a PS-TN mode and so forth, since the dielectric anisotropy is positive and its value is large. The dielectric anisotropy of the composition can be increased by the addition of component D. Component D has the effect of increasing the temperature range of a liquid crystal phase, adjusting the viscosity and adjusting the optical anisotropy. Component D is useful for adjusting the voltage-transmission curve of the device.

The content of component D is suitably in the range of 1% by weight to 99% by weight, preferably in the range of 10% by weight to 97% by weight, more preferably 40% by weight to 95% by weight based on the weight of the liquid crystal composition, in the preparation of a composition for use in a mode of PS-TN or the like. The content of component D is preferably 30% by weight or less based on the weight of the liquid crystal composition when component D is added to a composition having negative dielectric anisotropy. The elastic constant of the composition can be adjusted and the voltage-transmission curve of the device can be adjusted by the addition of component D.

Component E is compounds (9) to (15). These compounds have a benzene ring substituted with two halogens in the lateral positions such as 2,3-difluoro-1,4-phenylene. Desirable examples of component E include compounds (9-1) to (9-8), compounds (10-1) to (10-17), compound (11-1), compounds (12-1) to (12-3), compounds (13-1) to (13-11), compounds (14-1) to (14-3) and compounds (15-1) to (15-3). In the compounds of component E, the definition of $R^{15}$, $R^{16}$ and $R^{17}$ is the same as that of formulas (9) to (15) described in item 4.

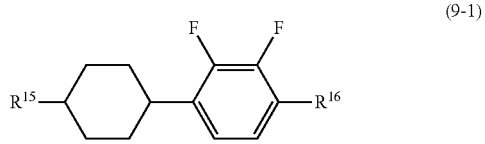
(9-1)

(9-2)

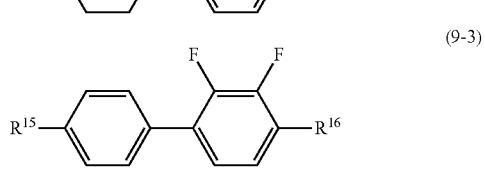
(9-3)

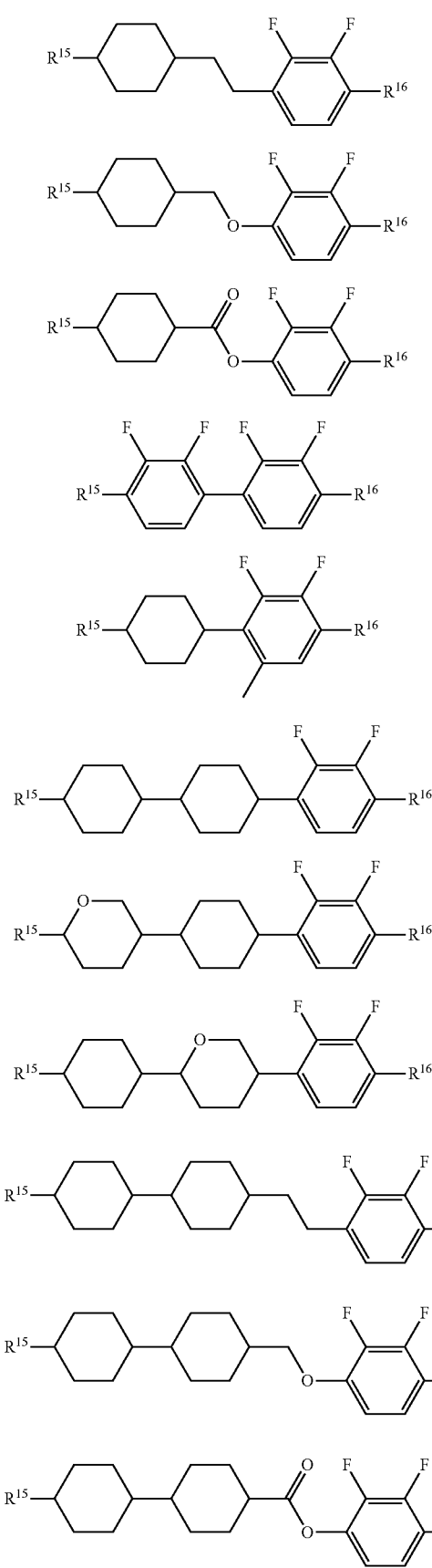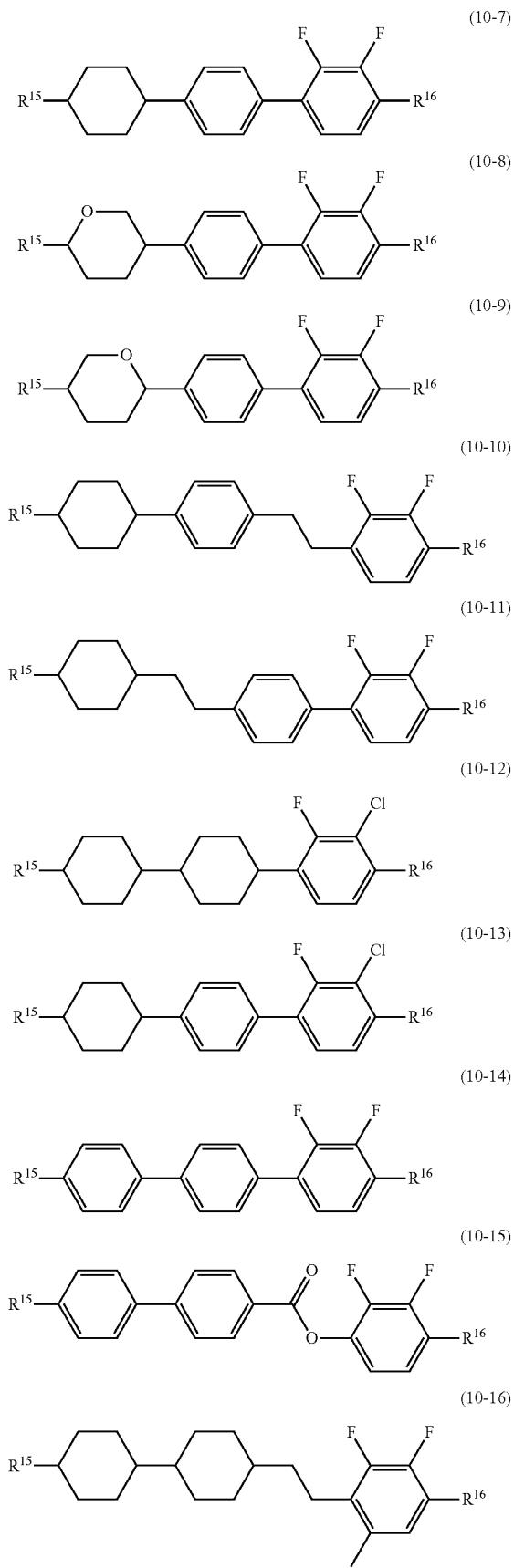

(10-17)
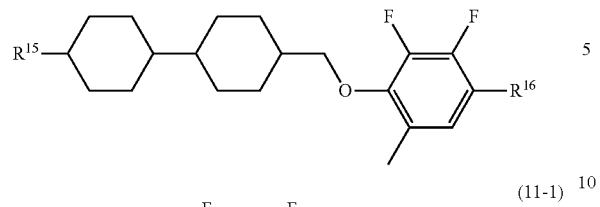
(11-1)
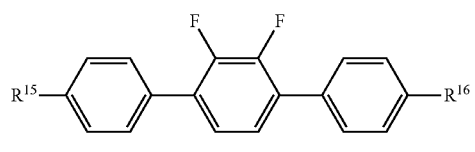
(12-1)
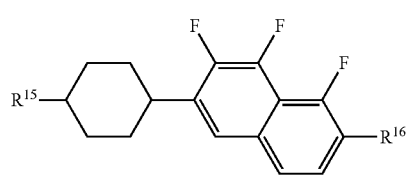
(12-2)
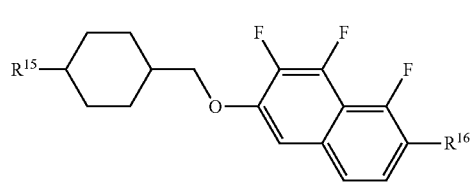
(12-3)
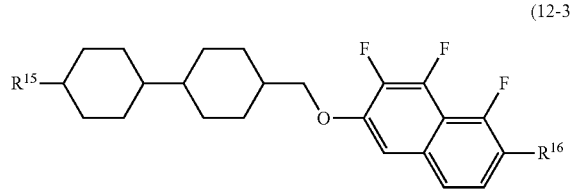
(13-1)
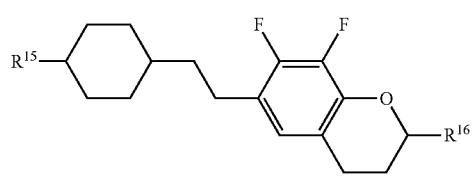
(13-2)
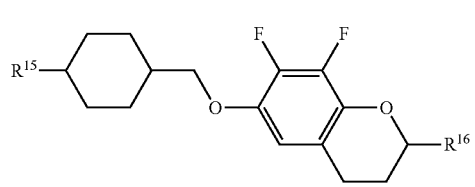
(13-3)
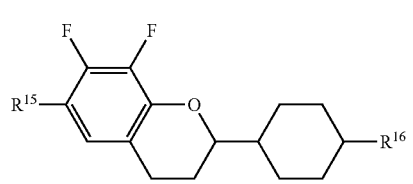
(13-4)
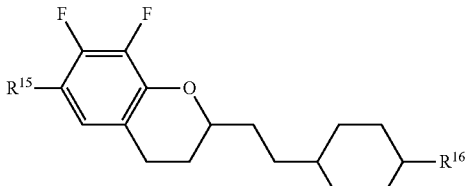
(13-5)
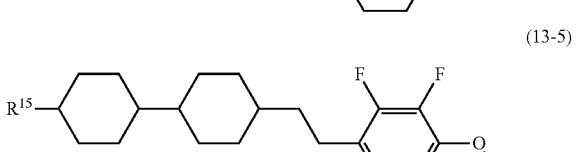
(13-6)
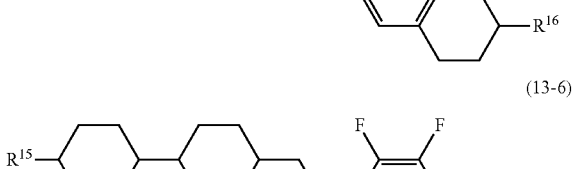
(13-7)
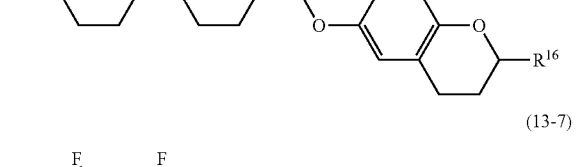
(13-8)
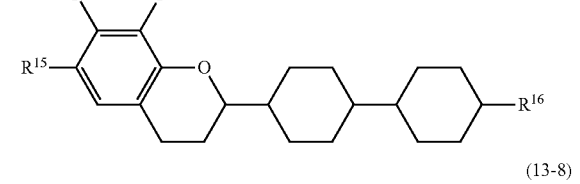
(13-9)
(13-10)
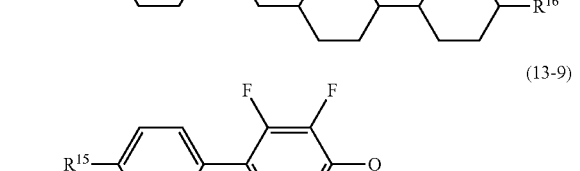
(13-11)
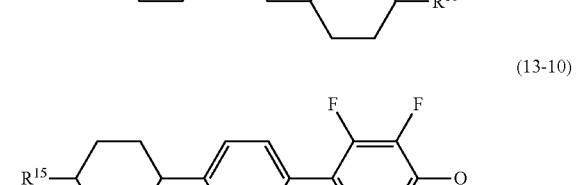

-continued (14-1)
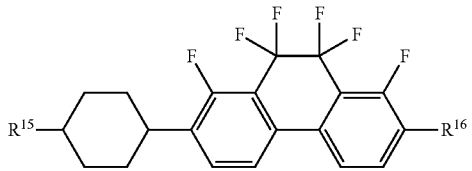

(14-2)
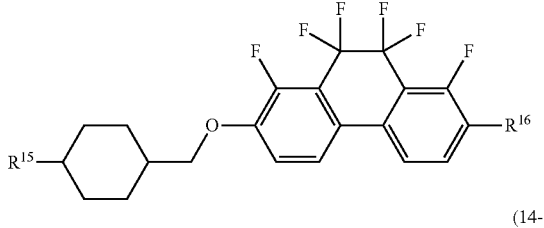

(14-3)
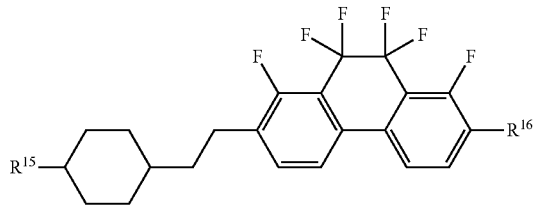

(15-1)
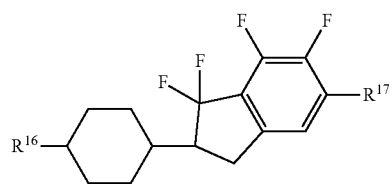

(15-2)
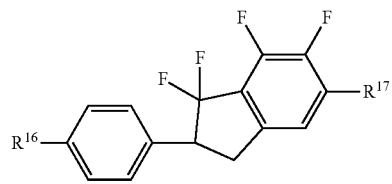

(15-3)
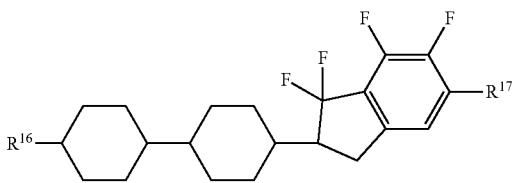

Component E is a compound in which the dielectric anisotropy is negative. Component E is mainly used for the preparation of a composition for use in modes of PS-IPS, PS-FFS, PSA-VA and so forth. As the content of component E is increased, the dielectric anisotropy of the composition increases negatively. However, the viscosity increases. Thus, it is desirable that the content should decrease as long as the required value of the threshold voltage of the device is satisfied. Accordingly, the content is preferably 40% by weight or more in order to ensure adequate voltage drive, in consideration that the absolute value of the dielectric anisotropy is about 5.

In component E, compound (9) is mainly effective in adjusting the viscosity, adjusting the optical anisotropy or adjusting the dielectric anisotropy, since it is a two-ring compound. Compounds (10) and (11) are effective in increasing the maximum temperature, increasing the optical anisotropy or increasing the dielectric anisotropy, since it is a three-ring compound. Compounds (12) to (15) are effective in increasing the dielectric anisotropy.

The content of component E is preferably 40% by weight or more, and more preferably in the range of 50% by weight to 95% by weight based on the weight of the liquid crystal composition, in the preparation of a composition for use in modes of PS-IPS, PS-FFS, PSA-VA and so forth. It is desirable that the content of component E should be 30% by weight or less based on the weight of the liquid crystal composition when component E is added to a composition having positive dielectric anisotropy. The elastic constant of the composition can be adjusted and the voltage-transmission curve of the device can be adjusted by the addition of component E.

The preparation of the polymerizable composition is carried out according to known methods such as the mutual dissolution of necessary components at a temperature higher than room temperature. An additive may be added to the composition depending on its intended use. Examples of the additive are an optically active compound, an antioxidant, an ultraviolet light absorber, a light stabilizer, a thermal stabilizer, a defoaming agent, a polymerization initiator, a polymerization inhibitor and so forth. These kinds of additives are known to a person skilled in the art, and have been described in the literature.

An optically active compound is effective in inducing a helical structure in liquid crystal molecules, giving a necessary twist angle and thus preventing a reverse twist. A helical pitch can be adjusted by the addition of the optically active compound. Two or more optically active compounds may be added for the purpose of adjusting the temperature dependence of the helical pitch. Desirable examples of the optically active compound include the following compounds (Op-1) to (Op-18). In compound (op-18), ring J is 1,4-cyclohexylene or 1,4-phenylene, and $R^{28}$ is alkyl having 1 to 10 carbons.

(Op-1)
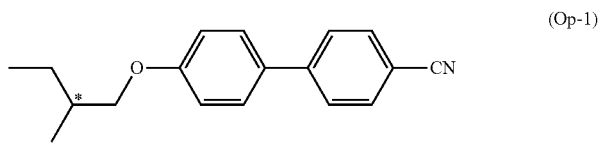

(Op-2)
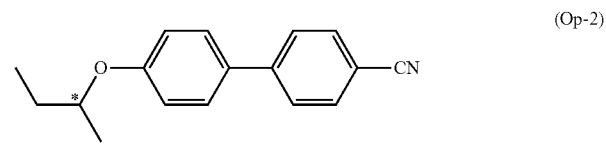

(Op-3)
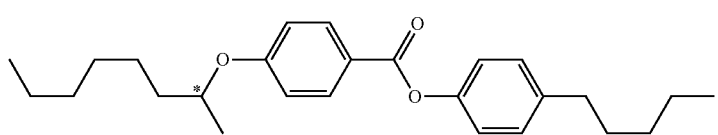

(Op-4)
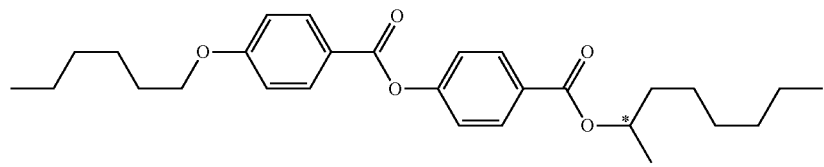
(Op-5)
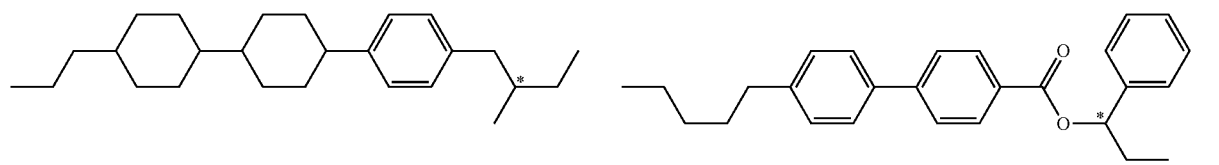
(Op-6)
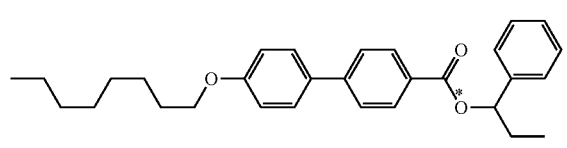
(Op-7)
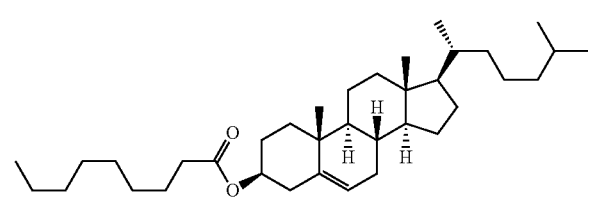
(Op-8)
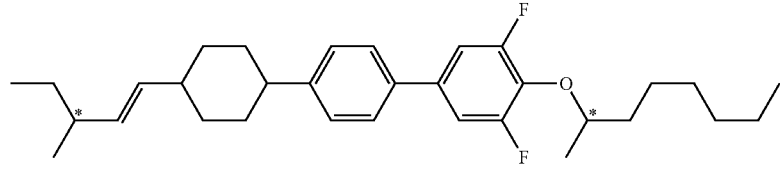
(Op-9)
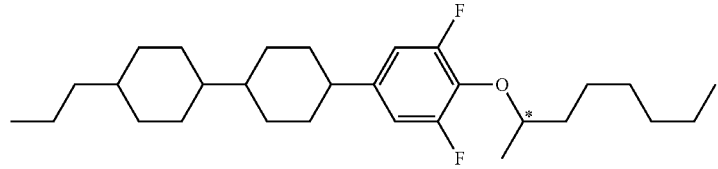
(Op-10)
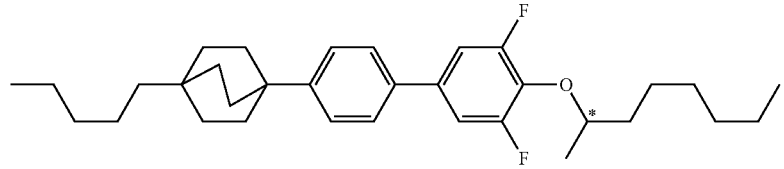
(Op-11)
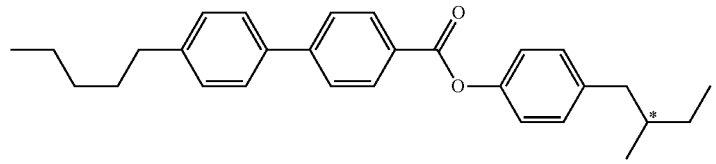
(Op-12)
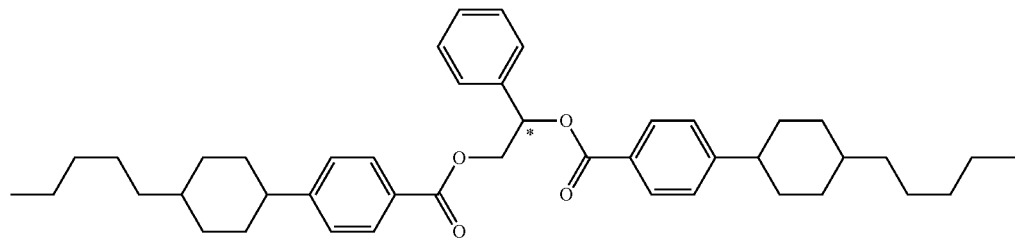
(Op-13)

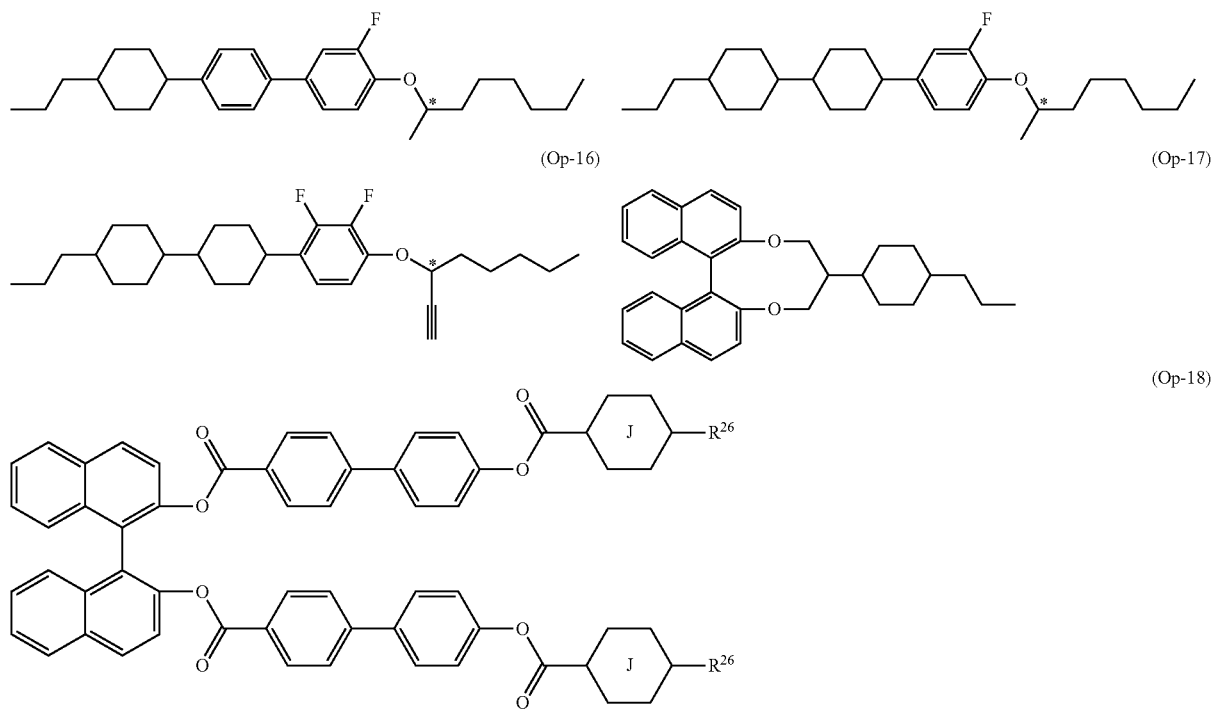

An antioxidant is effective in maintaining a large voltage holding ratio. Desirable examples of the antioxidant include compounds (AO-1) and (AO-2) described below, Irganox 415, Irganox 565, Irganox 1010, Irganox 1035, Irganox 3114 and Irganox 1098 (trade name: BASF SE). An ultraviolet light absorber is effective for preventing a decrease in the maximum temperature. Desirable examples of the ultraviolet light absorber include benzophenone derivatives, benzoate derivatives and triazole derivatives. Specific examples include compounds (AO-3) and (AO-4) described below, Tinuvin 329, Tinuvin P, Tinuvin 326, Tinuvin 234, Tinuvin 213, Tinuvin 400, Tinuvin 328, Tinuvin 99-2 (trade name: BASF SE) and 1,4-diazabicyclo[2.2.2]octane (DABCO).

A light stabilizer such as amines with steric hindrance is also desirable for maintaining a large voltage holding ratio. Desirable examples of the light stabilizer include compounds (AO-5) and (AO-6) described below, Tinuvin 144, Tinuvin 765 and Tinuvin 770DF (trade name: BASF SE). A thermal stabilizer is also effective in maintaining a large voltage holding ratio. Desirable examples include Irgafos 168 (trade name: BASF SE). An antifoaming agent is effective in preventing foam formation. Desirable examples of the antifoaming agent include dimethyl silicone oil and methyl phenyl silicone oil.

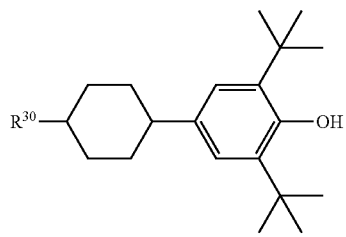
(AO-2)

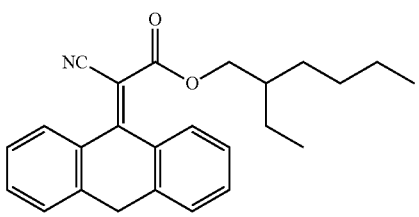
(AO-3)

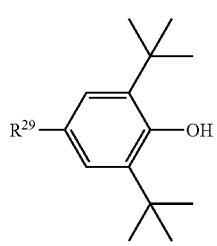
(AO-1)

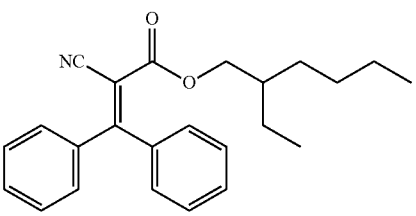
(AO-4)

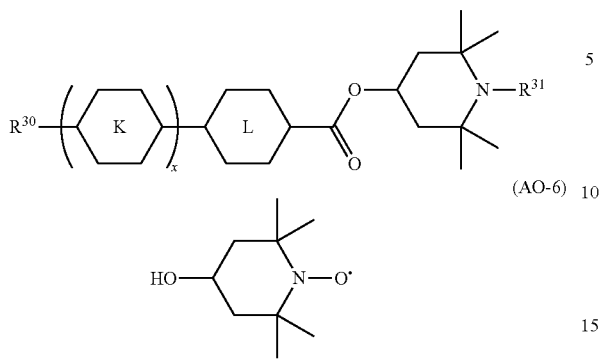

In compound (AO-1), $R^{29}$ is alkyl having 1 to 20 carbons, alkoxy having 1 to 20 carbons, —COOR$^{32}$ or —CH$_2$CH$_2$COOR$^{32}$, where $R^{32}$ is alkyl having 1 to 20 carbons. In compounds (AO-2) and (AO-5), $R^{30}$ is alkyl having 1 to 20 carbons. In compound (AO-5), $R^{31}$ is hydrogen, methyl or O. (oxygen radical), ring K and ring L are 1,4-cyclohexylene or 1,4-phenylene, and x is 0, 1 or 2.

4. Liquid Crystal Composites

Compound (1) has a high polymerization reactivity, a high conversion yield and a high solubility in a liquid crystal composition. The liquid crystal composite is formed by the polymerization of a polymerizable composition including compound (1) and a liquid crystal composition. A polymer is formed in the liquid crystal composition by the polymerization of compound (1). This polymer is effective in inducing pretilt in liquid crystal molecules. It is desirable that the polymerization should be carried out at a temperature in which the polymerizable composition exhibits a liquid crystal phase. The polymerization takes place with the aid of heat, light or the like. A desirable reaction is photopolymerization. It is desirable that the photopolymerization should be carried out at 100° C. or lower to avoid the thermal polymerization occurring simultaneously. The polymerization may be carried out under the conditions of an applied electric or magnetic field.

The polymerization reactivity and the conversion yield of compound (1) can be adjusted. Compound (1) is suitable for radical polymerization. Compound (1) can smoothly be polymerized by the addition of a polymerization initiator. The amount of the remaining compound (1) can be decreased by optimizing the reaction temperature. Examples of a photo-radical polymerization initiator are TPO, 1173 and 4265 of Darocur series, and 184, 369, 500, 651, 784, 819, 907, 1300, 1700, 1800, 1850 and 2959 of Irgacure series, at BASF SE.

Additional examples of the photo-radical polymerization initiators are 4-methoxyphenyl-2,4-bis(trichloromethyl)triazine, 2-(4-butoxystyryl)-5-trichloromethyl-1,3,4-oxadiazole, 9-phenylacridine, 9,10-benzphenazine, a mixture of benzophenone/Michler's ketone, a mixture of hexaarylbiimidazole/mercaptobenzimidazole, 1-(4-isopropylphenyl)-2-hydroxy-2-methylpropan-1-one, benzyldimethylketal, 2-methyl-1-[4-(methylthio)phenyl]-2-morphorinopropan-1-one, a mixture of 2,4-diethylxanthone/methyl p-dimethylaminobenzoate and a mixture of benzophenone/methyltriethanolamine.

The polymerization can be carried out by irradiation with ultraviolet light under the conditions of an applied electric field, after a photo-radical polymerization initiator had been added to a polymerizable composition. However, the unreacted polymerization initiator or the degradation product of the polymerization initiator may cause a poor display such as image burn-in to the device. The photo-polymerization may be carried out without the polymerization initiator in order to avoid it. Desirable wavelengths of the irradiated light are in the range of 150 nm to 500 nm. More desirable wavelengths are in the range of 250 nm to 450 nm, and the most desirable wavelengths are in the range of 300 nm to 400 nm.

A polymerization inhibitor may be added in order to prevent the polymerization when a polymerizable compound is kept in storage. The polymerizable compound is usually added to a composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

5. Liquid Crystal Display Devices

The effect of the polymer in a liquid crystal display device is interpreted as follows: A polymerizable composition is a mixture of a liquid crystal compound, a polymerizable compound and so forth. The liquid crystal molecules are oriented in the direction of an electric field by the application of the electric field to the composition. The molecules of the polymerizable compound are also oriented in the same direction in accordance with this orientation. Under these conditions, irradiation of the composition with ultraviolet light polymerizes the polymerizable compound, as a result of which the network of a polymer is formed in the polymerizable composition. The liquid crystal molecules are stabilized under the conditions in which they are oriented in the direction of the electric field by the effect of this network. This effect is maintained even when the electric field is removed. The response time of the device is decreased accordingly.

It is desirable that the polymerization of the polymerizable composition should be carried out in a display device. One example is as follows: A display device is prepared in which it has two glass substrates equipped with transparent electrodes and alignment films. A polymerizable composition is prepared, in which the component is compound (1), a liquid crystal composition, an additive and so forth. This composition is injected into the display device. Compound (1) is polymerized by irradiation of the display device with ultraviolet light while an electric field is applied. The polymerization gives a liquid crystal composite. A liquid crystal display device having the liquid crystal composite can easily made by this method. The rubbing treatment for the alignment film may be skipped in this method. Incidentally, a method in which liquid crystal molecules are stabilized without an electric field may be employed.

A liquid crystal display device having a PSA mode is made when the added amount of the polymerizable compound is in the range of 0.1% by weight to 2% by weight based on the weight of the liquid crystal composition. The device having a PSA mode can be driven by means of a driving mode such as an active matrix (AM) or a passive matrix (PM). This kind of device can be applied to any type of a reflection type, a transmission type and a semi-transmission type. A device having a polymer dispersed mode can be made by increasing the added amount of the polymer.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in more detail by way of examples. The invention is not limited to the examples.

1. Examples for Compound (1)

Compound (1) was prepared by the method described below. Compounds prepared herein were identified by NMR analysis and so forth. The physical properties of the compounds were measured by the methods described below.
NMR Analysis A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane (TMS) was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.
HPLC Analysis Model Prominence (LC-20AD; SPD-20A) made by Shimadzu Corporation was used for measurement. A column YMC-Pack ODS-A (length 150 mm, bore 4.6 mm, particle size 5 μm) made by YMC Co., Ltd. was used. Acetonitrile and water were suitably mixed and used as an eluent. A UV detector, a RI detector, a Corona detector and so forth were suitably used as a detector. A wavelength for the UV detector was 254 nm. A sample was dissolved in acetonitrile to give a 0.1% by weight solution, and then 1 microliter of the solution was injected into the sample injector. Model C-R7Aplus made by Shimadzu Corporation was used as a recorder.
Ultraviolet and Visible Spectrophotometric Analysis Model PharmaSpec UV-1700 made by Shimadzu Corporation was used for measurement. Wavelengths in the range of 190 nm to 700 nm were used for the detection. A sample was dissolved in acetonitrile, giving a 0.01 mmol/L solution, which was placed in a quartz cell (optical path length: 1 cm) and measured.
Samples for Measurement A compound itself was used as a sample when the phase structure and the transition temperature (a clearing point, a melting point, a starting temperature of polymerization and so forth) were measured. A mixture of the compound and mother liquid crystals was used as a sample when physical properties such as the maximum temperature of a nematic phase, viscosity, optical anisotropy and dielectric anisotropy were measured.
Measurement Methods The physical properties of compounds were measured according to the following methods. Most were methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement
(1) Phase Structures A sample was placed on a hot plate of a melting point apparatus (Hot Stage Model FP-52 made by Mettler Toledo International Inc.) equipped with a polarizing microscope. The phase conditions and their changes were observed with the polarizing microscope while the sample was heated at the rate of 3° C. per minute, and the kinds of phases were specified.
(2) Transition Temperature (° C.)

A differential scanning calorimeter, Diamond DSC System, made by Perkin-Elmer Inc. or a high sensitivity differential scanning analyzer, X-DSC7000, made by SII Nano-Technology Inc. was used for measurement. A sample was heated and then cooled at the rate of 3° C. per minute. The starting point of an endothermic peak or an exothermic peak caused by the phase change of the sample was obtained by extrapolation, and thus the transition temperature was determined. The melting point and the starting temperature of polymerization of a compound were also measured by use of this apparatus. The transition temperature of a compound from solid to a liquid crystal phase such as a smectic phase or a nematic phase may be abbreviated to "the minimum temperature of a liquid crystal phase". The transition temperature of a compound from a liquid crystal phase to liquid may be abbreviated to "a clearing point".

The symbol C stood for crystals, which were expressed as $C_1$ and $C_2$ when the kinds of crystals were distinguishable. The symbols S and N stood for a smectic phase and a nematic phase, respectively. When a smectic A phase, a smectic B phase, a smectic C phase or a smectic F was distinguishable in the smectic phases, it was expressed as $S_A$, $S_B$, $S_C$ or $S_F$, respectively. The symbol I stood for a liquid (isotropic). Transition temperatures were expressed as, for example, "C 50.0 N 100.0 Iso", which means that the transition temperature from crystals to a nematic phase was 50.0° C., and the transition temperature from the nematic phase to a liquid was 100.0° C.
(3) Maximum Temperature of a Nematic Phase ($T_{NI}$ or NI; ° C.)

A sample was placed on a hot plate of a melting point apparatus equipped with a polarizing microscope and was heated at the rate of 1° C. per minute. The temperature was measured when a part of the sample began to change from a nematic phase to an isotropic liquid. A higher limit of the temperature range of a nematic phase may be abbreviated to "the maximum temperature." The symbol $T_{NI}$ means that the sample was a mixture of compound (1) and mother liquid crystals. The symbol NI means that the sample was a mixture of compound (1) and compounds such as components B, C, D and E.
(4) Minimum Temperature of a Nematic Phase ($T_C$; ° C.)

A sample having a nematic phase was kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., $T_C$ was expressed as ≤−20° C. A lower limit of the temperature range of a nematic phase may be abbreviated to "the minimum temperature."
(5) Viscosity (Bulk Viscosity; η; Measured at 20° C.; mPa·s)

The viscosity was measured by use of an E-type viscometer made by Tokyo Keiki Inc.
(6) Optical Anisotropy (Refractive Index Anisotropy; Δn; Measured at 25° C.)

The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy (Δn) was calculated from the equation: Δn=n∥−n⊥.

(7) Specific Resistance (ρ; Measured at 25° C.; Ωcm):

A sample of 1.0 milliliter was poured into a vessel equipped with electrodes. DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

(8) Voltage Holding Ratio (VHR-1; measured at 25° C.; %)

A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between a voltage curve and a horizontal axis in a unit cycle was obtained. Area B was an area without the decrease. The voltage holding ratio was expressed as a percentage of area A to area B.

(9) Voltage Holding Ratio (VHR-2; Measured at 80° C.; %)

The voltage holding ratio was measured by the method described above, except that it was measured at 80° C. instead of 25° C. The results were shown by using the symbol VHR-2.

The measurement method of physical properties for a sample having positive dielectric anisotropy is sometimes different from that for a sample having negative dielectric anisotropy. Measurement methods are described in items (10a) to (14a) when the dielectric anisotropy is positive. When the dielectric anisotropy is negative, they are shown in items (10b) to (14b).

(10a) Viscosity (Rotational Viscosity; γ1; Measured at 25° C.; mPa·s)

Positive dielectric anisotropy: The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage with an increment of 0.5 volt in the range of 16 to 19.5 volts was applied stepwise to this device. After a period of 0.2 second with no voltage, a voltage was applied repeatedly under the conditions of a single rectangular wave alone (rectangular pulse; 0.2 second) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

(10b) Viscosity (Rotational Viscosity; γ1; Measured at 25° C.; mPa·s)

Negative dielectric anisotropy: The measurement was carried out according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 39 V to 50 V was applied stepwise with an increment of 1 volt to this device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of the dielectric anisotropy necessary for the present calculation was obtained by the method that will be described below, under the heading "Dielectric anisotropy."

(11a) Dielectric Anisotropy (Δε; Measured at 25° C.)

Positive dielectric anisotropy: A sample was poured into a TN device in which the distance between the two glass substrates (cell gap) was 9 micrometers and the twist angle was 80 degrees. Sine waves (10 V, 1 kHz) were applied to this device, and the dielectric constant (ε∥) in the major axis direction of liquid crystal molecules was measured after 2 seconds. Sine waves (0.5 V, 1 kHz) were applied to this device and the dielectric constant (ε⊥) in the minor axis direction of the liquid crystal molecules was measured after 2 seconds. The value of dielectric anisotropy was calculated from the equation: Δε=ε∥−ε⊥.

(11b) Dielectric Anisotropy (Δε; measured at 25° C.)

Negative dielectric anisotropy: The value of dielectric anisotropy was calculated from the equation: Δε=ε∥−ε⊥. Dielectric constants (ε∥ and ε⊥) were measured as follows.
1) Measurement of a dielectric constant (ε∥): A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured into a VA device in which the distance between the two glass substrates (cell gap) was 4 micrometers, and then this device was sealed with a UV-curable adhesive. Sine waves (0.5 V, 1 kHz) were applied to this device, and the dielectric constant (ε∥) in the major axis direction of liquid crystal molecules was measured after 2 seconds.
2) Measurement of a dielectric constant (ε⊥): A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to this device, and the dielectric constant (ε⊥) in the minor axis direction of liquid crystal molecules was measured after 2 seconds.

(12a) Elastic Constants (K; Measured at 25° C.; pN)

Positive dielectric anisotropy: A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to the equation (2.98) and the equation (2.101) in page 75 of the "Ekisho Debaisu Handobukku" (Liquid Crystal Device Handbook, in English; The Nikkan Kogyo Shimbun, Ltd., Japan) and the values of $K_{11}$ and $K_{33}$ were obtained from the equation (2.99). Next, the value of $K_{22}$ was calculated from the equation (3.18) in page 171 and the values of $K_{11}$ and $K_{33}$ thus obtained. The elastic constant K was expressed as an average value of $K_{11}$, $K_{22}$ and $K_{33}$.

(12b) Elastic Constants ($K_{11}$ and $K_{33}$; Measured at 25° C.; pN)

Negative dielectric anisotropy: An elastic constant measurement system Model EC-1 made by Toyo Corporation was used for measurement. A sample was poured into a homeotropic device in which the distance between the two glass substrates (cell gap) was 20 micrometers. An electric charge of 20 volts to 0 volts was applied to this device, and electrostatic capacity and applied voltage were measured. The values of the electrostatic capacity (C) and the applied voltage (V) were fitted to the equation (2.98) and the equation (2.101) in page 75 of the "Ekisho Debaisu Handobukku" (Liquid Crystal Device Handbook, in English; The Nikkan Kogyo Shimbun, Ltd., Japan), and the value of the elastic constant was obtained from the equation (2.100).

(13a) Threshold Voltage (Vth; Measured at 25° C.; V)

Positive dielectric anisotropy: The measurement was carried out with an LCD evaluation system Model LCD-5100 made by Otsuka Electronics Co., Ltd. The light source was a halogen lamp. A sample was poured into a TN device having a normally white mode, in which the distance between the two glass substrates (cell gap) was 4.45/Δn (micrometers) and the twist angle was 80 degrees. Voltage to be applied to this device (32 Hz, rectangular waves) was stepwise increased in 0.02 V increments from 0 V up to 10 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was expressed as a voltage at 90% transmittance.

(13b) Threshold Voltage (Vth; Measured at 25° C.; V)

Negative dielectric anisotropy: The measurement was carried out with an LCD evaluation system Model LCD-5100 made by Otsuka Electronics Co., Ltd. The light source was a halogen lamp. A sample was poured into a PVA device having a normally black mode, in which the distance between the two glass substrates (cell gap) was 4 micrometers and the rubbing direction was antiparallel, and then this device was sealed with a UV-curable adhesive. The voltage to be applied to this device (60 Hz, rectangular waves) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was expressed as a voltage at 10% transmittance.

(14a) Response Time (τ; Measured at 25° C.; Millisecond)

Positive dielectric anisotropy: The measurement was carried out with an LCD evaluation system Model LCD-5100 made by Otsuka Electronics Co., Ltd. The light source was a halogen lamp. The low-pass filter was set at 5 kHz. A sample was poured into a TN device having a normally white mode, in which the cell gap between the two glass substrates was 5.0 micrometers and the twist angle was 80 degrees. Rectangular waves (60 Hz, 5 V, 0.5 second) were applied to this device. The device was simultaneously irradiated with light in the perpendicular direction, and the amount of light passing through the device was measured. The transmittance was regarded as 100% when the amount of light reached a maximum. The transmittance was regarded as 0% when the amount of light reached a minimum. Rise time (τr; millisecond) was the time required for a change from 90% to 10% transmittance. Fall time (τf; millisecond) was the time required for a change from 10% to 90% transmittance. The response time was expressed as the sum of the rise time and the fall time thus obtained.

(14b) Response Time (τ; Measured at 25° C.; Millisecond)

Negative dielectric anisotropy: The measurement was carried out with an LCD evaluation system Model LCD-5100 made by Otsuka Electronics Co., Ltd. The light source was a halogen lamp. The low-pass filter was set at 5 kHz. A sample was poured into a VA device having a normally black mode, in which the cell gap between two glass substrates was 3.2 micrometers, and the rubbing direction was antiparallel. This device was sealed with a UV-curable adhesive. A voltage that was a little more than the threshold voltage was applied to this device for 1 minute, and then the device was irradiated with ultraviolet light of 23.5 mW/cm$^2$ for 8 minutes while a voltage of 5.6 V was applied. Rectangular waves (60 Hz, 10 V, 0.5 second) were applied to this device. The device was simultaneously irradiated with light in the perpendicular direction, and the amount of light passing through the device was measured. The transmittance was regarded as 100% when the amount of light reached a maximum. The transmittance was regarded as 0% when the amount of light reached a minimum. The response time was expressed as the period of time required for the change from 90% to 10% transmittance (fall time: millisecond).

Example 1

Compound (1-1-1) was prepared according to the following scheme.

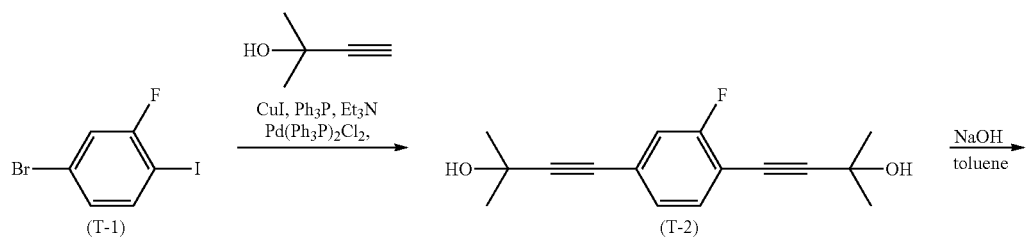

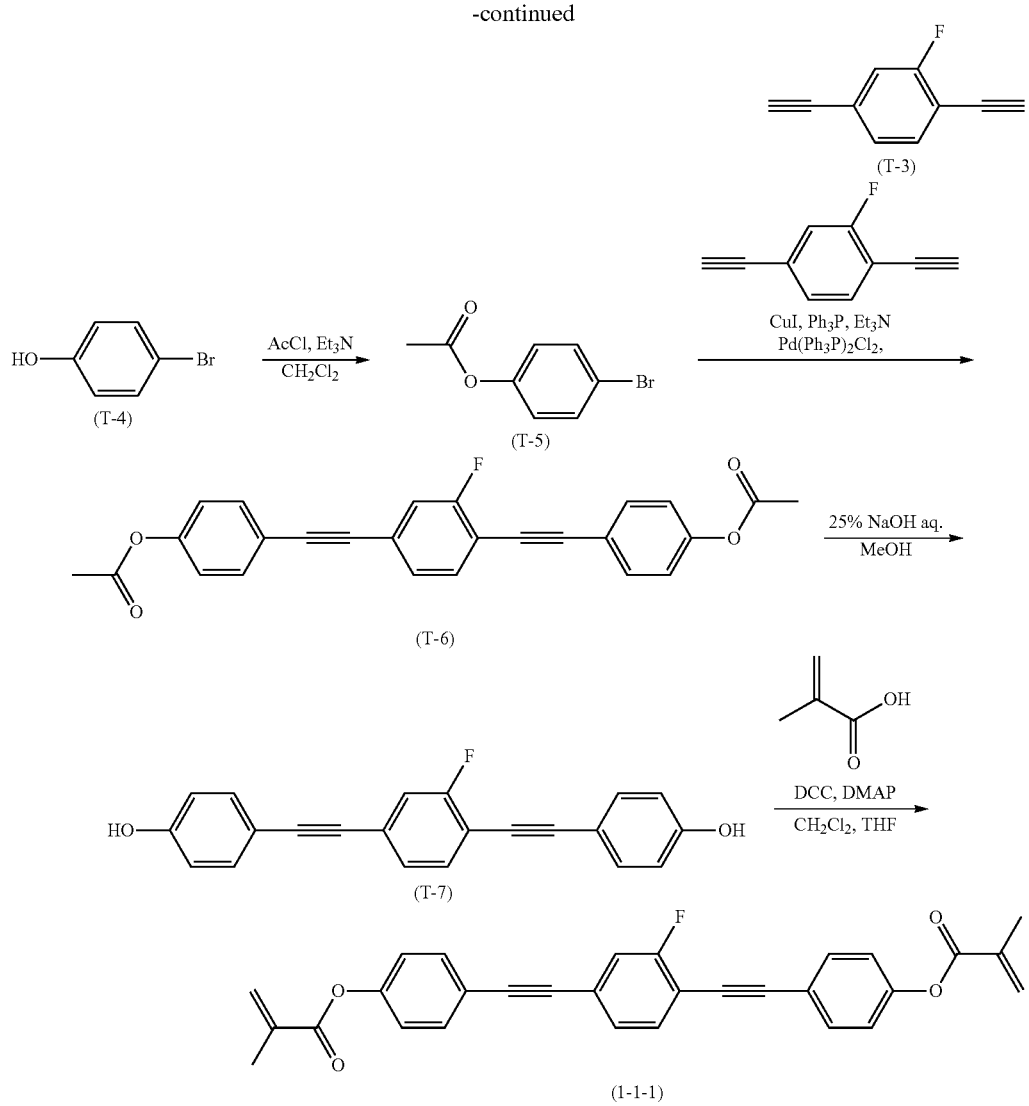

First Step: Preparation of Compound (T-2)

Compound (T-1) (60.2 g), 2-methyl-3-butyn-2-ol (74.0 g), triphenylphosphine (1.1 g), dichlorobis(triphenylphosphine)palladium (2.8 g), copper iodide (2.3 g), triethylamine (247 g) and 2,6-t-butyl-4-methylphenol (0.5 g) were placed in a 1 liter flask, and the mixture was heated under reflux for 20 hours under a stream of argon. The reaction mixture was returned to room temperature and filtered. The filtrate was concentrated under reduced pressure to give a crude product (38.6 g, 74.2% yield) of compound (T-2) as a red oil.

Second Step: Preparation of Compound (T-3)

Compound (T-2) (38 g) prepared in the above step was placed in a 500 ml flask and dissolved in toluene (150 ml). Sodium hydride (21.65 g) was added and the mixture was heated at 80° C. for 18 hours under a stream of argon. The reaction mixture was returned to room temperature and filtered. The residue was washed with toluene (500 ml), and the washings were combined with the filtrate and then concentrated under reduced pressure. The residue was purified by silica gel chromatography (hexane) to give compound (T-3; 11.4 g, 54.2% yield) as yellow crystals.

Third Step: Preparation of Compound (T-5)

4-Bromophenol (T-4) (69.2 g) was placed in a 500 ml flask and dissolved in methylene chloride (250 ml). Triethylamine (48.6 g) was added and the mixture was cooled on an ice-salt bath. Acetyl chloride (34.54 g) was added dropwise at −5° C. to 5° C. during a period of 1 hour. After 2 hours of stirring at room temperature, water (200 ml) was added and the stirring was continued for 30 minutes. After the organic layer had been separated from the aqueous layer, the organic layer was washed with water (200 ml). The organic layer was dried over anhydrous magnesium sulfate, and concentrated under reduced pressure to give compound (T-5; 76.4 g, 88.8% yield) as a red brown oil.

Fourth Step: Preparation of Compound (T-6)

Compound (T-5) (24 g) prepared in the above step, compound (T-3) (8 g) prepared in the above step, triphenylphosphine (0.3 g), dichlorobis(triphenylphosphine)palladium (0.79 g), copper iodide (0.64 g), triethylamine (79 g) and 2,6-t-butyl-4-methylphenol (0.1 g) were placed in a 250 ml flask, and the mixture was heated under reflux for 17 hours under a stream of argon. The reaction mixture was returned to room temperature and filtered. The filtrate was concentrated under reduced pressure and recrystallized from ethanol to give compound (T-6; 5.4 g, 12% yield) as yellow crystals.

Fifth Step: Preparation of Compound (T-7)

Compound (T-6) (5.4 g) prepared in the above step was placed in a 250 ml flask and dissolved in methanol (10 g). A 25%-sodium hydride aqueous solution (6.05 g) was added and the mixture was stirred for 17 hours. The reaction mixture was quenched with 30% hydrochloric acid and extracted with methyl t-butyl ether (100 ml×2). The extract was washed with water (200 ml), dried over anhydrous magnesium sulfate, and concentrated under reduced pressure to give crude yellow crystals (6.4 g). These crude crystals were recrystallized from hexane/ethyl acetate (20/1 by volume) to give compound (T-7; 4.2 g, 97.7% yield) as yellow crystals.

Sixth Step: Preparation of Compound (1-1-1)

Compound (T-7) (3.2 g) prepared in the above step, methacrylic acid (2.58 g), 4-dimethylaminopyridine (0.6 g), and 2,6-t-butyl-4-methylphenol (0.05 g) were placed in a 100 ml flask and dissolved in a mixed solvent of methylene chloride (30 ml) and THF (30 ml). N,N'-Dicyclohexylcarbodiimide (6.18 g) in a methylene chloride (10 ml) solution was added dropwise at temperatures below 25° C. during a period of 30 minutes. After 5 hours of stirring at room temperature, the reaction mixture was quenched with water (0.8 g) and filtered. The residue was washed with methylene chloride (100 ml), and the washings were combined with the filtrate and then concentrated under reduced pressure. The residue was purified by silica gel chromatography (hexane/ethyl acetate=15/1 by volume) to give compound (1-1-1; 4.2 g, 74% yield) as yellow crystals.

$^1$H-NMR (δ ppm; CDCl$_3$): 7.62 (d, J=8.7 Hz, 2H), 7.59 (d, J=8.7 Hz, 2H), 7.51 (dd, J=8.1, 7.6 Hz, 1H), 7.32 (dd, J=8.1, 1.2 Hz, 1H), 7.29 (dd, J=9.7, 1.2 Hz, 1H), 7.18 (d, J=8.7 Hz, 2H×2), 6.39 (s, 1H×2), 5.81 (d, J=1.1 Hz, 1H×2) and 2.10 (s, 3H×2). $^{19}$F-NMR (δ ppm; CDCl$_3$): −115.52 (dd, J=9.7, 7.6 Hz, 1F).

The physical properties of compound (1-1-1) were as follows. Melting point: 134.9° C., starting temperature of polymerization: 157° C.

Example 2

Compound (1-1-67) was prepared according to the following scheme.

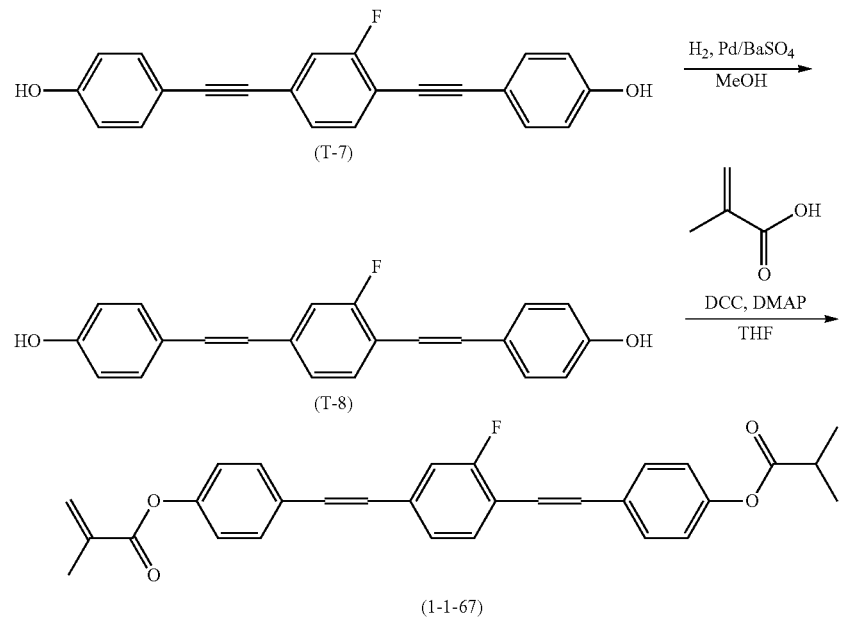

First Step: Preparation of Compound (T-8)

A suspension of palladium/barium sulfate (0.8 g), quinoline (2.0 g) and methanol (20 ml) was placed in a 500 ml autoclave and stirred for 20 minutes. Compound (T-7) (4.0 g) prepared in the above step in a methanol (200 ml) solution was added and the mixture was stirred at 50° C. to 60° C. for 60 hours under pressure of hydrogen (0.3 Mpa). The reaction mixture was returned to room temperature and filtered. The filtrate was concentrated under reduced pressure. A methylene chloride (100 ml) solution of the residue was washed with brine, 10% hydrochloric acid and a saturated aqueous solution of sodium hydrogencarbonate. This solution was dried and concentrated under reduced pressure to give compound (T-8; 3.2 g, 79% yield) as yellow crystals.

Second Step: Preparation of Compound (1-1-67)

Compound (T-8) (3.0 g) prepared in the above step and methacrylic acid (1.86 g) were placed in a 100 ml flask and dissolved in THF (50 ml). 4-Dimethylaminopyridine (0.22 g) and 2,6-t-butyl-4-methylphenol (0.05 g) were added. N,N'-Dicyclohexylcarbodiimide (4.47 g) in a THF (20 ml) solution was added dropwise at 20° C. to 25° C. during a period of 30 minutes, and the mixture was stirred at room temperature for 5 hours. The reaction mixture was quenched with water (0.8 g) and filtered. The residue was washed with methylene chloride (100 ml), and the washings were combined with the filtrate and then concentrated under reduced pressure. The residue was purified by silica gel chromatography (hexane/ethyl acetate=20/1 by volume) to give compound (1-1-67; 2.2 g, 52% yield) as yellow crystals.

$^1$H-NMR (δ ppm; CDCl$_3$): 7.27 (d, J=8.6 Hz, 2H), 7.25 (d, J=8.5 Hz, 2H), 7.09 (dd, J=8.1, 7.6 Hz, 1H), 7.01 (d, J=8.6 Hz, 2H), 6.99 (d, J=8.5 Hz, 2H), 6.94 (dd, J=11.3, 1.0

Hz, 1H), 6.84 (dd, J=8.1, 0.9 Hz, 1H), 6.67 (d, J=12.2 Hz, 1H), 6.60 (d, J=12.2 Hz, 1H), 6.63 (d, J=12.2 Hz, 1H), 6.50 (d, J=12.2 Hz, 1H), 6.33 (s, 1H), 6.32 (s, 1H), 5.75-5.74 (m, 2H) and 2.05 (s, 3H×2). $^{19}$F-NMR (δ ppm; CDCl$_3$): −115.52 (dd, J=11.3, 7.6 Hz, 1F).

The physical properties of compound (1-1-67) were as follows. Melting point: 98.7° C., starting temperature of polymerization: 189° C.

Compounds (1-1-2) to (1-1-66), compounds (1-1-67) to (1-1-137), compounds (1-2-1) to (1-2-40), compounds (1-3-1) to (1-3-40), compounds (1-4-1) to (1-4-40), compounds (1-5-1) to (1-5-40), compounds (1-6-1) to (1-6-40) described below can be prepared by the same method as the method described in Examples 1 and 2.

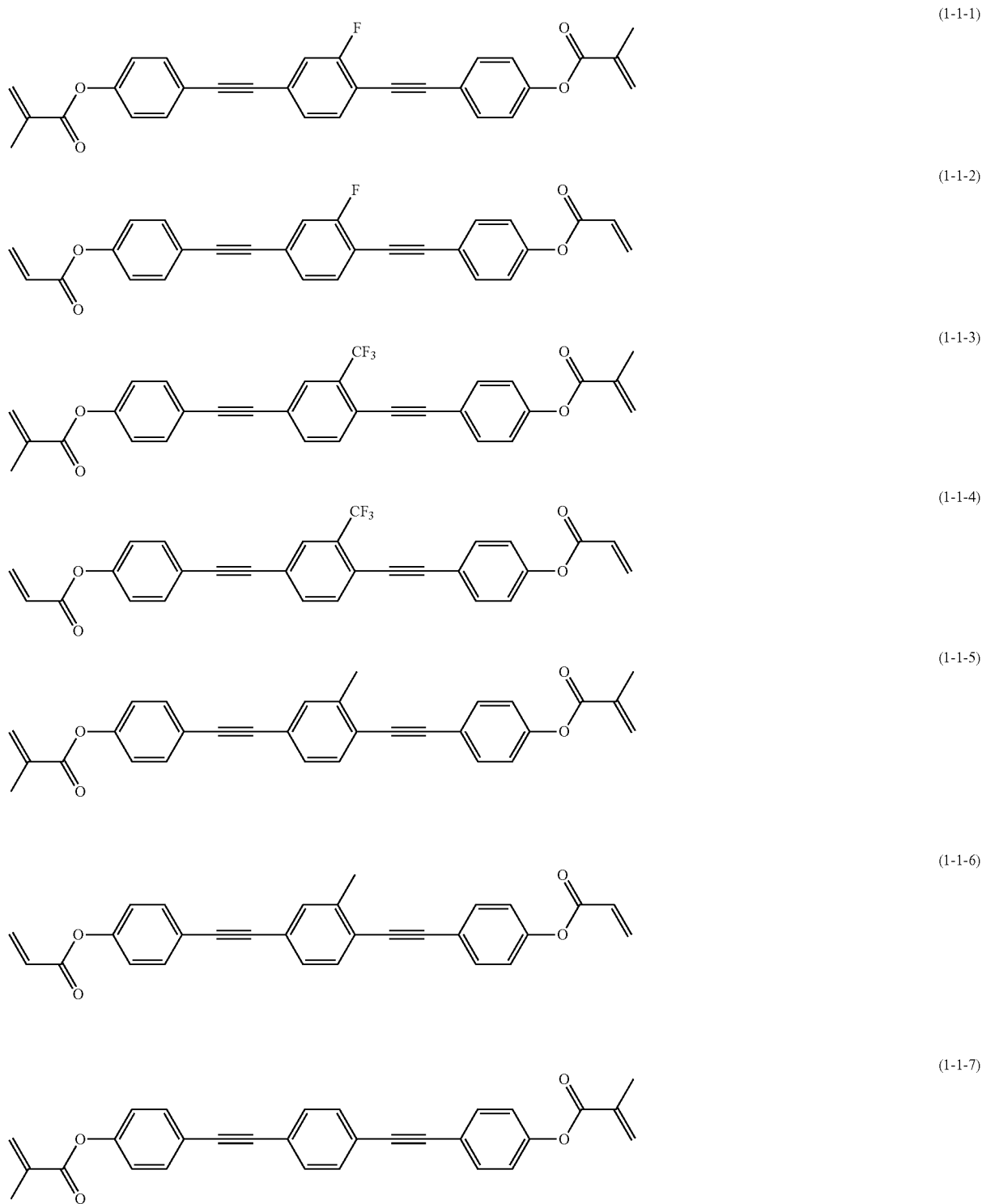

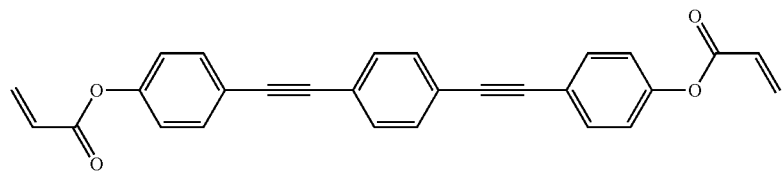
(1-1-8)
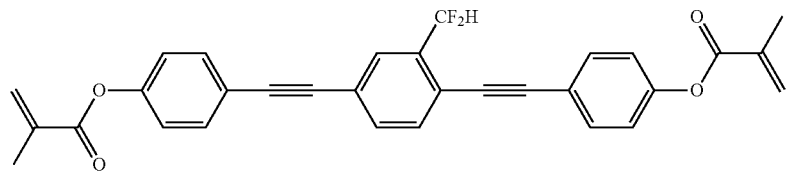
(1-1-9)
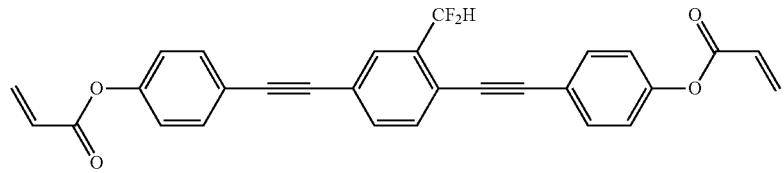
(1-1-10)
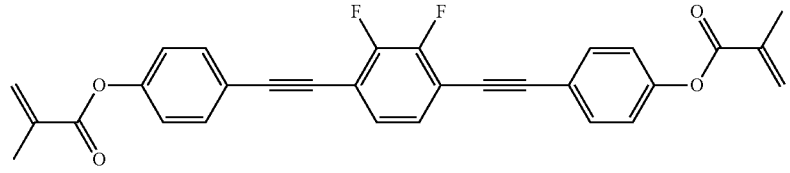
(1-1-11)
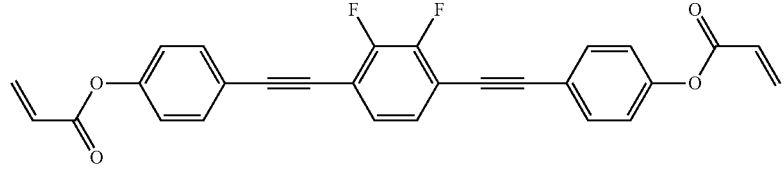
(1-1-12)
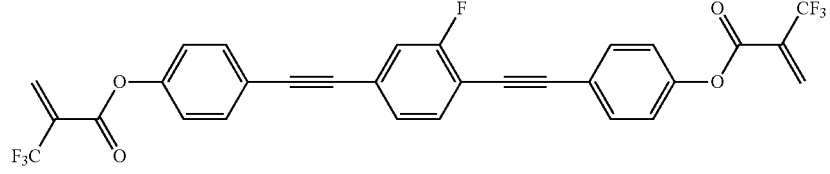
(1-1-13)
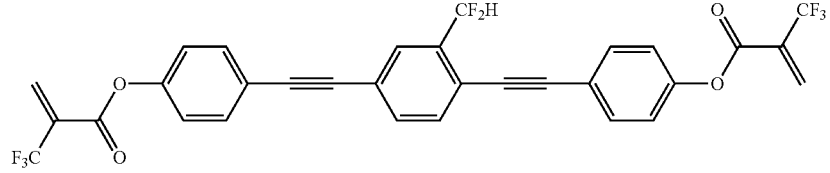
(1-1-14)
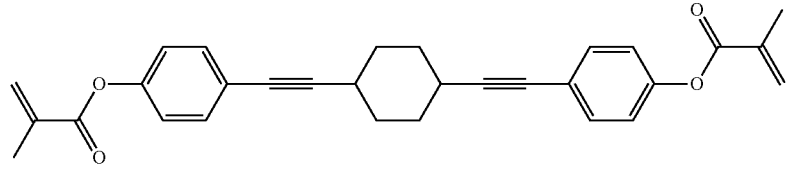
(1-1-15)
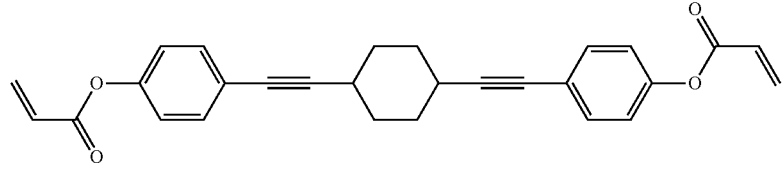
(1-1-16)

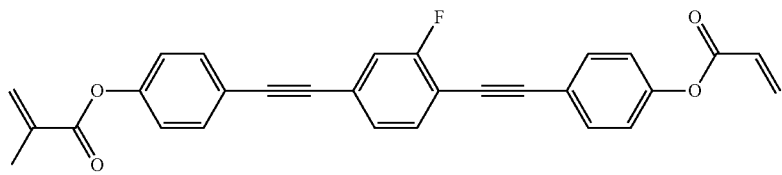 [SMILES: C=C(C)C(=O)Oc1ccc(C#Cc2ccc(C#Cc3ccc(OC(=O)C(=C)C)cc3)c(F)c2)cc1]
(1-1-17)
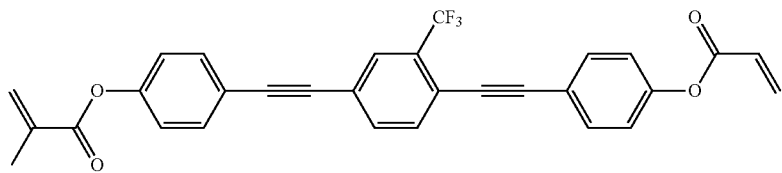
(1-1-18)
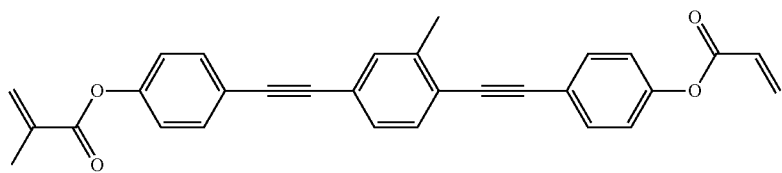
(1-1-19)
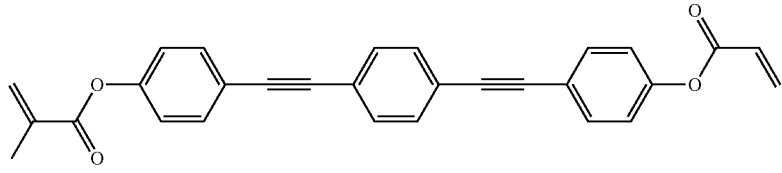
(1-1-20)
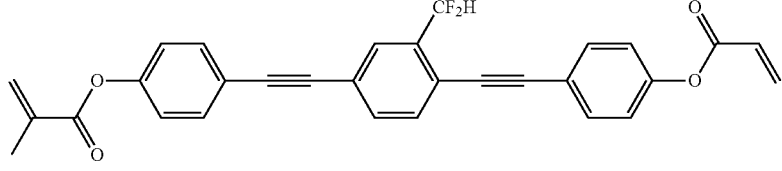
(1-1-21)
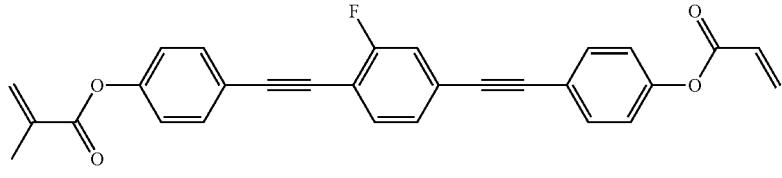
(1-1-22)
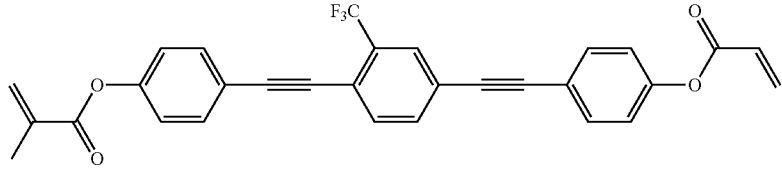
(1-1-23)
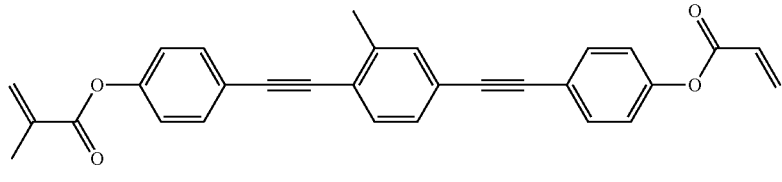
(1-1-24)
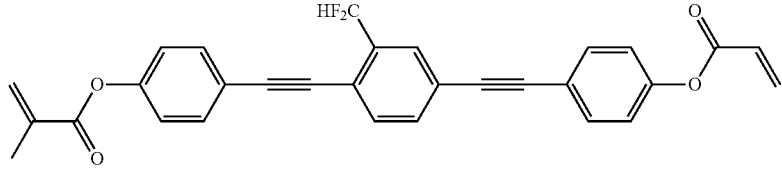
(1-1-25)

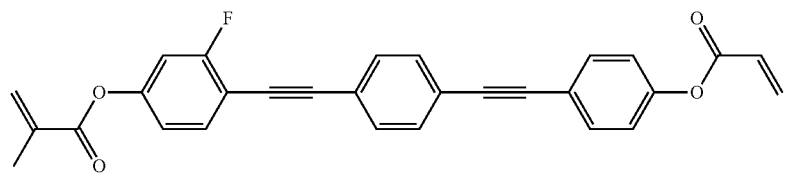
(1-1-26)
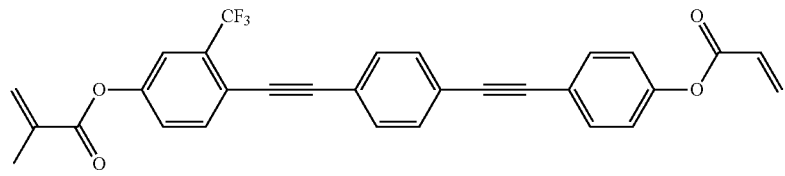
(1-1-27)
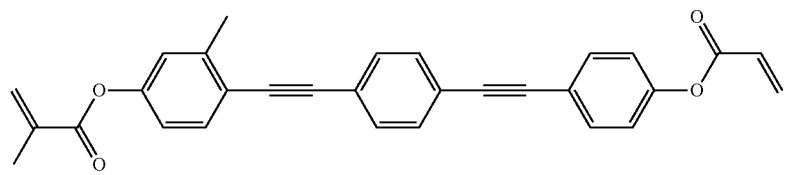
(1-1-28)
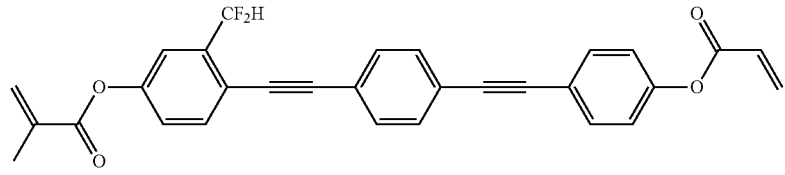
(1-1-29)
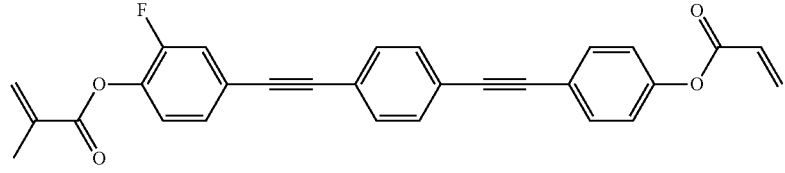
(1-1-30)
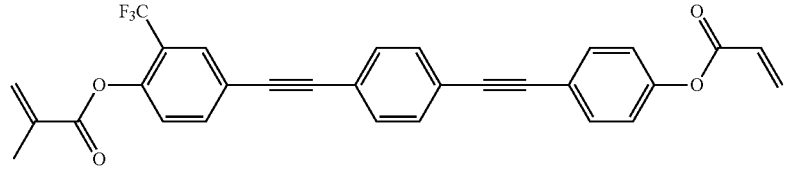
(1-1-31)
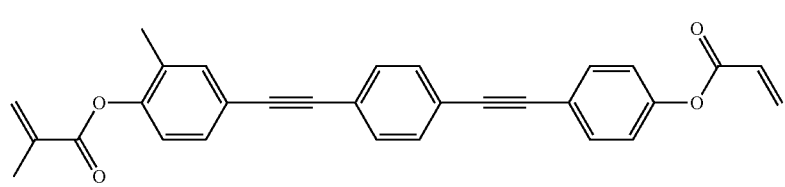
(1-1-32)
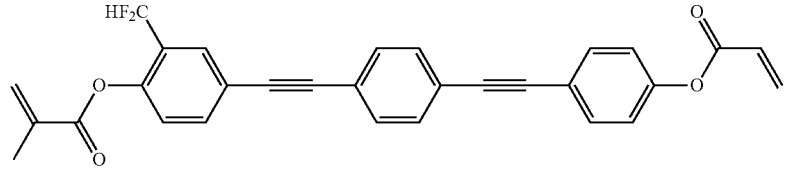
(1-1-33)

-continued
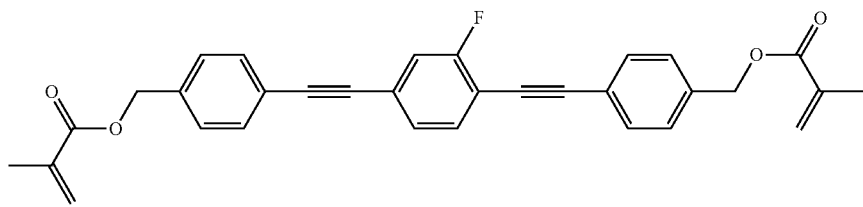
(1-1-34)
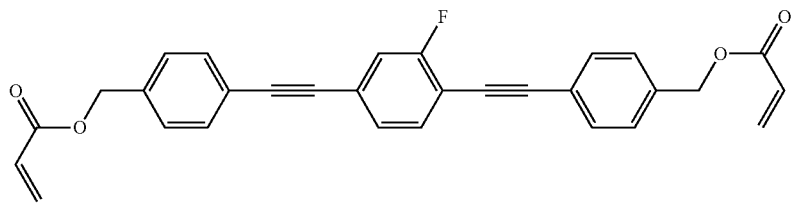
(1-1-35)
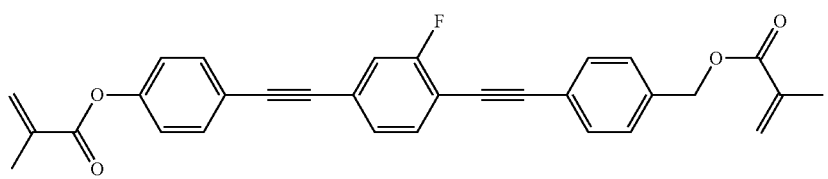
(1-1-36)
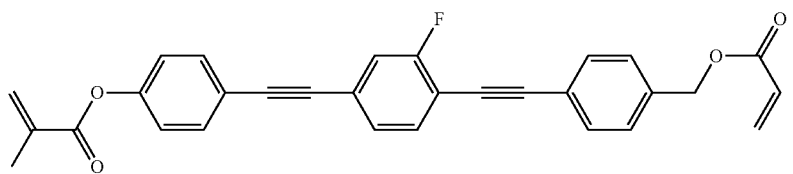
(1-1-37)
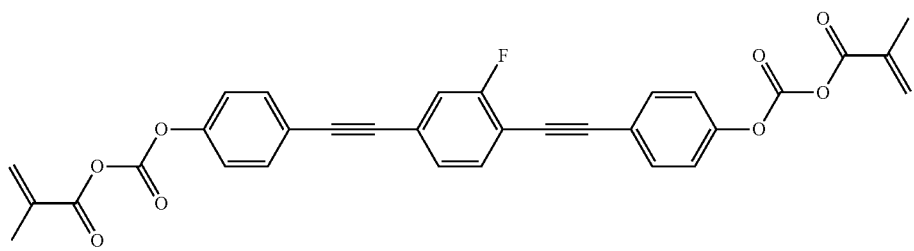
(1-1-38)
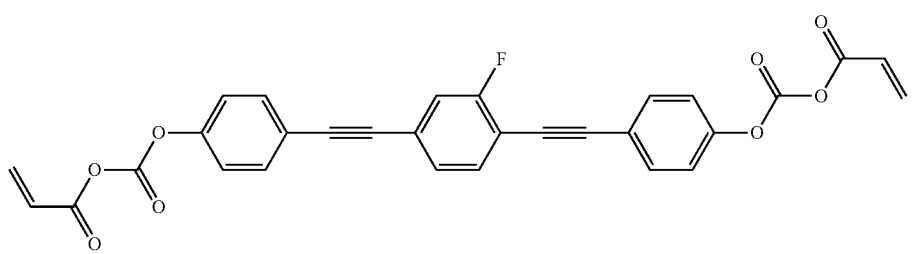
(1-1-39)
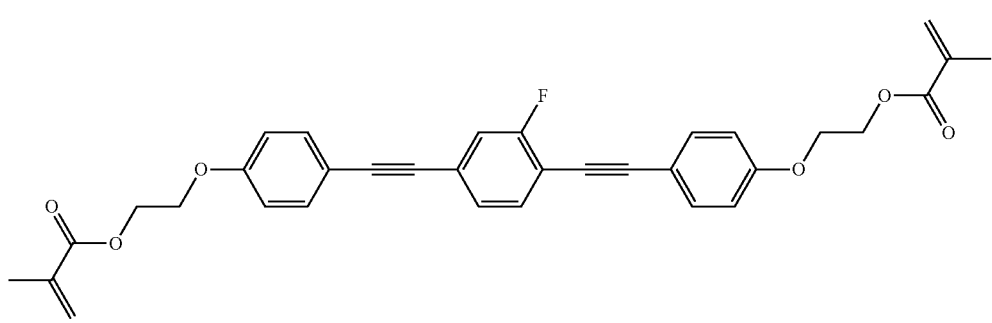
(1-1-40)

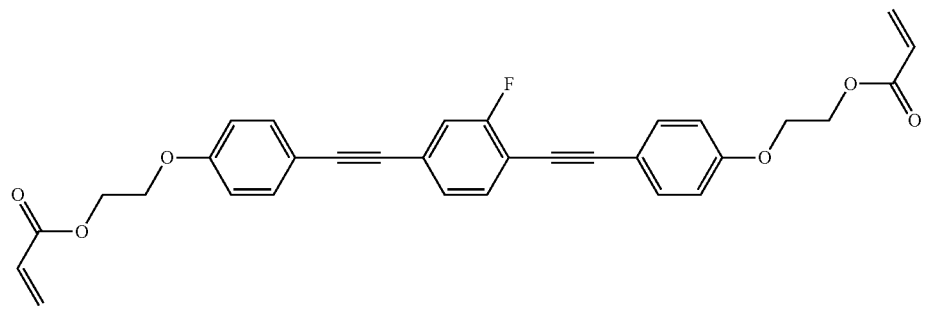
(1-1-41)
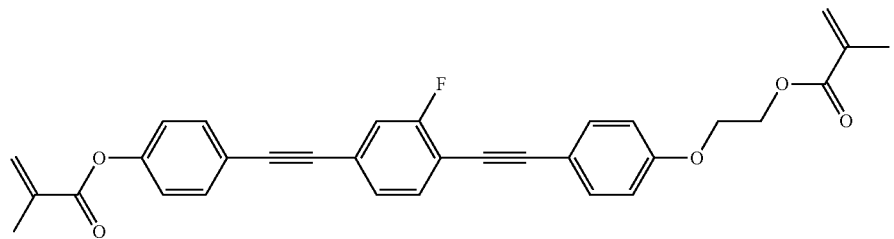
(1-1-42)
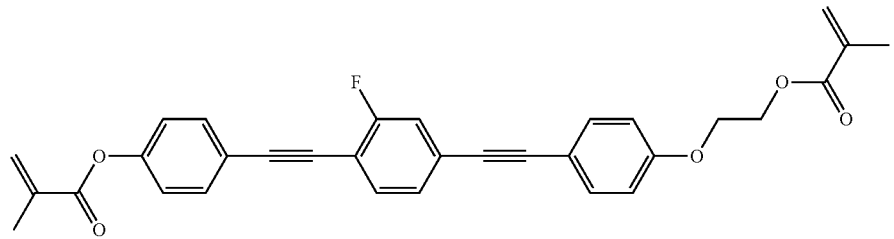
(1-1-43)
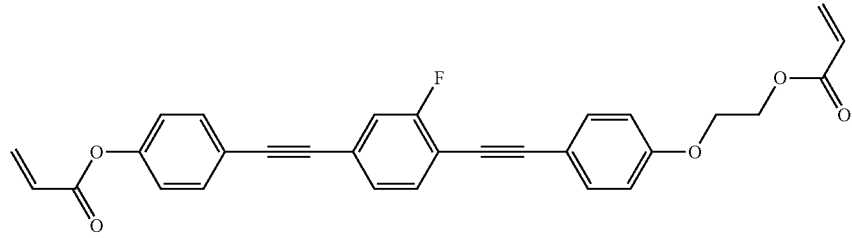
(1-1-44)
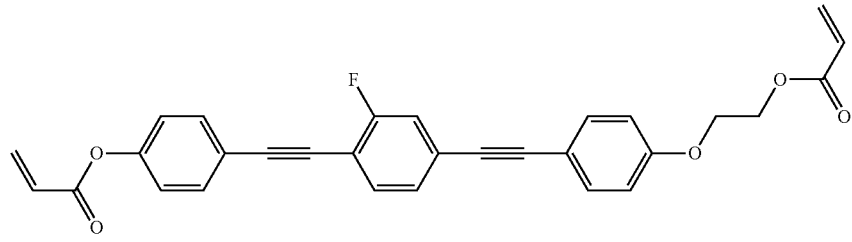
(1-1-45)
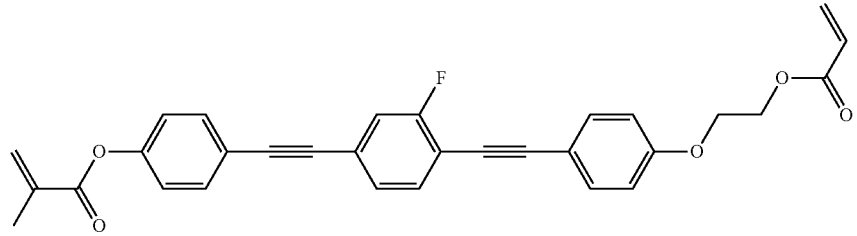
(1-1-46)

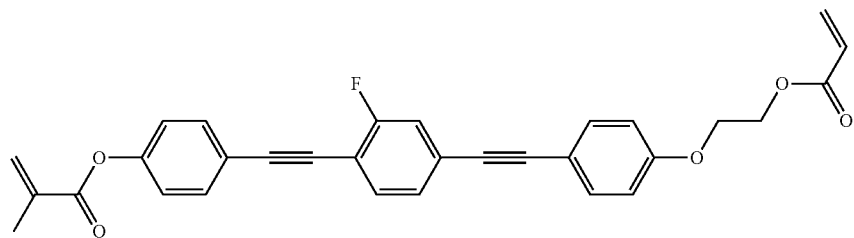
(1-1-47)
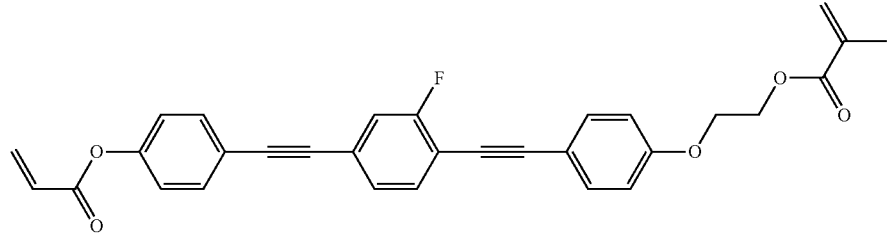
(1-1-48)
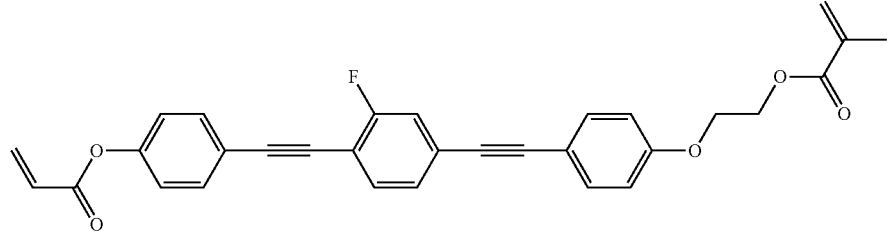
(1-1-49)
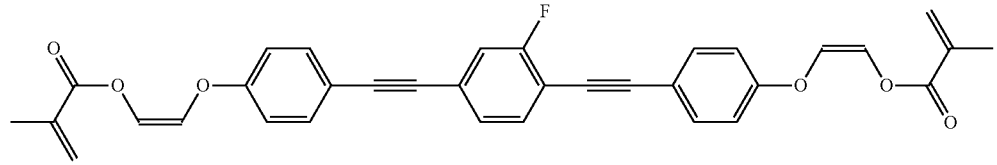
(1-1-50)
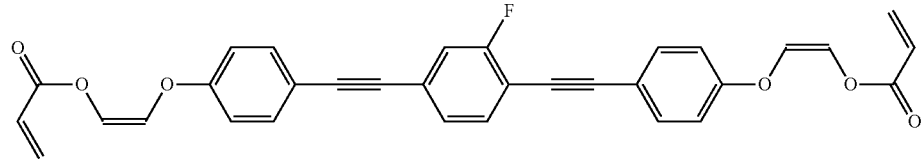
(1-1-51)
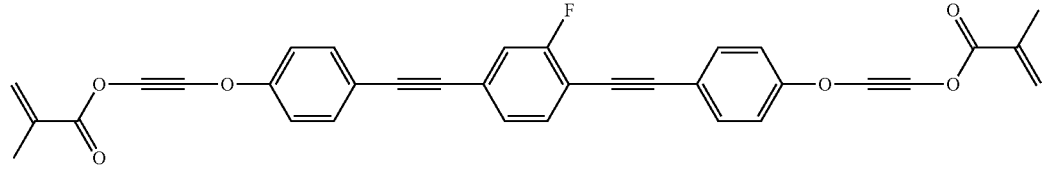
(1-1-52)
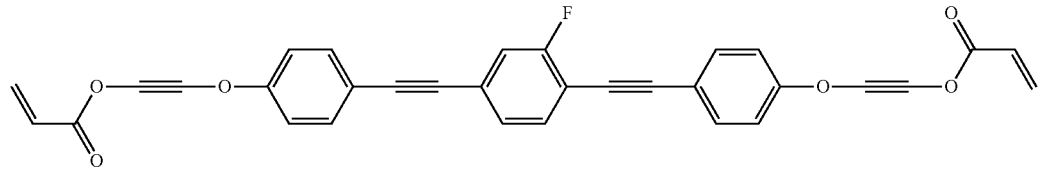
(1-1-53)
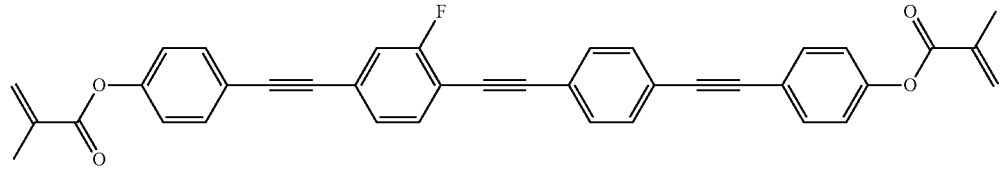
(1-1-54)

-continued
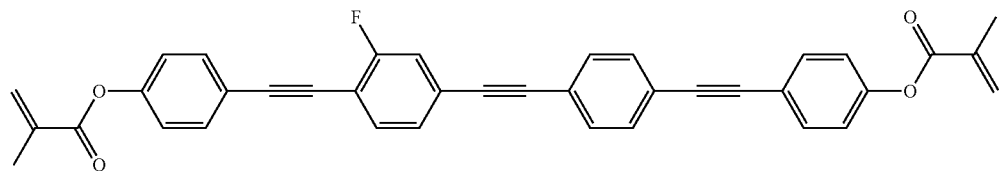
(1-1-55)
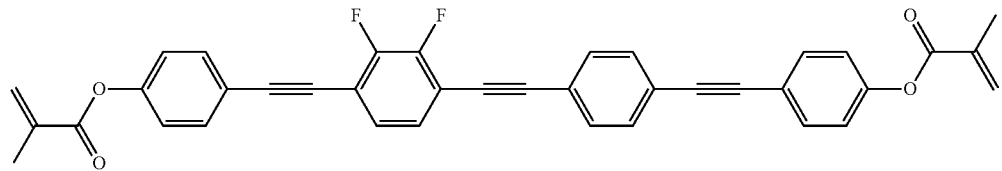
(1-1-56)
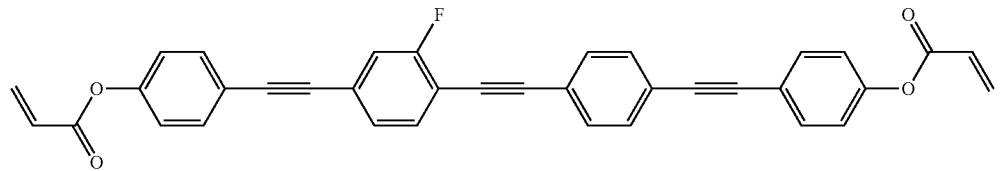
(1-1-57)
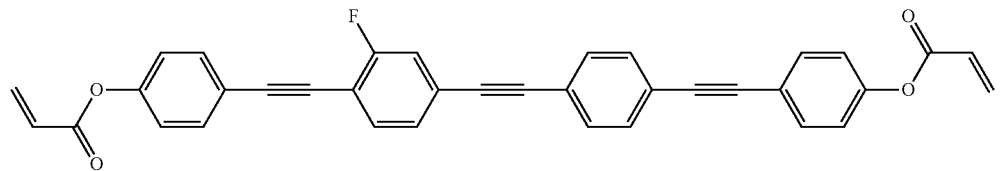
(1-1-58)
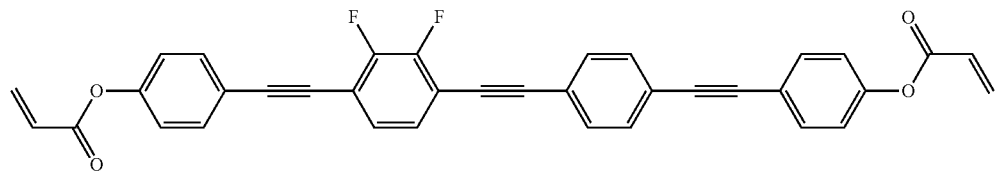
(1-1-59)
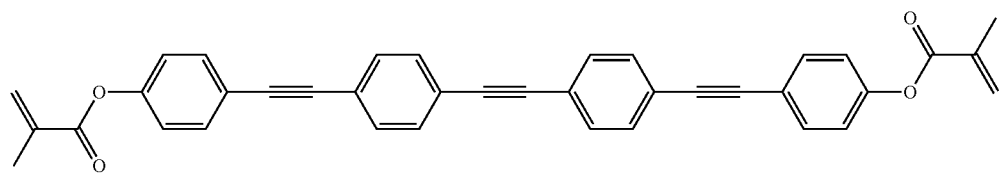
(1-1-60)
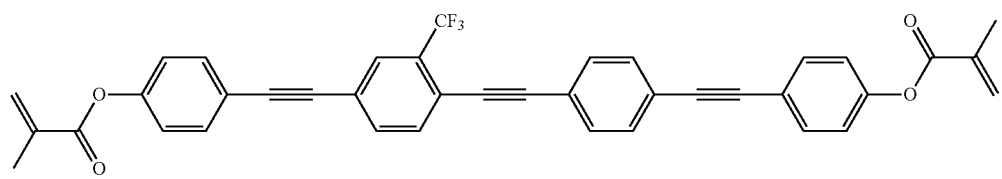
(1-1-61)
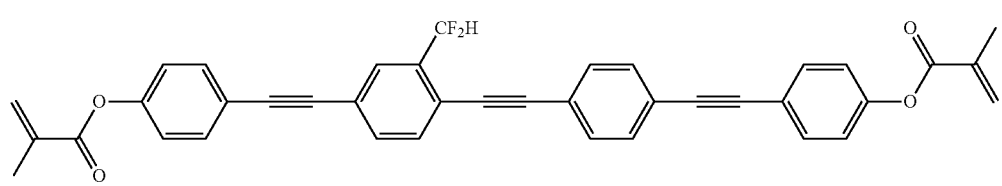
(1-1-62)
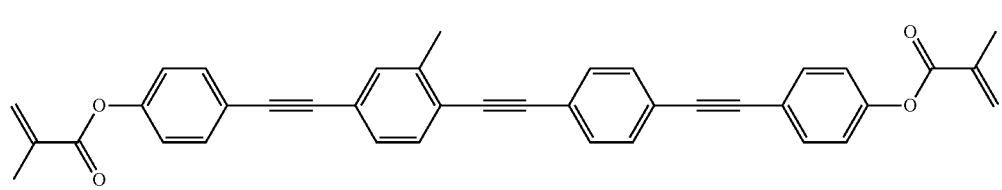
(1-1-63)

-continued
(1-1-64)
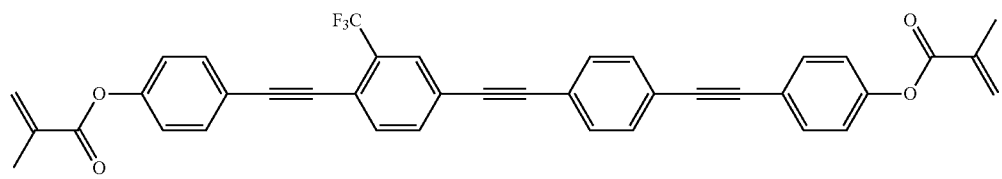
(1-1-65)
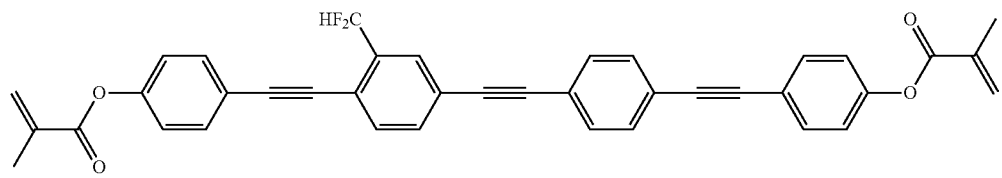
(1-1-66)
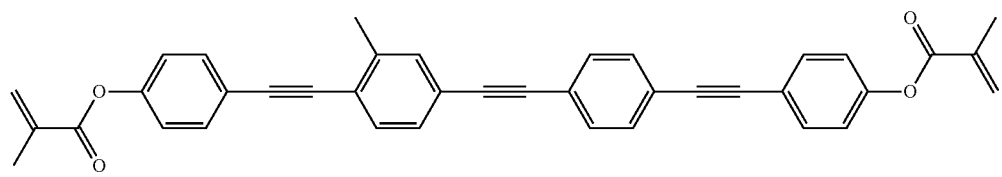
(1-1-67)
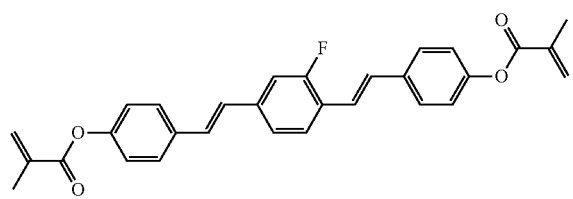
(1-1-68)
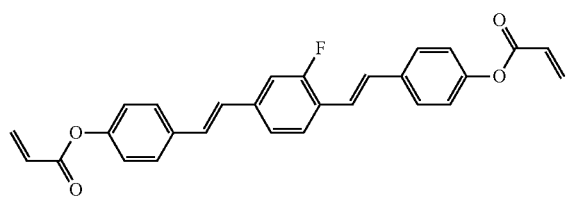
(1-1-69)
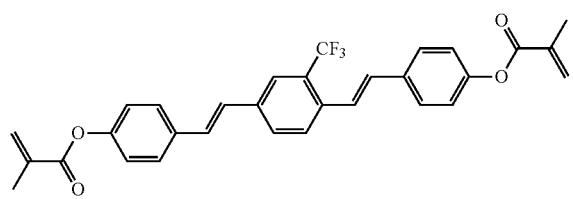
(1-1-71)
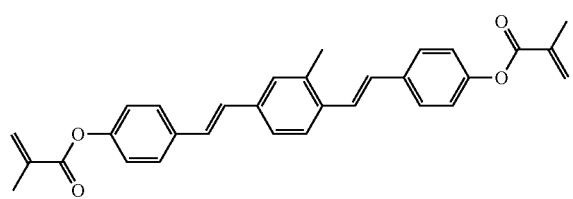
(1-1-73)
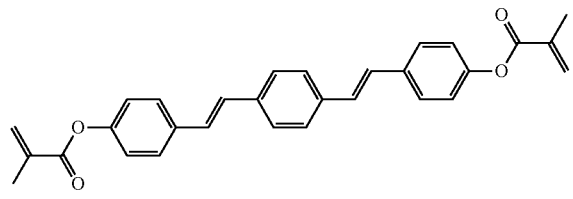
(1-1-74)
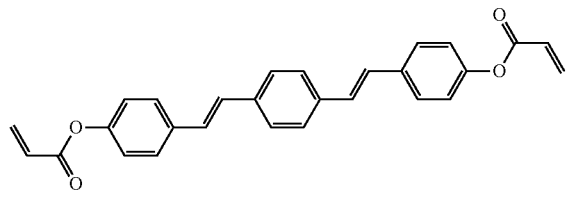

-continued
(1-1-75)
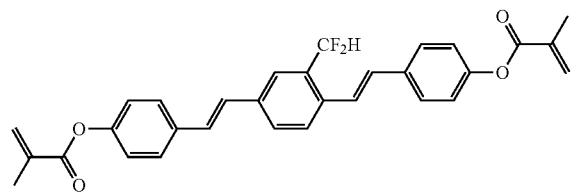
(1-1-76)
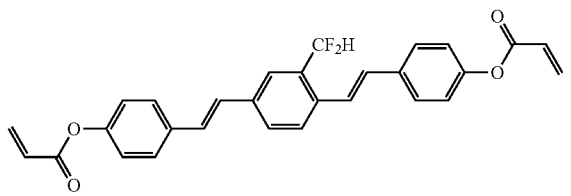
(1-1-77)
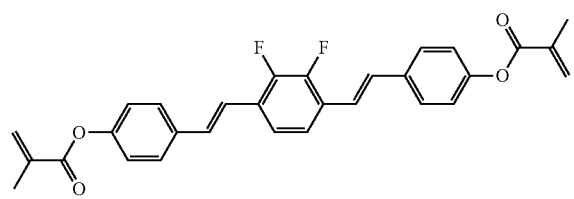
(1-1-78)
(1-1-79)
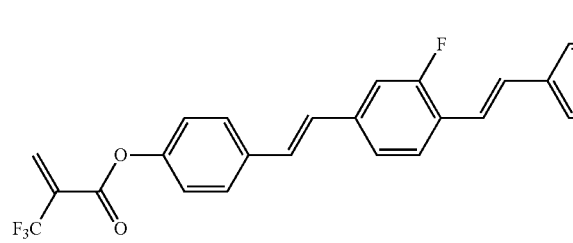
(1-1-80)
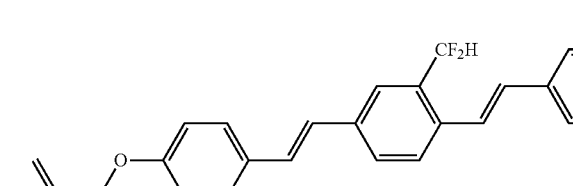
(1-1-81)
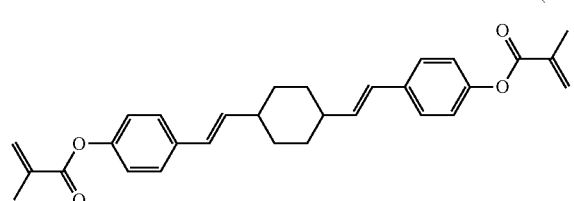
(1-1-82)
(1-1-83)
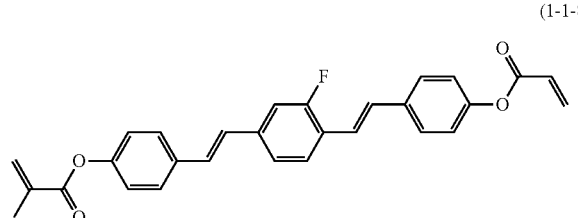
(1-1-84)
(1-1-85)
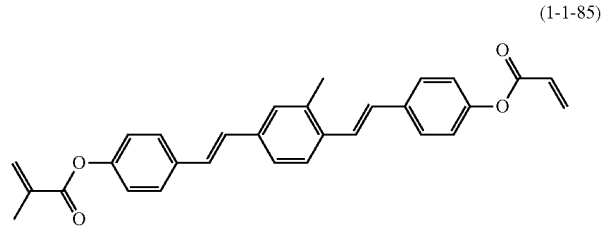
(1-1-86)

-continued
(1-1-87)
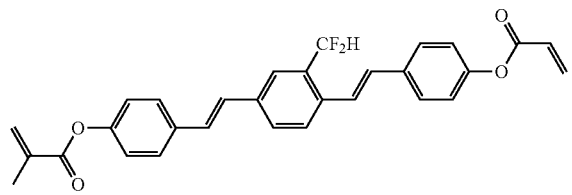
(1-1-88)
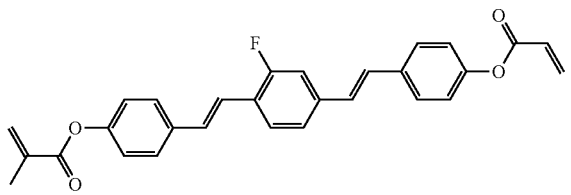
(1-1-89)
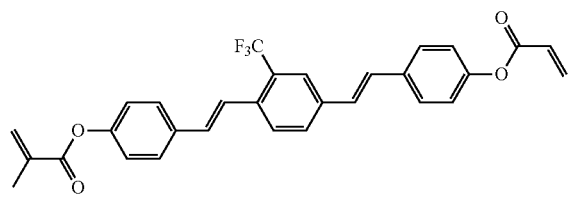
(1-1-90)
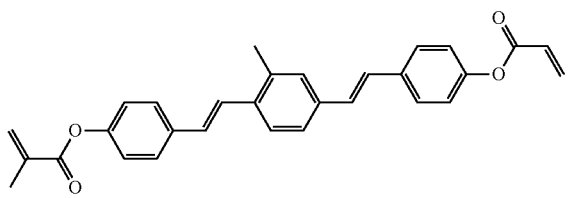
(1-1-91)
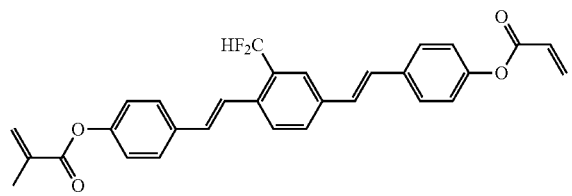
(1-1-92)
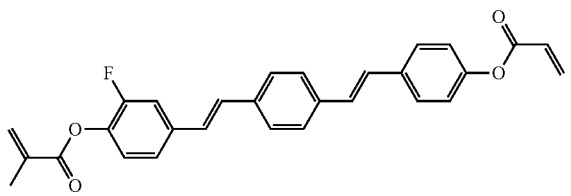
(1-1-93)
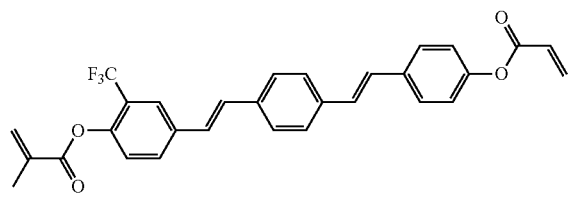
(1-1-94)
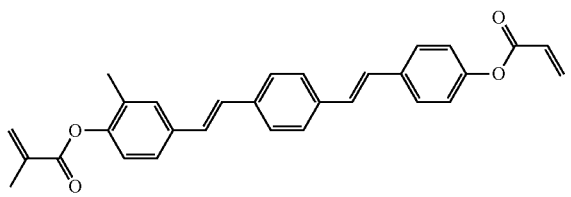
(1-1-95)
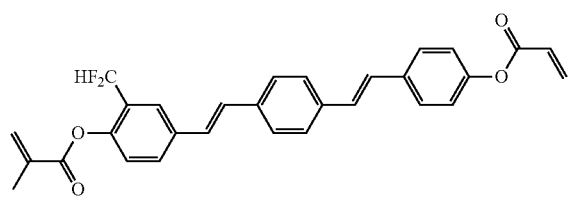
(1-1-96)
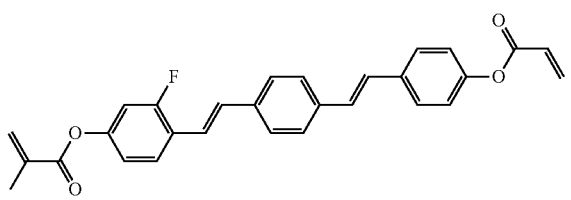
(1-1-97)
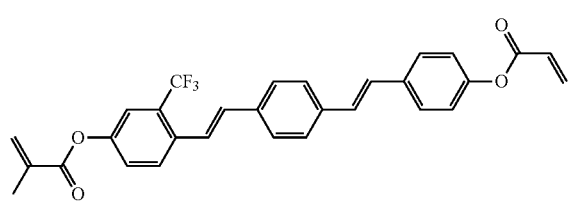
(1-1-98)
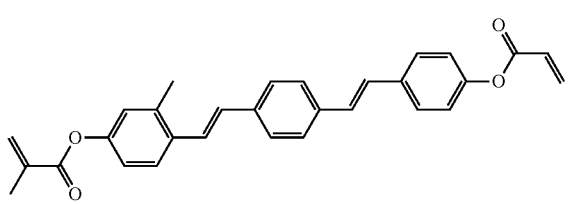
(1-1-99)
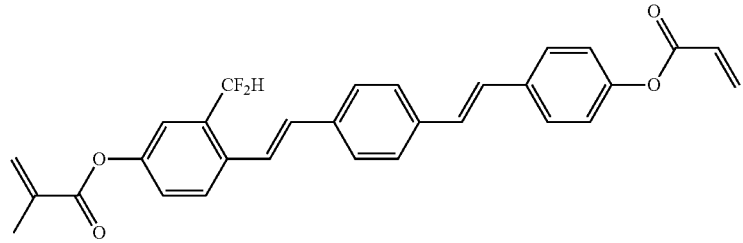

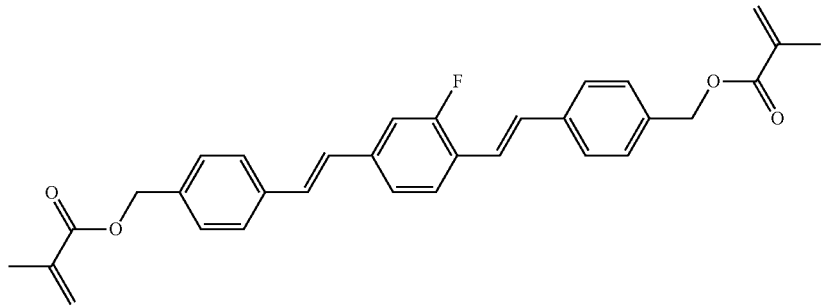
(1-1-100)
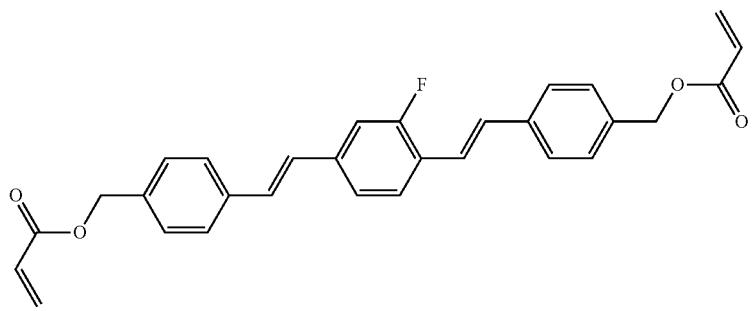
(1-1-101)
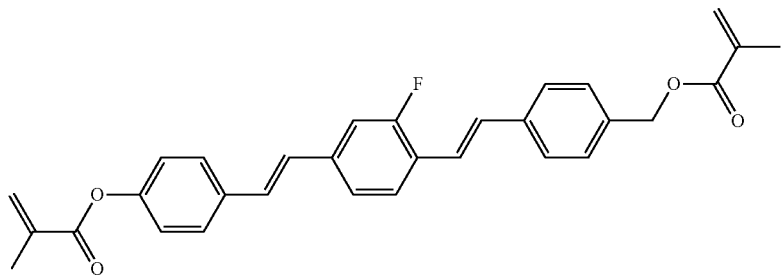
(1-1-102)
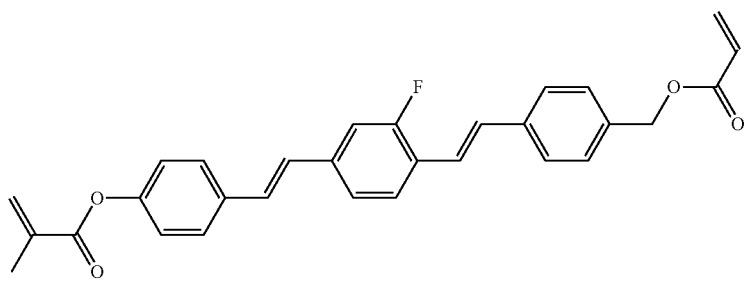
(1-1-103)
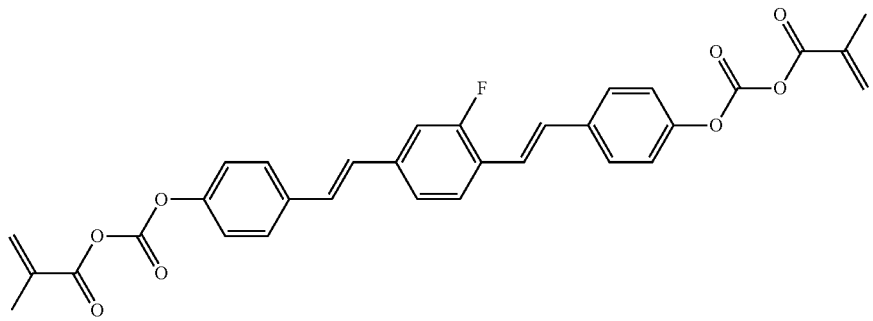
(1-1-104)

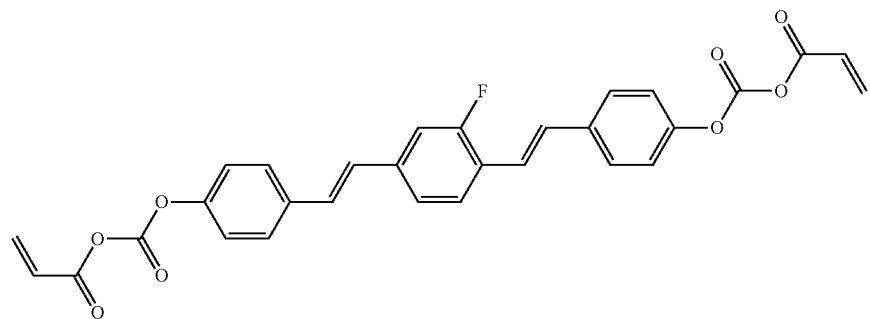
(1-1-105)
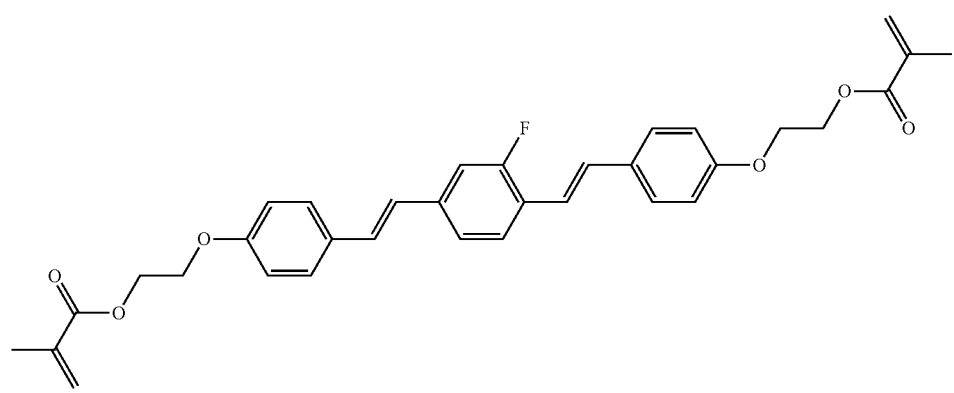
(1-1-106)
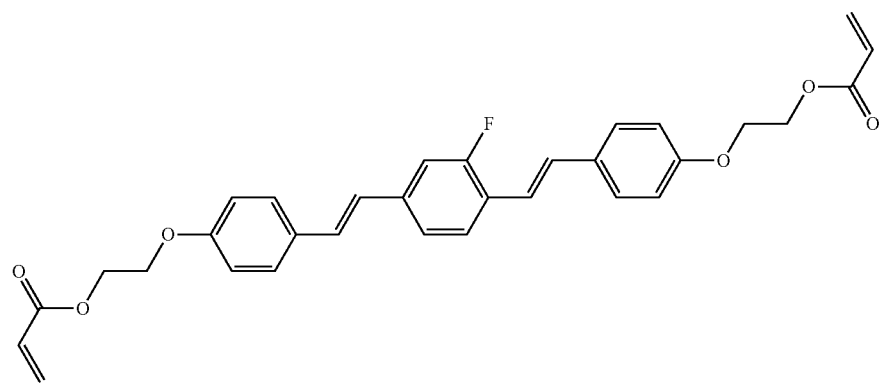
(1-1-107)
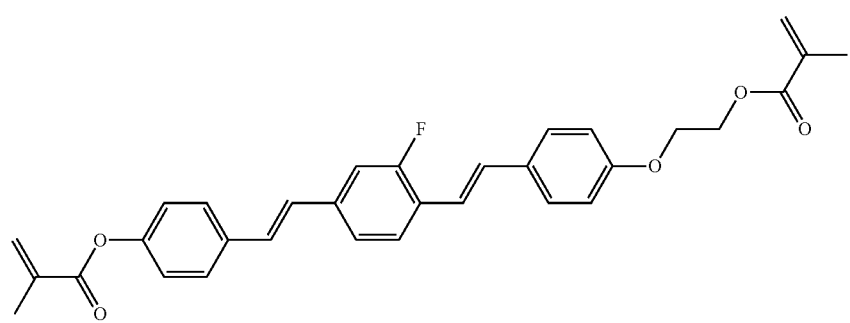
(1-1-108)

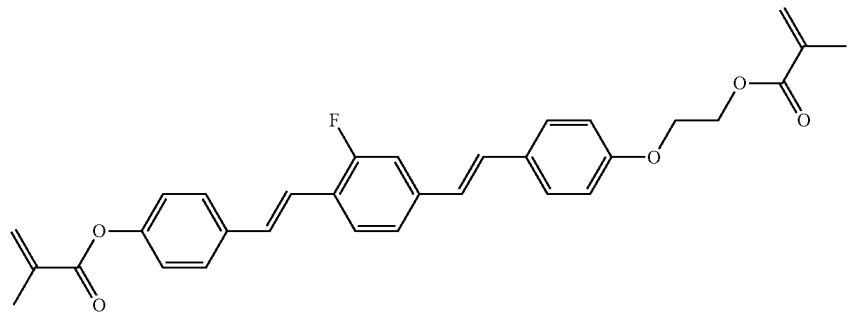
(1-1-109)
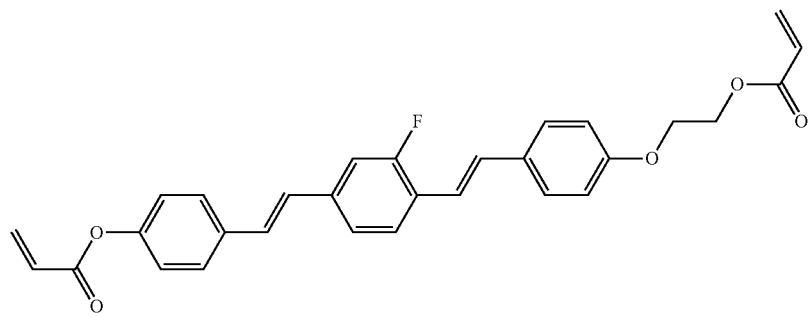
(1-1-110)
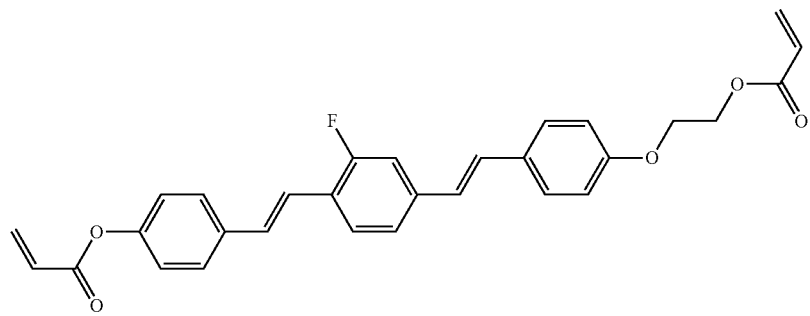
(1-1-111)
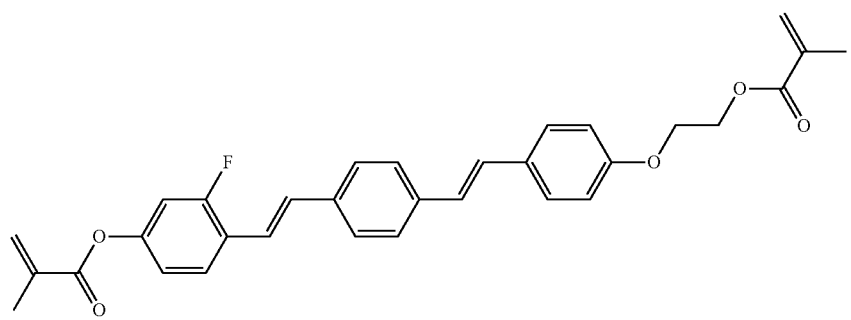
(1-1-112)
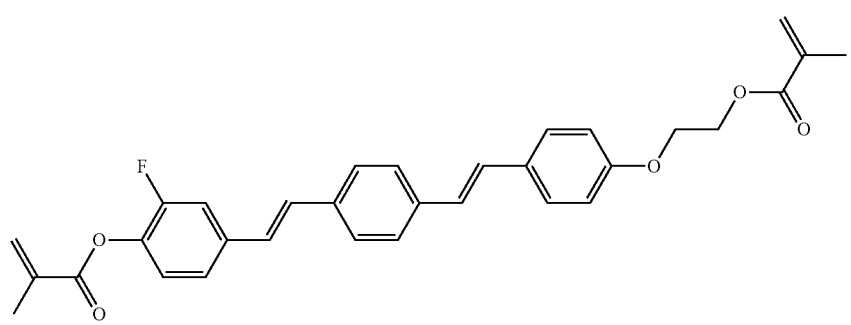
(1-1-113)

-continued
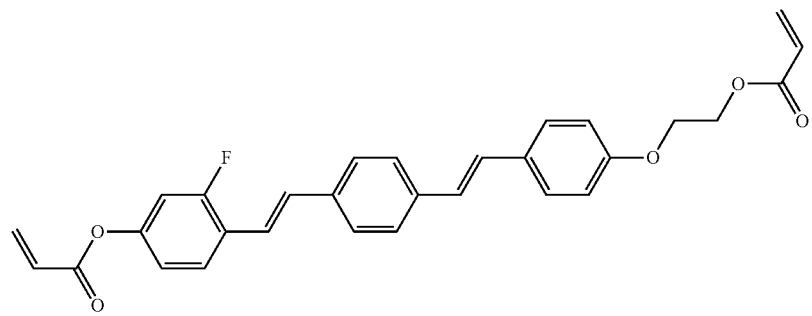
(1-1-114)
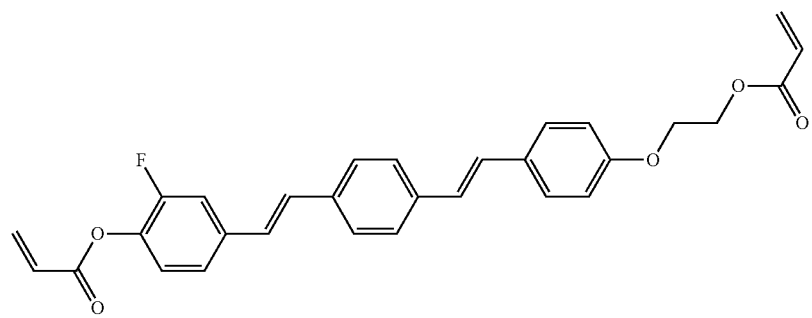
(1-1-115)
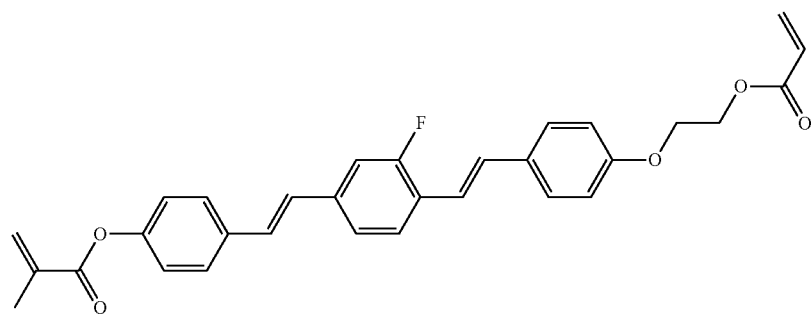
(1-1-116)
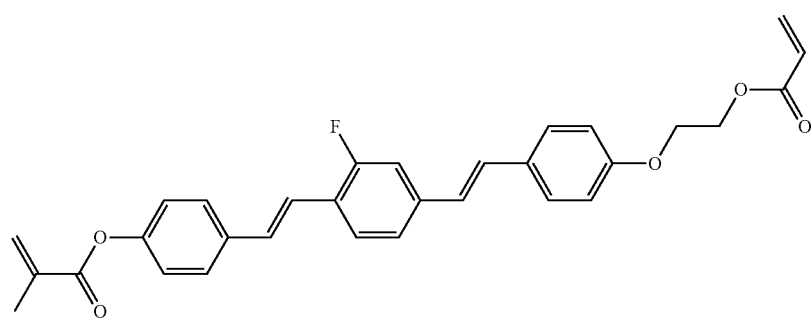
(1-1-117)
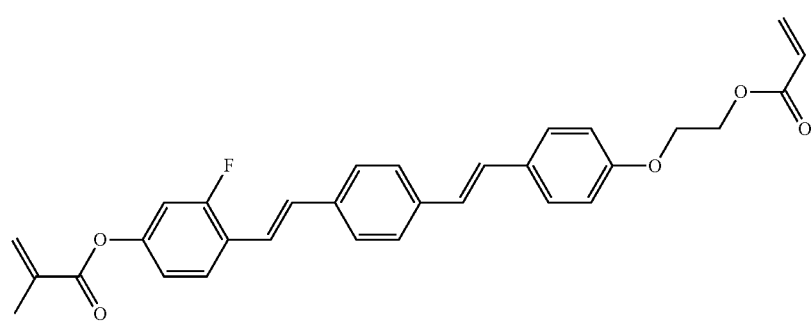
(1-1-118)

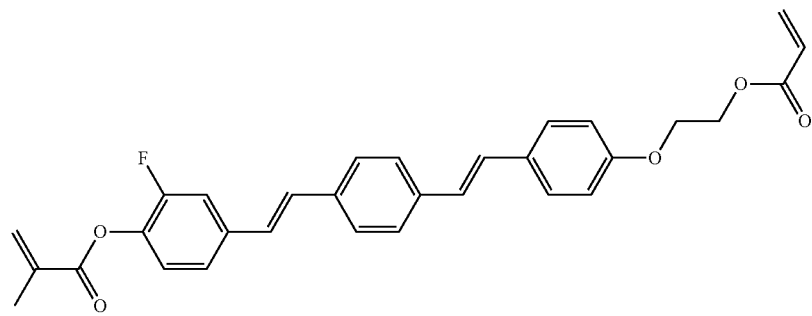
(1-1-119)
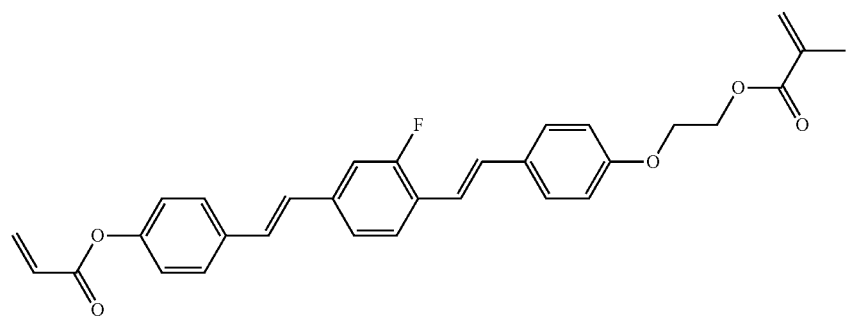
(1-1-120)
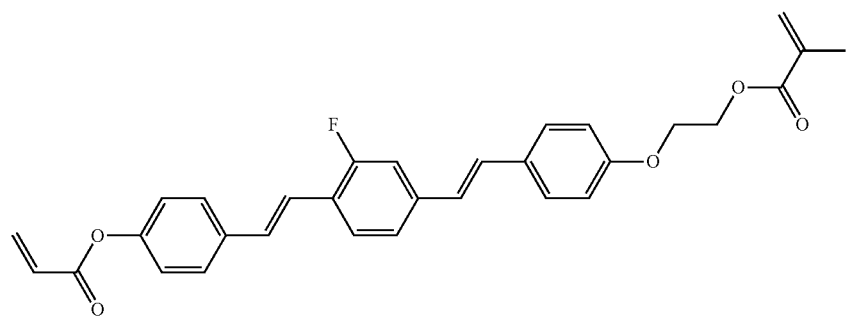
(1-1-121)
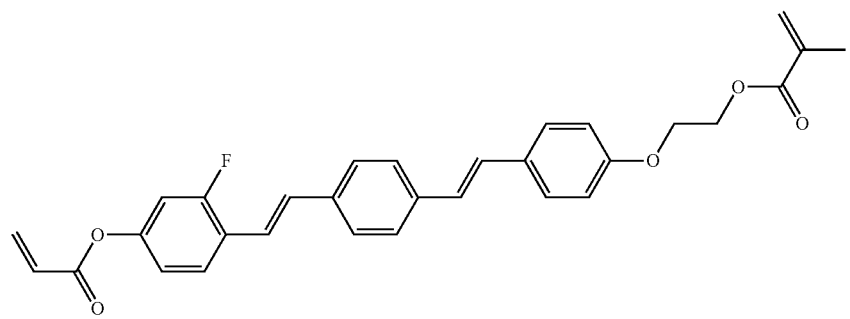
(1-1-122)
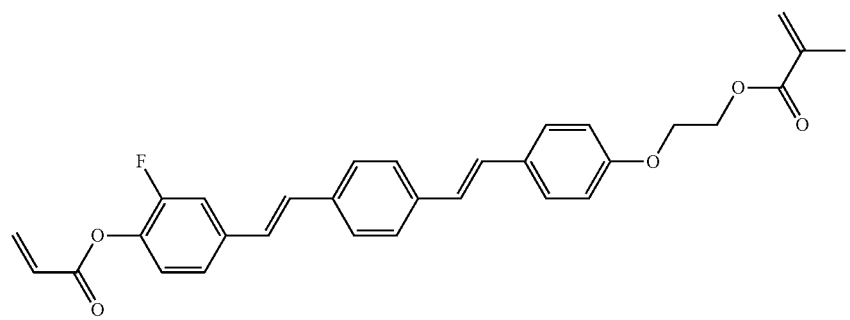
(1-1-123)

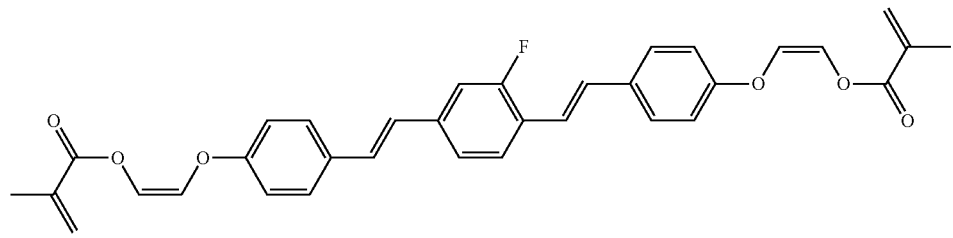
(1-1-124)
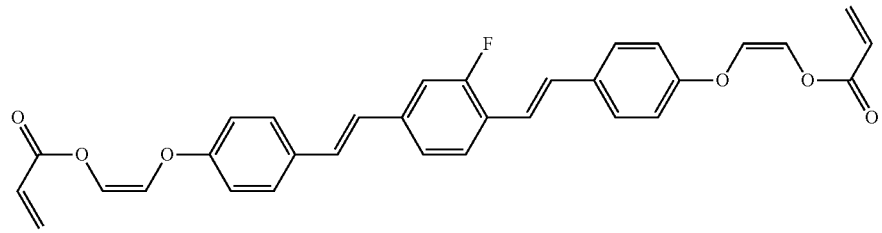
(1-1-125)
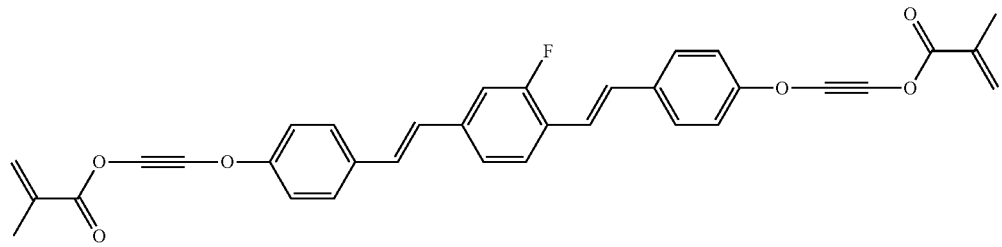
(1-1-126)
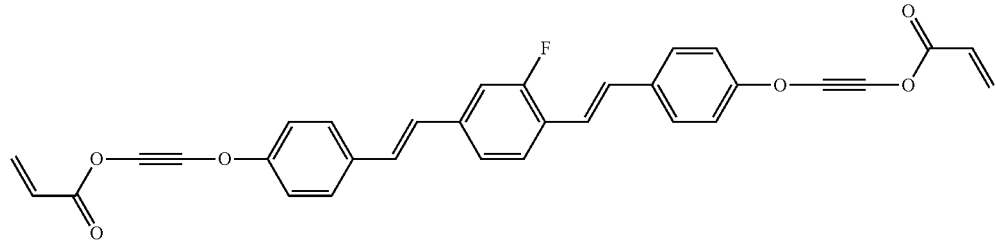
(1-1-127)
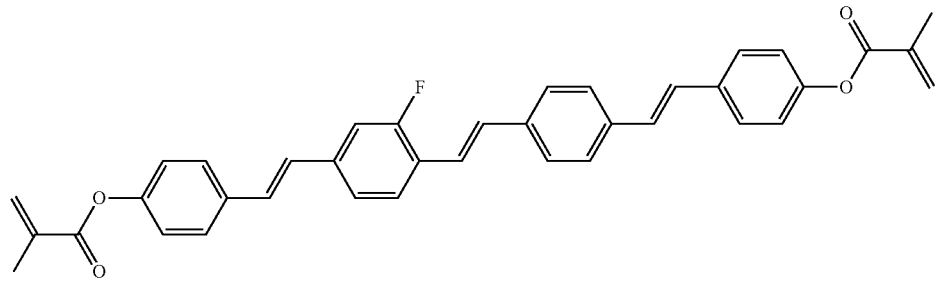
(1-1-128)
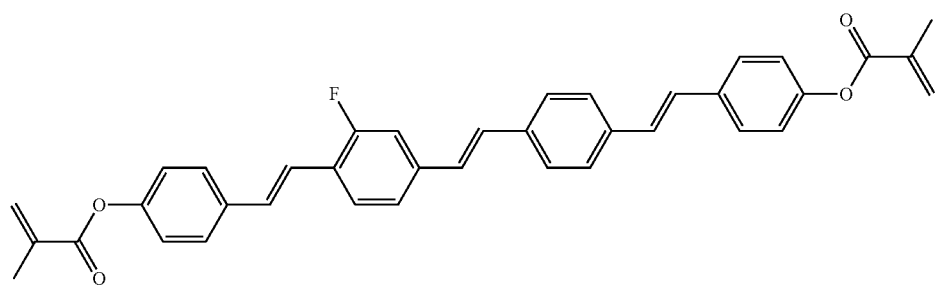
(1-1-129)

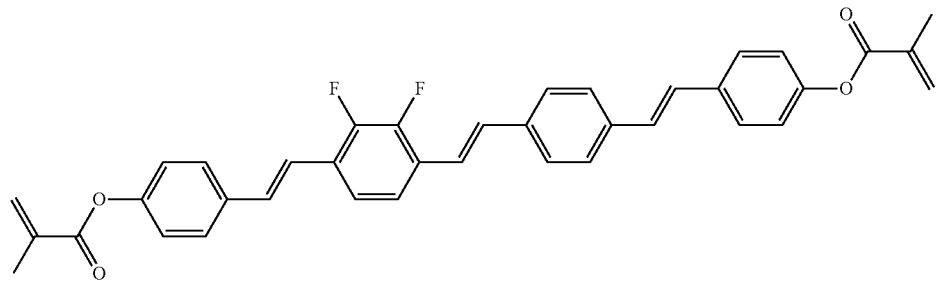
(1-1-130)
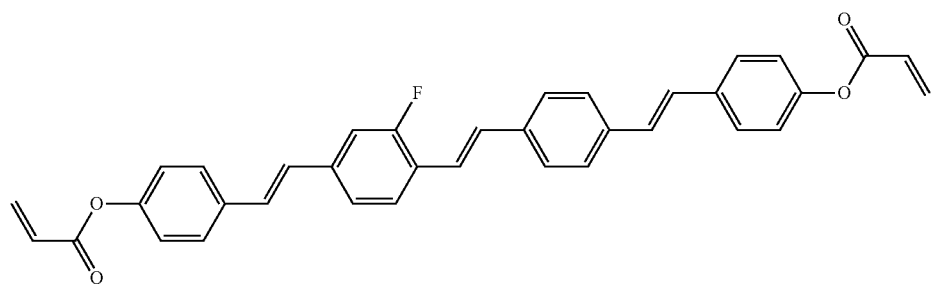
(1-1-131)
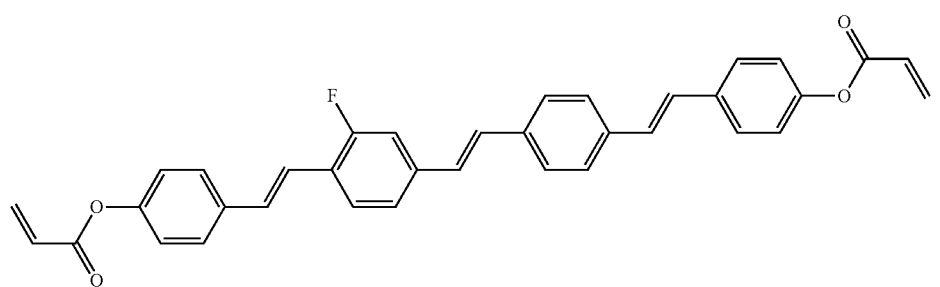
(1-1-132)
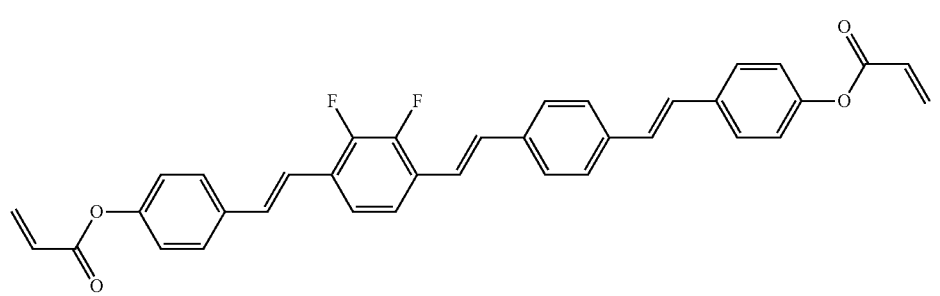
(1-1-133)
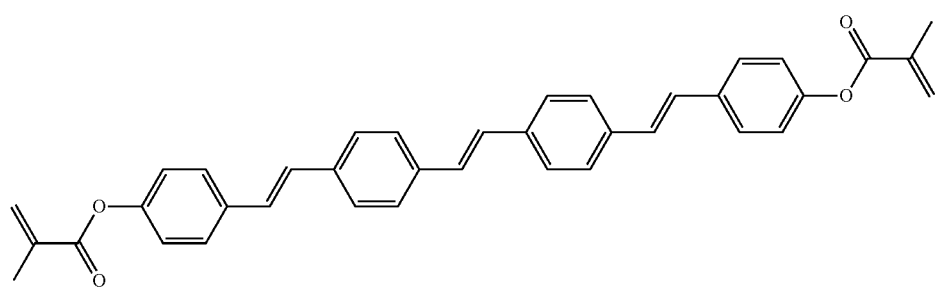
(1-1-134)

(1-1-135)
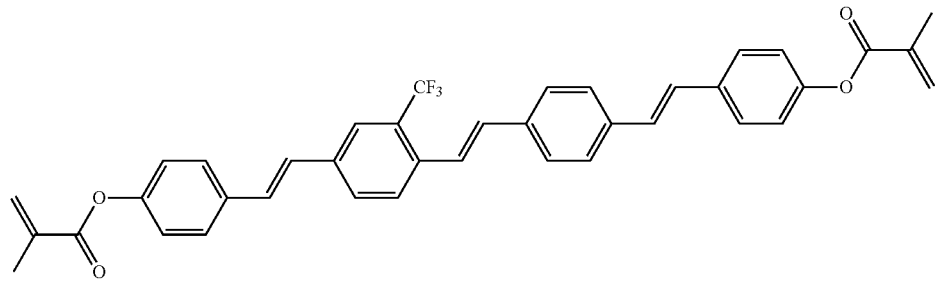
(1-1-136)
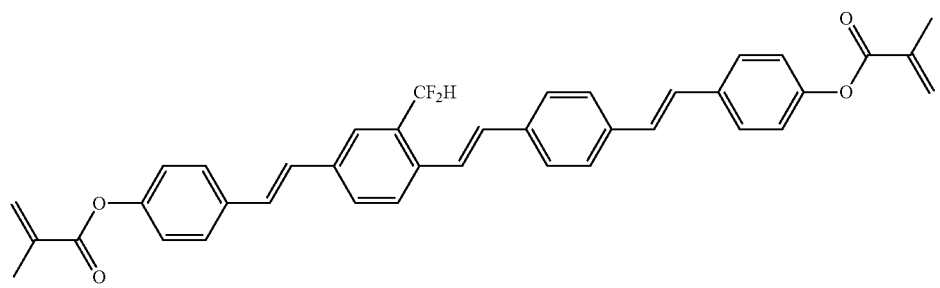
(1-1-137)
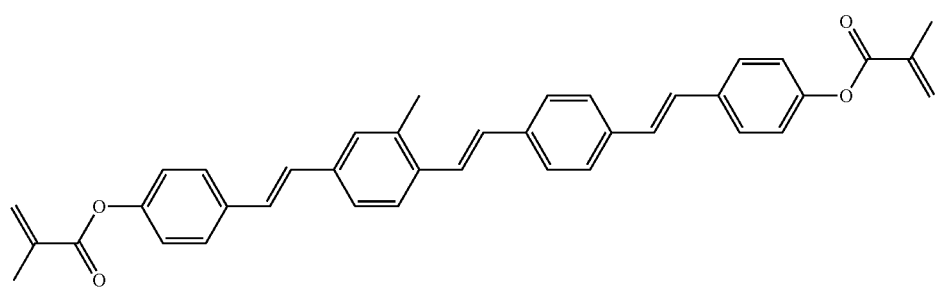
(1-2-1)
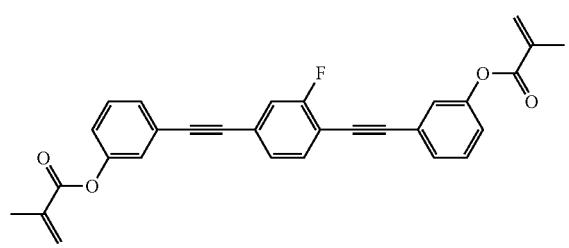
(1-2-2)
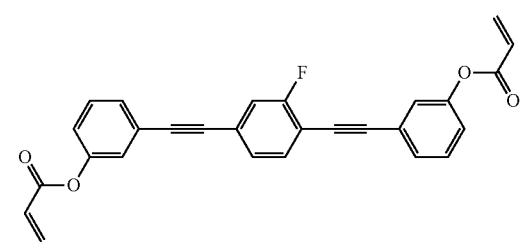
(1-2-3)
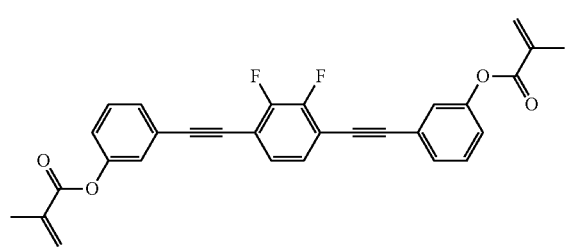
(1-2-4)
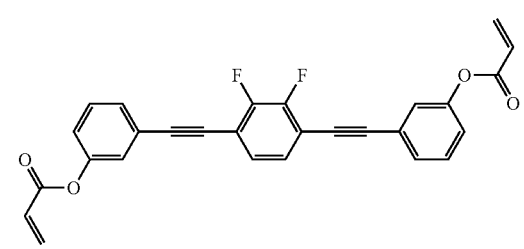

-continued
(1-2-5)
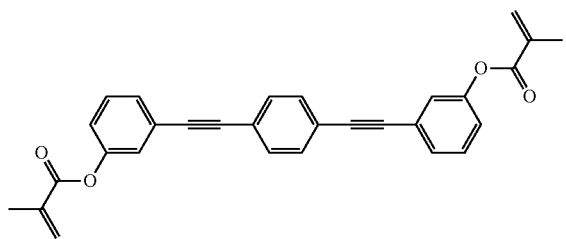
(1-2-6)
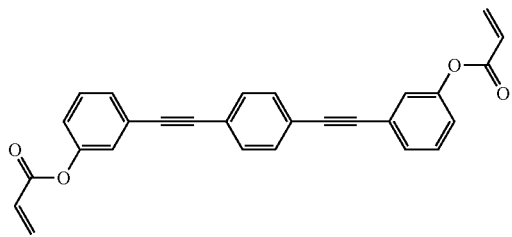
(1-2-7)
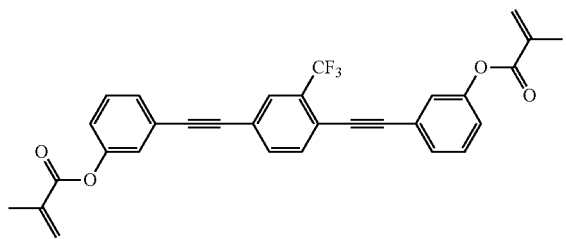
(1-2-8)
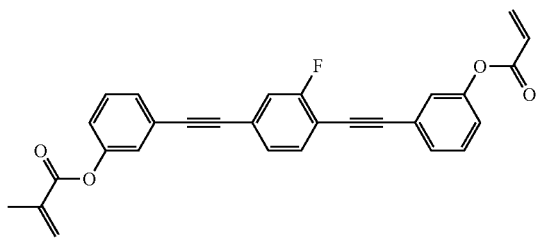
(1-2-9)
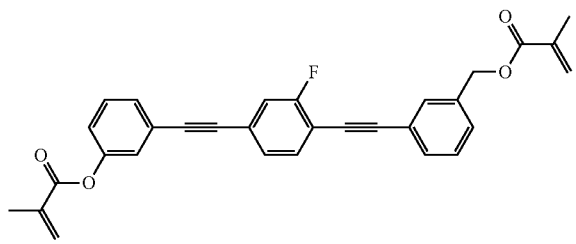
(1-2-10)
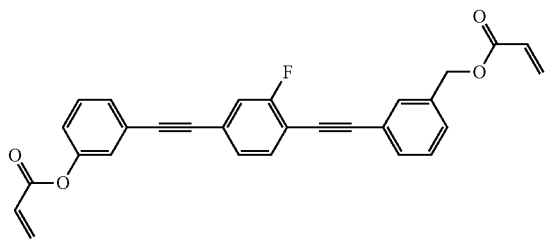
(1-2-11)
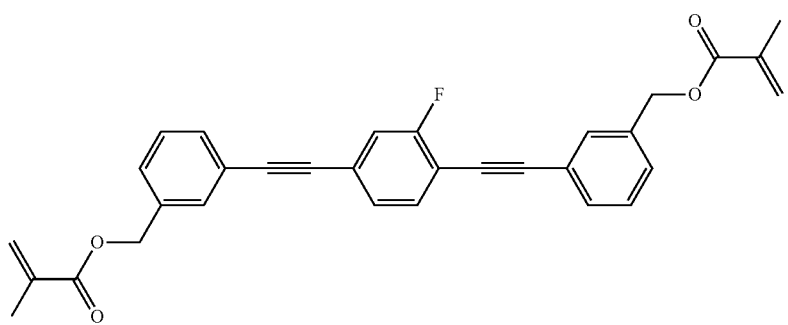
(1-2-12)
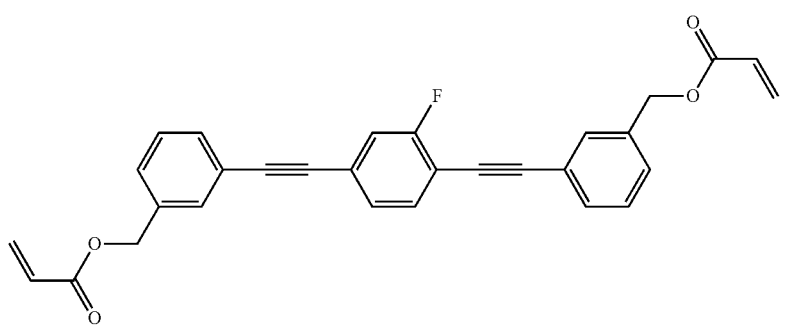

(1-2-13)
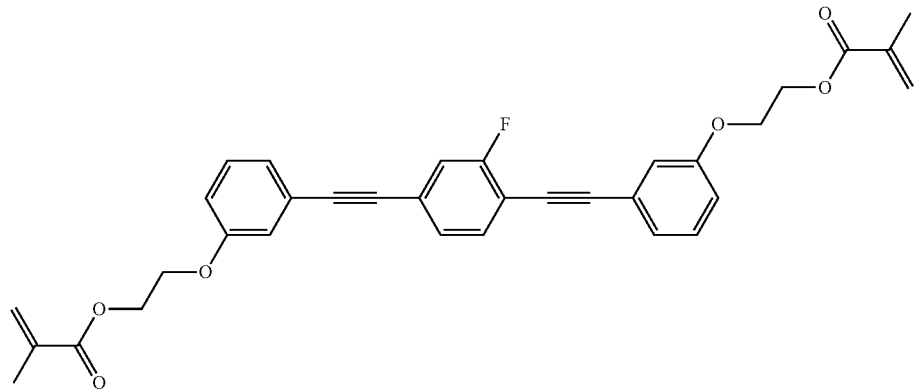
(1-2-14)
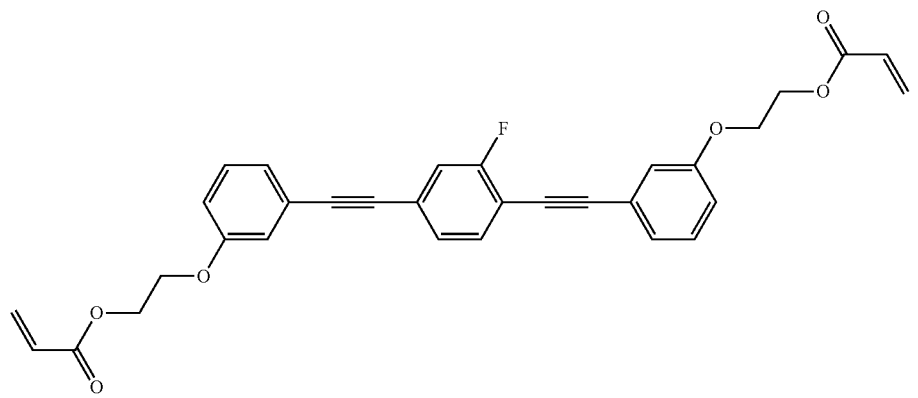
(1-2-15)
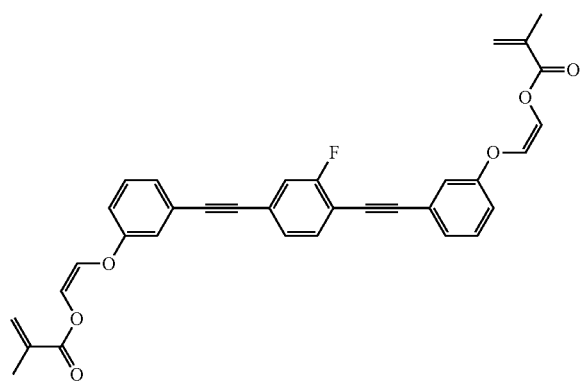
(1-2-16)
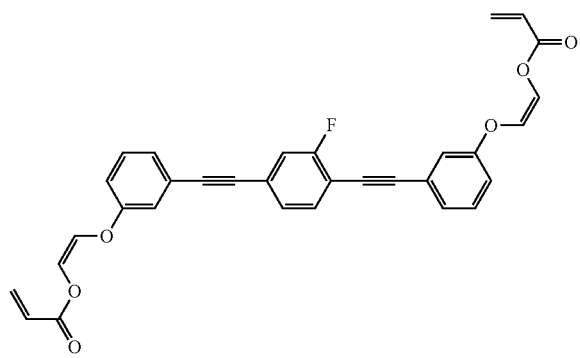
(1-2-17)
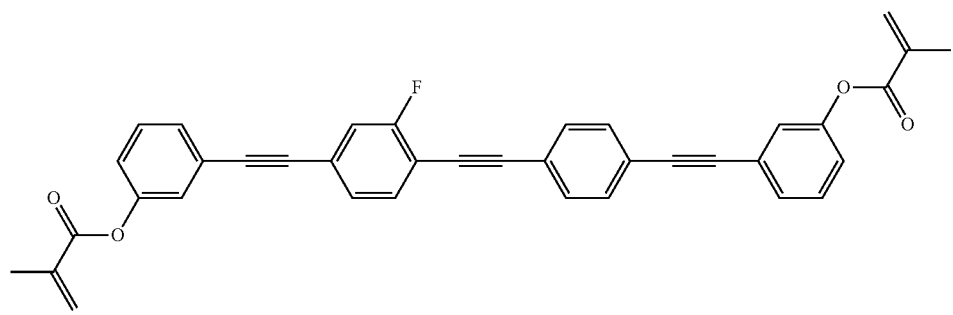

(1-2-18)
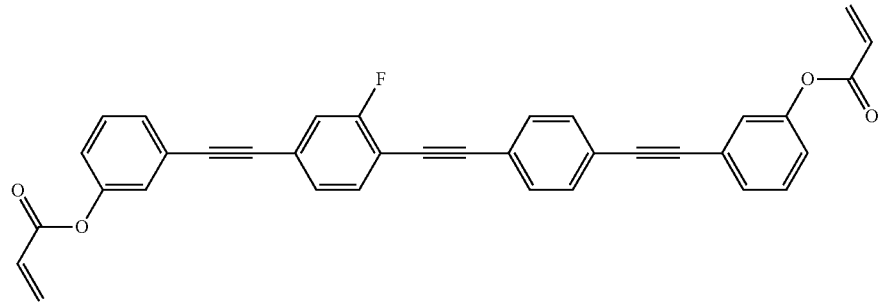
(1-2-19)
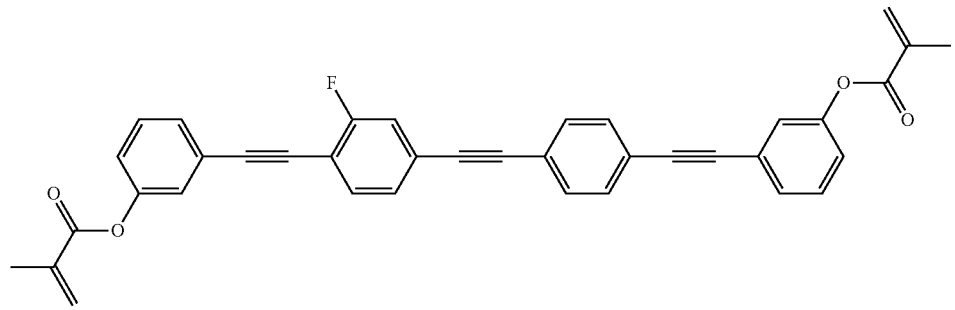
(1-2-20)
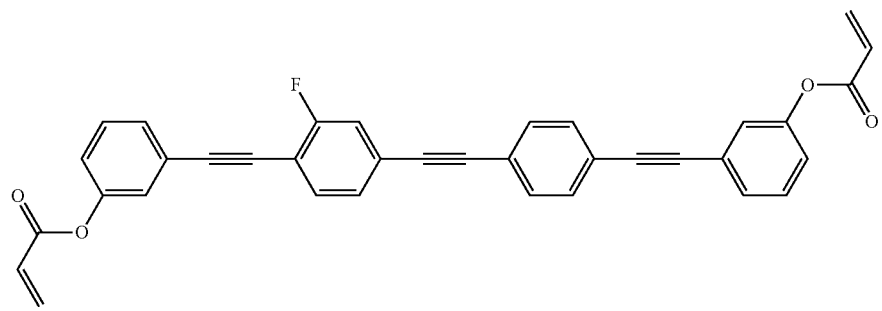
(1-2-21)
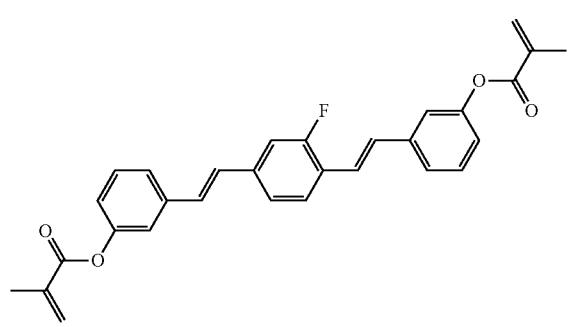
(1-2-22)
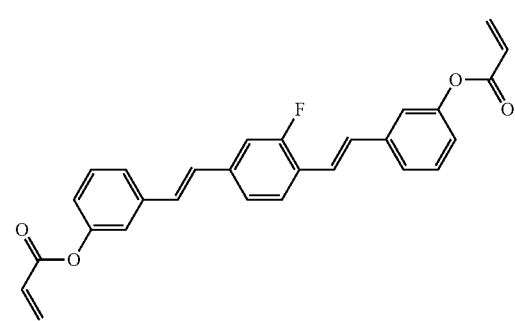
(1-2-23)
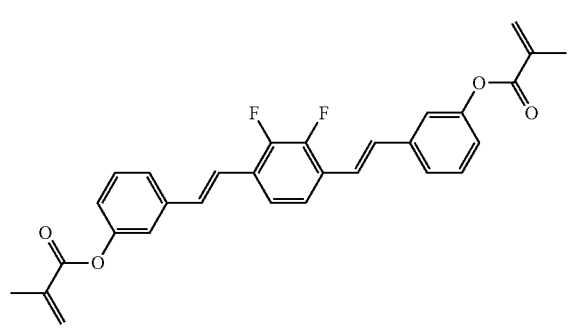
(1-2-24)
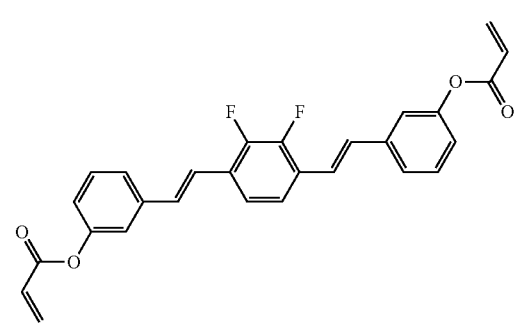

-continued
(1-2-25)
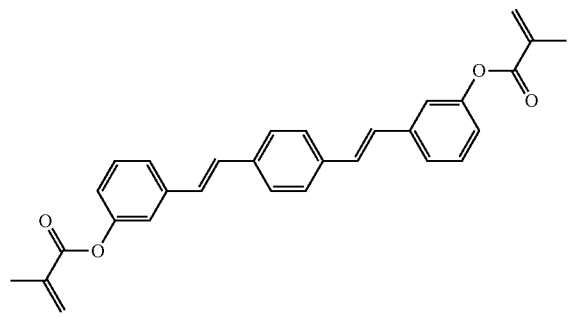
(1-2-26)
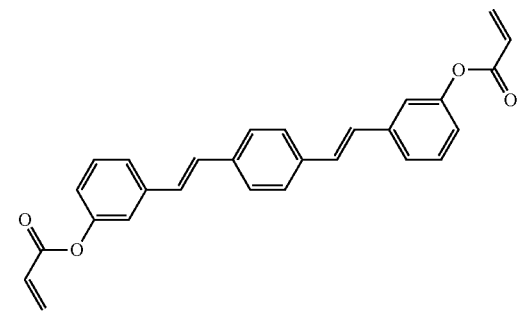
(1-2-27)
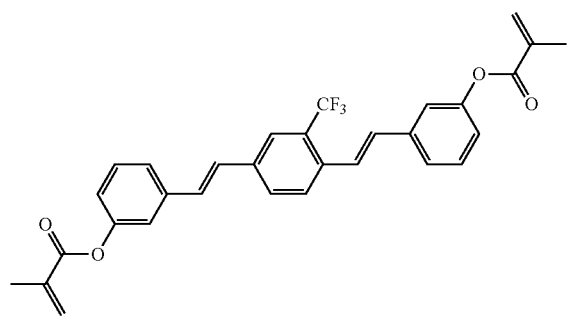
(1-2-28)
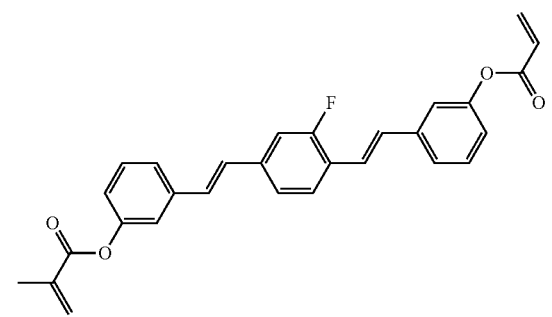
(1-2-29)
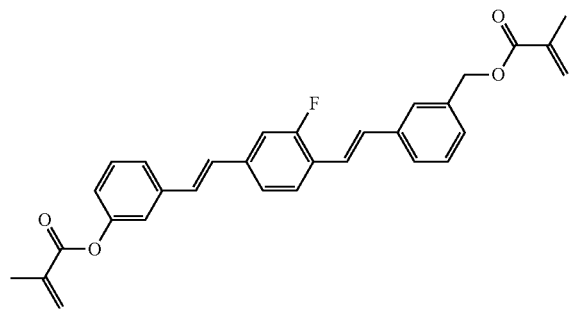
(1-2-30)
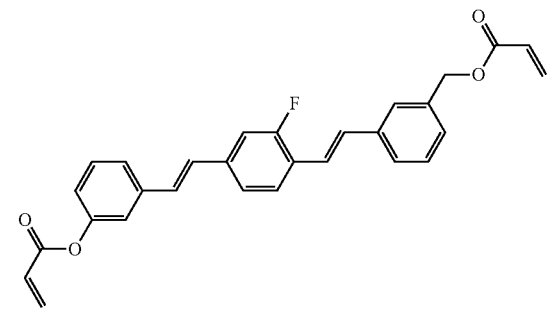
(1-2-31)
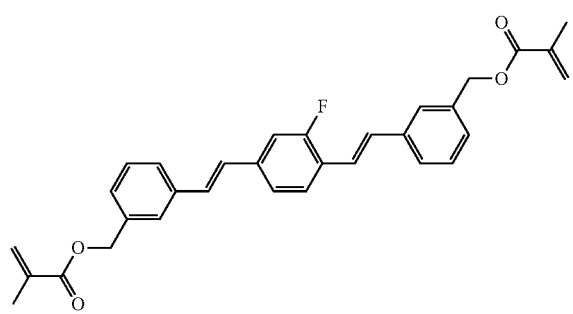
(1-2-32)
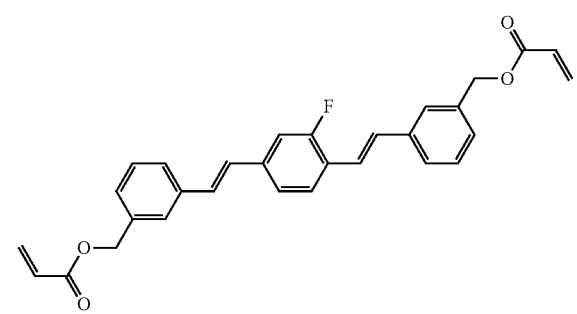

(1-2-33)
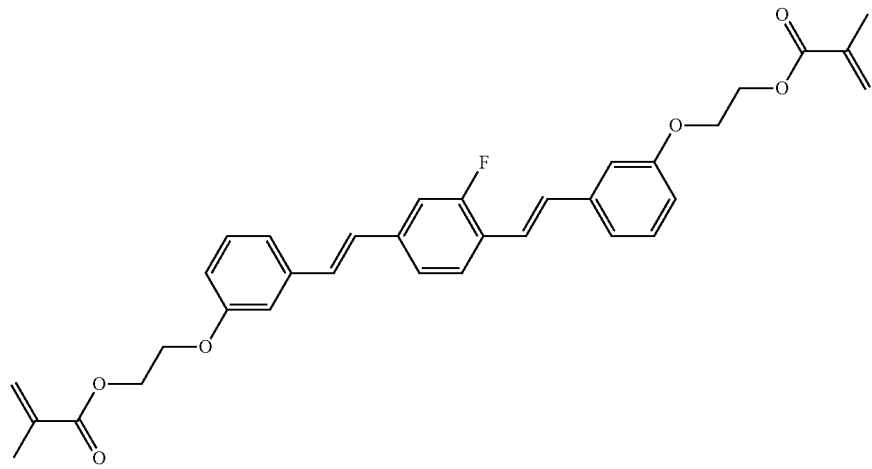
(1-2-34)
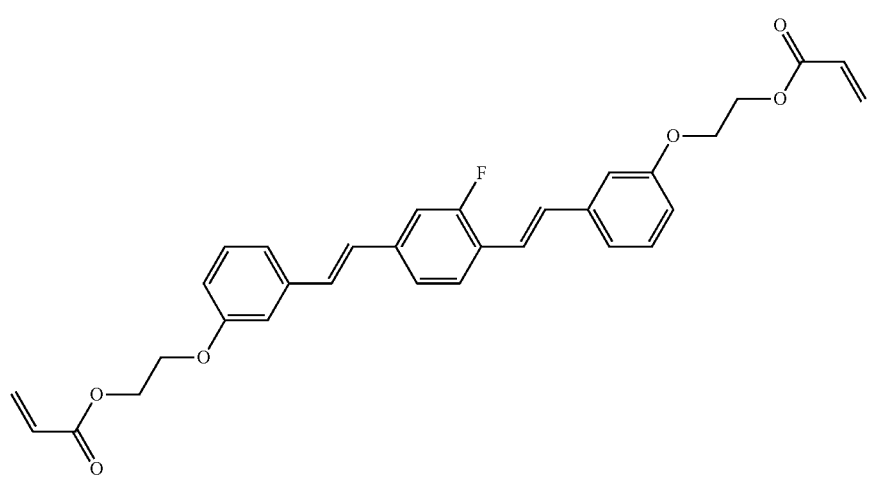
(1-2-35)
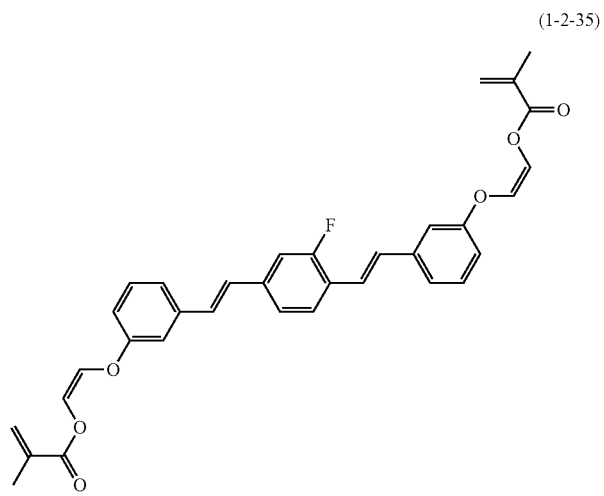
(1-2-36)
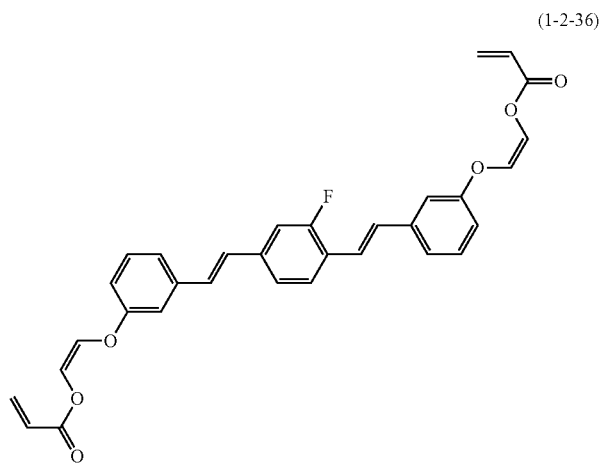

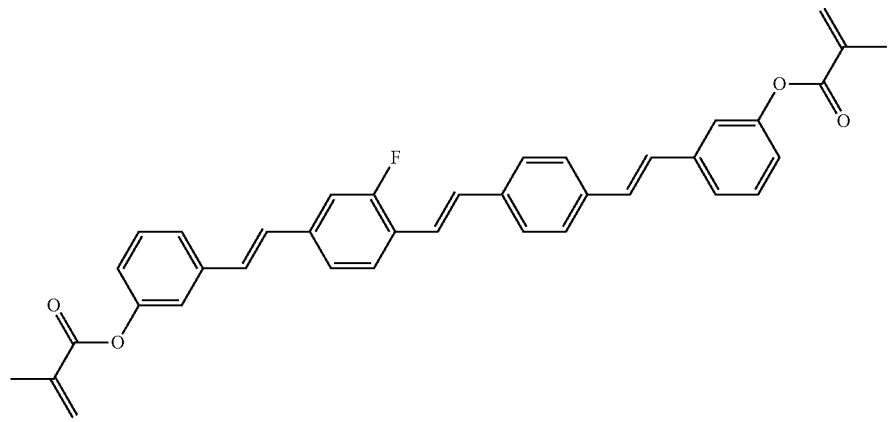
(1-2-37)
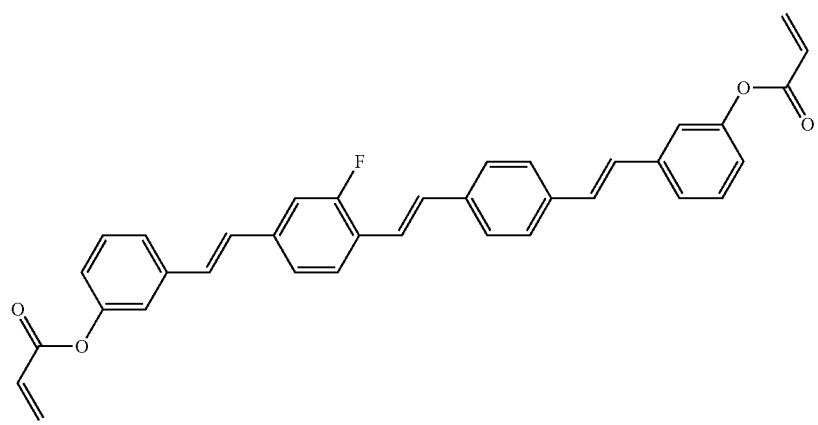
(1-2-38)
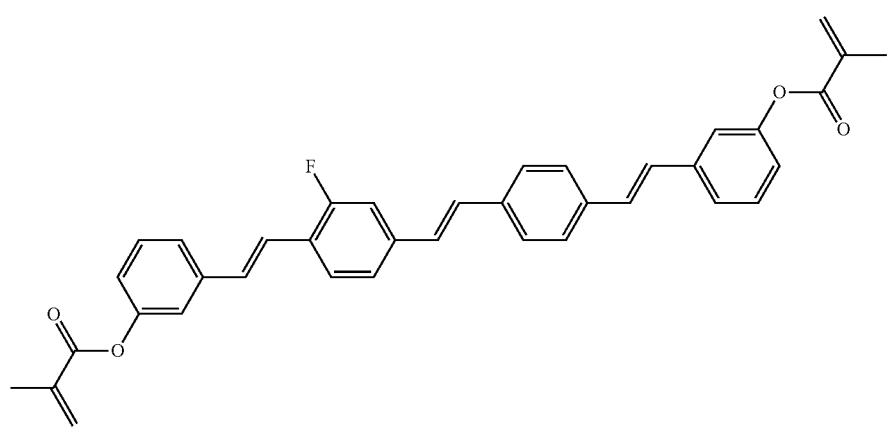
(1-2-39)

(1-2-40)
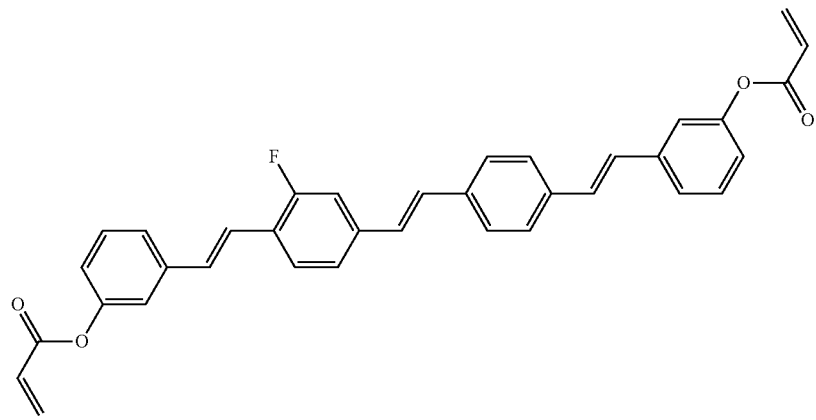
(1-3-1)
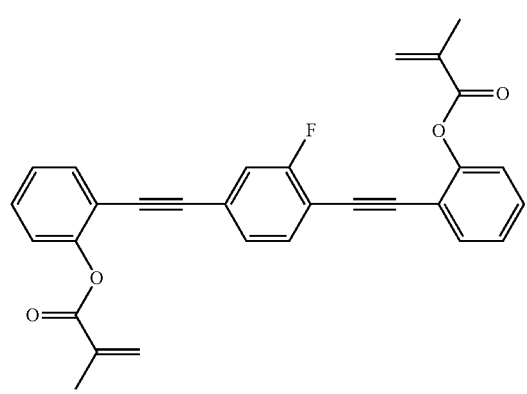
(1-3-2)
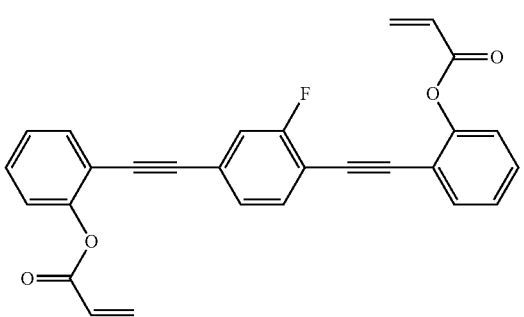
(1-3-3)
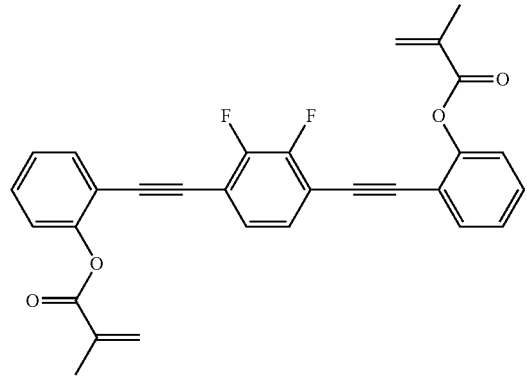
(1-3-4)
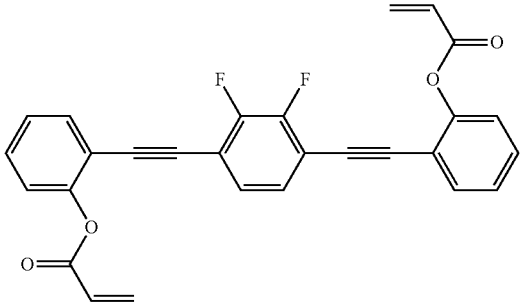
(1-3-5)
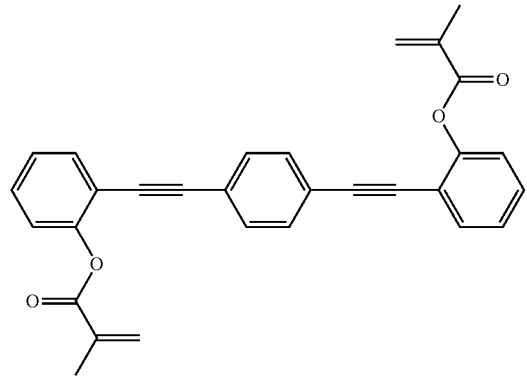
(1-3-6)
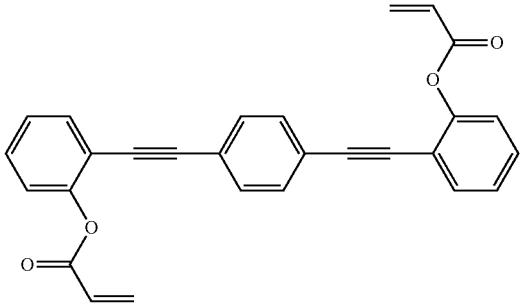

-continued
(1-3-7)
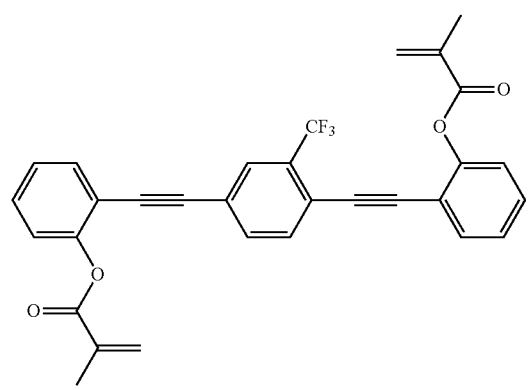
(1-3-8)
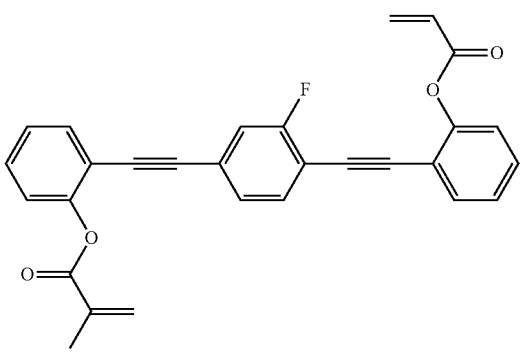
(1-3-9)
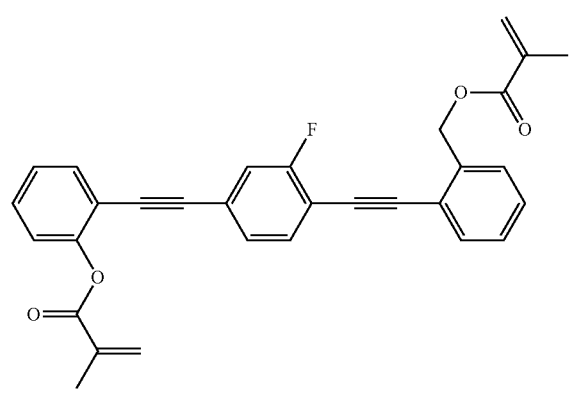
(1-3-10)
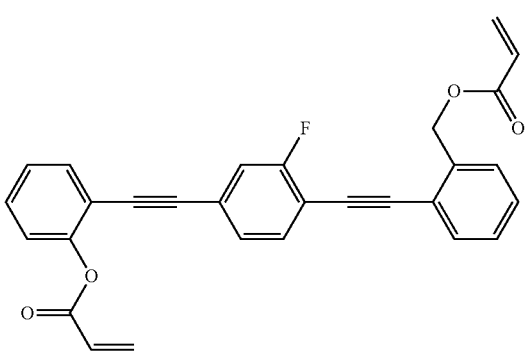
(1-3-11)
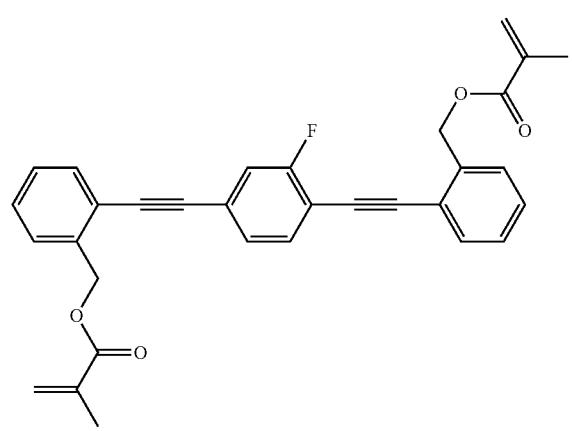
(1-3-12)
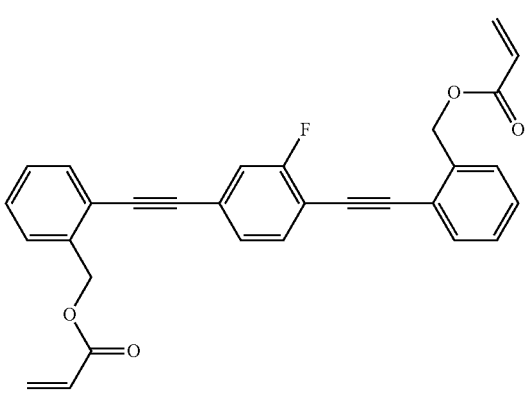

-continued
(1-3-13)
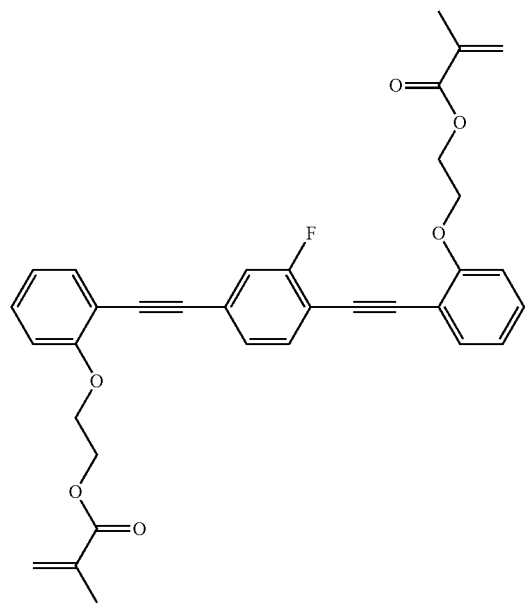
(1-3-14)
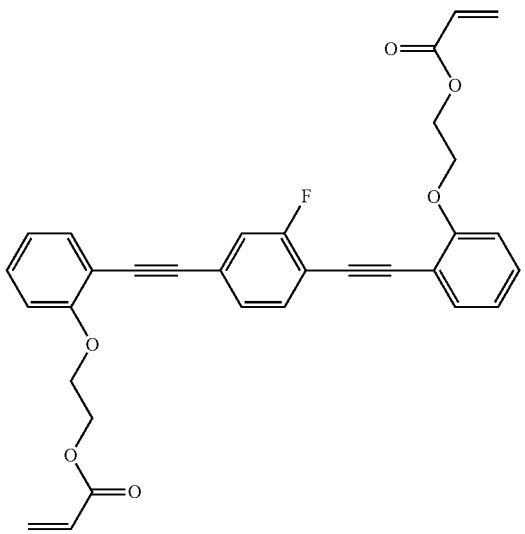
(1-3-15)
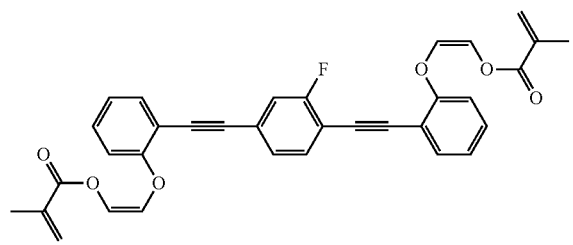
(1-3-16)
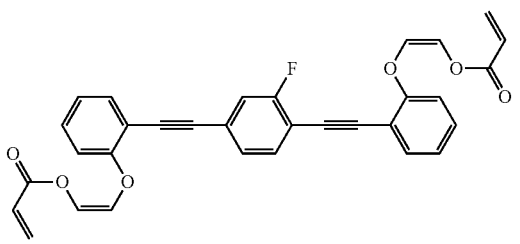
(1-3-17)
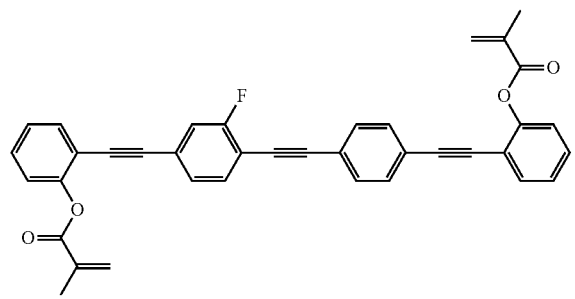
(1-3-18)
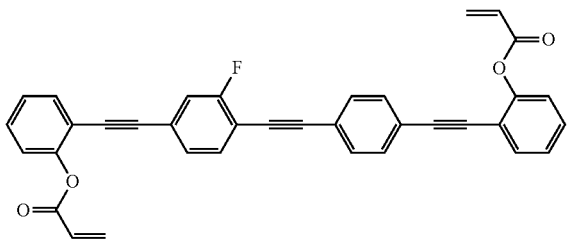
(1-3-19)
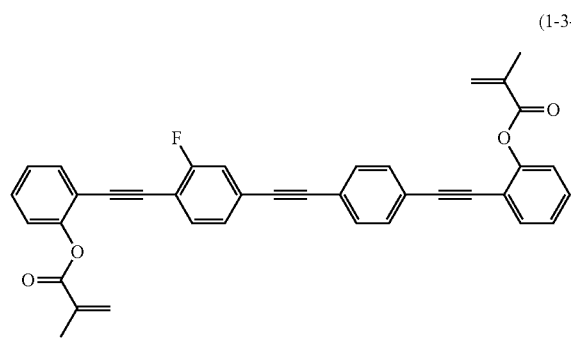
(1-3-20)
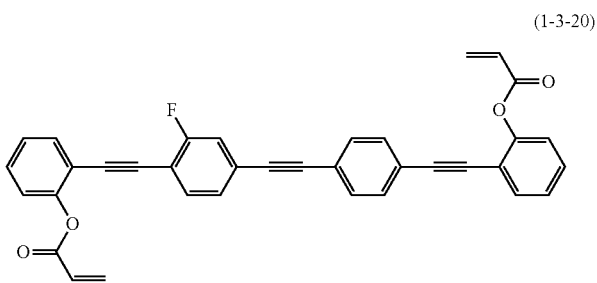

(1-3-21) 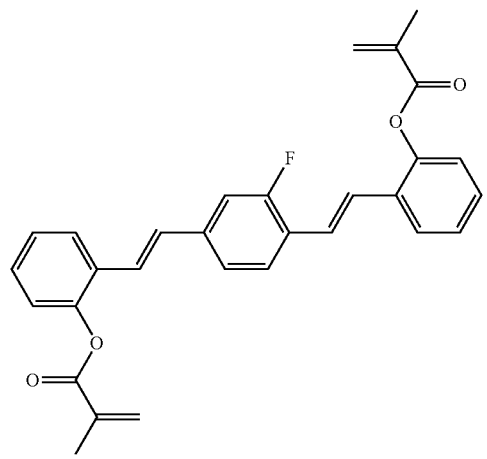
(1-3-22) 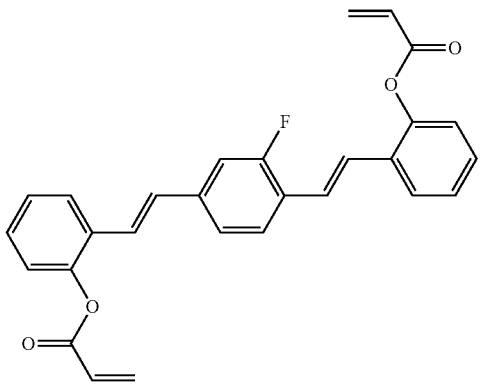
(1-3-23) 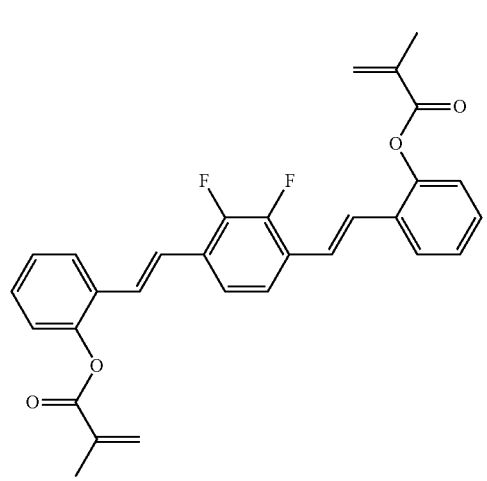
(1-3-24) 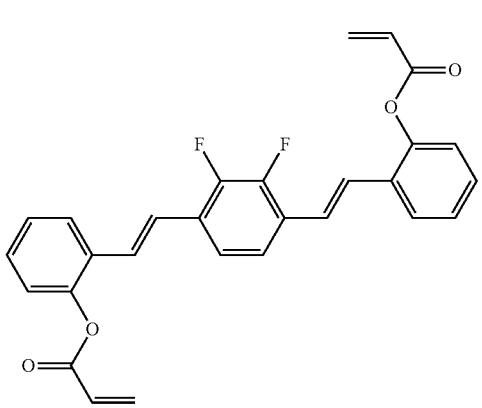
(1-3-25) 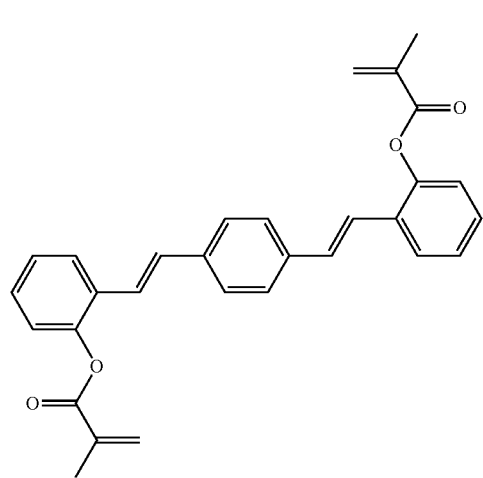
(1-3-26) 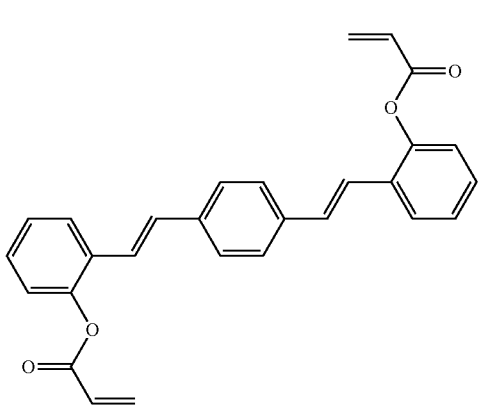

(1-3-27) 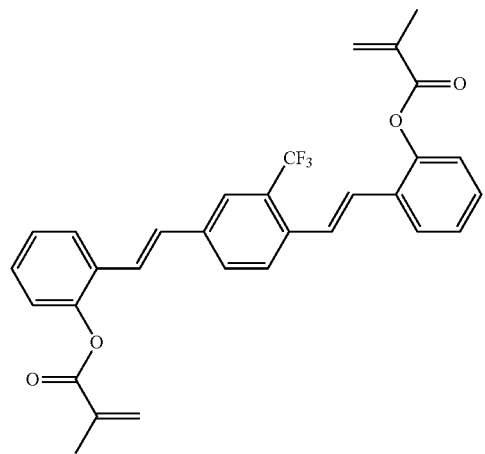
(1-3-28) 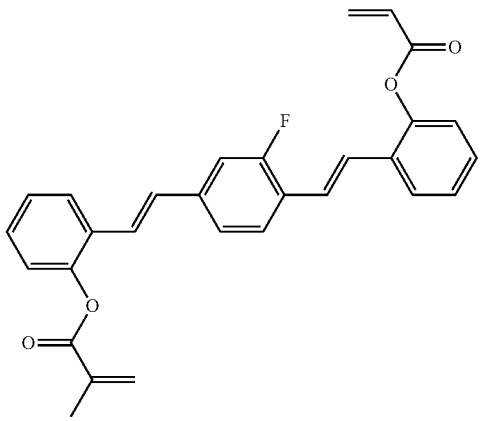
(1-3-29) 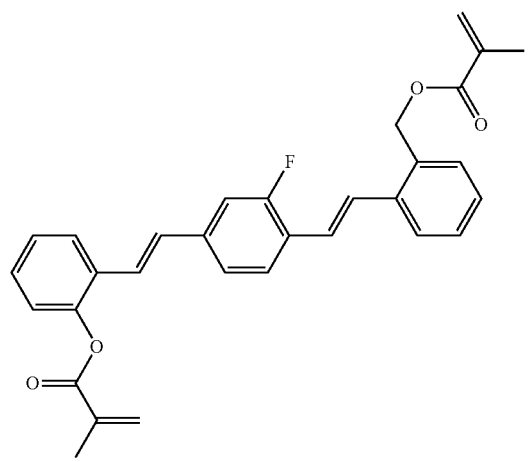
(1-3-30) 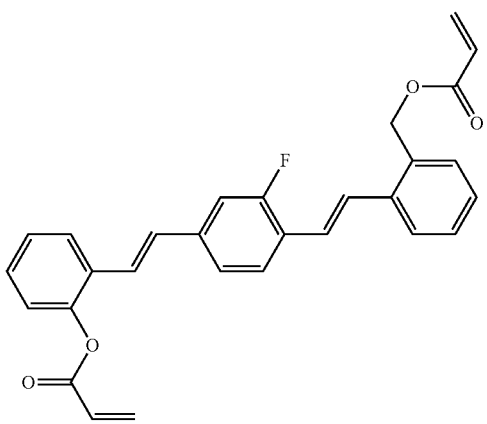
(1-3-31) 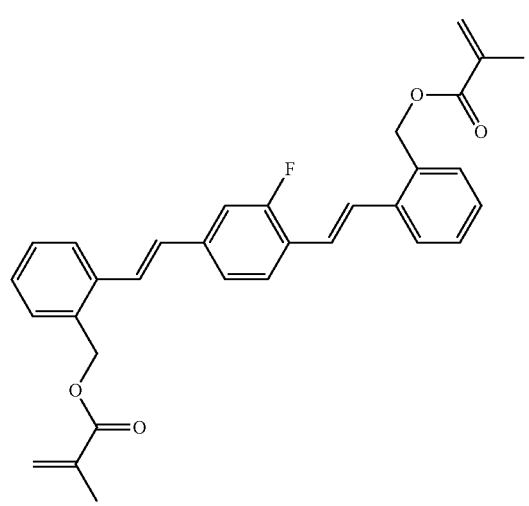
(1-3-32) 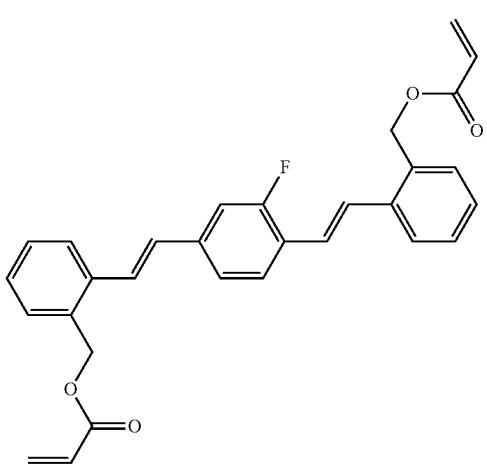

-continued
(1-3-33)
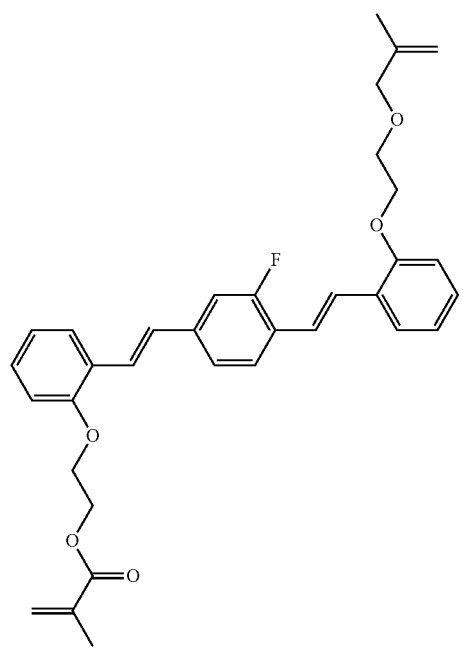
(1-3-34)
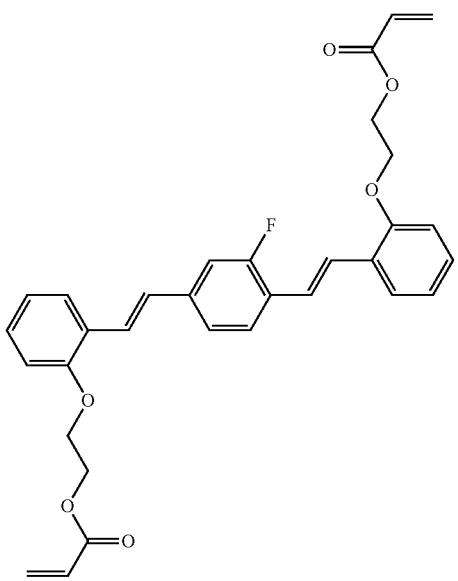
(1-3-35)
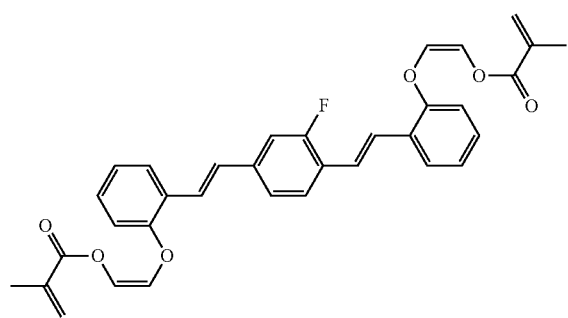
(1-3-36)
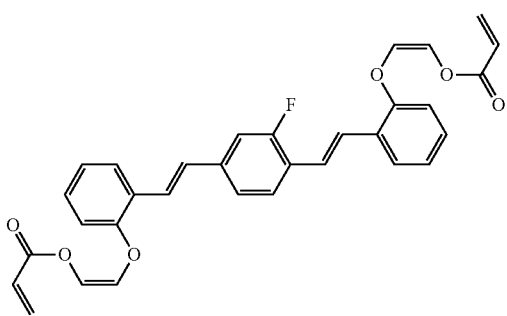
(1-3-37)
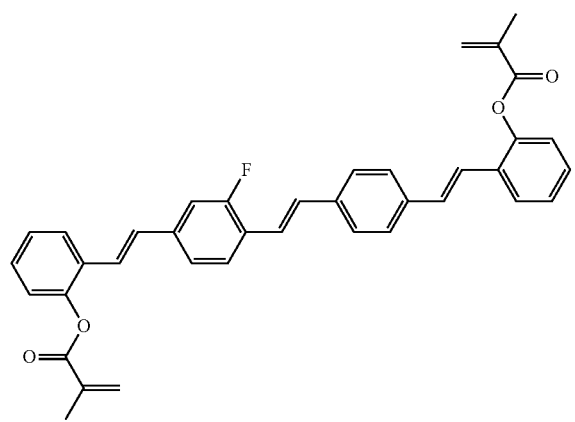
(1-3-38)
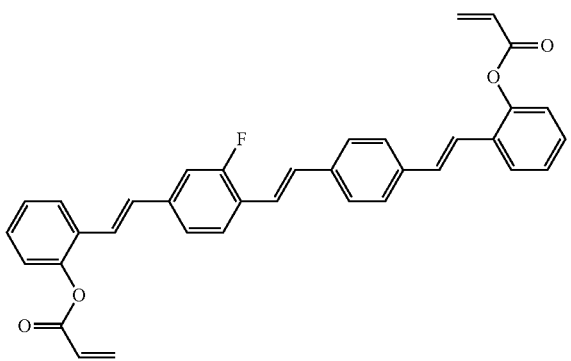

-continued
(1-3-39)
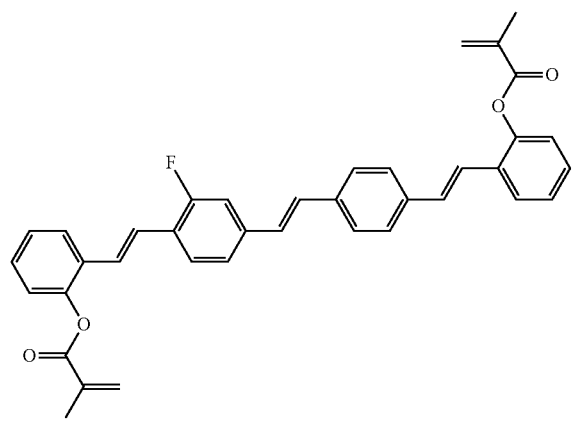
(1-3-40)
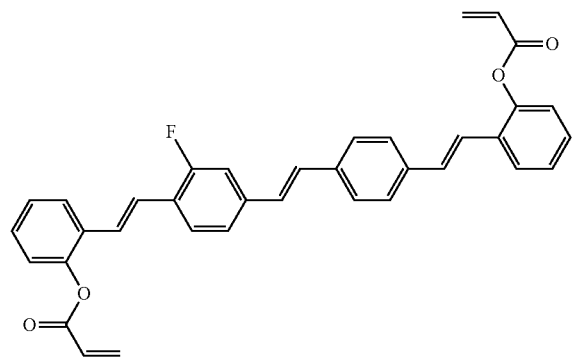
(1-4-1)
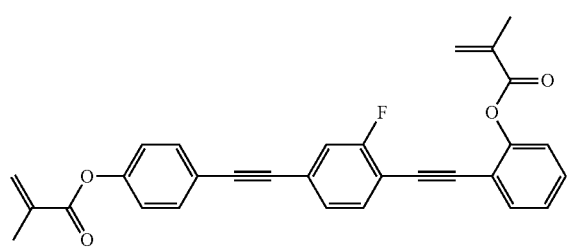
(1-4-2)
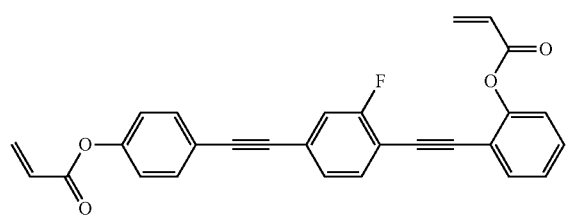
(1-4-3)
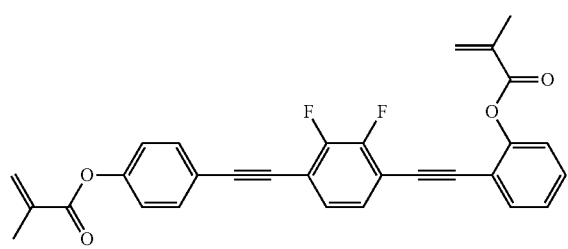
(1-4-4)
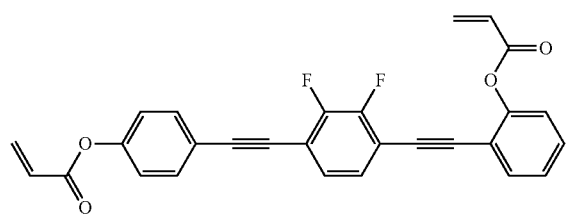
(1-4-5)
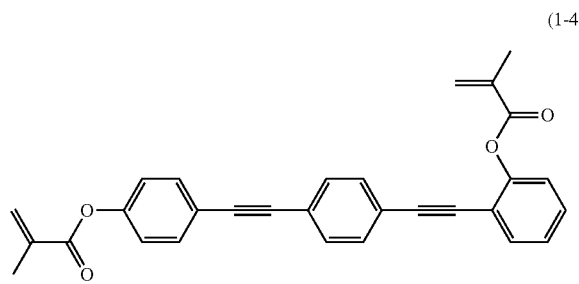
(1-4-6)
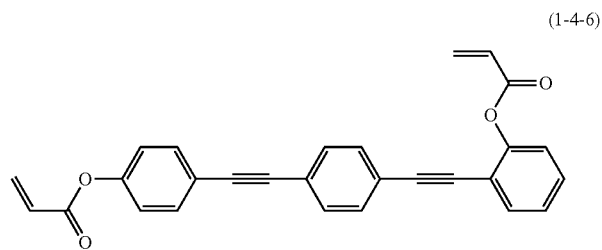
(1-4-7)
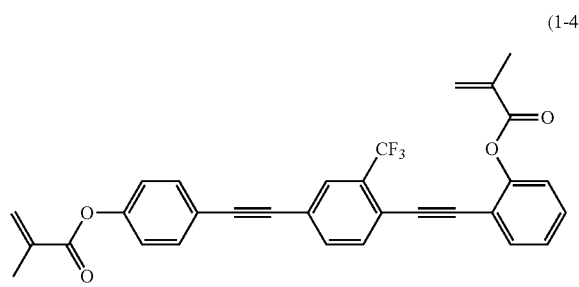
(1-4-8)
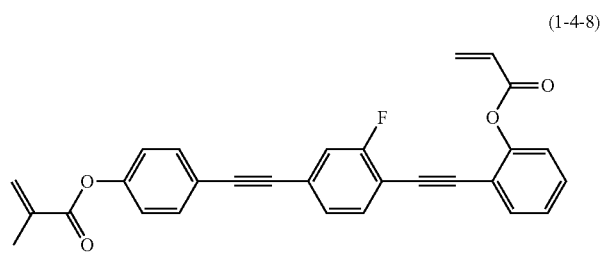

-continued
(1-4-9)
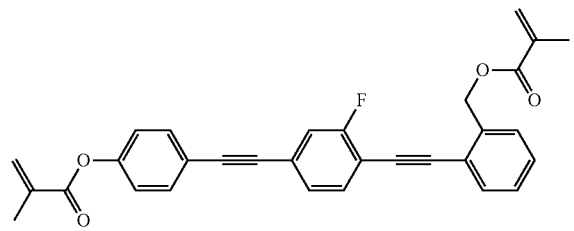
(1-4-10)
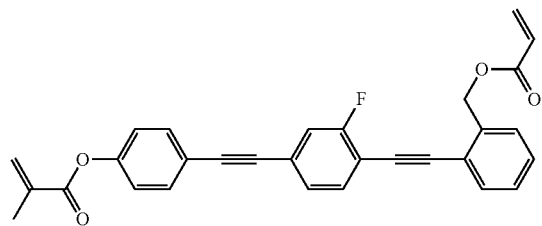
(1-4-11)
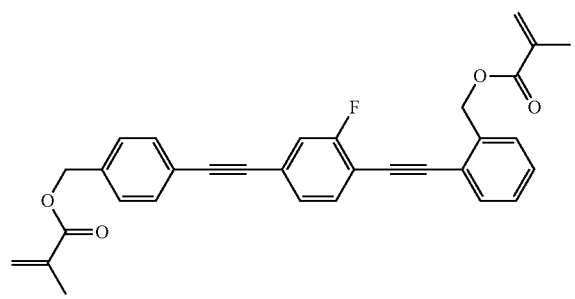
(1-4-12)
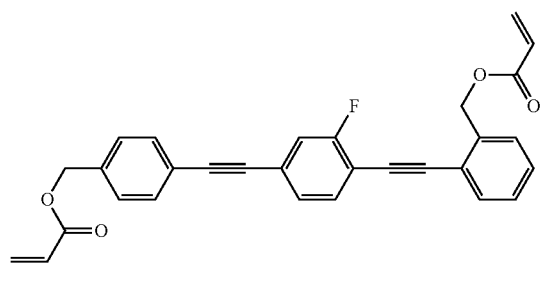
(1-4-13)
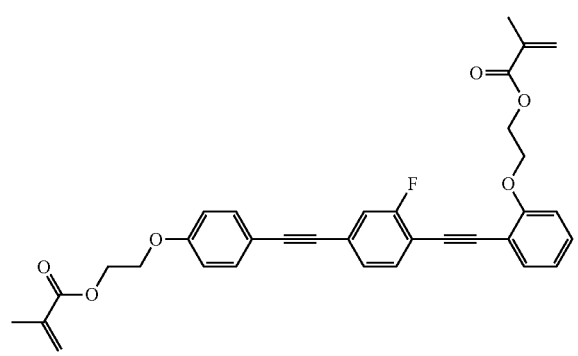
(1-4-14)
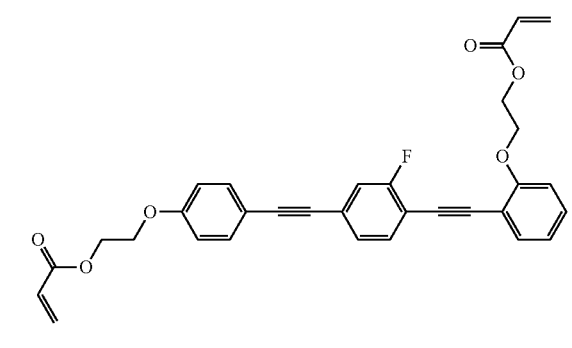
(1-4-15)
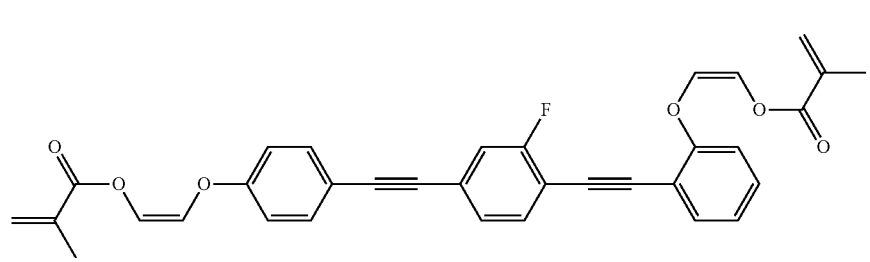
(1-4-16)
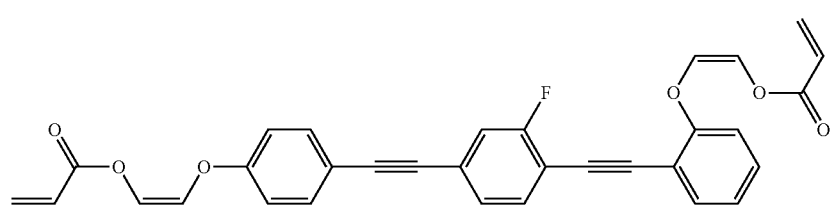

(1-4-17)
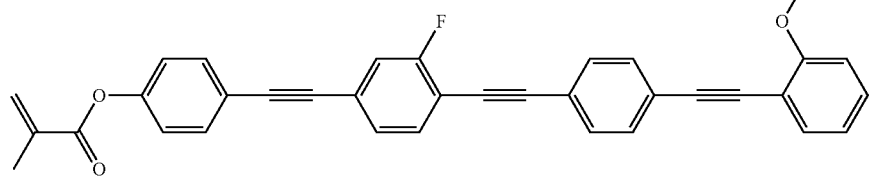
(1-4-18)
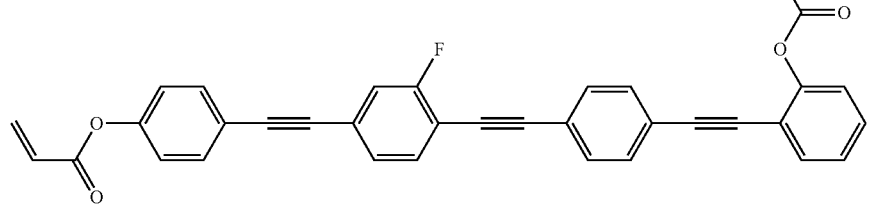
(1-4-19)
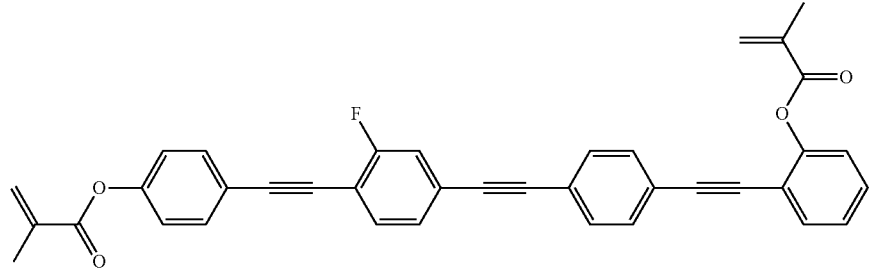
(1-4-20)
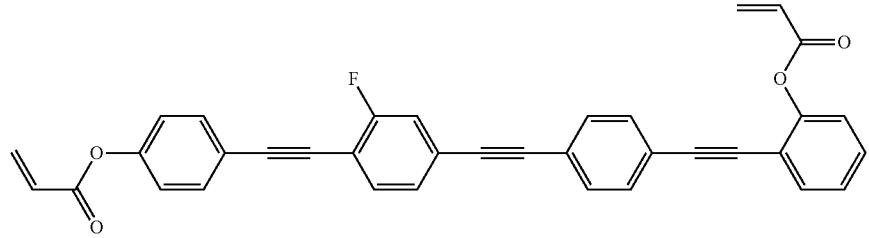
(1-4-21)
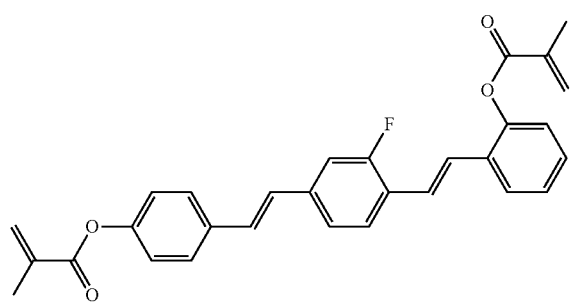
(1-4-22)
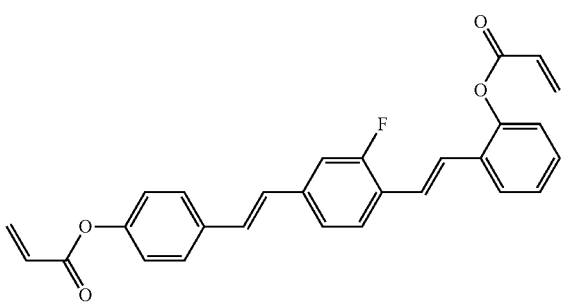

-continued
(1-4-23)
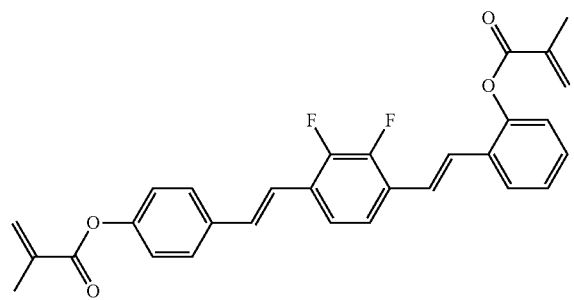
(1-4-24)
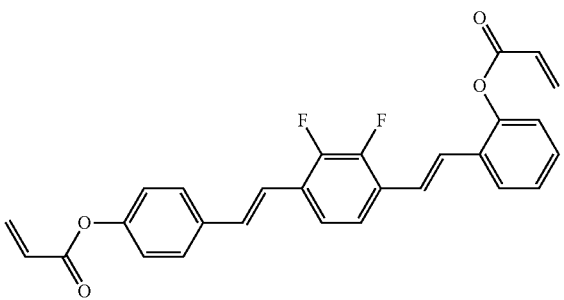
(1-4-25)
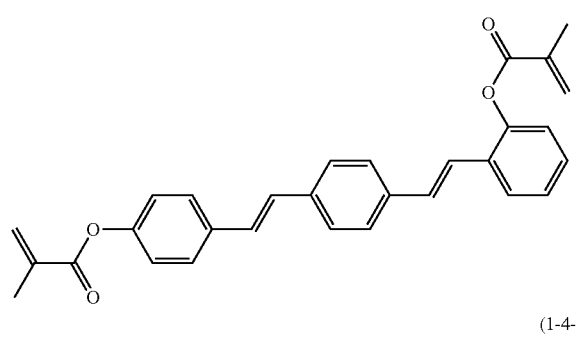
(1-4-26)
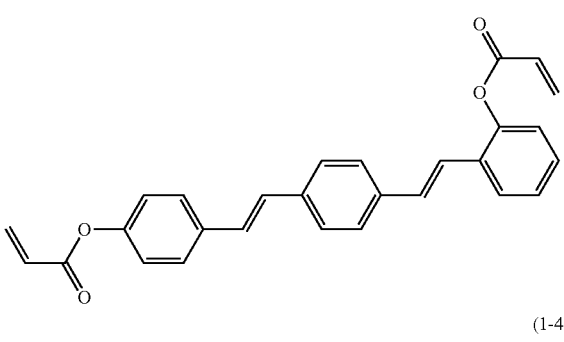
(1-4-27)
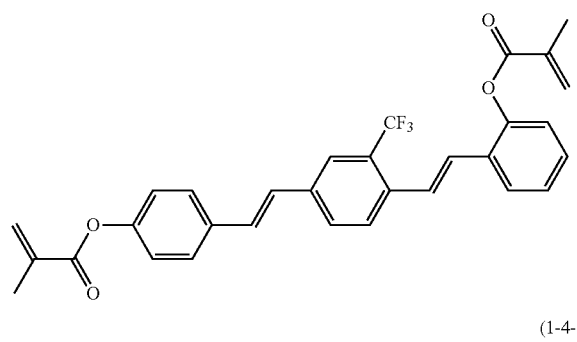
(1-4-28)
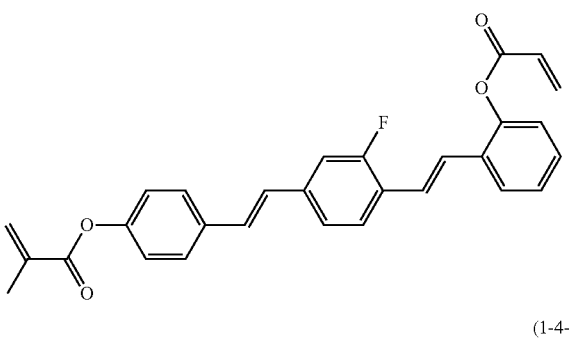
(1-4-29)
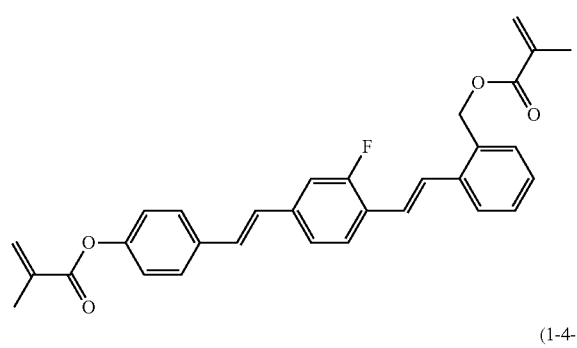
(1-4-30)
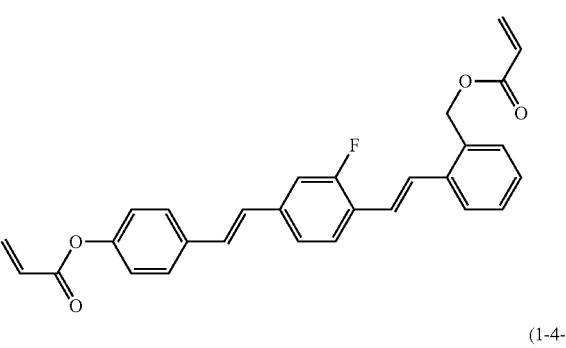
(1-4-31)
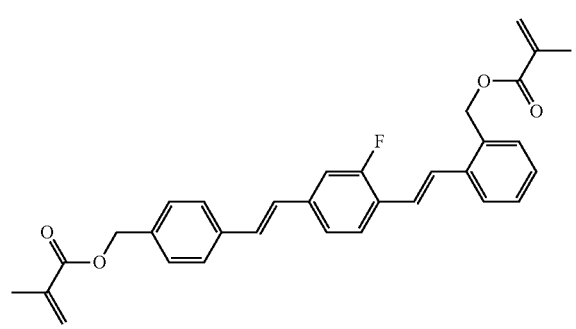
(1-4-32)
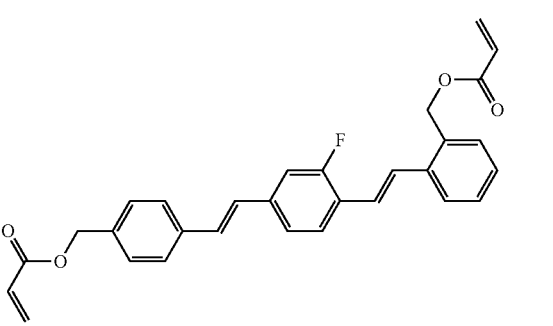

-continued
(1-4-33)
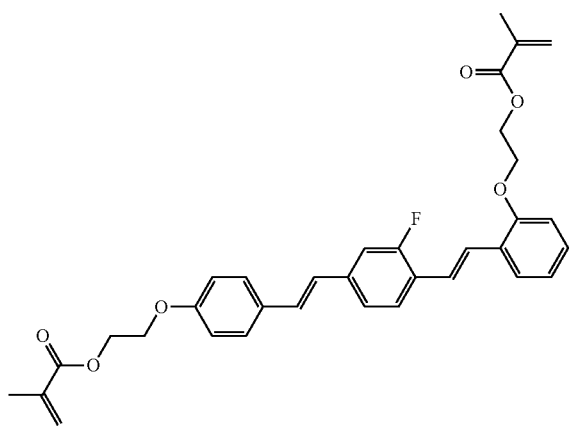
(1-4-34)
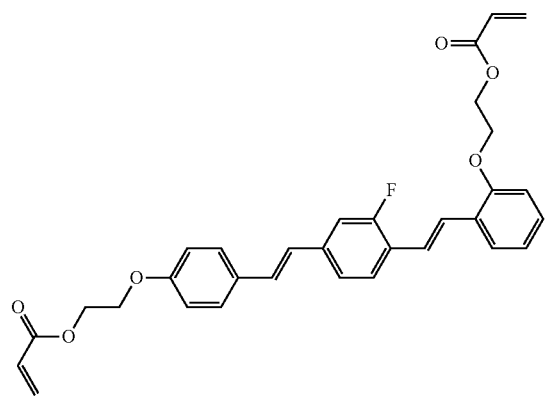
(1-4-35)
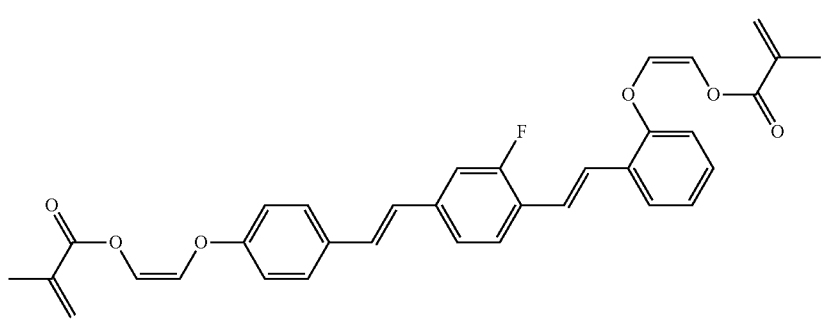
(1-4-36)
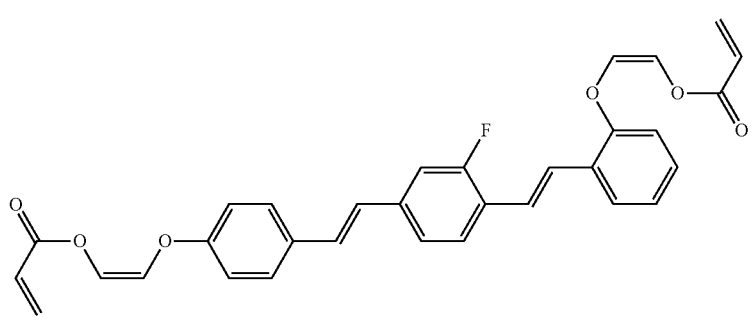
(1-4-37)
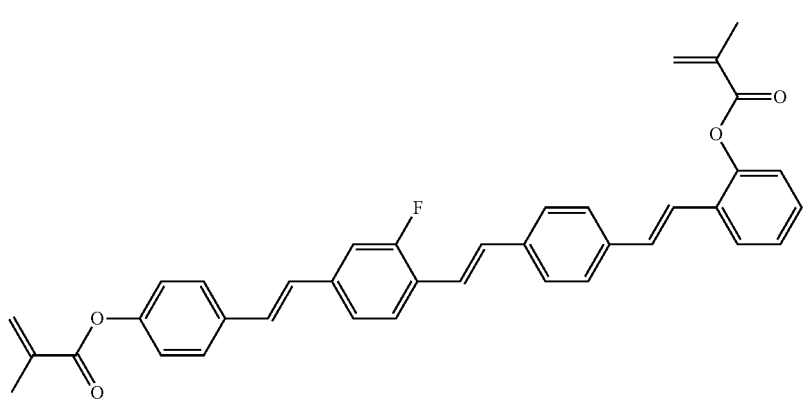

(1-4-38)
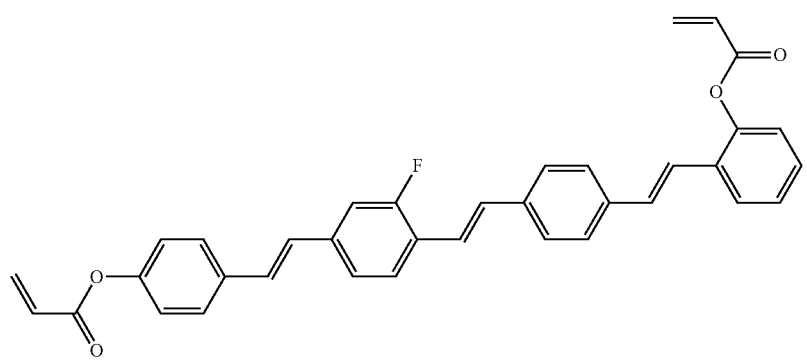
(1-4-39)
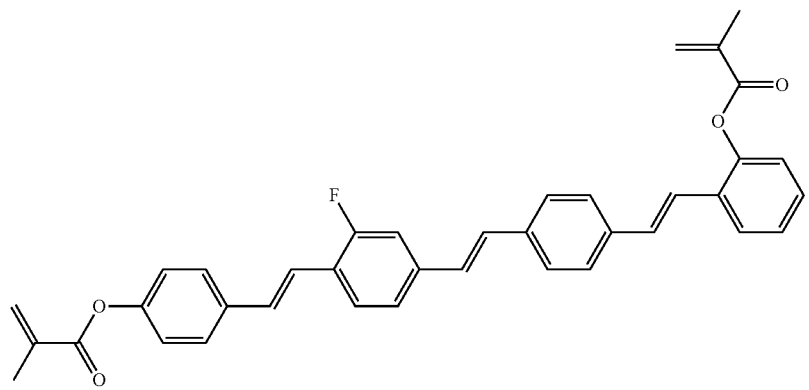
(1-4-40)
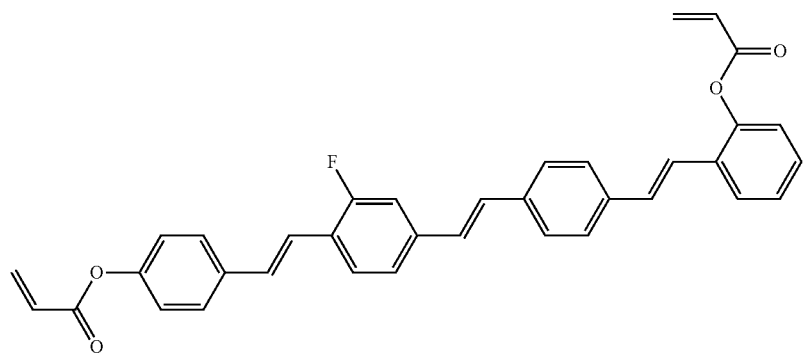
(1-5-1)
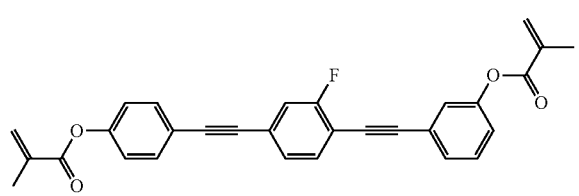
(1-5-2)
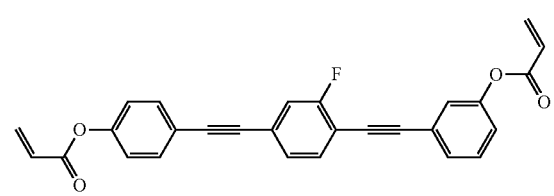
(1-5-3)
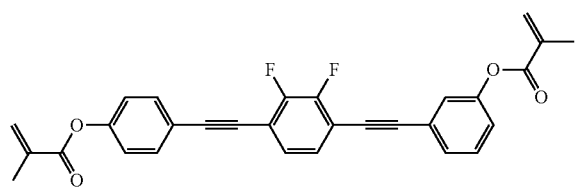
(1-5-4)
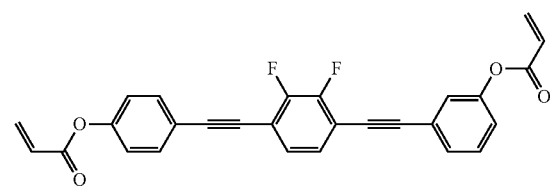

-continued
(1-5-5)
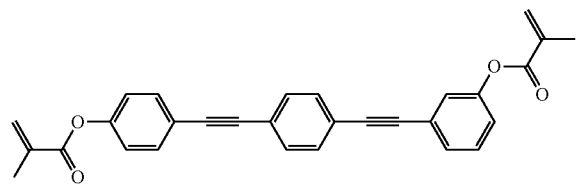
(1-5-6)
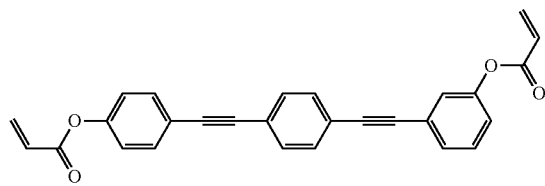
(1-5-7)
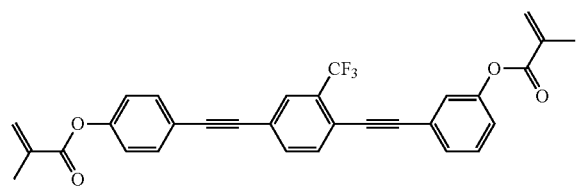
(1-5-8)
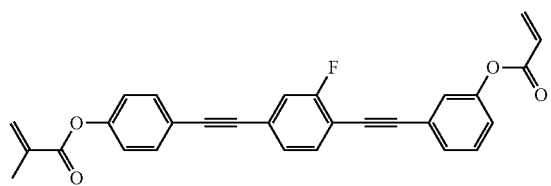
(1-5-9)
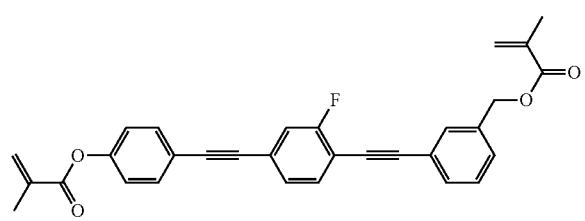
(1-5-10)
(1-5-11)
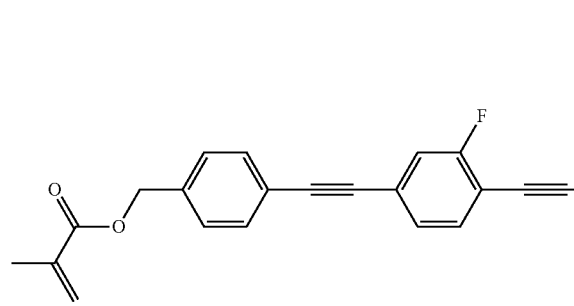
(1-5-12)
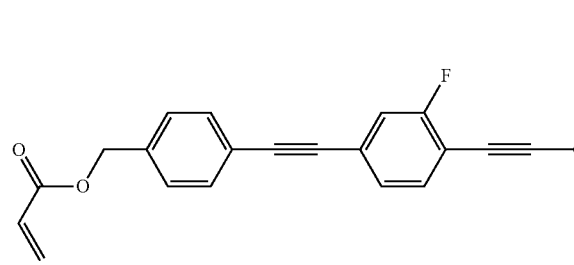
(1-5-13)
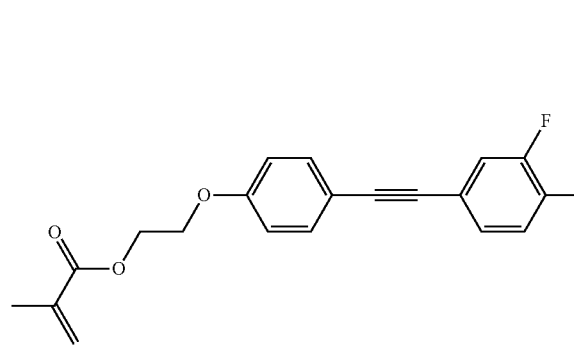

(1-5-14)
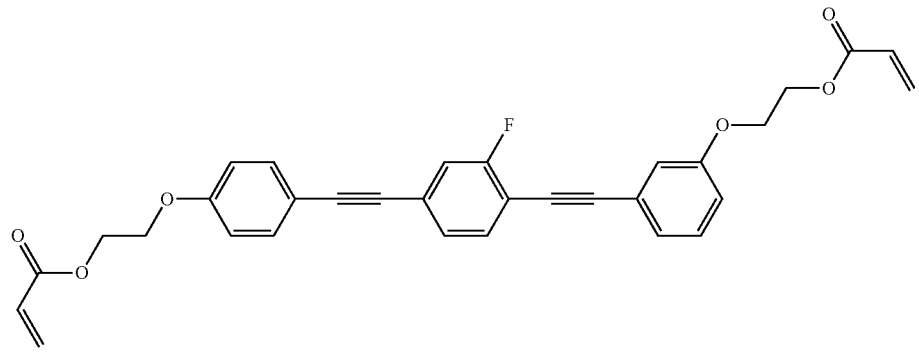
(1-5-15)
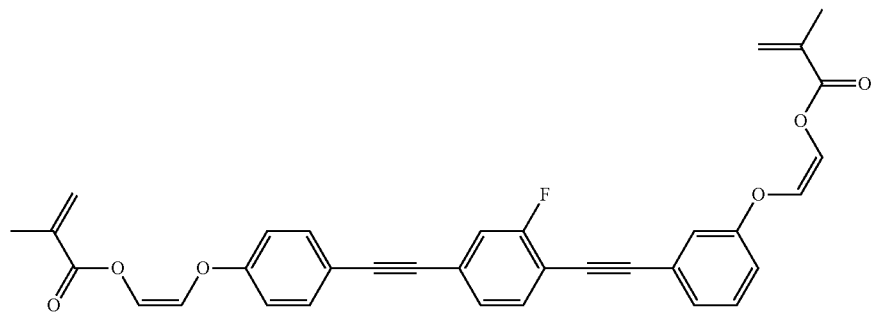
(1-5-16)
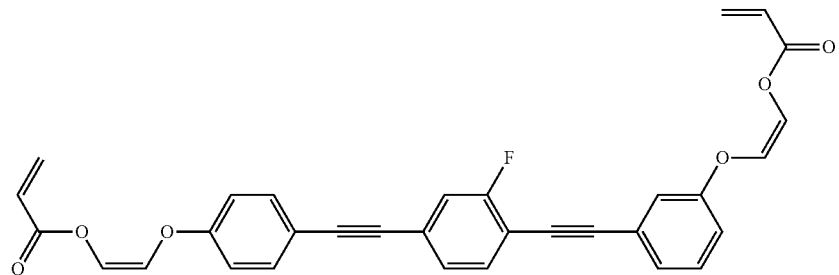
(1-5-17)
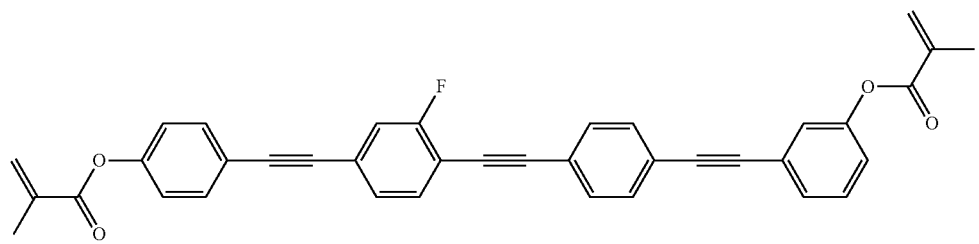
(1-5-18)
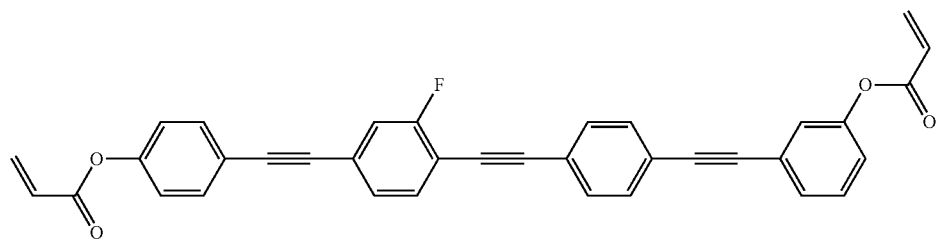

(1-5-19)
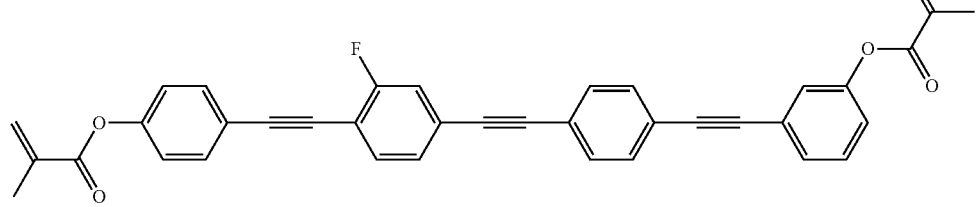
(1-5-20)
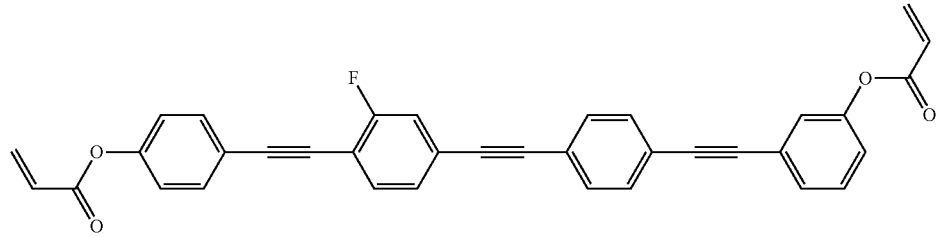
(1-5-21)
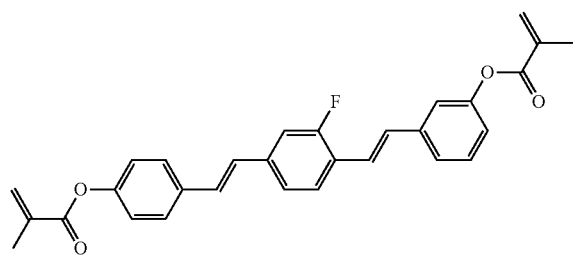
(1-5-22)
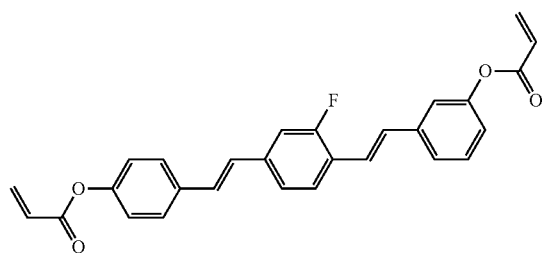
(1-5-23)
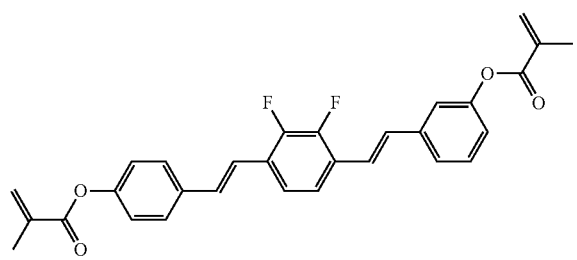
(1-5-24)
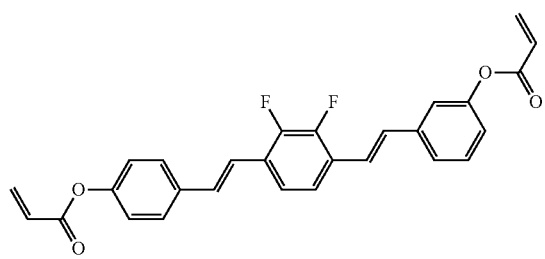
(1-5-25)
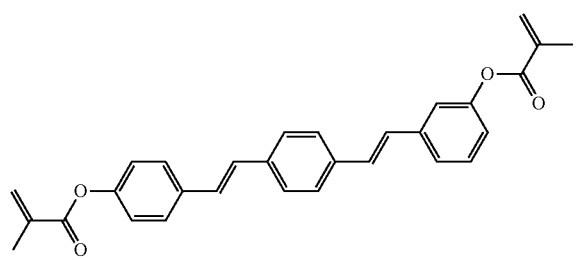
(1-5-26)
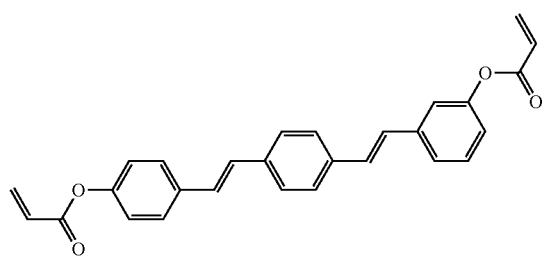
(1-5-27)
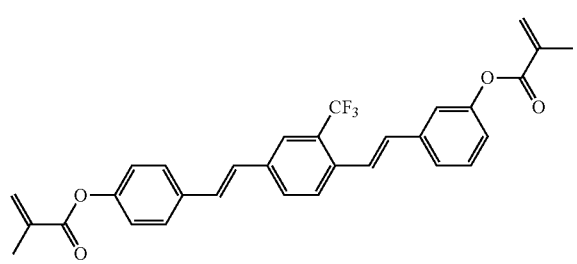
(1-5-28)
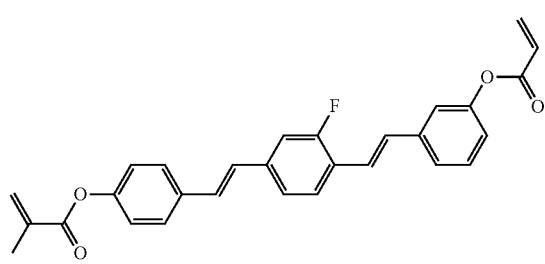

-continued
(1-5-29)
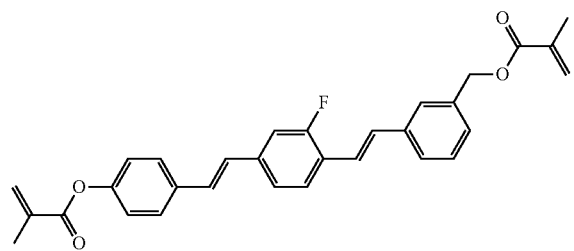
(1-5-30)
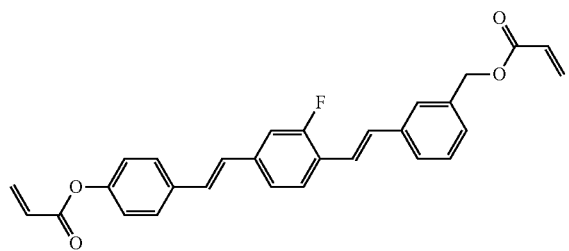
(1-5-31)
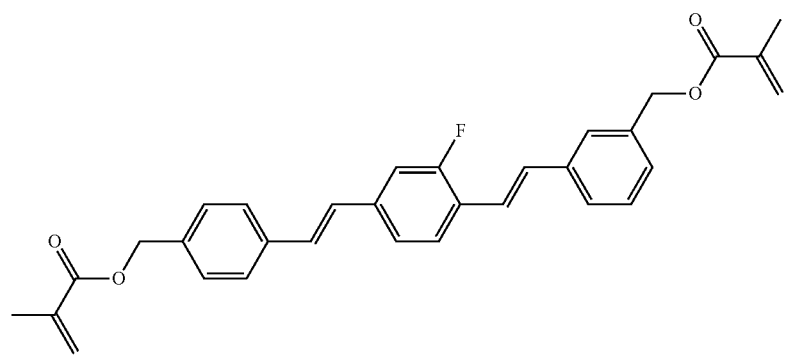
(1-5-32)
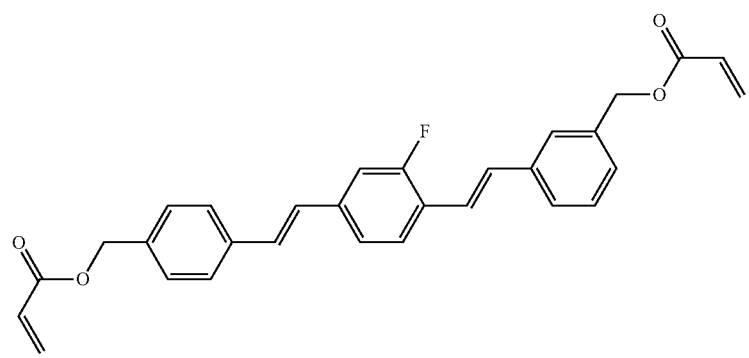
(1-5-33)
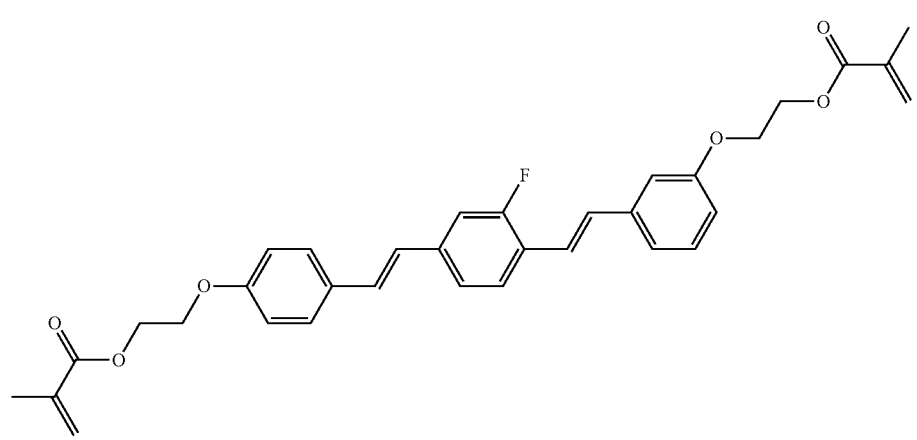

(1-5-34)
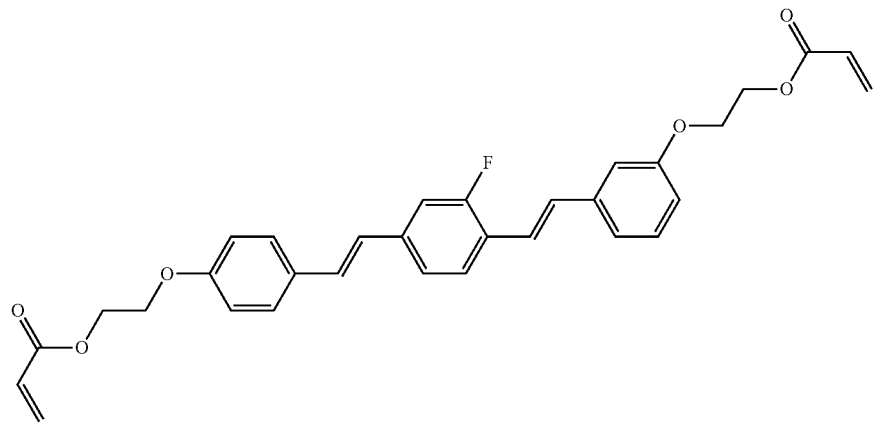
(1-5-35)
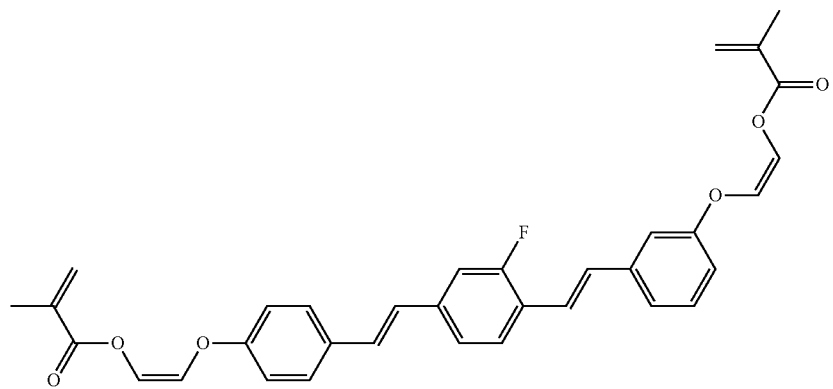
(1-5-36)
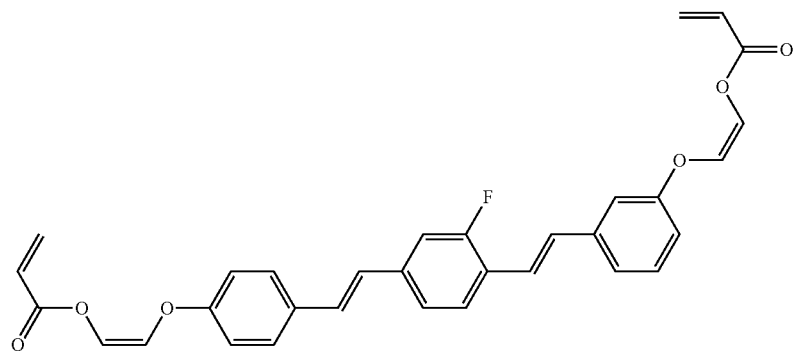
(1-5-37)
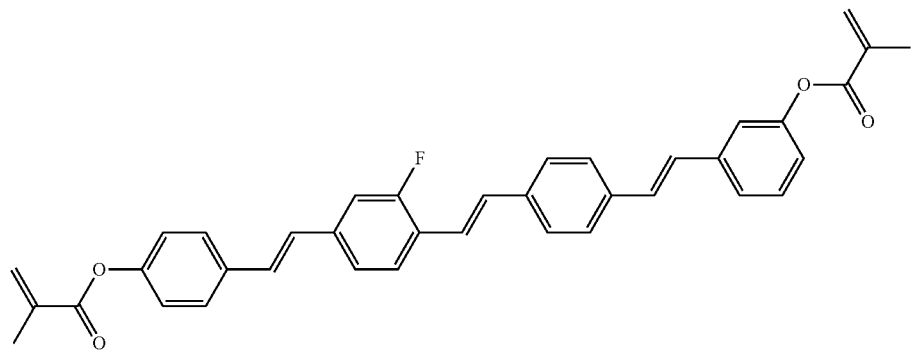

(1-5-38)
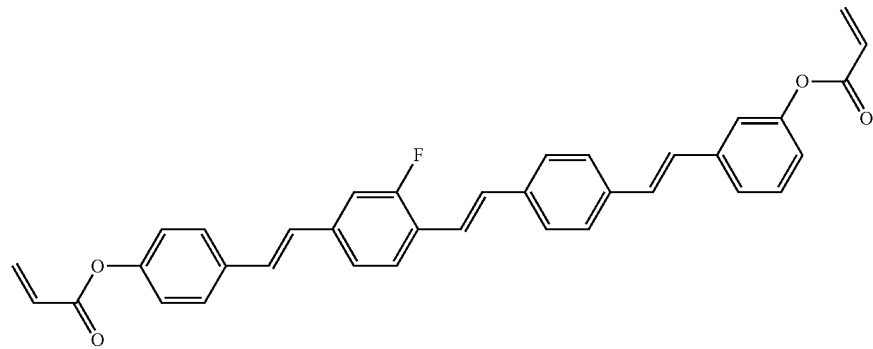
(1-5-39)
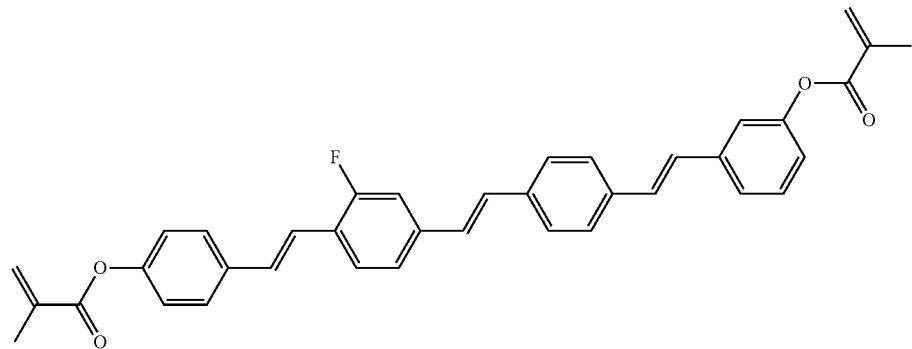
(1-5-40)
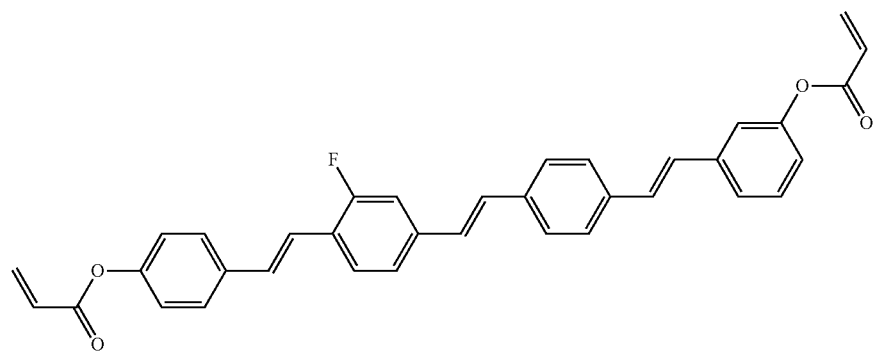
(1-6-1)
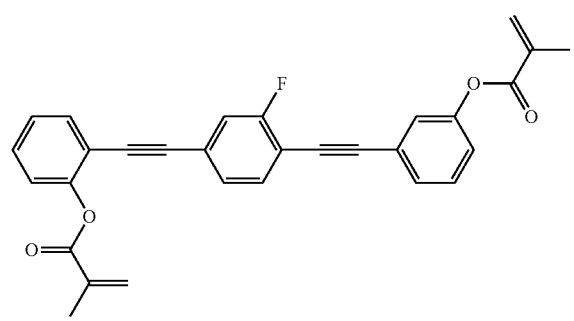
(1-6-2)
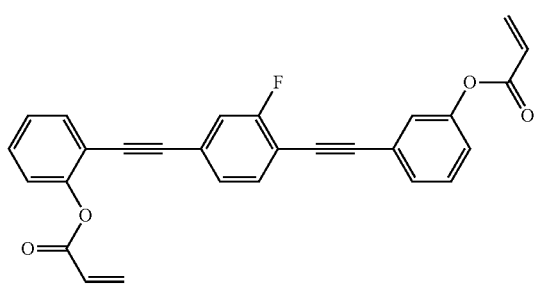

-continued
(1-6-3)
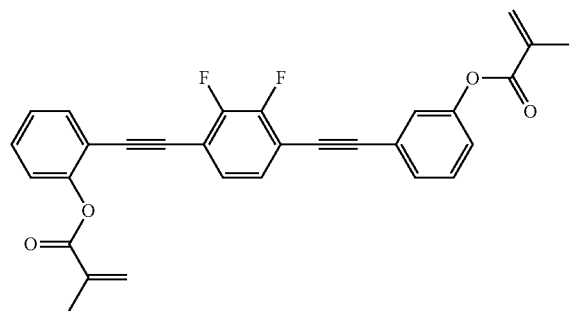
(1-6-4)
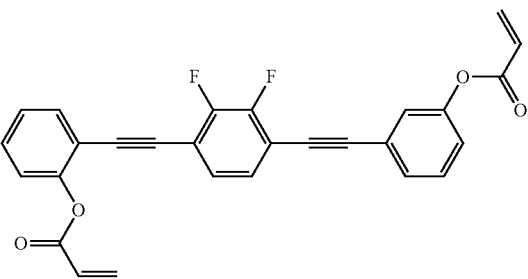
(1-6-5)
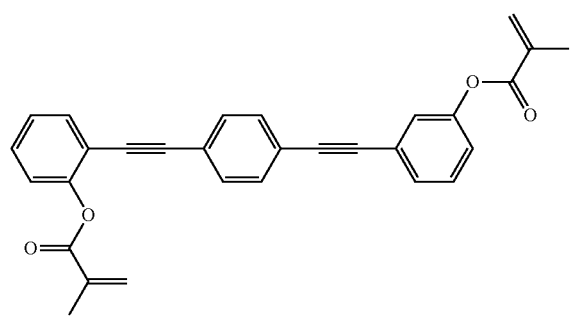
(1-6-6)
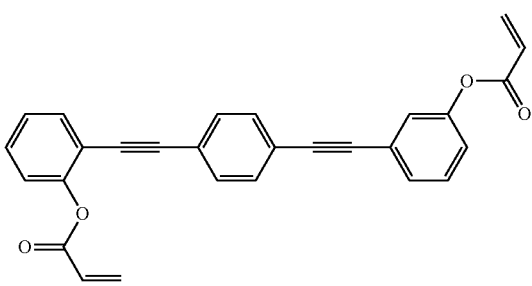
(1-6-7)
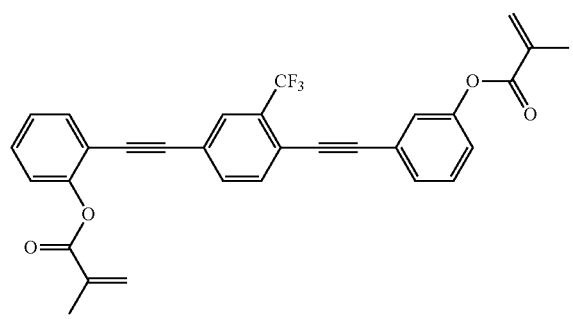
(1-6-8)
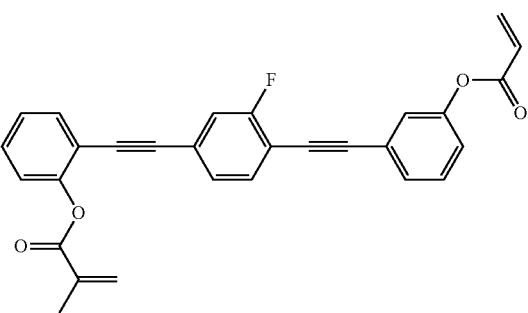
(1-6-9)
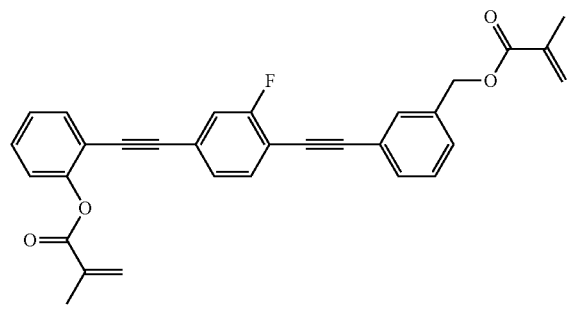
(1-6-10)
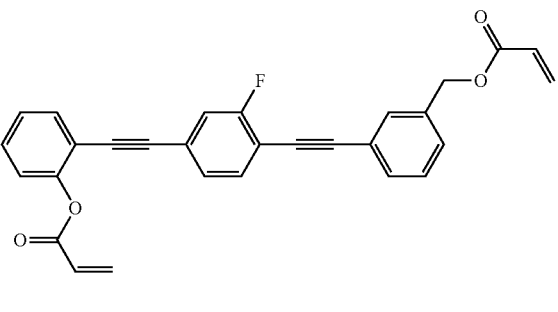

-continued
(1-6-11)
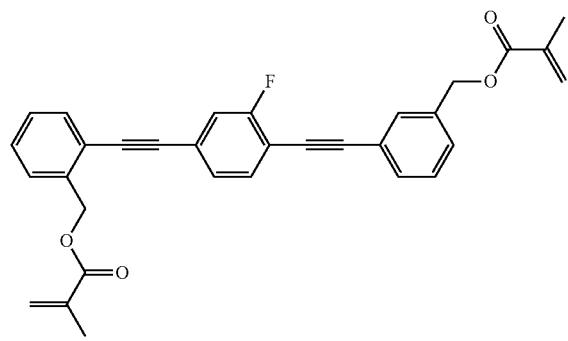
(1-6-12)
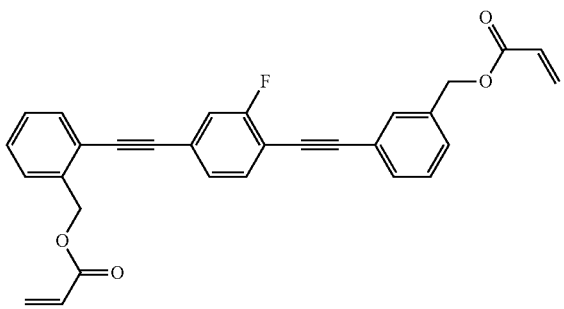
(1-6-13)
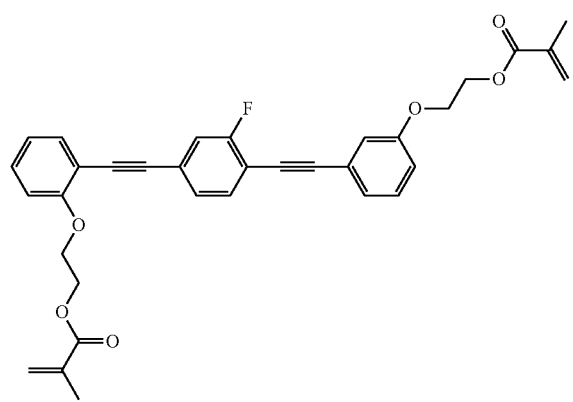
(1-6-14)
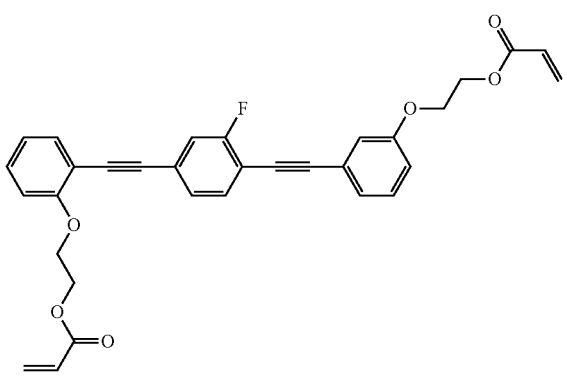
(1-6-15)
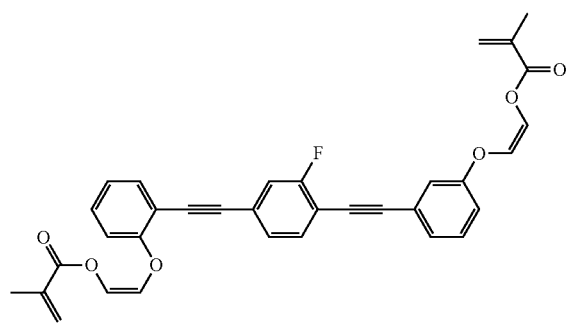
(1-6-16)
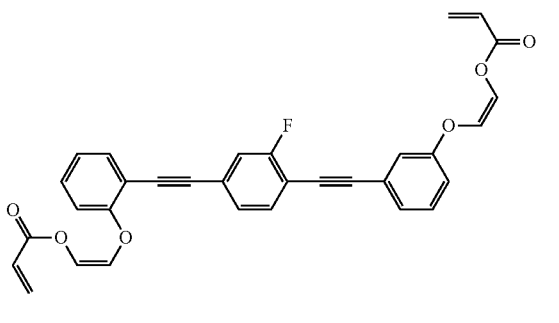
(1-6-17)
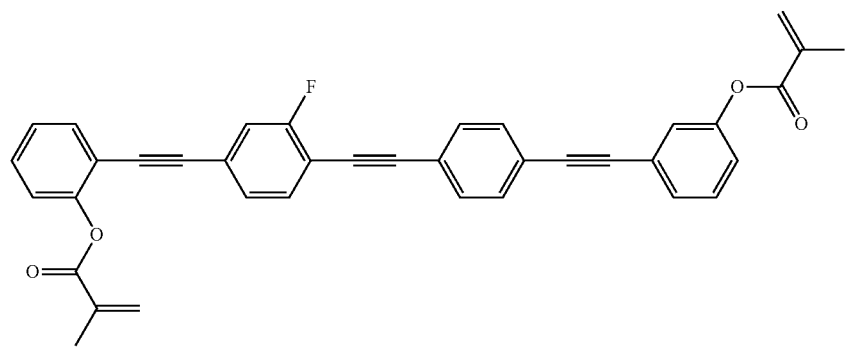

(1-6-18)
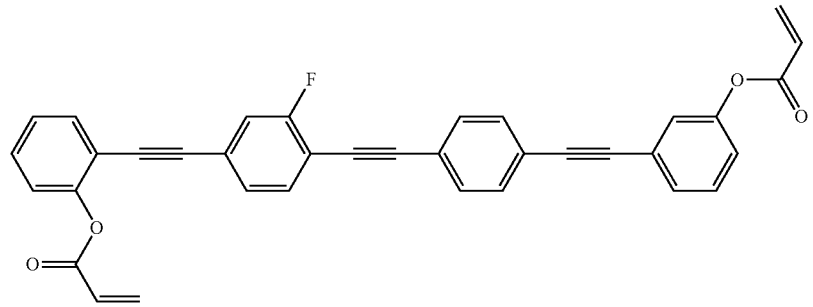
(1-6-19)
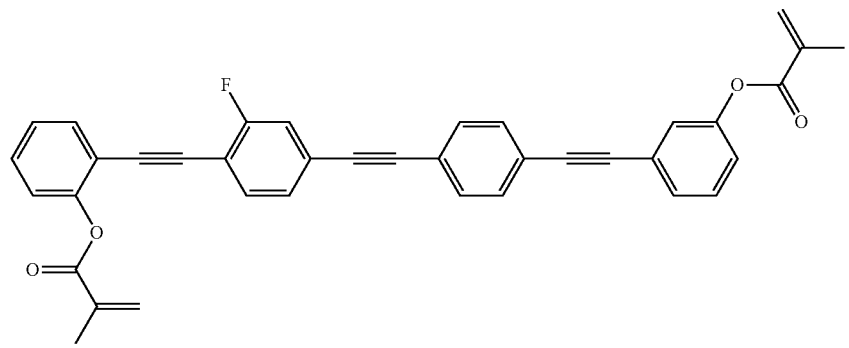
(1-6-20)
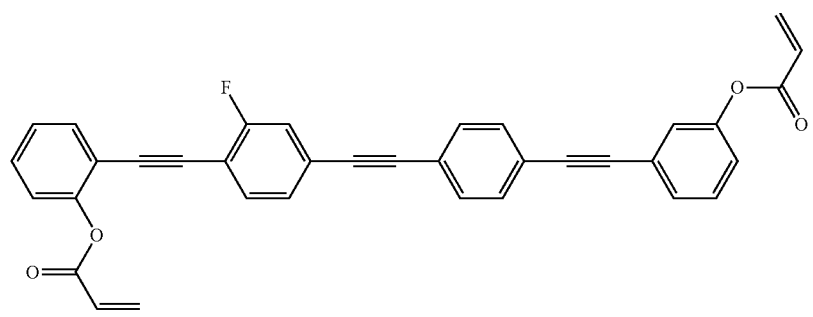
(1-6-21)
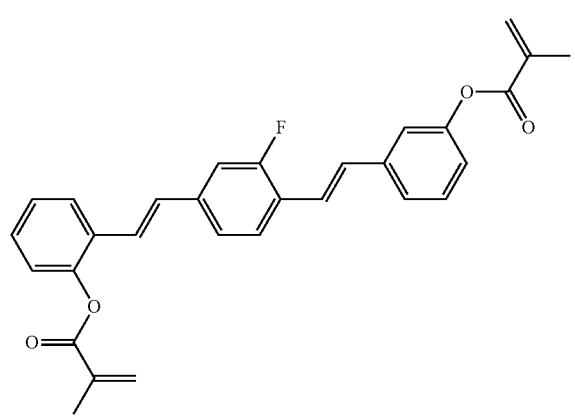
(1-6-22)
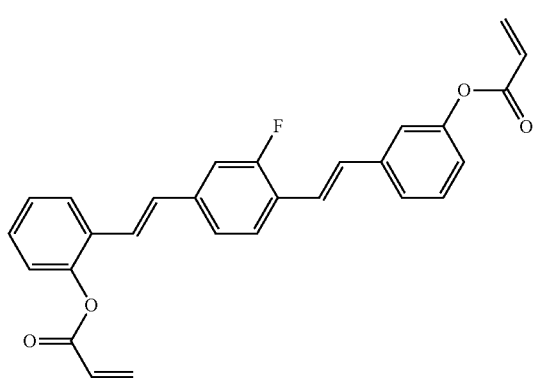

-continued
(1-6-23)
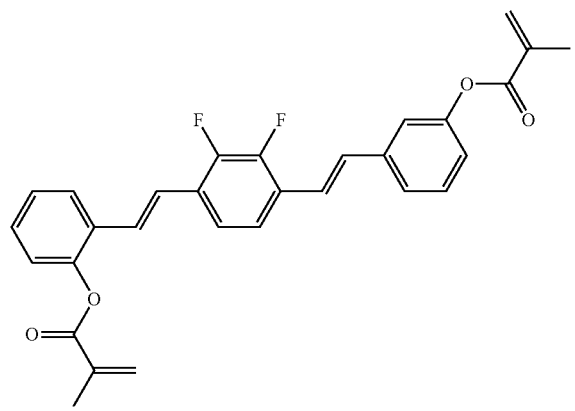
(1-6-24)
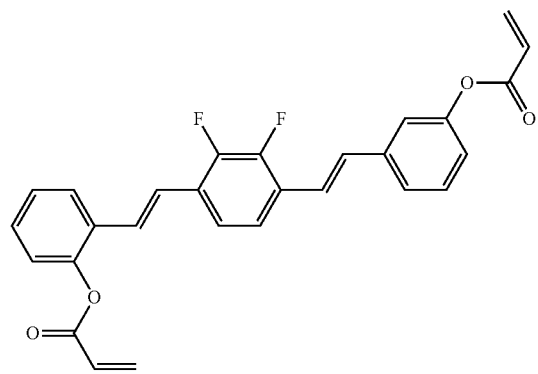
(1-6-25)
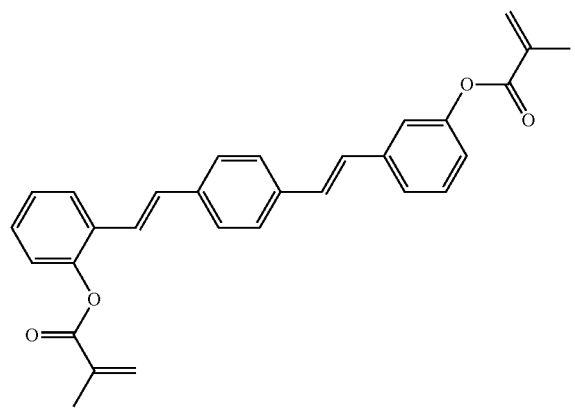
(1-6-26)
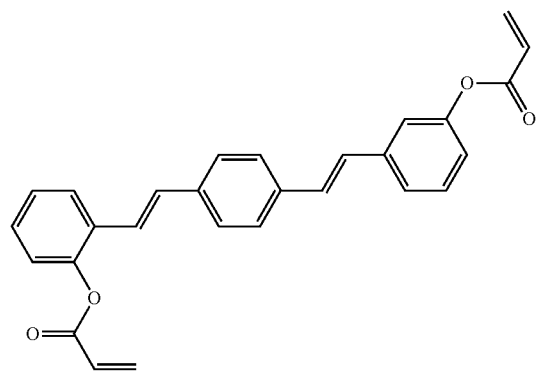
(1-6-27)
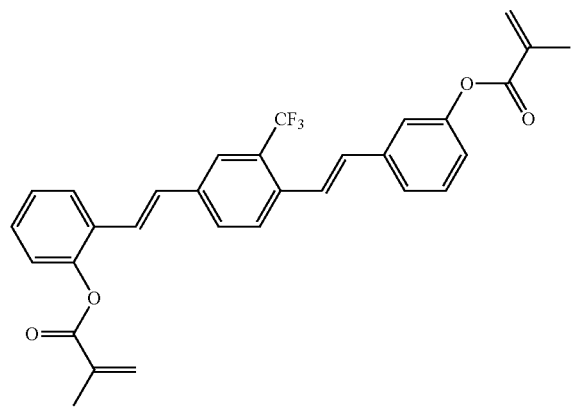
(1-6-28)
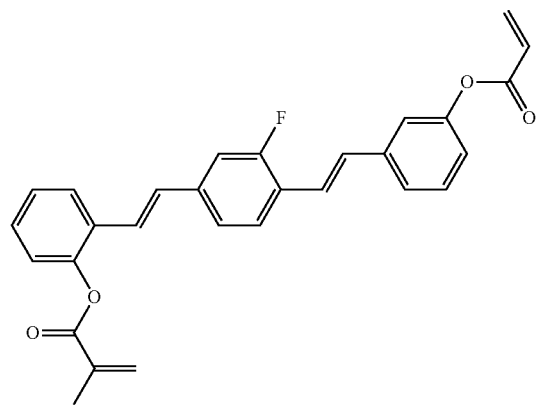

-continued
(1-6-29)
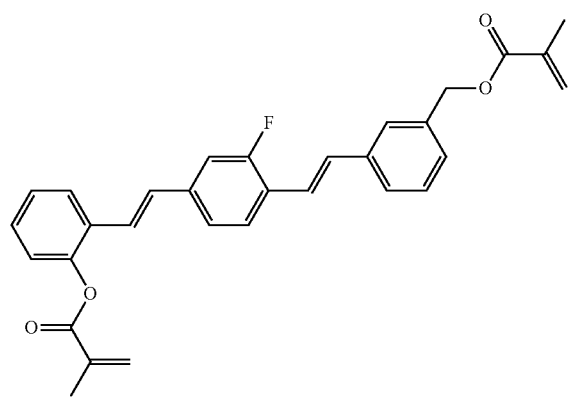
(1-6-30)
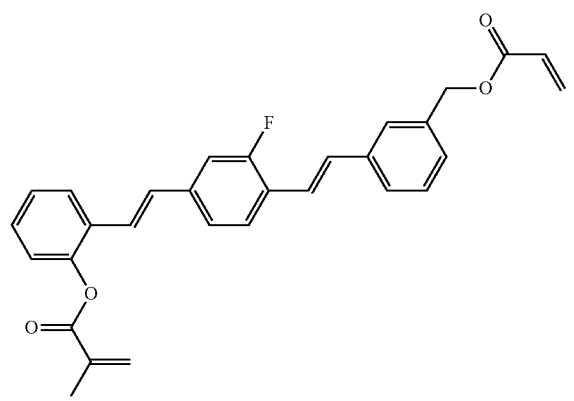
(1-6-31)
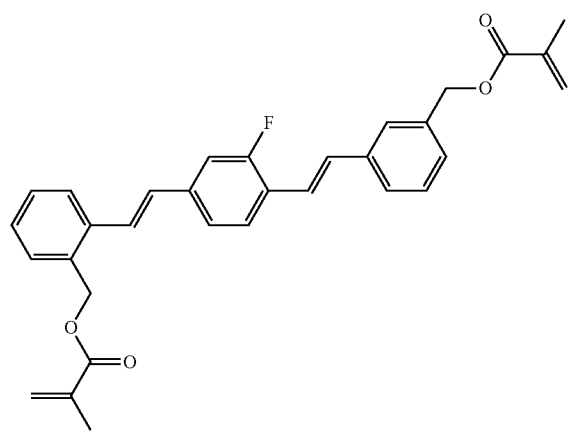
(1-6-32)
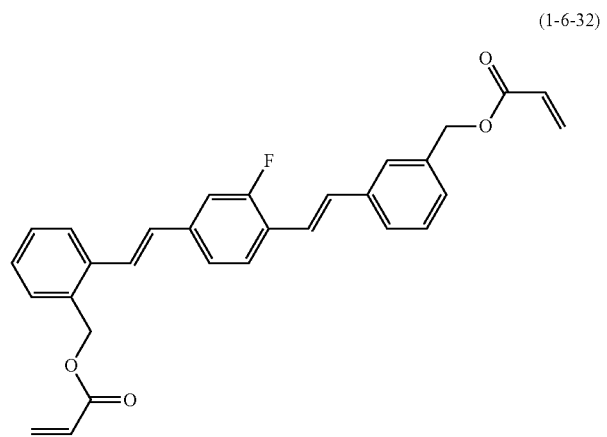
(1-6-33)
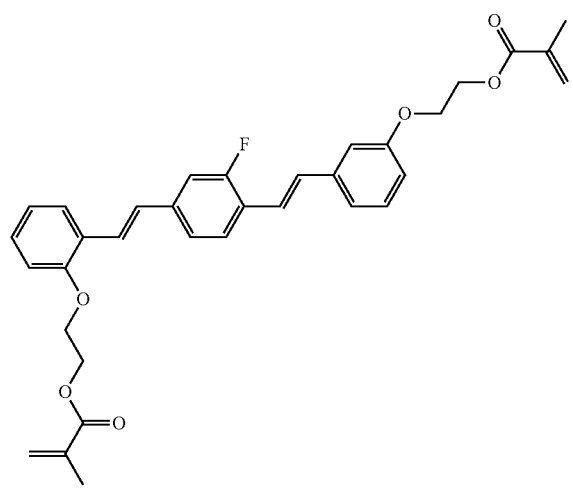
(1-6-34)
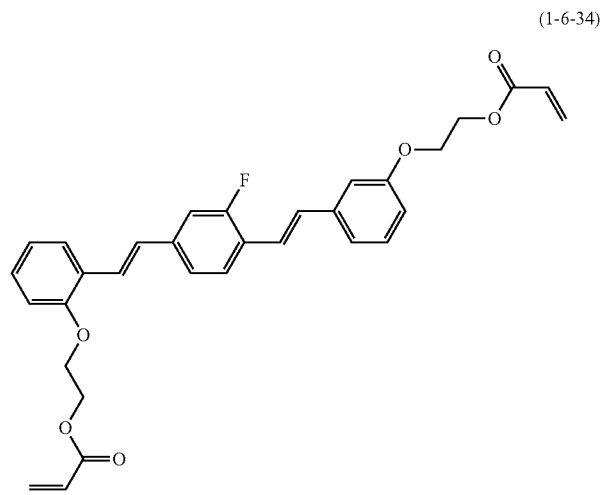

-continued
(1-6-35)
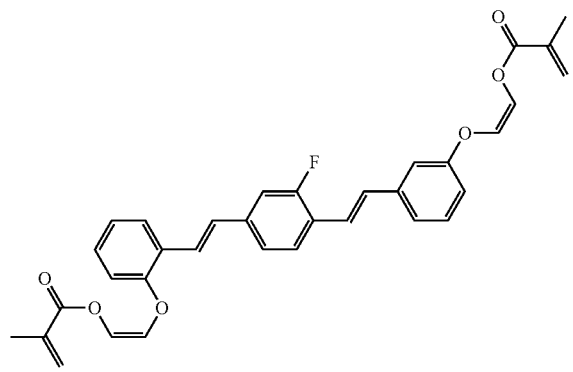
(1-6-36)
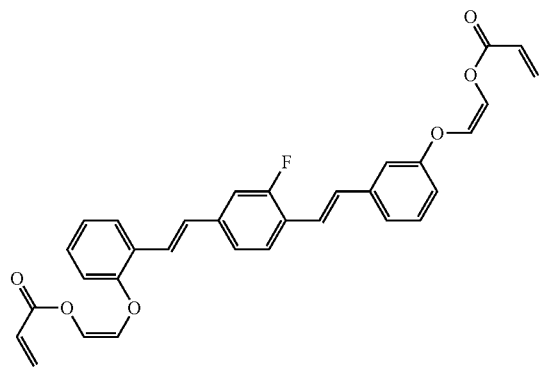
(1-6-37)
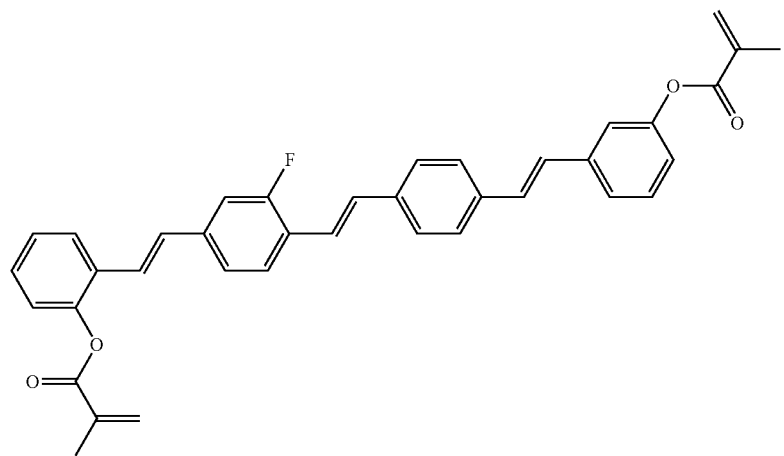
(1-6-38)
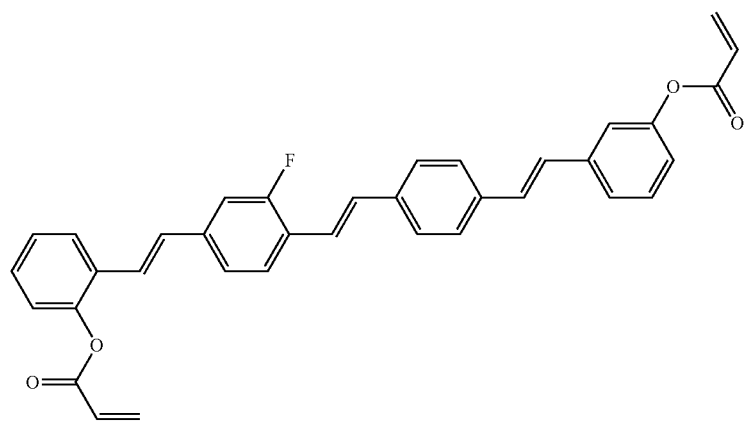

(1-6-39)

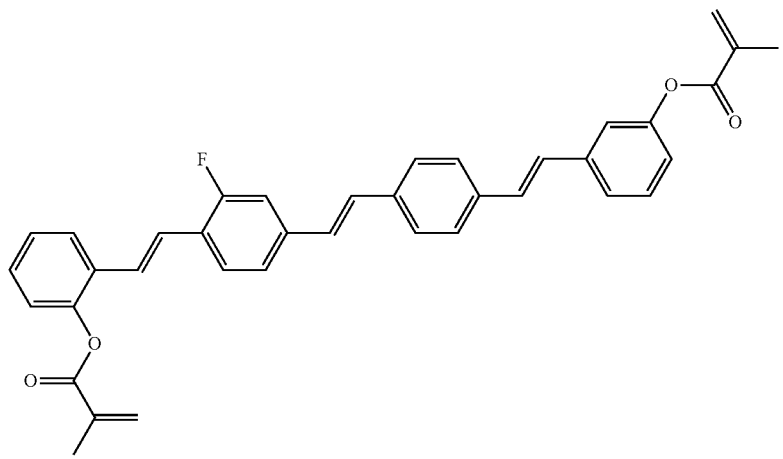

(1-6-40)

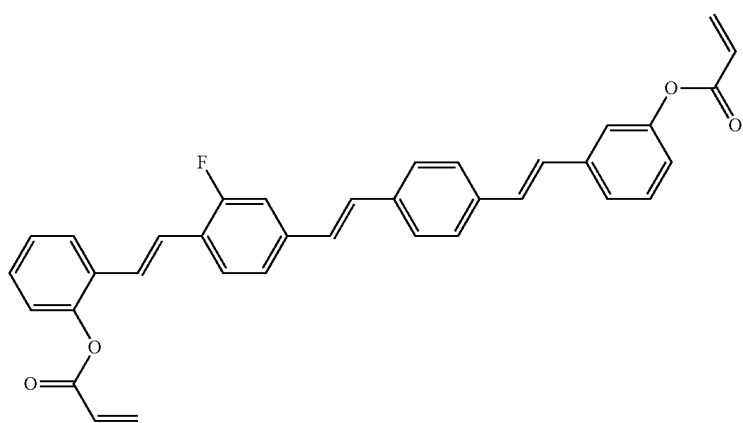

Comparative Example 1

Compound (R-1) was prepared for comparison according to the following scheme.

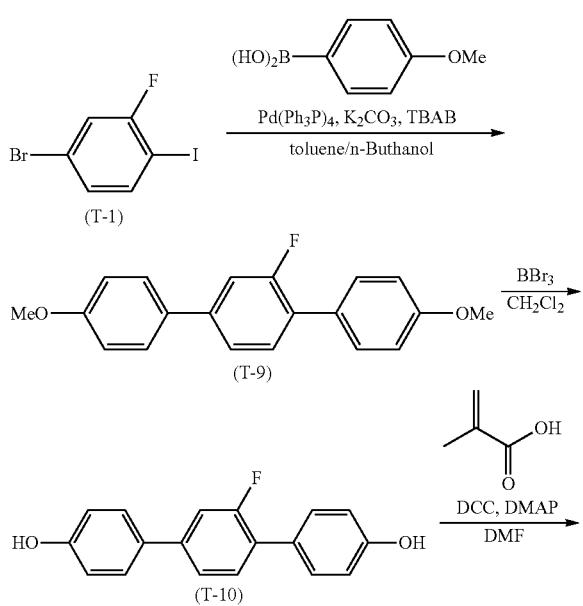

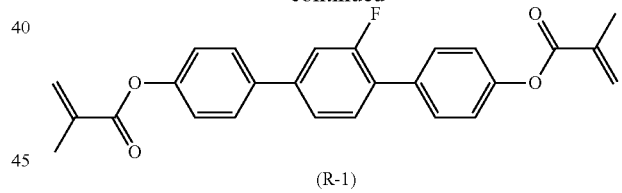

(R-1)

First Step: Preparation of Compound (T-9)

A mixed solvent (360 ml; toluene:2-propanol:water=1:1:1) was added to compound (T-1) (40.0 g), 4-methoxyphenylboronic acid (42.42 g), 5% Pd/C (1.2 g; N.E. Chemcat Corporation), tetrabutylammonium bromide (17.4 g) and potassium carbonate (73.49 g), and the mixture was heated under reflux. After 32 hours, Pd/C was filtered and the filtrate was extracted with toluene. The extract was washed with brine, dried and concentrated under reduced pressure. The residue was purified by silica gel chromatography (toluene/ethyl acetate=19/1 by volume) to give compound (T-9; 3 g, 7.2% yield) as colorless crystals.

Second Step: Preparation of Compound (T-10)

Compound (T-9) (8.62 g) was dissolved in methylene chloride (100 ml) and boron tribromide (70.0 ml; a 1.0 mol/liter methylene chloride solution) was added dropwise at −20° C. or lower. The mixture was stirred at room temperature overnight. The reaction mixture was poured into ice-water (100 ml) and extracted with methylene chloride (100 ml). The extract was washed with brine, dried and concentrated under reduced pressure. The residue was purified by silica gel chromatography (ethyl acetate) to give compound (T-10; 4.2 g, 53.6% yield) as brown crystals.

Third Step: Preparation of (R-1)

The reaction of compound (T-10) (4.0 g) was carried out in the same manner as in Example 1 gave colorless crystals of the comparative compound (R-1).

$^{1}$H-NMR (δ ppm; CDCl$_{3}$): 7.64-7.64 (m, 4H), 7.50 (dd, J=8.1, 8.0 Hz, 1H), 7.43 (dd, J=8.0, 1.7 Hz, 1H), 7.38 (dd, J=11.9, 1.7 Hz, 1H), 7.23 (d, J=8.5 Hz, 2H×2), 6.38 (s, 1H×2), 5.79-5.78 (m, 1H×2) and 2.09 (s, 3H×2). $^{19}$F-NMR (δ ppm; CDCl$_{3}$): −118.10 (dd, J=11.9, 8.1 Hz, 1F).

The physical properties of the comparative compound (R-1) were as follows. Melting point: 179.11° C., starting temperature of polymerization: 184.15° C.

lamp, Execure 4000-D made by Hoya Candeo Optronics Corp. was used for the irradiation with ultraviolet light. The amount of the polymerizable compound remained in the composition was measured with HPLC. Table 1 summarizes the results, together with the results on the irradiation with ultraviolet light for 400 seconds (30,000 mJ). "Unreacted reactant" was expressed as a ratio of the unreacted polymerizable compound to the added polymerizable compound. "2% or less" shows that the unreacted polymerizable compound could not be detected. It was found from the table that two compounds of the invention were consumed by the polymerization although the unreacted reactant was remained with regard to the comparative compound (R-1). Accordingly, it is concluded that the compound of the invention is excellent in view of a high reactivity.

TABLE 1

Amount of unreacted polymerizable compound

| Polymerizable compound | Structural formula | Unreacted reactant (% by weight) | |
| --- | --- | --- | --- |
| | | 15,000 mJ | 30,000 mJ |
| Compound (1-1-1) | | 2% or less | 2% or less |
| Compound (1-1-67) | | 2% or less | 2% or less |
| Comparative compound (R-1) | | 41% | 26% |

Comparative Experiment

The following liquid crystal composition A was used for a comparative experiment.

| | | |
| --- | --- | --- |
| 3-H2B(2F,3F)-O2 | (9-4) | 18% |
| 5-H2B(2F,3F)-O2 | (9-4) | 17% |
| 3-HH1OCro(7F,8F)-5 | (13-6) | 6% |
| 3-HBB(2F,3F)-O2 | (10-7) | 10% |
| 4-HBB(2F,3F)-O2 | (10-7) | 6% |
| 5-HBB(2F,3F)-O2 | (10-7) | 6% |
| 2-HH-3 | (2-1) | 14% |
| 3-HH-4 | (2-1) | 8% |
| 3-HHB-1 | (3-1) | 5% |
| 3-HHB-3 | (3-1) | 6% |
| 3-HHB-O1 | (3-1) | 4% |

A polymerizable compound was added to this liquid crystal composition A in the ratio of 0.3% by weight. This composition was irradiated with ultraviolet light of 75 mW/cm$^{2}$ for 200 seconds (15,000 mJ). A mercury-xenon 2. Examples for the Polymerizable Composition The compounds described in Examples were expressed in terms of symbols based on the definition in Table 2 described below. In Table 2, the configuration of 1,4-cyclohexylene is trans. The parenthesized number next to a symbolized compound in Example indicates the number of the compound. The symbol (-) means any other liquid crystal compound. The content (percentage) of liquid crystal compounds means the percentages by weight (% by weight) based on the weight of the liquid crystal composition. Last, the values of physical properties of the composition were summarized. The physical properties were measured according to the method described above, and the measured values were reported without extrapolation.

TABLE 2

Method of Description of Compounds using Symbols
R—(A₁)—Z₁— . . . —Zₙ—(Aₙ)—R'

1) Left-terminal Group R—

| Group | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2{=}CH$— | V— |
| $C_nH_{2n+1}$—CH=CH— | nV— |
| $CH_2{=}CH$—$C_nH_{2n}$— | Vn— |
| $C_mH_{2m+1}$—CH=CH—$C_nH_{2n}$— | mVn— |
| $CF_2{=}CH$— | VFF— |
| $CF_2{=}CH$—$C_nH_{2n}$— | VFFn— |

2) Right-terminal Group —R'

| Group | Symbol |
|---|---|
| —$C_nH_{2n+1}$ | -n |
| —$OC_nH_{2n+1}$ | —On |
| —$COOCH_3$ | —EMe |
| —$CH{=}CH_2$ | —V |
| —CH=CH—$C_nH_{2n+1}$ | —Vn |
| —$C_nH_{2n}$—CH=$CH_2$ | —nV |
| —$C_mH_{2m}$—CH=CH—$C_nH_{2n+1}$ | —mVn |
| —CH=$CF_2$ | —VFF |
| —F | —F |
| —Cl | —CL |
| —$OCF_3$ | —OCF3 |
| —$OCF_2H$ | —OCF2H |
| —$CF_3$ | —CF3 |
| —CF=CH—$CF_3$ | —FVCF3 |
| —C≡N | —C |

3) Bonding Group —Zₙ—

| Group | Symbol |
|---|---|
| —$C_nH_{2n}$— | n |
| —COO— | E |
| —CH=CH— | V |
| —$CH_2O$— | 1O |
| —$OCH_2$— | O1 |
| —$CF_2O$— | X |
| —C≡C— | T |

4) Ring Structure —Aₙ—

| Structure | Symbol |
|---|---|
| 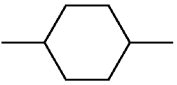 | H |
|  | B |
| 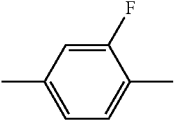 | B(F) |
| 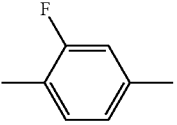 | B(2F) |
| 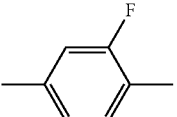 | B(F,F) |
| 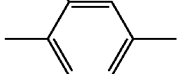 | B(2F,5F) |
| 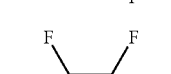 | B(2F,3F) |
| 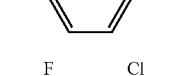 | B(2F,3CL) |
| 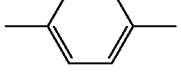 | G |
| 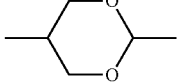 | dh |
|  | Dh |
| 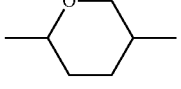 | Cro(7F,8F) |

5) Examples of Description

Example 1. 3-BB(F,F)XB(F,F)—F

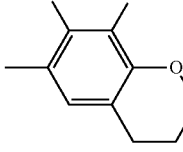

Example 2. 3-HBB(2F,3F)—O2

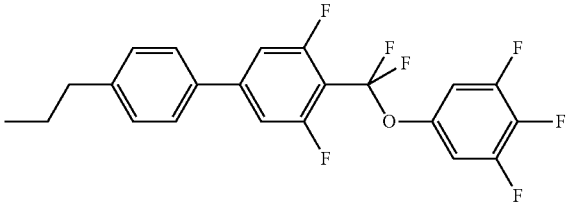 [SMILES: CCCc1ccc(-c2cc(F)c(C(F)(F)Oc3cc(F)c(F)c(F)c3)c(F)c2)cc1]

Example 3. 3-HH-4

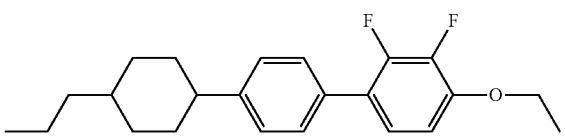 [SMILES: CCCC1CCC(c2ccc(-c3ccc(OCC)c(F)c3F)cc2)CC1]

TABLE 2-continued

Method of Description of Compounds using Symbols
R—(A$_1$)—Z$_1$— ... —Z$_n$—(A$_n$)—R'

Example 4. 3-HBB(F,F)—F

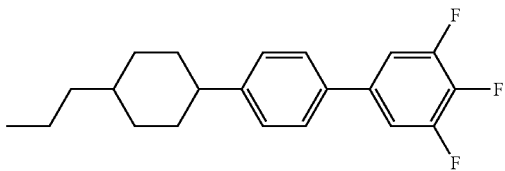 [SMILES: CCCC1CCC(c2ccc(-c3cc(F)c(F)c(F)c3)cc2)CC1]

Example 3

| | | |
|---|---|---|
| 2-HB-C | (5-2) | 5% |
| 3-HB-C | (5-2) | 12% |
| 3-HB-O2 | (2-5) | 15% |
| 2-BTB-1 | (2-10) | 3% |
| 3-HHB-F | (6-1) | 4% |
| 3-HHB-1 | (3-1) | 6% |
| 3-HHB-O1 | (3-1) | 7% |
| 3-HHB-3 | (3-1) | 14% |
| 3-HHEB-F | (6-10) | 4% |
| 5-HHEB-F | (6-10) | 4% |
| 2-HHB(F)-F | (6-2) | 7% |
| 3-HHB(F)-F | (6-2) | 7% |
| 5-HHB(F)-F | (6-2) | 7% |
| 3-HHB(F,F)-F | (6-3) | 5% |

Compound (1-1-1) was added to the preceding composition in the ratio of 0.2% by weight.

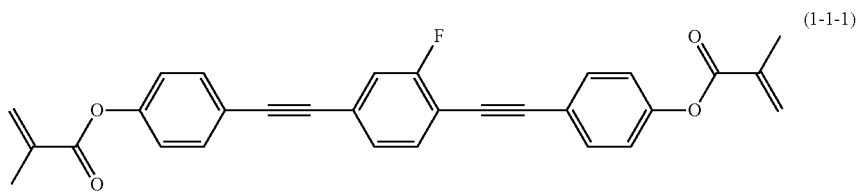

(1-1-1)

NI=101.0° C.; Δn=0.100; Δε=4.6; η=18.1 mPa·s.

Example 4

| | | |
|---|---|---|
| 5-HB-CL | (5-2) | 16% |
| 3-HH-4 | (2-1) | 10% |
| 3-HH-5 | (2-1) | 4% |
| 3-HHB-F | (6-1) | 4% |
| 3-HHB-CL | (6-1) | 3% |
| 4-HHB-CL | (6-1) | 4% |
| 3-HHB(F)-F | (6-2) | 10% |
| 4-HHB(F)-F | (6-2) | 9% |
| 5-HHB(F)-F | (6-2) | 9% |
| 7-HHB(F)-F | (6-2) | 8% |
| 5-HBB(F)-F | (6-2) | 4% |
| 1O1-HBBH-5 | (4-1) | 5% |
| 3-HHBB(F,F)-F | (7-6) | 2% |
| 4-HHBB(F,F)-F | (7-6) | 3% |
| 5-HHBB(F,F)-F | (7-6) | 3% |
| 3-HH2BB(F,F)-F | (7-15) | 3% |
| 4-HH2BB(F,F)-F | (7-15) | 3% |

Compound (1-1-108) was added to the preceding composition in the ratio of 0.3% by weight.

(1-1-108)

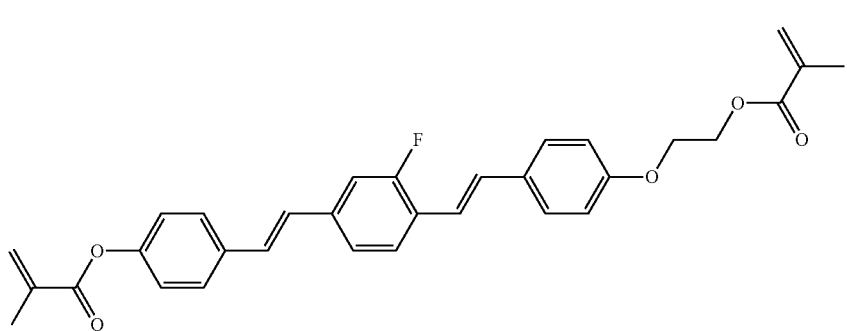

NI=118.8° C.; Δn=0.094; Δε=3.9; η=20.9 mPa·s.

Example 5

| | | |
|---|---|---|
| 3-HH-4 | (2-1) | 15% |
| 3-HH-5 | (2-1) | 4% |
| 3-HH-V | (2-1) | 3% |
| 3-HB-O2 | (2-5) | 12% |
| 3-H2B(2F,3F)-O2 | (9-4) | 15% |
| 5-H2B(2F,3F)-O2 | (9-4) | 15% |
| 3-HHB(2F,3CL)-O2 | (10-12) | 5% |
| 2-HBB(2F,3F)-O2 | (10-7) | 3% |
| 3-HBB(2F,3F)-O2 | (10-7) | 9% |
| 5-HBB(2F,3F)-O2 | (10-7) | 9% |
| 3-HHB-1 | (3-1) | 3% |
| 3-HHB-3 | (3-1) | 4% |
| 3-HHB-O1 | (3-1) | 3% |

Compound (1-1-67) was added to the preceding composition in the ratio of 0.2% by weight.

(1-1-67)

NI=75.6° C.; Δn=0.093; Δε=-4.0; η=18.8 mPa·s.

Example 6

| | | |
|---|---|---|
| 2-HH-3 | (2-1) | 21% |
| 3-HH-4 | (2-1) | 9% |
| 1-BB-3 | (2-8) | 9% |
| 3-HB-O2 | (2-5) | 2% |
| 3-BB(2F,3F)-O2 | (9-3) | 9% |
| 5-BB(2F,3F)-O2 | (9-3) | 6% |
| 2-HH1OB(2F,3F)-O2 | (10-5) | 13% |
| 3-HH1OB(2F,3F)-O2 | (10-5) | 19% |
| 3-HHB-1 | (3-1) | 5% |
| 3-HHB-O1 | (3-1) | 3% |
| 5-B(F)BB-2 | (3-8) | 4% |

Compound (B1) was added to the preceding composition in the ratio of 0.3% by weight.

(1-1-108)

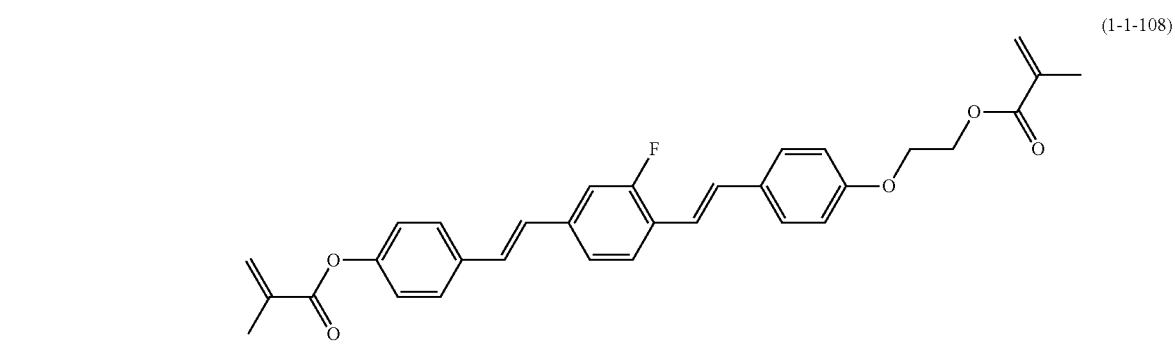 [SMILES: C=C(C)C(=O)OCCOc1ccc(/C=C/c2ccc(/C=C/c3ccc(OC(=O)C(=C)C)cc3)cc2F)cc1]

NI=73.8° C.; Δn=0.100; Δε=-3.0; η=15.0 mPa·s.

Example 7
| | | |
|---|---|---|
| 2-HH-3 | (2-1) | 16% |
| 7-HB-1 | (2-5) | 10% |
| 5-HB-O2 | (2-5) | 8% |
| 3-HB(2F,3F)-O2 | (9-1) | 17% |
| 5-HB(2F,3F)-O2 | (9-1) | 16% |
| 3-HHB(2F,3CL)-O2 | (10-12) | 3% |
| 4-HHB(2F,3CL)-O2 | (10-12) | 3% |
| 5-HBB(2F,3F)-O2 | (10-7) | 2% |
| 3-HH1OCro(7F,8F)-5 | (13-6) | 5% |
| 5-HBB(F)B-2 | (4-5) | 10% |
| 5-HBB(F)B-3 | (4-5) | 10% |
Compound (1-1-106) was added to the preceding composition in the ratio of 0.4% by weight.
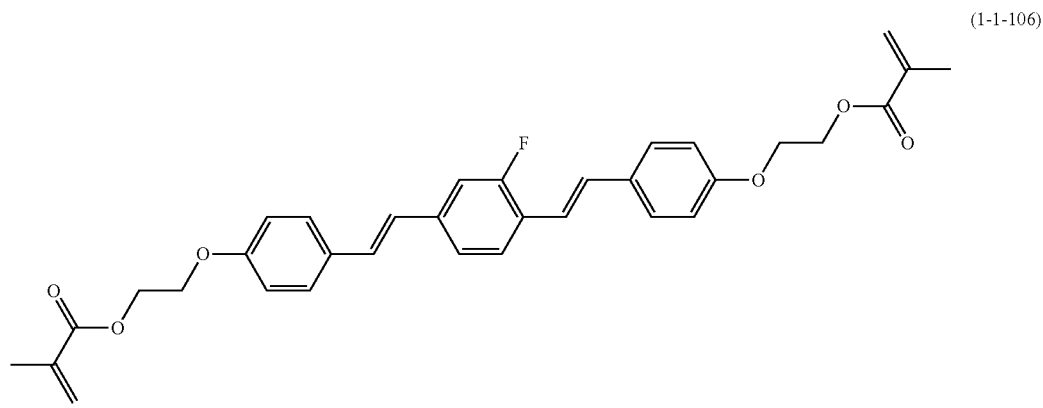 [SMILES: C=C(C)C(=O)OCCOc1ccc(/C=C/c2ccc(/C=C/c3ccc(OCCOC(=O)C(=C)C)cc3)c(F)c2)cc1]
(1-1-106)
NI=76.3° C.; Δn=0.106; Δε=−2.5; η=22.6 mPa·s.
Example 8
| | | |
|---|---|---|
| 1-BB-3 | (2-8) | 10% |
| 3-HH-V | (2-1) | 27% |
| 3-BB(2F,3F)-O2 | (9-3) | 15% |
| 2-HH1OB(2F,3F)-O2 | (10-5) | 20% |
| 3-HH1OB(2F,3F)-O2 | (10-5) | 14% |
| 3-HHB-1 | (3-1) | 8% |
| 5-B(F)BB-2 | (3-8) | 6% |
Compound (1-1-1) was added to the preceding composition in the ratio of 0.3% by weight.
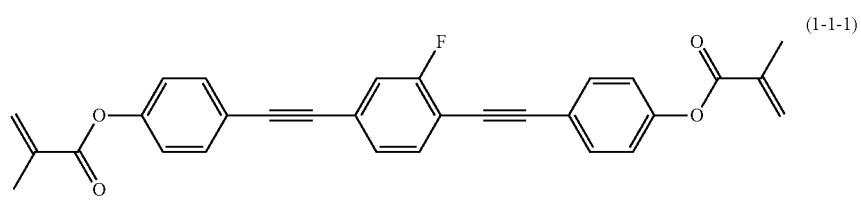 [SMILES: C=C(C)C(=O)Oc1ccc(C#Cc2ccc(C#Cc3ccc(OC(=O)C(=C)C)cc3)c(F)c2)cc1]
(1-1-1)
NI=73.8° C.; Δn=0.109; Δε=−3.1; η=15.6 mPa·s.

Example 9

| | | |
|---|---|---|
| 5-HB(F)B(F,F)XB(F,F)-F | (7-41) | 5% |
| 3-BB(F)B(F,F)XB(F,F)-F | (7-47) | 3% |
| 4-BB(F)B(F,F)XB(F,F)-F | (7-47) | 7% |
| 5-BB(F)B(F,F)XB(F,F)-F | (7-47) | 3% |
| 3-HH-V | (2-1) | 39% |
| 3-HH-V1 | (2-1) | 9% |
| 3-HHEH-5 | (3-13) | 3% |
| 3-HHB-1 | (3-1) | 4% |
| V-HHB-1 | (3-1) | 5% |
| V2-BB(F)B-1 | (3-6) | 5% |
| 1V2-BB-F | (5-1) | 3% |
| 3-BB(F,F)XB(F,F)-F | (6-97) | 11% |
| 3-HHBB(F,F)-F | (7-6) | 3% |

Compound (1-1-106) was added to the preceding composition in the ratio of 0.15% by weight.

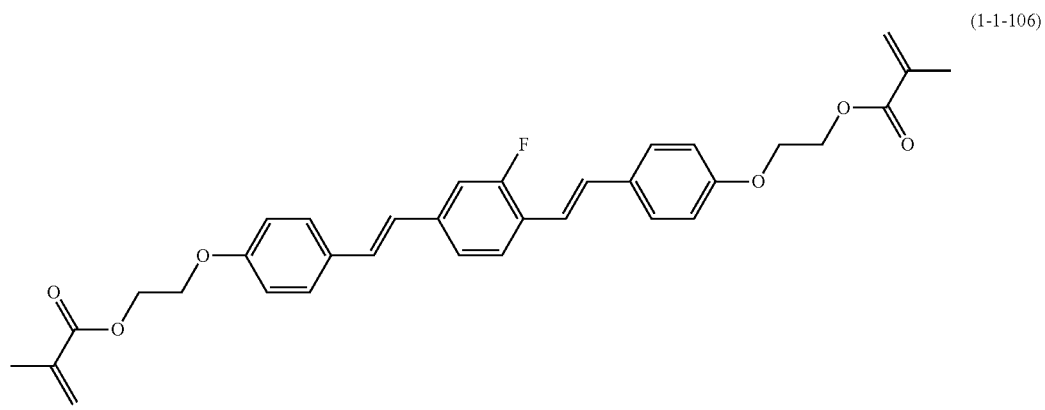 [SMILES: C=C(C)C(=O)OCCOc1ccc(/C=C/c2ccc(/C=C/c3ccc(OCCOC(=O)C(=C)C)cc3)c(F)c2)cc1]

(1-1-106)

NI=82.6° C.; Δn=0.105; Δε=6.3; η=12.2 mPa·s.

Example 10

| | | |
|---|---|---|
| 3-GB(F)B(F,F)XB(F,F)-F | (7-57) | 5% |
| 3-BB(F)B(F,F)XB(F,F)-F | (7-47) | 3% |
| 4-BB(F)B(F,F)XB(F,F)-F | (7-47) | 7% |
| 5-BB(F)B(F,F)XB(F,F)-F | (7-47) | 3% |
| 3-HH-V | (2-1) | 41% |
| 3-HH-V1 | (2-1) | 7% |
| 3-HHEH-5 | (3-13) | 3% |
| 3-HHB-1 | (3-1) | 6% |
| V-HHB-1 | (3-1) | 3% |
| V2-BB(F)B-1 | (3-7) | 5% |
| 1V2-BB-F | (5-1) | 3% |
| 3-BB(F,F)XB(F,F)-F | (6-97) | 6% |
| 3-GB(F,F)XB(F,F)-F | (6-113) | 5% |
| 3-HHBB(F,F)-F | (7-6) | 3% |

Compound (1-1-67) was added to the preceding composition in the ratio of 0.2% by weight.

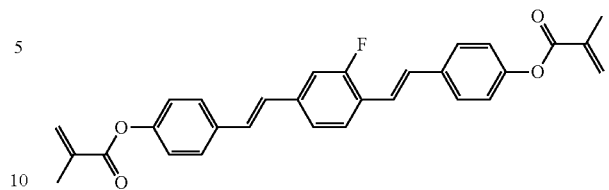

(1-1-67)

NI=81.5° C.; Δn=0.102; Δε=7.3; η=12.8 mPa·s.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A liquid crystal display device having a mode such as PSA can be made by the polymerization of a polymerizable composition including compound (1) and a liquid crystal composition. This device has a wide temperature range in which the device can be used, a short response time, a large voltage holding ratio, a low threshold voltage, a large contrast ratio and a long service life. Accordingly, compound (1) can be used for liquid crystal display projectors, liquid crystal display televisions and so forth. Compound (1) can also be used as a starting material for an optically anisotropic material.

What is claimed is:

1. A polymerizable composition including at least one compound selected from the group of compounds represented by formula (1) and at least one compound selected from the group of compounds represented by formula (2) to formula (4):

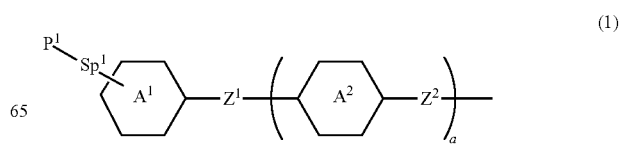

(1)

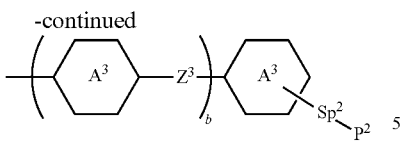

in formula (1),
P$^1$ and P$^2$ are independently a polymerizable group;
Sp$^1$ and Sp$^2$ are independently a single bond or alkylene having 1 to 6 carbons, and in this alkylene at least one —CH$_2$— may be replaced by —O—, —COO— or —OCO—, and at least one —CH$_2$CH$_2$— may be replaced by —CH=CH— or —C≡C—, and in these groups at least one hydrogen may be replaced by fluorine;
ring A$^1$, ring A$^2$, and ring A$^4$ are independently a divalent group derived from benzene, naphthalene, anthracene, pyrimidine or pyridine, and in this divalent group at least one hydrogen may be replaced by halogen, alkyl having 1 to 12 carbons, alkyl having 1 to 12 carbons in which at least one hydrogen has been replaced by halogen or -Sp$^3$-P$^3$, where the definition of P$^3$ is the same as that of P$^1$ and P$^2$ and the definition of Sp$^3$ is the same as that of Sp$^1$ and Sp$^2$, and ring A$^2$ may be independently a divalent group derived from cyclohexane, cyclohexene, tetrahydropyran or dioxane;
Z$^1$ and Z$^2$ are independently —CH=CH— or —C≡C—; and
a is 1, and b is; and then

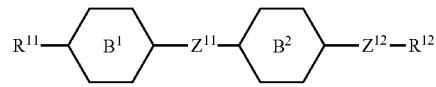

(2)

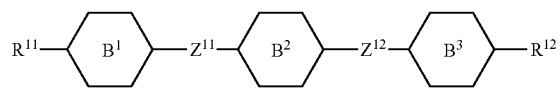

(3)

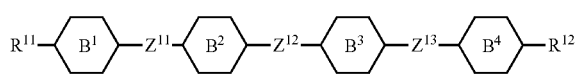

(4)

in formula (2) to formula (4),
R$^{11}$ and R$^{12}$ are independently alkyl having 1 to 10 carbons or alkenyl having 2 to 10 carbons, and in the alkyl and alkenyl at least one —CH$_2$— may be replaced by —O—, and at least one hydrogen may be replaced by fluorine;
ring B$^1$, ring B$^2$, ring B$^3$ and ring B$^4$ are independently 1,4-cyclohexylene, 1,4-phenylene, 2-fluoro-1,4-phenylene, 2,5-difluoro-1,4-phenylene or pyrimidine-2,5-diyl; and
Z$^{11}$, Z$^{12}$ and Z$^{13}$ are independently a single bond, —CH$_2$CH$_2$—, —CH=CH—, —C≡C— or —COO—.

2. The polymerizable composition according to claim 1, further including at least one compound selected from the group of compounds represented by formula (5) to formula (7):

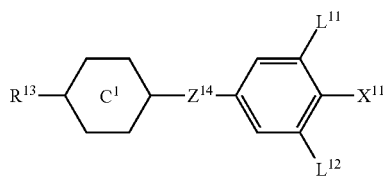

(5)

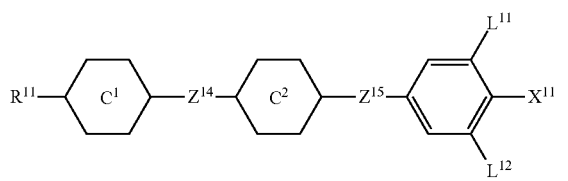

(6)

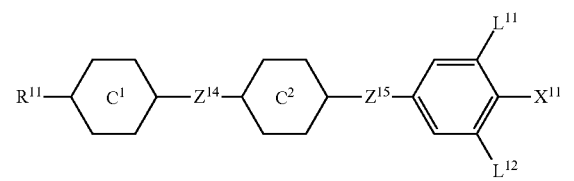

(7)

in formula (5) to formula (7),
R$^{13}$ is alkyl having 1 to 10 carbons or alkenyl having 2 to 10 carbons, and in the alkyl and alkenyl at least one —CH$_2$— may be replaced by —O—, and at least one hydrogen may be replaced by fluorine;
X$^{11}$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;
ring C$^1$, ring C$^2$ and ring C$^3$ are independently 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;
Z$^{14}$, Z$^{15}$ and Z$^{16}$ are independently a single bond, —CH$_2$CH$_2$—, —CH=CH—, —C≡C—, —COO—, —CF$_2$O—, —OCF$_2$—, —CH$_2$O— or —(CH$_2$)$_4$—; and
L$^{11}$ and L$^{12}$ are independently hydrogen or fluorine.

3. The polymerizable composition according to claim 1, further including at least one compound selected from the group of compounds represented by formula (8):

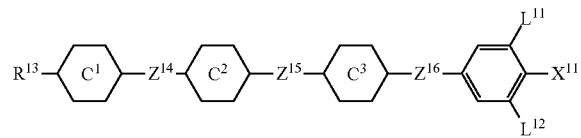

(8)

in formula (8),
R$^{14}$ is alkyl having 1 to 10 carbons or alkenyl having 2 to 10 carbons, and in the alkyl and alkenyl at least one —CH$_2$— may be replaced by —O—, and at least one hydrogen may be replaced by fluorine;
X$^{12}$ is —C≡N or —C≡C—C≡N;
ring D$^1$ is 1,4-cyclohexylene, 1,4-phenylene in which at least one hydrogen may be replaced by fluorine, tetrahydropyran-2,5-diyl, 1,3-dioxane-2,5-diyl or pyrimidine-2,5-diyl;
Z$^{17}$ is a single bond, —CH$_2$CH$_2$—, —C≡C—, —COO—, —CF$_2$O—, —OCF$_2$— or —CH$_2$O—;

$L^{13}$ and $L^{14}$ are independently hydrogen or fluorine; and i is 1, 2, 3 or 4.

4. The polymerizable composition according to claim 1, further including at least one compound selected from the group of compounds represented by formula (9) to formula (15):

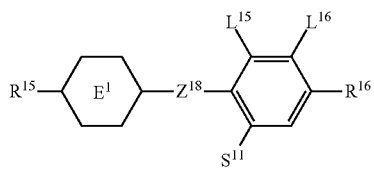
(9)

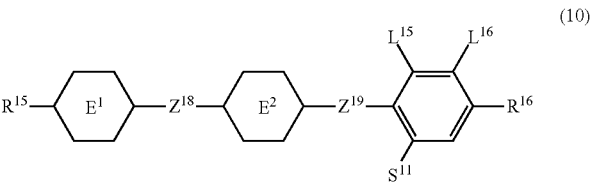
(10)

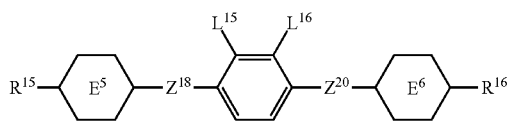
(11)

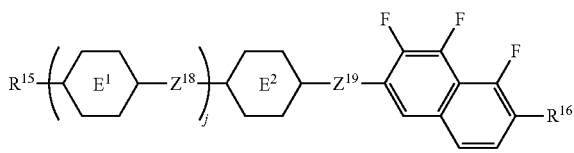
(12)

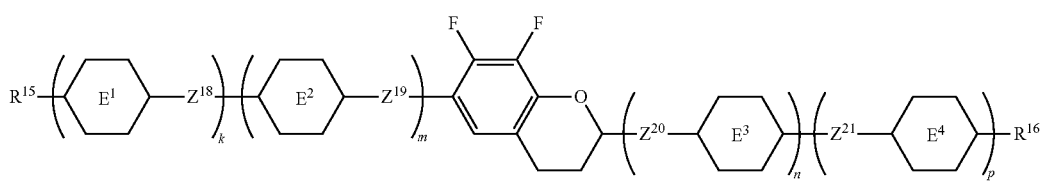
(13)

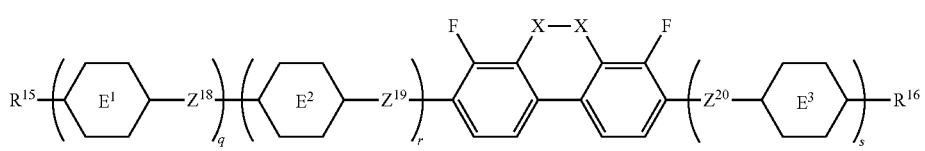
(14)

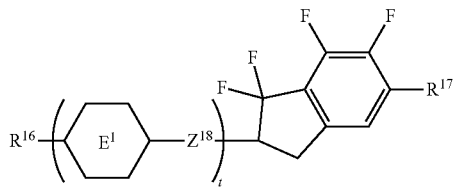
(15)

in formula (9) to formula (15),
- $R^{15}$ and $R^{16}$ are independently alkyl having 1 to 10 carbons or alkenyl having 2 to 10 carbons, and in the alkyl and alkenyl at least one —CH$_2$— may be replaced by —O—, and at least one hydrogen may be replaced by fluorine;
- $R^{17}$ is hydrogen, fluorine, alkyl having 1 to 10 carbons or alkenyl having 2 to 10 carbons, and in the alkyl and alkenyl at least one —CH$_2$— may be replaced by —O—, and at least one hydrogen may be replaced by fluorine;
- ring $E^1$, ring $E^2$, ring $E^3$ and ring $E^4$ are independently 1,4-cyclohexylene, 1,4-cyclohexenylene, 1,4-phenylene in which at least one hydrogen may be replaced by fluorine, tetrahydropyran-2,5-diyl or decahydronaphthalene-2,6-diyl;
- ring $E^5$ and ring $E^6$ are independently 1,4-cyclohexylene, 1,4-cyclohexenylene, 1,4-phenylene, tetrahydropyran-2,5-diyl or decahydronaphthalene-2,6-diyl;
- $Z^{18}$, $Z^{19}$, $Z^{20}$ and $Z^{21}$ are independently a single bond, —CH$_2$CH$_2$—, —COO—, —CH$_2$O—, —OCF$_2$— or —OCF$_2$CH$_2$CH$_2$—;
- $L^{15}$ and $L^{16}$ are independently fluorine or chlorine;
- $S^{11}$ is hydrogen or methyl;
- X is —CHF— or —CF$_2$—; and
- j, k, m, n, p, q, r and s are independently 0 or 1, the sum of k, m, n and p is 1 or 2, the sum of q, r and s is 0, 1, 2 or 3, and t is 1, 2 or 3.

5. A liquid crystal composite formed by the polymerization of the polymerizable composition according to claim 1.

6. A liquid crystal display device containing the polymerizable composition according to claim 1.

7. A compound represented by any one of formula (1-1) to formula (1-6):

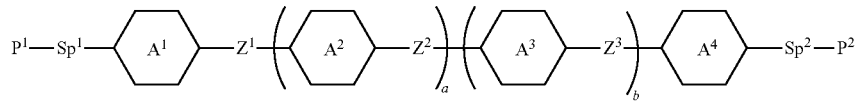

(1-1)

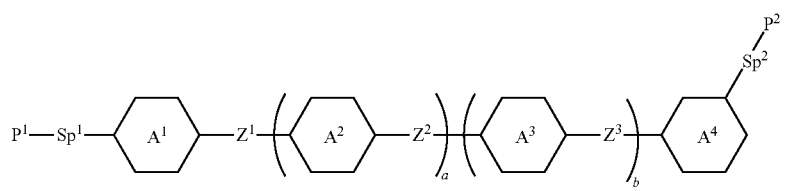

(1-2)

(1-3)

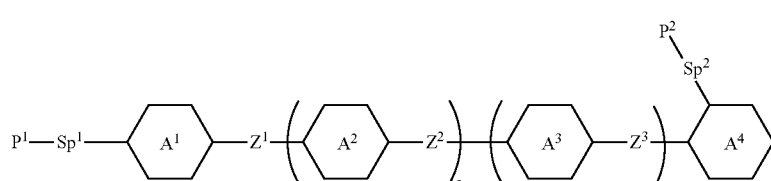

(1-4)

(1-5)

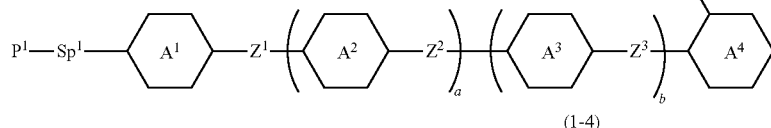

(1-6)

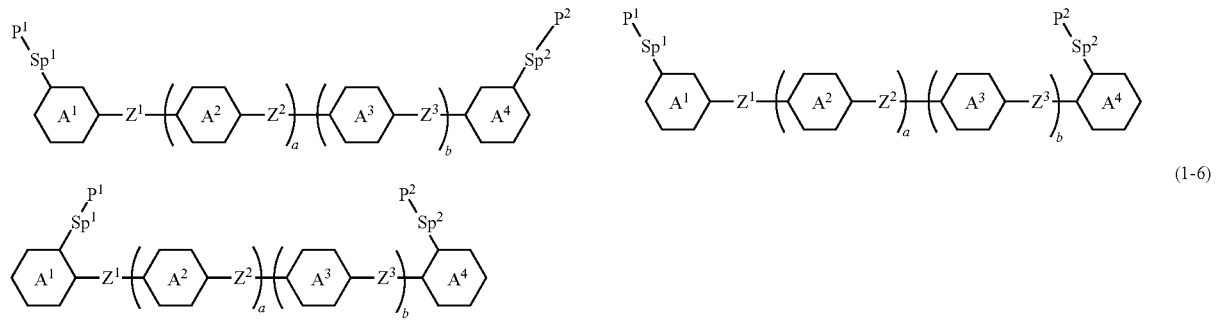

in formula (1-1) to formula (1-6),
$P^1$ and $P^2$ are independently a polymerizable group;
$Sp^1$ and $Sp^2$ are independently a single bond, —$CH_2O$—, —$OCH_2$—, —COO—, —OCO—, —CH=CH—, —C≡C—, —$CH_2CH_2O$—, —$OCH_2CH_2$—, —CH=CHO— or —OCH=CH—;
ring $A^1$ and ring $A^4$ are independently a divalent group derived from benzene, pyrimidine or pyridine;
ring $A^2$ is independently a divalent group derived from benzene, pyrimidine, pyridine, cyclohexane, cyclohexene, tetrahydropyran or dioxane; and in the divalent groups derived from benzene, pyrimidine or pyridine at least one hydrogen may be replaced by halogen, alkyl having 1 carbon, alkyl having 1 carbon in which at least one hydrogen has been replaced by halogen or -$Sp^3$-$P^3$, where the definition of $P^3$ is the same as that of $P^1$ and $P^2$ and the definition of $Sp^3$ is the same as that of $Sp^1$ and $Sp^2$;
$Z^1$ and $Z^2$ are independently —CH=CH— or —C≡C—; and —;
a is 1, and b is 0.

8. The compound according to claim 7, wherein in formula (1-1) to formula (1-6),
$P^1$ is —OCO-($M^1$)C=CH($M^2$), vinyloxy or oxiranyl, and
$P^2$ is —OCO-($M^3$)C=CH($M^4$), vinyloxy or oxiranyl, where $M^1$, $M^2$, $M^3$ and $M^4$ are independently hydrogen, fluorine, methyl or trifluoromethyl;

$Sp^1$ and $Sp^2$ are independently a single bond, —$CH_2O$—, —$OCH_2$—, —COO—, —OCO—, —CH=CH—, —C≡C—, —$CH_2CH_2O$—, —$OCH_2CH_2$—, —CH=CHO— or —OCH=CH—;
ring $A^1$ and ring $A^4$ are independently a divalent group derived from benzene;
ring $A^2$ is independently a divalent group derived from benzene, pyrimidine, pyridine, cyclohexane, tetrahydropyran or dioxane; and in the divalent group derived from benzene at least one hydrogen may be replaced by fluorine, chlorine, alkyl having 1 carbon or alkyl having 1 carbon in which at least one hydrogen has been replaced by fluorine;
$Z^1$ and $Z^2$ are independently —CH=CH— or —C≡C—; -; and
a is 1, and b is 0.

9. The compound according to claim 7, wherein in formula (1-1) to formula (1-6), $P^1$ is —OCO-($M^1$)C=CH($M^2$), and $P^2$ is —OCO-($M^3$)C=CH($M^4$),
where $M^1$ and $M^3$ are independently hydrogen or methyl, $M^2$ and $M^4$ are hydrogen;
$Sp^1$ and $Sp^2$ are independently a single bond;
ring $A^1$, ring $A^2$, and ring $A^4$ are independently a divalent group derived from benzene, and in this divalent group one or two hydrogens may be replaced by fluorine, chlorine, methyl, difluoromethyl or trifluoromethyl;
$Z^1$ and $Z^2$ are independently —CH=CH— or —C≡C—; and
a is 1, and b is 0.

10. A compound represented by either formula (1-11) or (1-12)

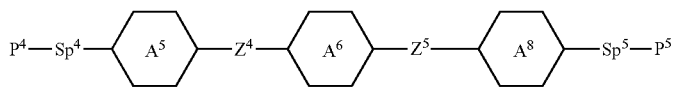
(1-11)

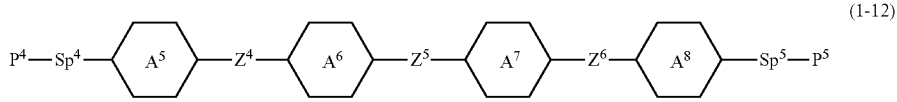
(1-12)

wherein in formula (1-11) or formula (1-12),
$P^4$ is —OCO-($M^5$)C=$CH_2$ and $P^5$ is —OCO-($M^6$)C=$CH_2$, where $M^5$ and $M^6$ are independently hydrogen, fluorine, methyl or trifluoromethyl;
$Sp^4$ and $Sp^5$ are independently a single bond, —$CH_2$O—, —O$CH_2$—, —COO—, —OCO—, —CH=CH—, —C≡C—, —$CH_2CH_2$O—, —O$CH_2CH_2$—, —CH=CHO— or —OCH=CH—;
ring $A^5$, ring $A^6$, ring $A^7$ and ring $A^8$ are independently 1,4-phenylene, pyrimidine-2,5-diyl or pyridine-2,5-diyl, and in this divalent group at least one hydrogen may be replaced by fluorine, methyl, difluoromethyl or trifluoromethyl;
ring $A^6$ and ring $A^7$ may be independently 1,4-cyclohexylene, 1,4-cyclohexenylene, tetrahydropyran-2,5-diyl or 1,3-dioxane-2,5-diyl; and
$Z^4$, $Z^5$ and $Z^6$ are independently —CH=CH— or —C≡C—.

11. The compound according to claim 10, wherein in formula (1-11) or formula (1-12), $P^1$ is —OCO-($M^5$)C=$CH_2$ and $P^2$ is —OCO-($M^6$)C=$CH_2$,
where $M^5$ and $M^6$ are independently hydrogen or methyl;
$Sp^4$ and $Sp^5$ are independently a single bond, —$CH_2$O—, —O$CH_2$—, —$CH_2CH_2$O—, —O$CH_2CH_2$—, —CH=CHO— or —OCH=CH—;
ring $A^5$, ring $A^6$, ring $A^7$ and ring $A^8$ are independently 1,4-phenylene, 2-fluoro-1,4-phenylene, 2,3-difluoro-1,4-phenylene, 2,5-difluoro-1,4-phenylene, 2-difluoromethyl-1,4-phenylene or 2-trifluoromethyl-1,4-phenylene; and
$Z^4$, $Z^5$ and $Z^6$ are independently —CH=CH— or —C≡C—.

12. A compound represented by either formula (1-111) or (1-112):

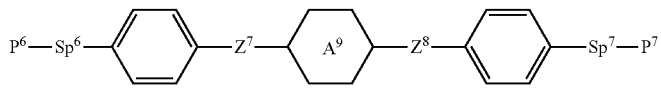
(1-111)

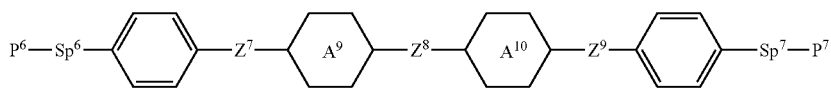
(1-112)

wherein in formula (1-111) or formula (1-112), $P^6$ and $P^7$ are independently —OCO—HC=$CH_2$ or —OCO—($CH_3$)C=$CH_2$;

$Sp^6$ and $Sp^7$ are independently a single bond, —$CH_2$O—, —O$CH_2$—, —CH=CHO— or —OCH=CH—;

ring $A^9$ and ring $A^{10}$ are independently 1,4-phenylene, 2-fluoro-1,4-phenylene, 2,3-difluoro-1,4-phenylene or 2,5-difluoro-1,4-phenylene; and $Z^7$, $Z^8$ and $Z^9$ are independently —CH=CH— or —C≡C—.

13. The compound according to claim 12, wherein in formula (1-111) or formula (1-112), $Sp^1$ and $Sp^2$ are a single bond.

14. A compound represented by formula (1-1111), formula (1-1112) or (1-1113):

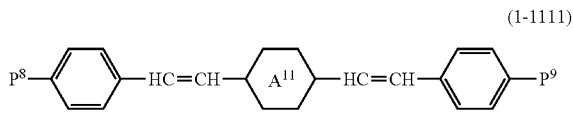
(1-1111)

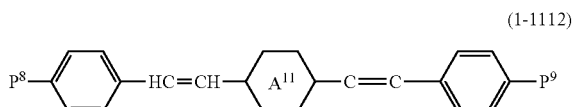
(1-1112)

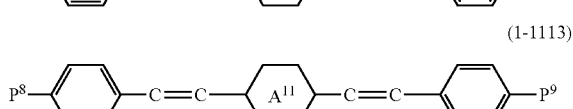
(1-1113)

wherein in formula (1-1111), (1-1112) or formula (1-1113),
$P^8$ and $P^9$ are independently —OCO—HC=$CH_2$ or —OCO—($CH_3$)C=$CH_2$, and ring $A^{11}$ is 2-fluoro-1,4-phenylene.

15. A polymerizable composition including at least one compound according to claim 7.

16. An optically anisotropic material formed by polymerization of the polymerizable composition according to claim 15.

* * * * *